US009552844B2

(12) United States Patent
Fujimoto et al.

(10) Patent No.: US 9,552,844 B2
(45) Date of Patent: Jan. 24, 2017

(54) IMAGE PROCESSING APPARATUS, IMAGE PROCESSING METHOD AND PROGRAM

(75) Inventors: Eisuke Fujimoto, Kanagawa (JP); Masayuki Ichihara, Tokyo (JP); Masayoshi Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 995 days.

(21) Appl. No.: 13/522,652

(22) PCT Filed: Jan. 20, 2011

(86) PCT No.: PCT/JP2011/050924
§ 371 (c)(1),
(2), (4) Date: Jul. 17, 2012

(87) PCT Pub. No.: WO2011/096278
PCT Pub. Date: Aug. 11, 2011

(65) Prior Publication Data
US 2012/0287267 A1 Nov. 15, 2012

(30) Foreign Application Priority Data
Feb. 8, 2010 (JP) ................................. 2010-025728

(51) Int. Cl.
*H04N 5/77* (2006.01)
*H04N 9/80* (2006.01)
(Continued)

(52) U.S. Cl.
CPC ......... *G11B 27/034* (2013.01); *G11B 27/3027* (2013.01)

(58) Field of Classification Search
USPC ................................. 386/223–226, 241, 248
See application file for complete search history.

(56) References Cited

U.S. PATENT DOCUMENTS 6,903,763 B1 * 6/2005 Noguchi ................ G01C 21/36
348/116
7,627,420 B2 * 12/2009 Ujino ..................... G01C 21/20
340/995.1

(Continued)

FOREIGN PATENT DOCUMENTS

| JP | 2002-057967 | 2/2002 |
| JP | 2006-148514 | 6/2006 |
| JP | 2006-254414 | 9/2006 |

OTHER PUBLICATIONS

International Search Report; International Application No. PCT/JP2011/050924; International Filing Date: Jan. 20, 2011.

*Primary Examiner* — Nigar Chowdhury
(74) *Attorney, Agent, or Firm* — Michael Best & Friedrich LLP

(57) ABSTRACT

To easily edit dynamic image content suiting user's preferences in consideration of the geographical position. A trajectory information generation unit 230 generates trajectory information about a trajectory during imaging of dynamic image content based on position information, wherein the dynamic image content is associated with the position information and azimuth information. An editing point setting unit 260 sets a section of the dynamic image content on a time axis based on the generated trajectory information. For example, the section is set based on a comparison result of an imaging range of the trajectory identified by the generated trajectory information (imaging range identified by azimuth information) and a specific target area such as a landmark. A play list information generation unit 270 generates play list information about a playback of the dynamic image content based on the set section. A display control unit 240 displays the trajectory identified by the generated trajectory information by superimposing the trajectory on a map containing the trajectory.

20 Claims, 95 Drawing Sheets

(51) Int. Cl.
*G11B 27/034* (2006.01)
*G11B 27/30* (2006.01)

(56) References Cited

U.S. PATENT DOCUMENTS

| | | | | |
|---|---|---|---|---|
| 8,248,503 | B2* | 8/2012 | Sogoh | G06T 17/05 348/333.02 |
| 2003/0007668 | A1* | 1/2003 | Kotake | G01C 21/26 382/113 |
| 2004/0017852 | A1* | 1/2004 | Garrido | H04N 7/0125 375/240.16 |
| 2004/0037540 | A1* | 2/2004 | Frohlich | G11B 31/006 386/285 |
| 2004/0145663 | A1* | 7/2004 | Nishio | G06F 17/30259 348/239 |
| 2006/0080286 | A1* | 4/2006 | Svendsen | G06F 17/30265 |
| 2007/0035639 | A1* | 2/2007 | Aridome | G01C 21/20 348/231.3 |
| 2009/0115862 | A1* | 5/2009 | Andersson | G09B 29/106 348/222.1 |
| 2010/0064239 | A1* | 3/2010 | Crawford | G06F 17/30265 715/771 |

* cited by examiner

FIG.2
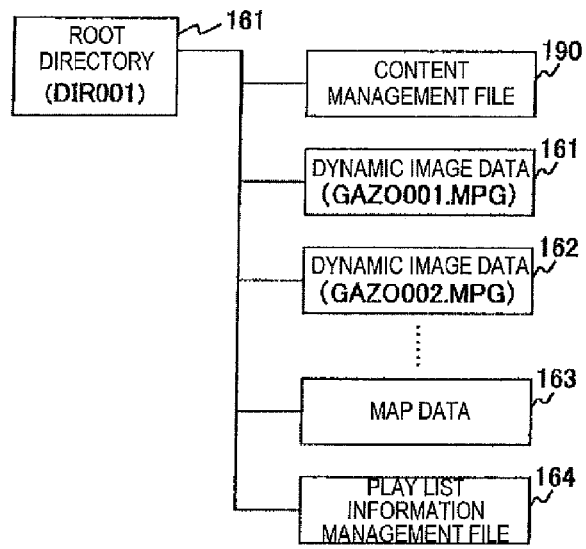
(a)
(b)

FIG.4

290 PLAY LIST INFORMATION STORAGE UNIT

| 291 PLAY LIST IDENTIFICATION INFORMATION | 292 CONTENT IDENTIFICATION INFORMATION | 293 SECTION INFORMATION | 294 PLAY LIST NAME | 295 PLAY LIST CREATION DATE/TIME INFORMATION | 296 LANDMARK INFORMATION | 297 MAP DISPLAY AREA INFORMATION |
|---|---|---|---|---|---|---|
| #2001 | #01 | ... ... ... | O×ZOO | 12/15/2009 0H. ○○MIN. ○SEC. | ... | ... |
|  | #03 | ... ... | | | | |
| ... | ... | ... ... | ... | ... | ... | ... |
| ... | ... | ... | ... | ... | ... | ... |

FIG.5
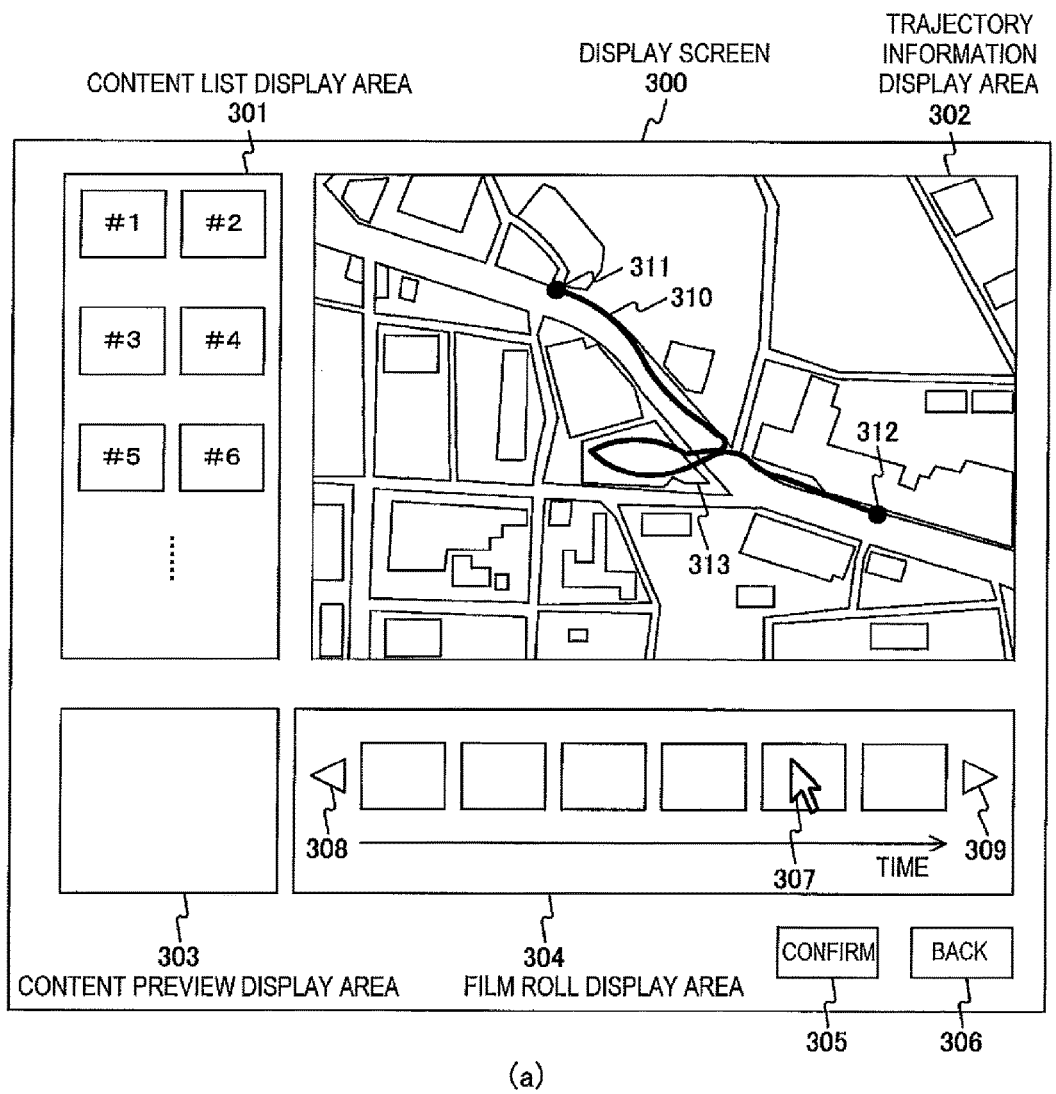
(a)
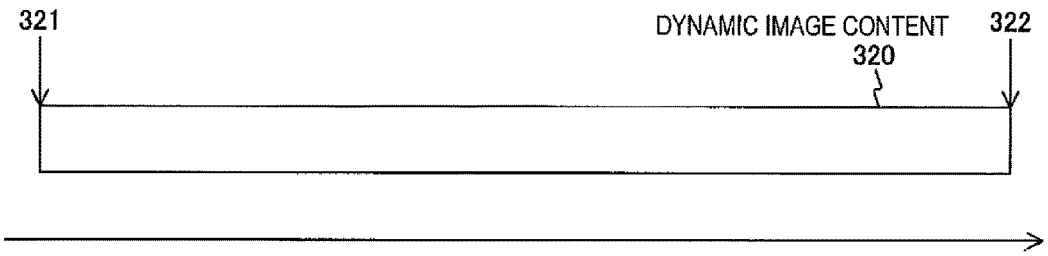
(b)

FIG.6
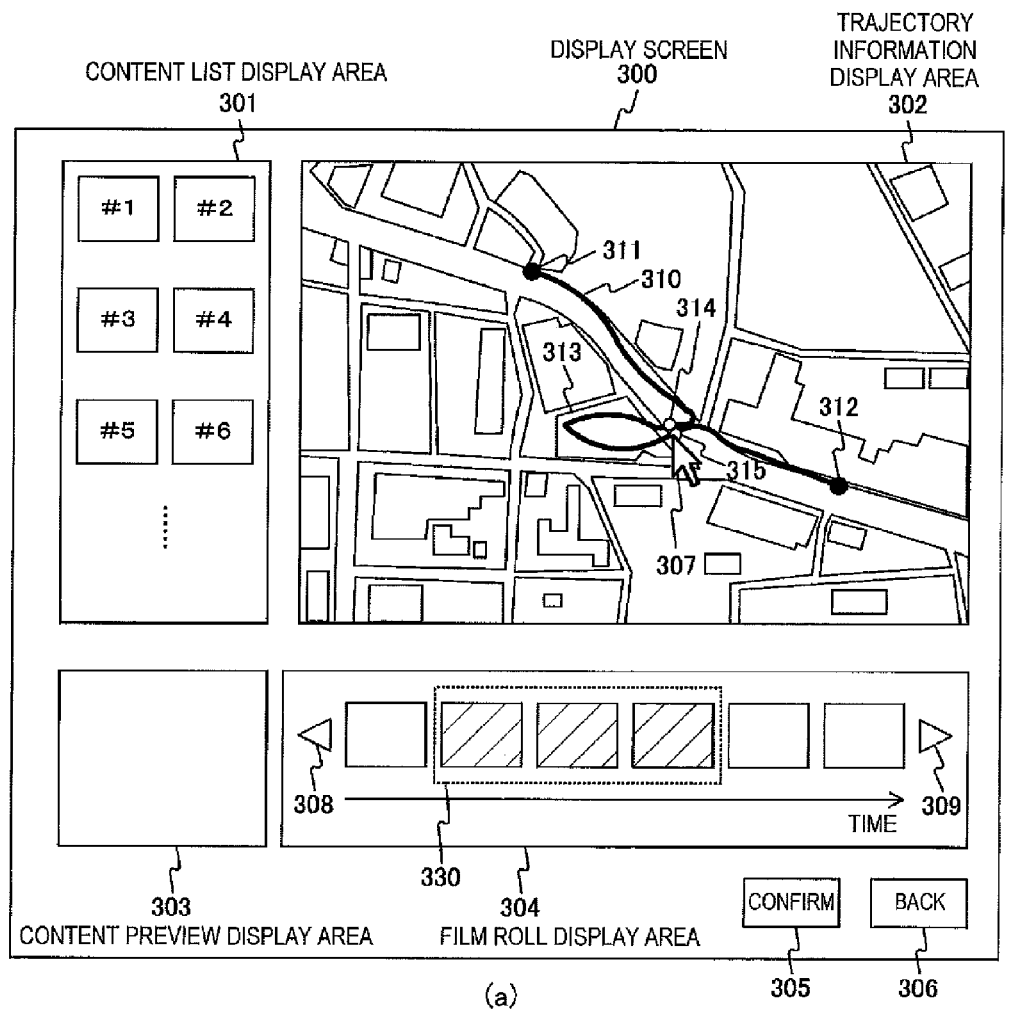
(a)
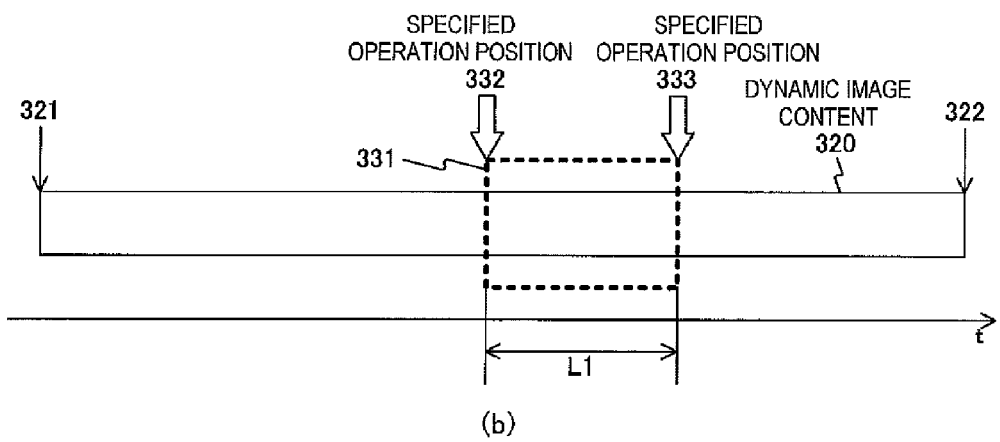
(b)

FIG.11
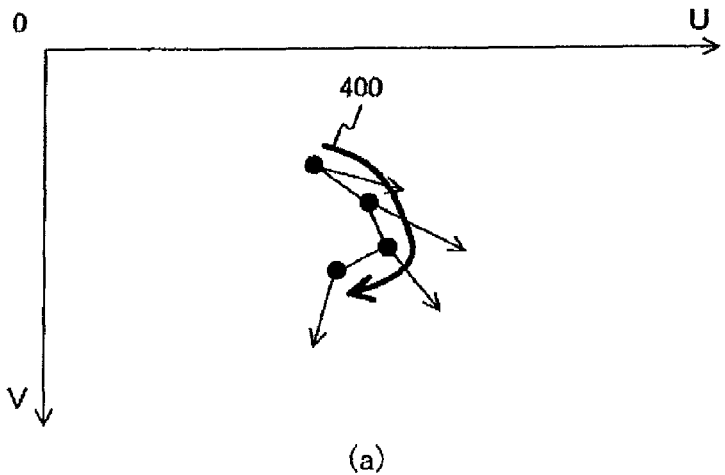
(a)
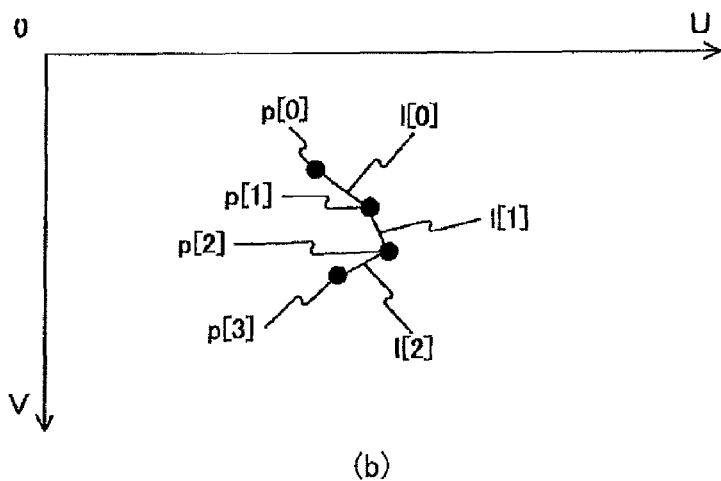
(b)
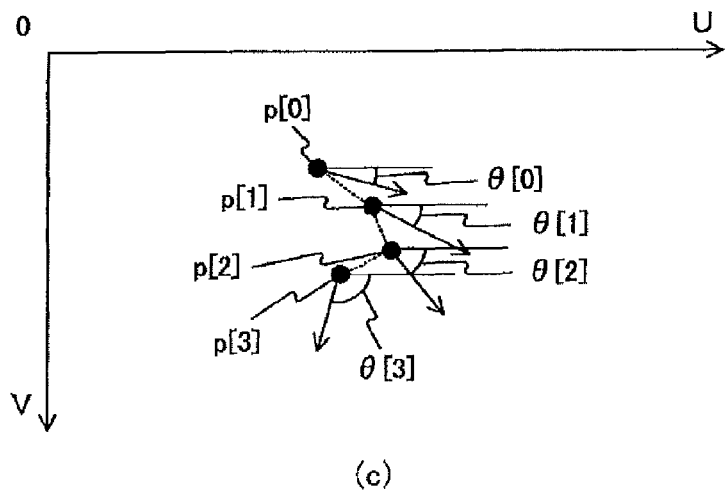
(c)

FIG.12
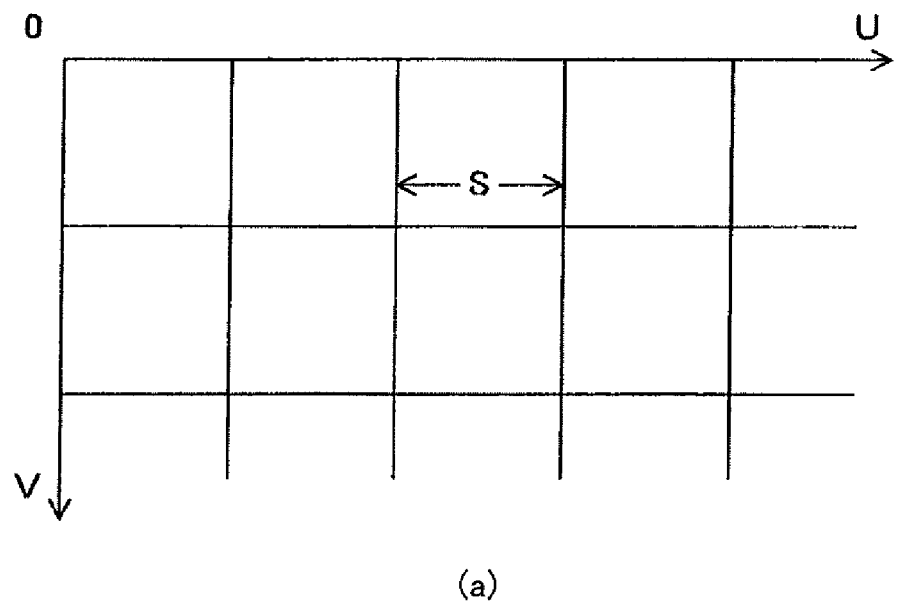
(a)
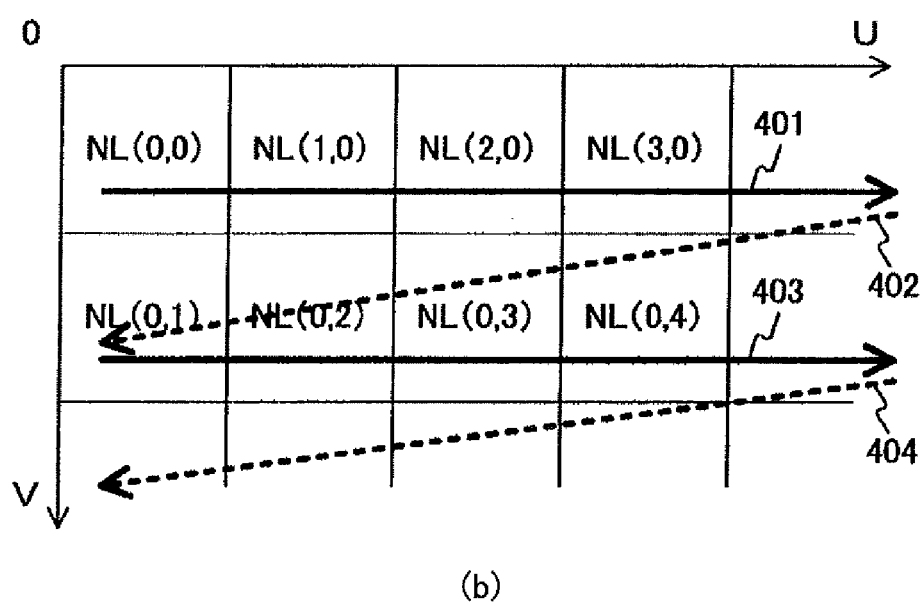
(b)

FIG.14
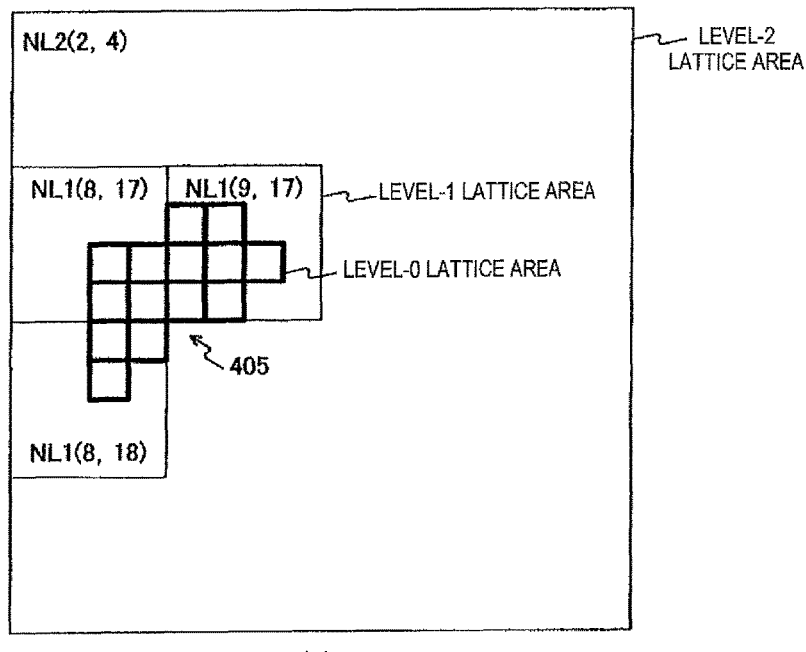
(a)
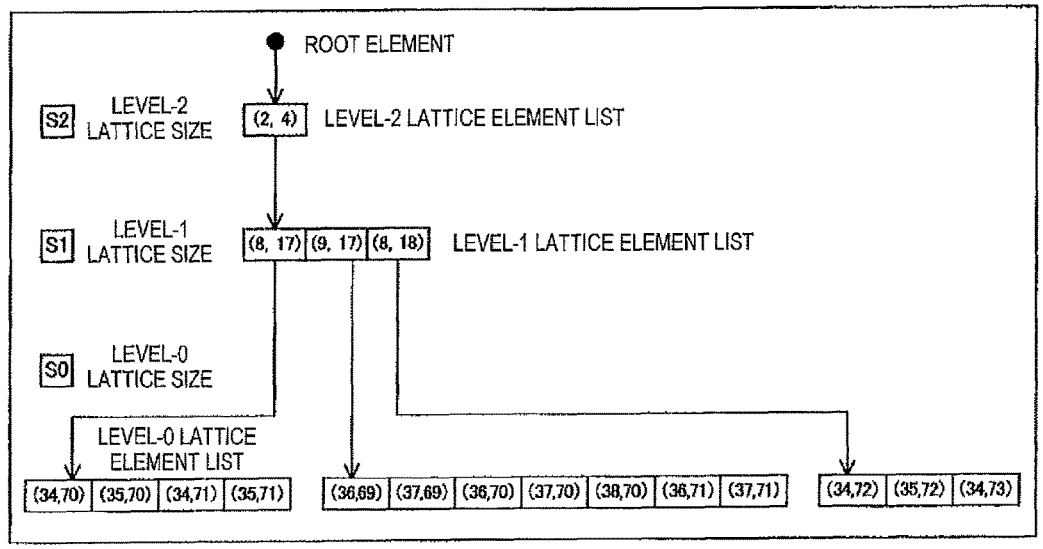
(b)

FIG.15
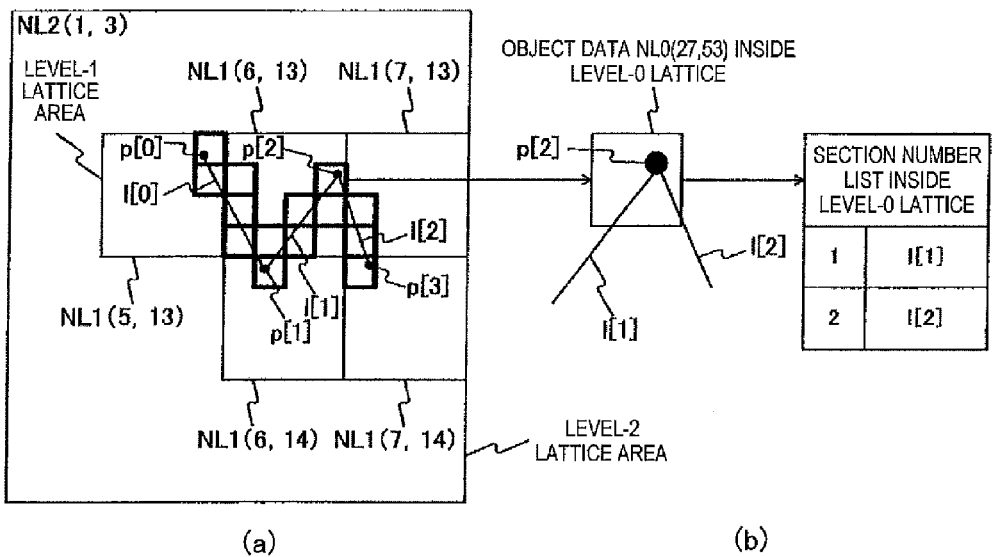
(a) (b)
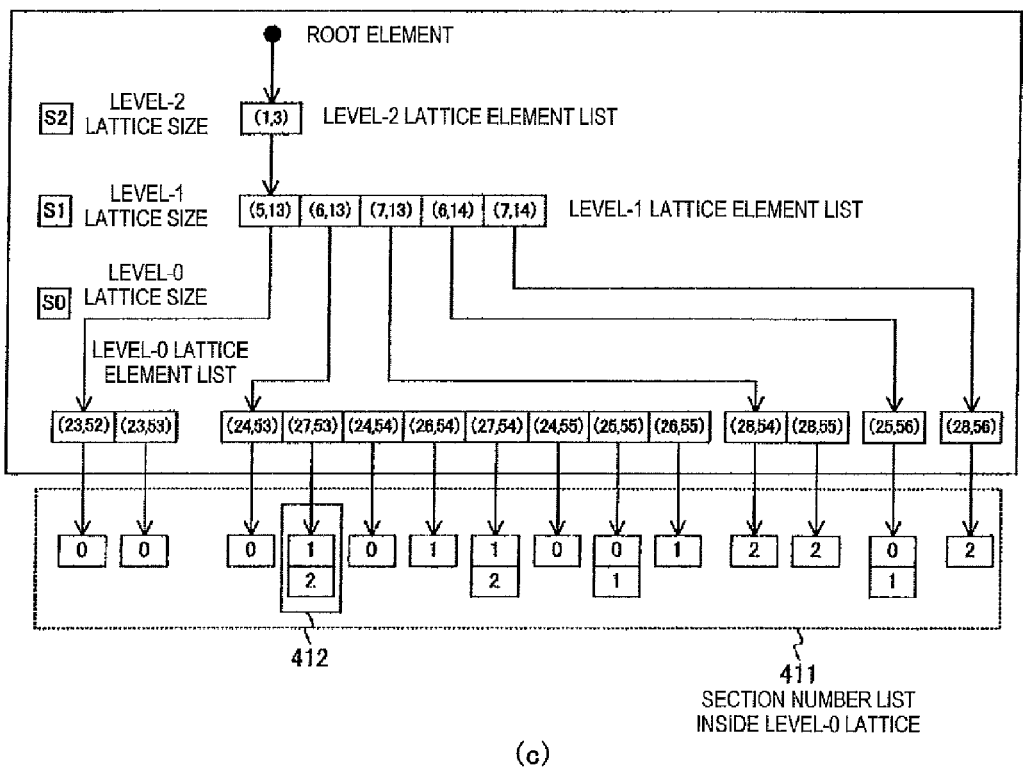
(c)

FIG.16
INPUT (SHOOTING TRAJECTORY)
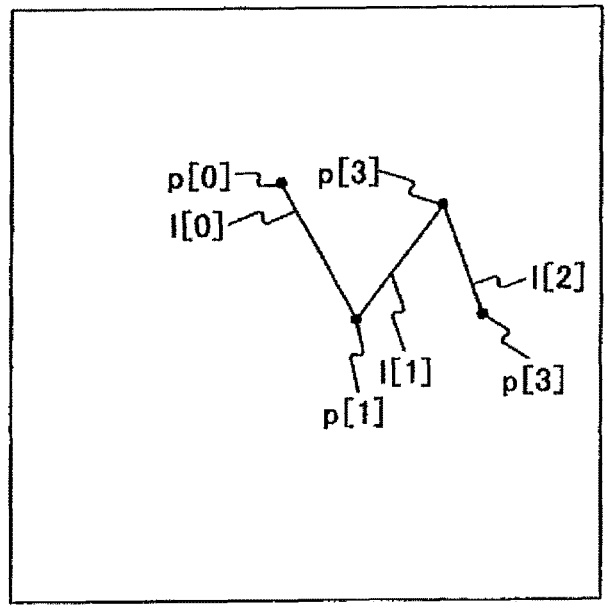
(a)
OUTPUT (SHOOTING TRAJECTORY HIERARCHICAL LATTICE AREA DATA)
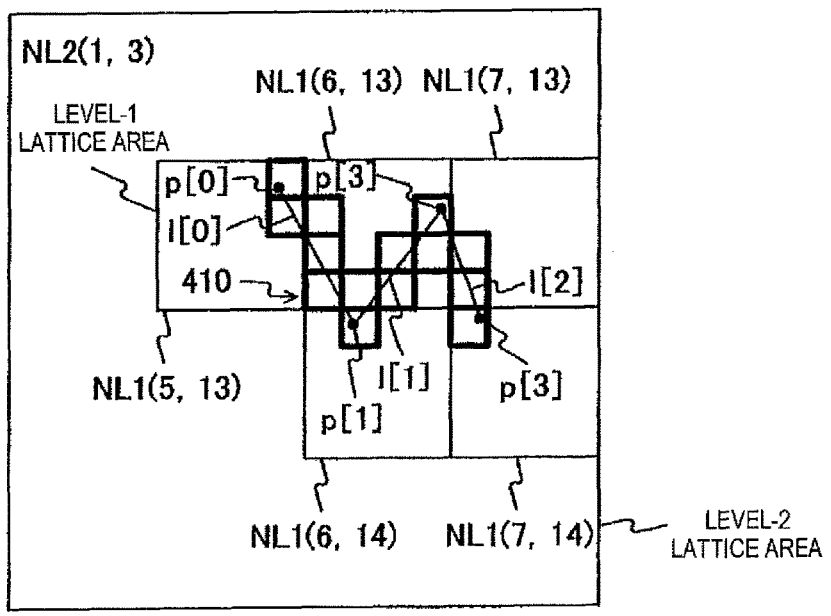
(b)

FIG.18
INPUT (LINE SEGMENT)
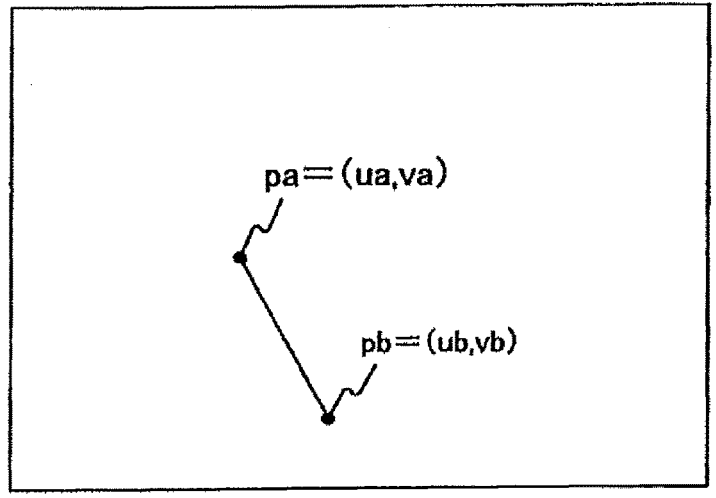
(a)
OUTPUT (LEVEL-0 LATTICE NUMBER LIST OF LINE SEGMENT)
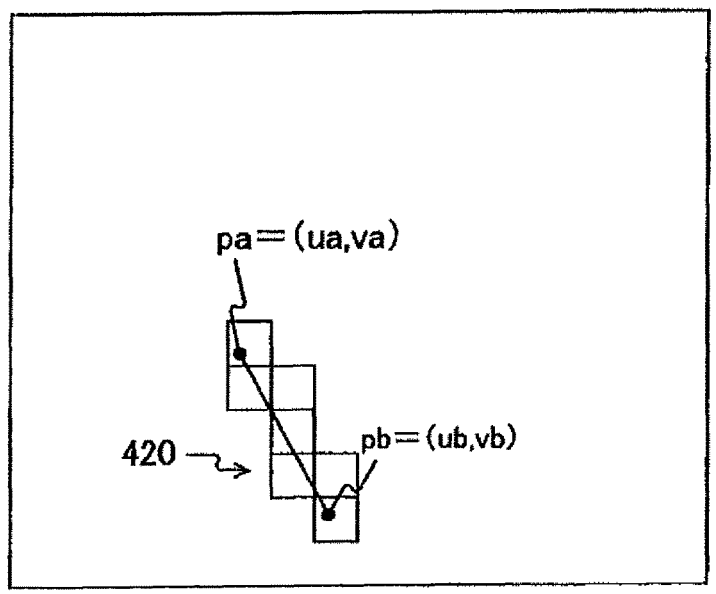
(b)

FIG.21
INPUT (UPWARD LINE SEGMENT)
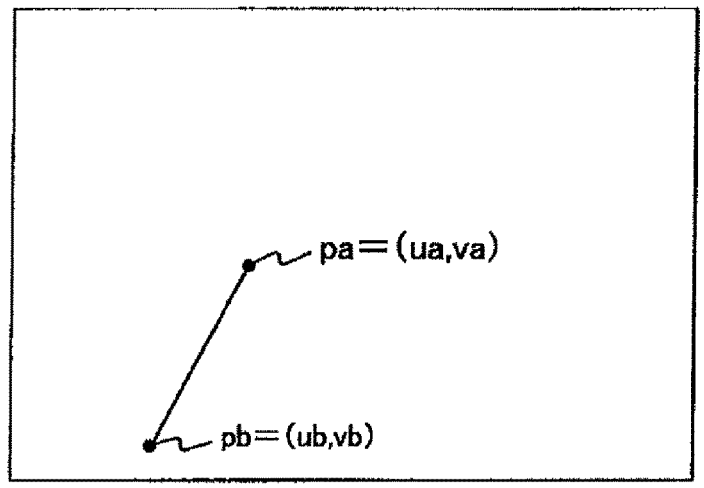
(a)
OUTPUT (LEVEL-0 LATTICE NUMBER LIST OF LINE SEGMENT)
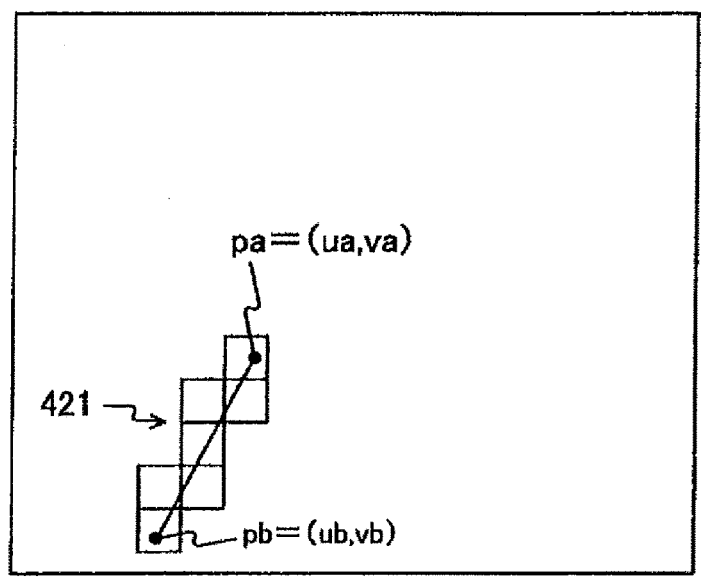
(b)

FIG.23
INPUT (STRAIGHT LINE SEGMENT)
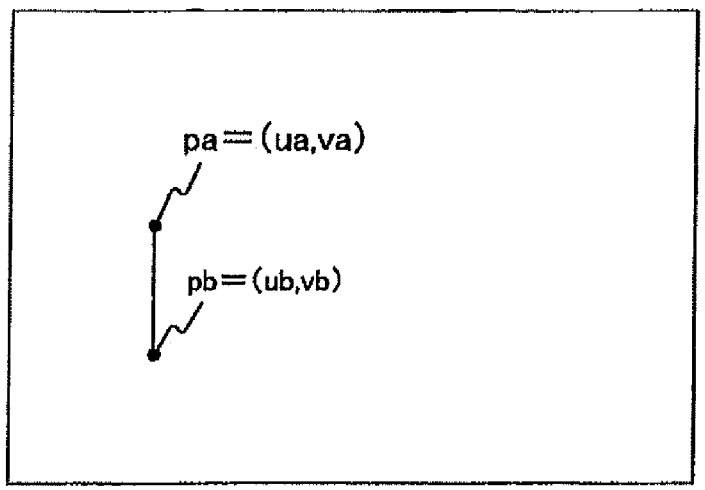
(a)
OUTPUT (LEVEL-0 LATTICE NUMBER LIST OF LINE SEGMENT)
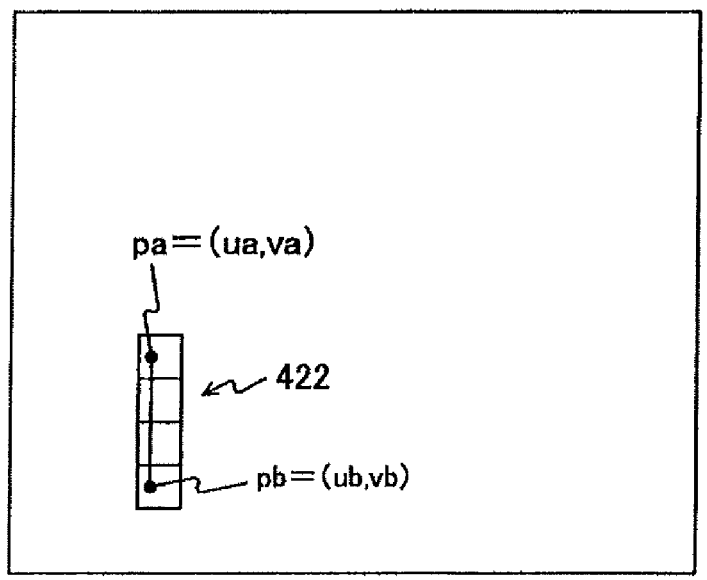
(b)

FIG.24
INPUT (HIERARCHICAL LATTICE AREA DATA, (SECTION NUMBER+LEVEL-0 LATTICE NUMBER LIST))
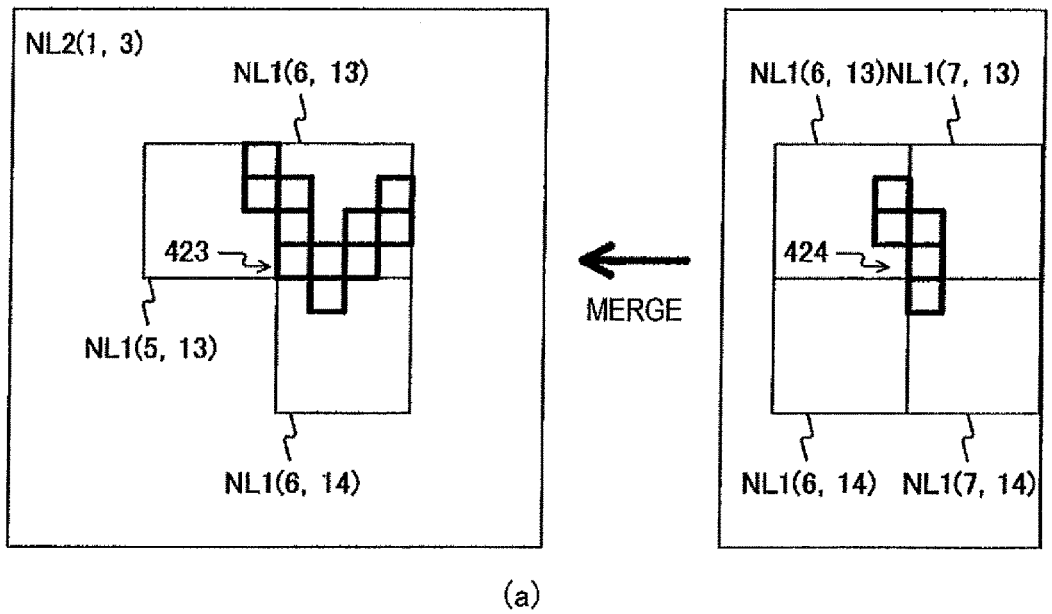
(a)
OUTPUT (SHOOTING TRAJECTORY HIERARCHICAL LATTICE AREA DATA)
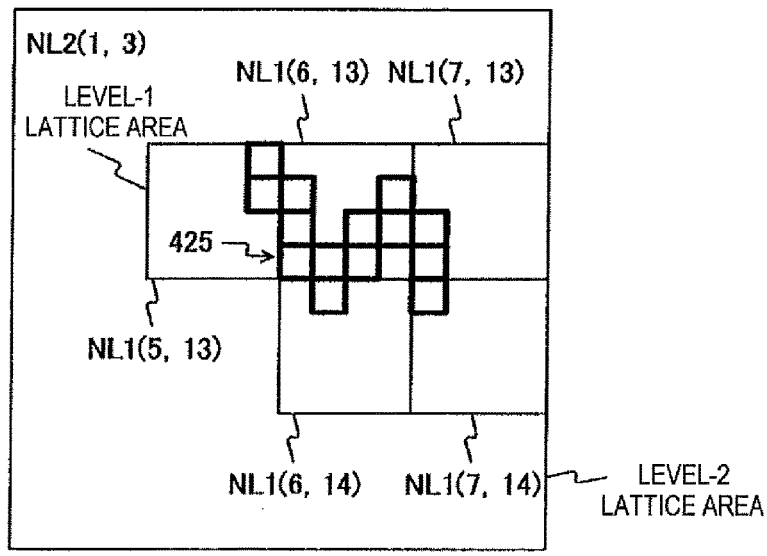
(b)

FIG.25
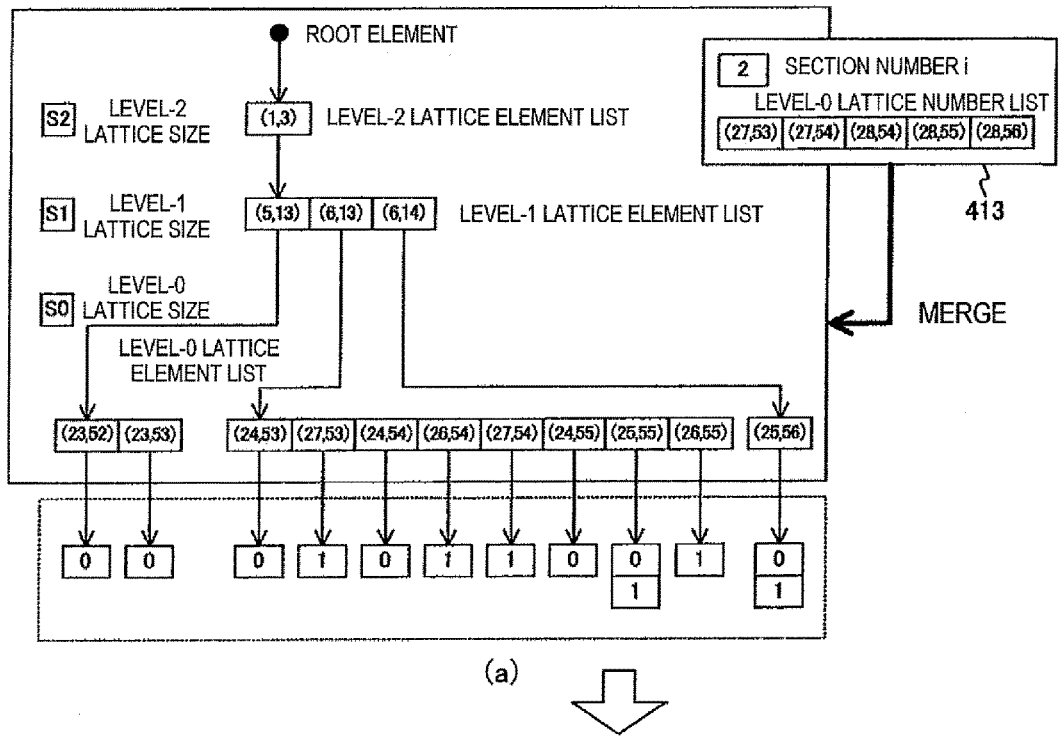
(a)
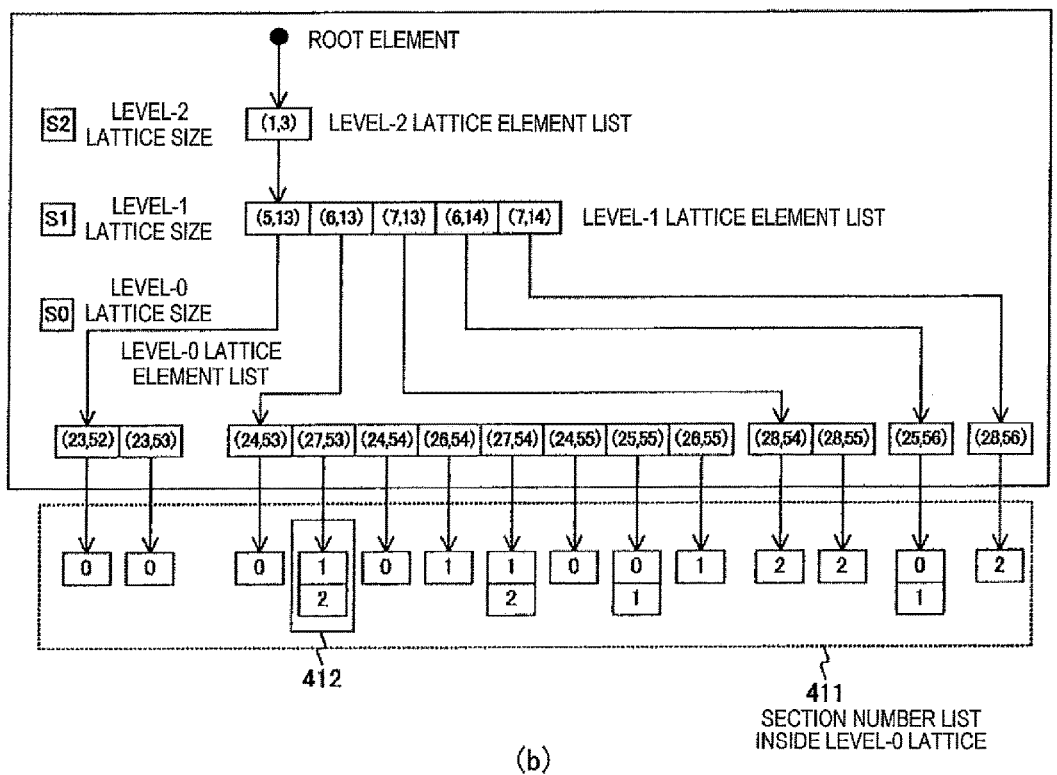
(b)

FIG.28
INPUT 1 (SHOOTING TRAJECTORY HIERARCHICAL LATTICE AREA DATA)
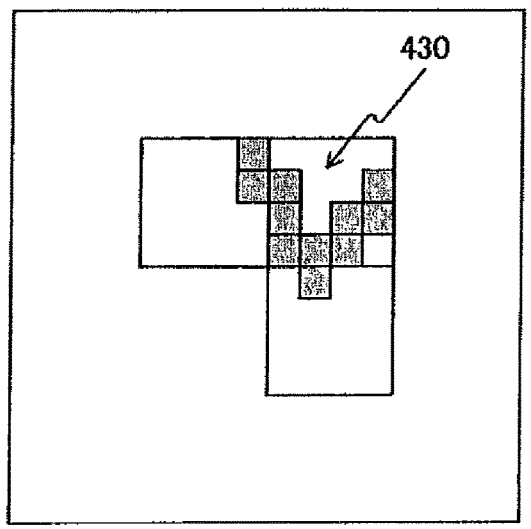
INPUT 2 (TARGET AREA HIERARCHICAL LATTICE AREA DATA)
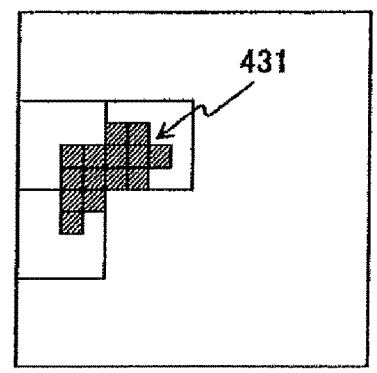
(a) 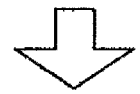
OUTPUT (COLLISION LEVEL-0 LATTICE ELEMENT PAIR LIST)
( (Ea[0], Eb[0]), (Ea[1], Eb[1]), ···, (Ea[N-1], Eb[N-1]) )
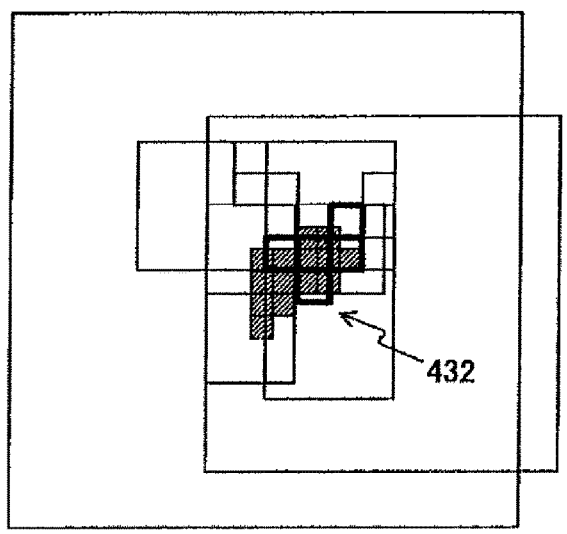
(b)

FIG. 31
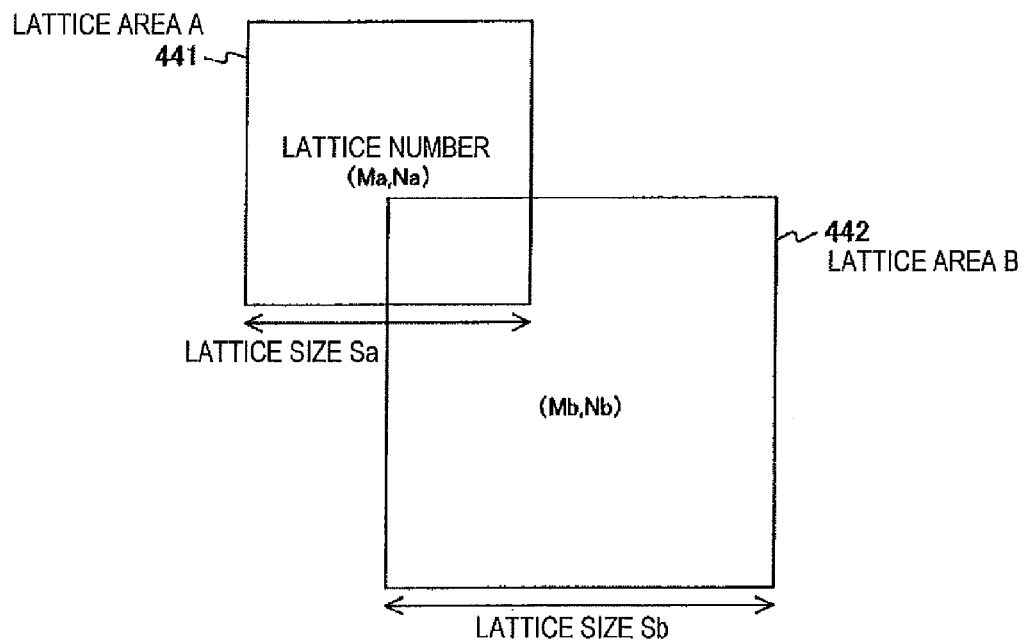
(a)
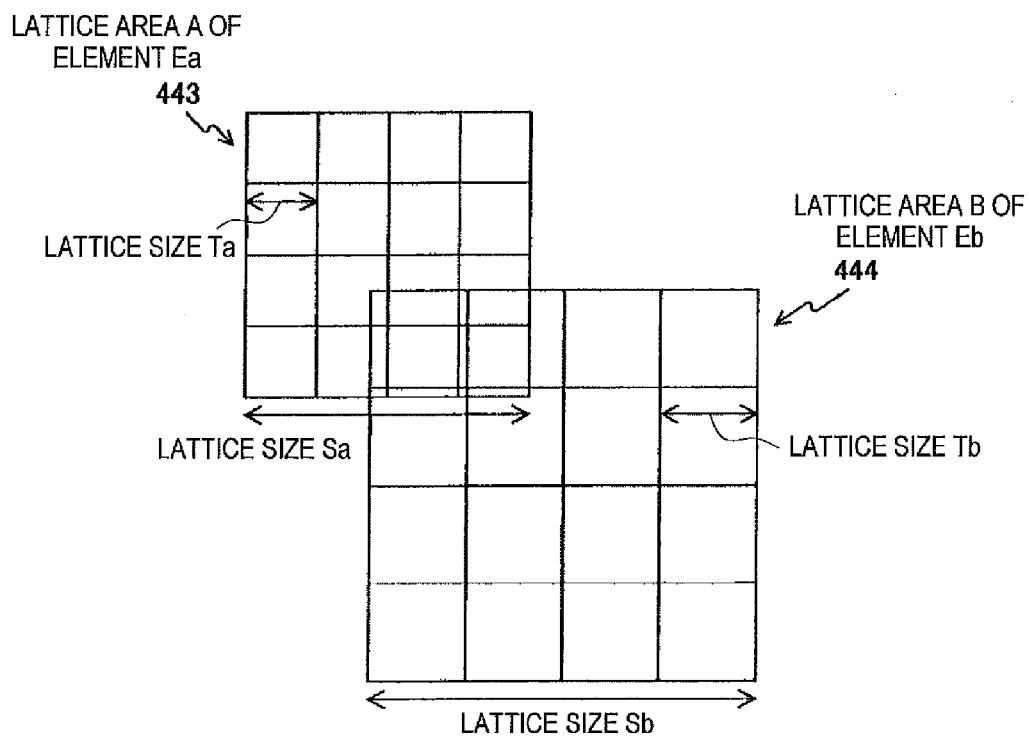
(b)

FIG.35
INPUT (SHOOTING TRAJECTORY)
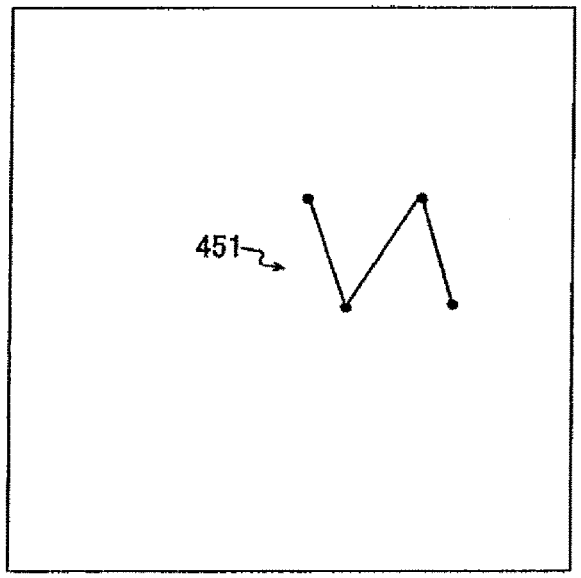
(a)
OUTPUT (SHOOTING TRAJECTORY HIERARCHICAL LATTICE AREA DATA)
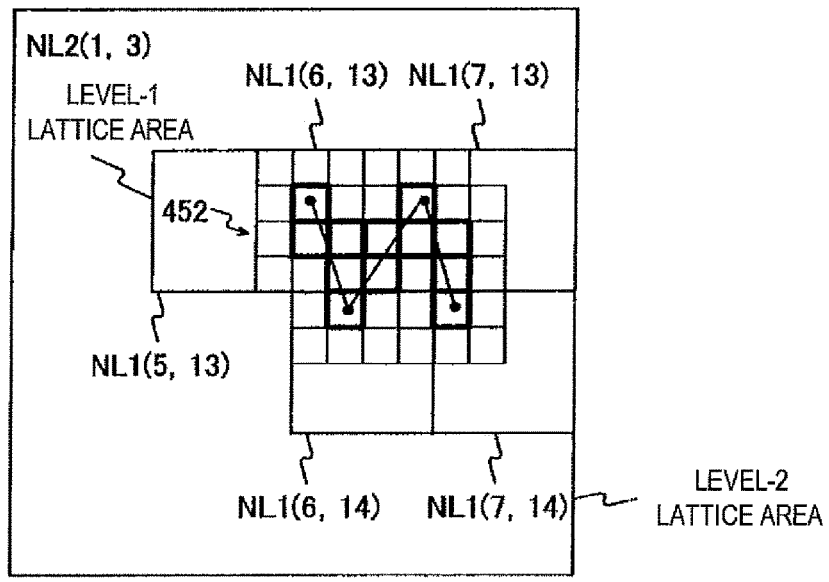
(b)

FIG.37
INPUT (LEVEL-0 LATTICE NUMBER LIST OF LINE SEGMENT)
$((m[0],n[0]),(m[1],n[1]),$
$\cdots,(m[N-1],n[N-1]))$
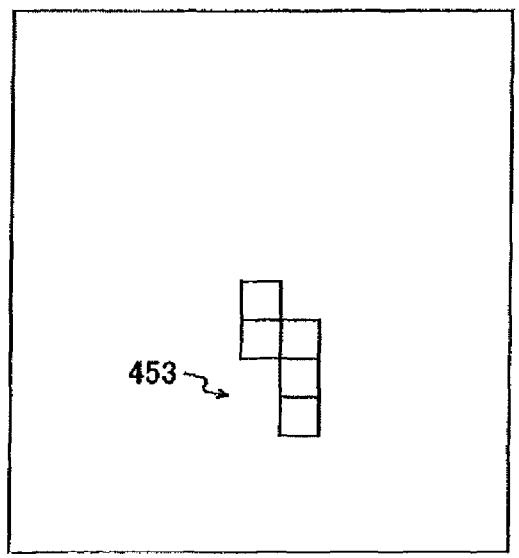
(a)
OUTPUT (LEVEL-0 LATTICE NUMBER LIST OF INTRA-SECTION SHOOTING AREA)
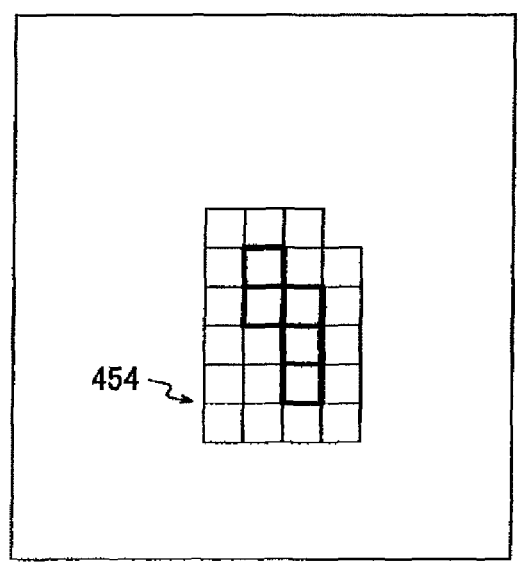
(b)

FIG.38
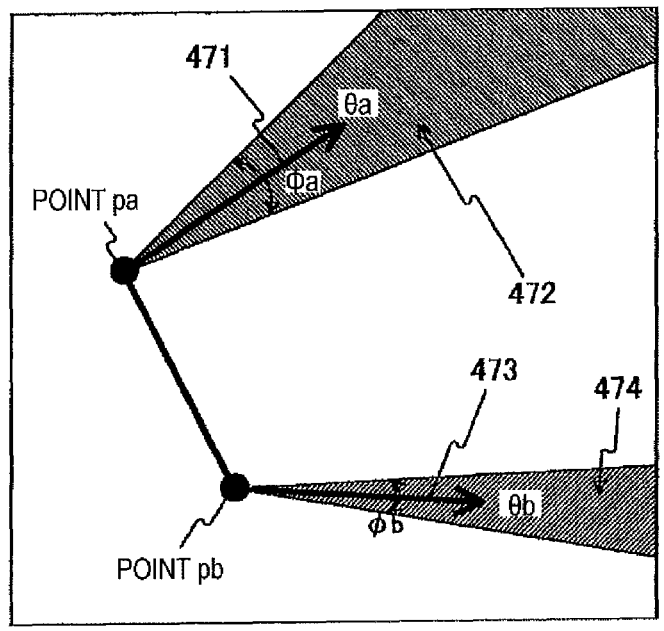
(a)
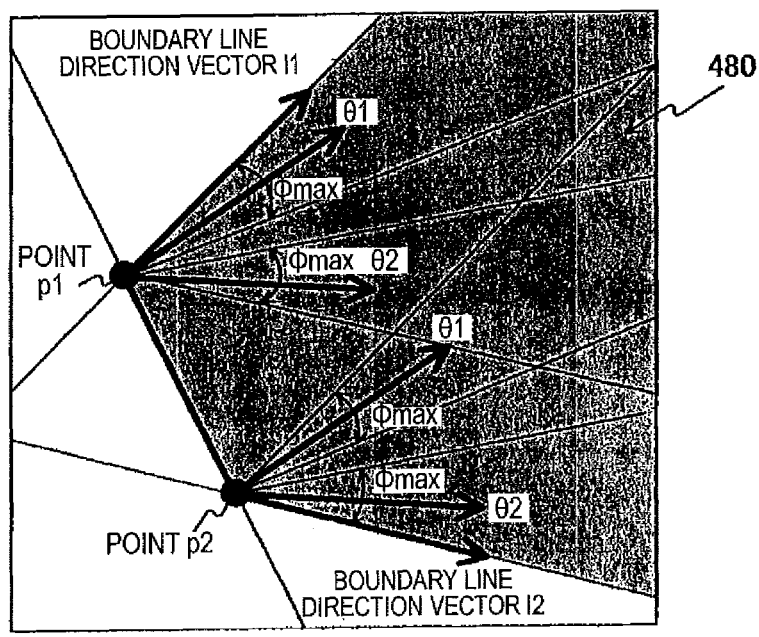
(b)

FIG.39
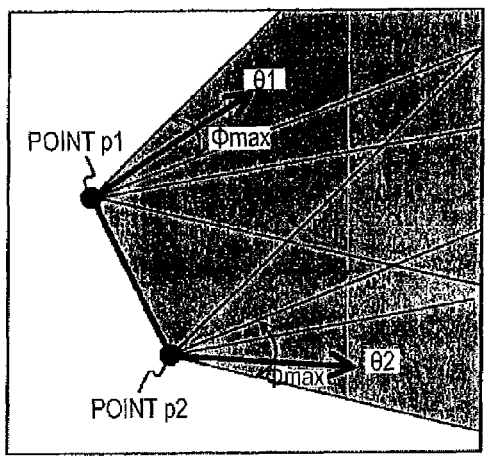
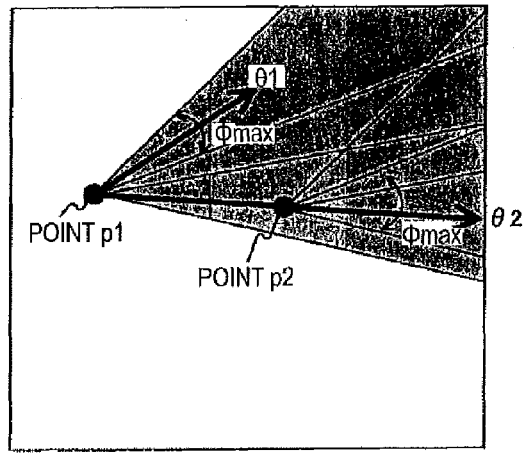
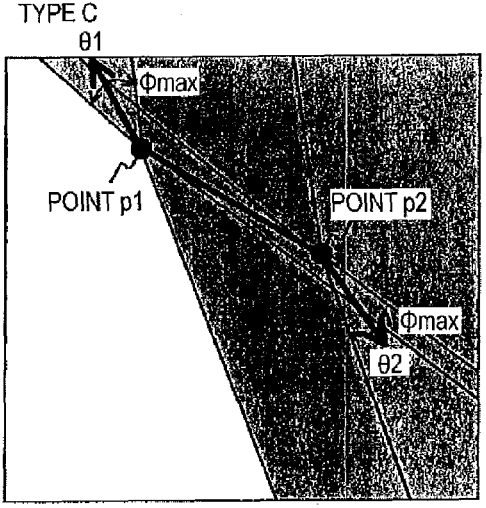
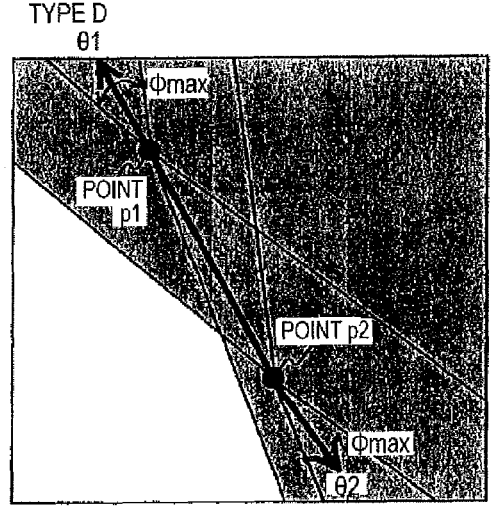

FIG.41
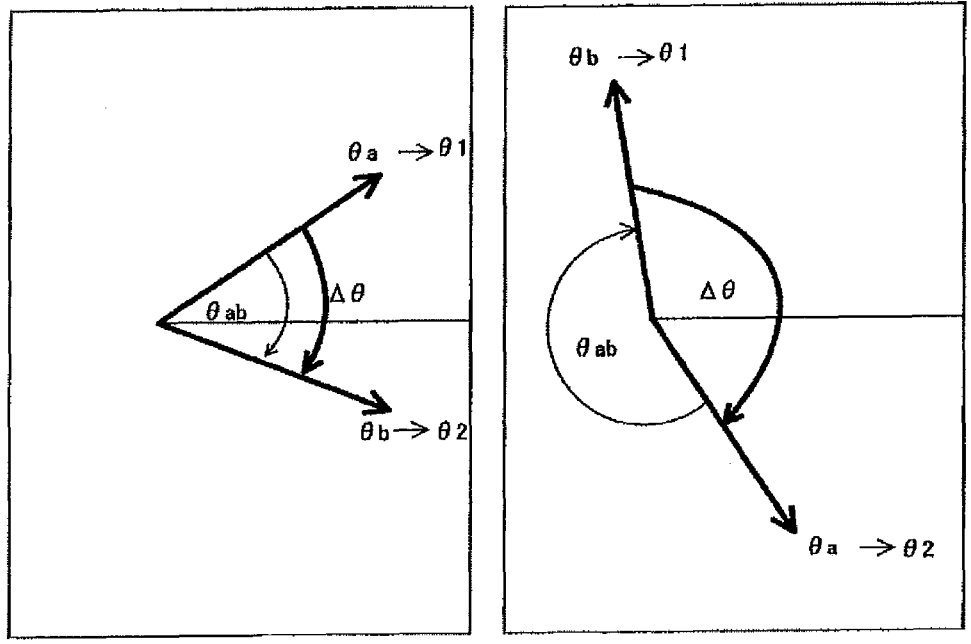
(a)  (b)
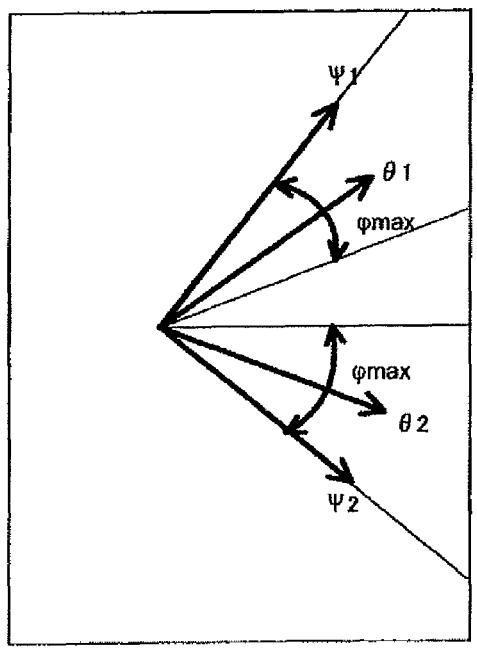
(c)

FIG.45
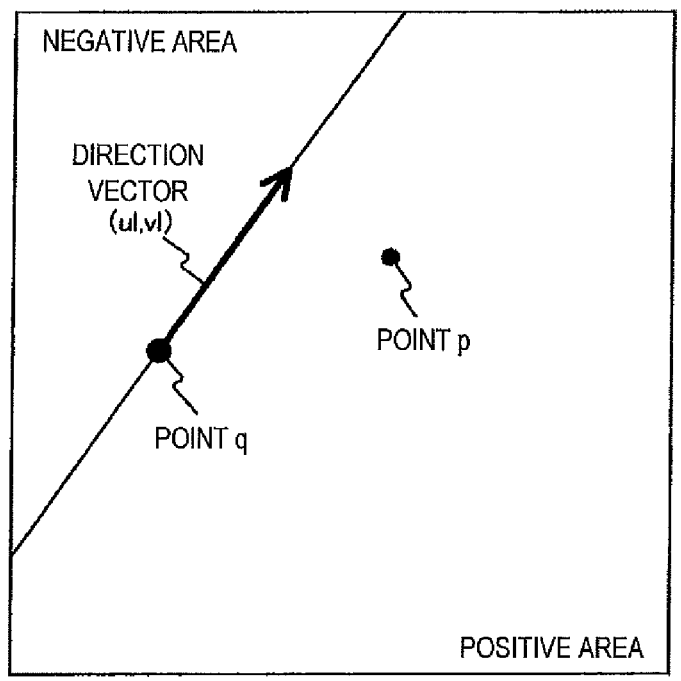
(a)
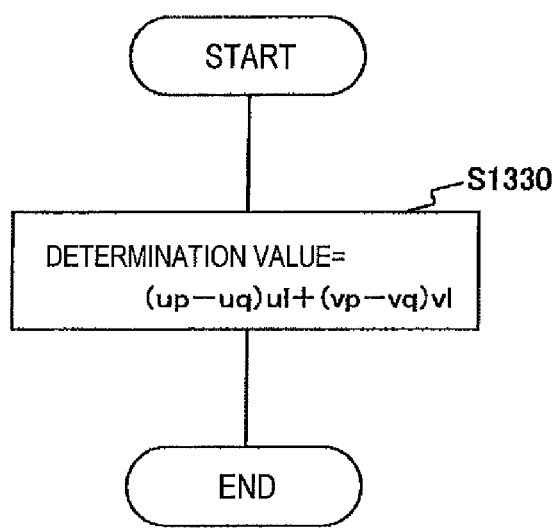
(b)

FIG.46
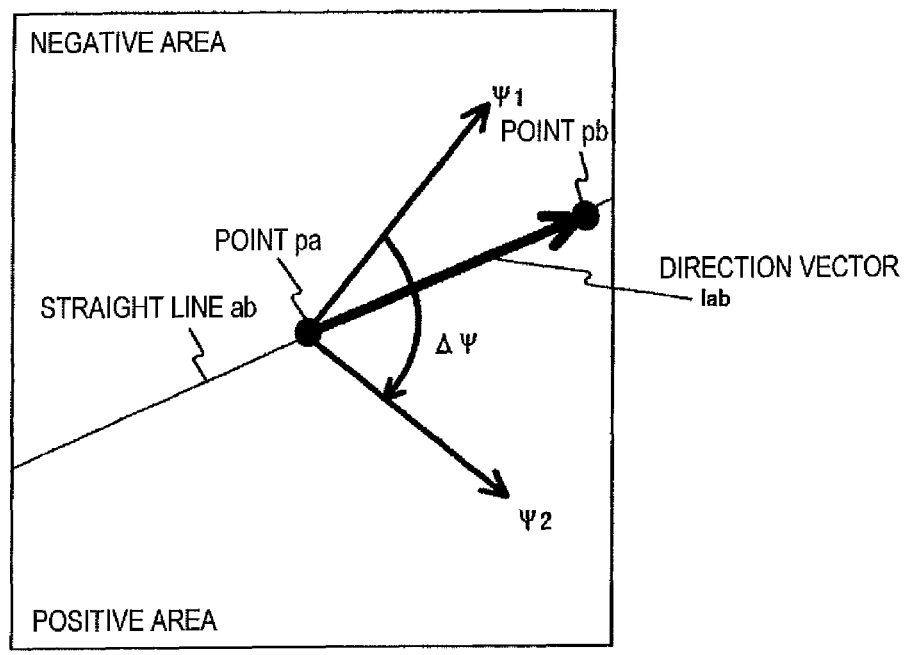
(a)
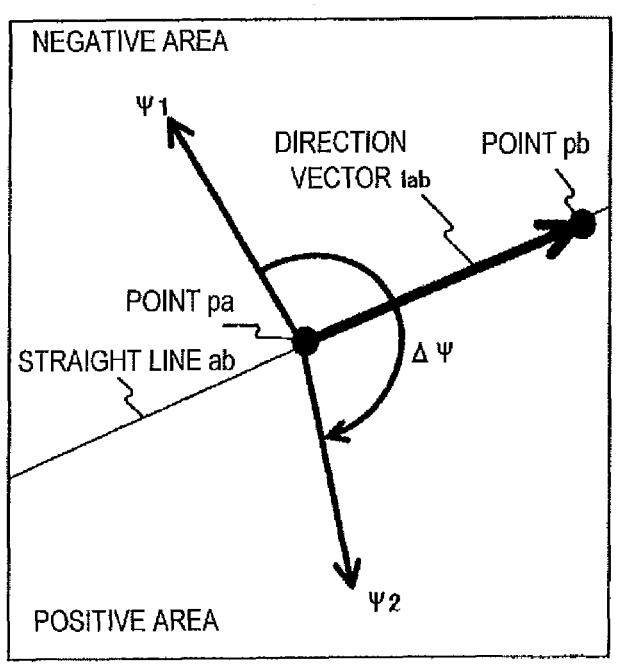
(b)

FIG.48
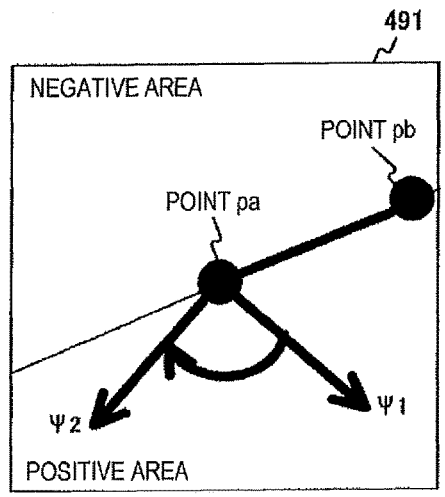
(a)
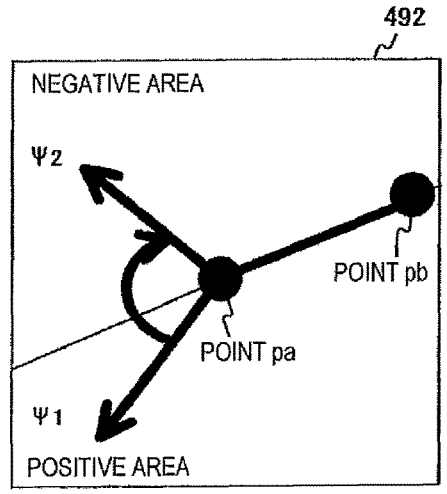
(a)
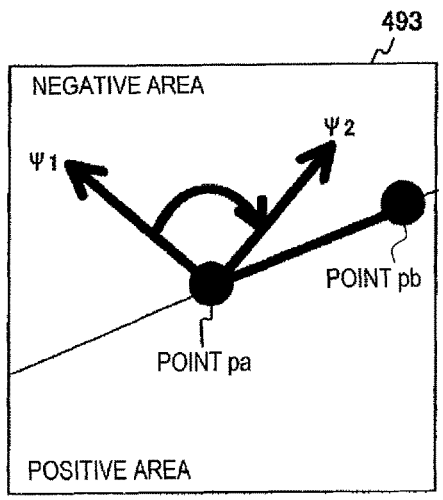
(c)
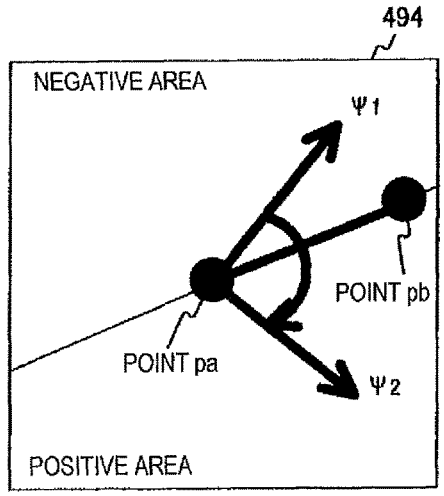
(d)

FIG.50
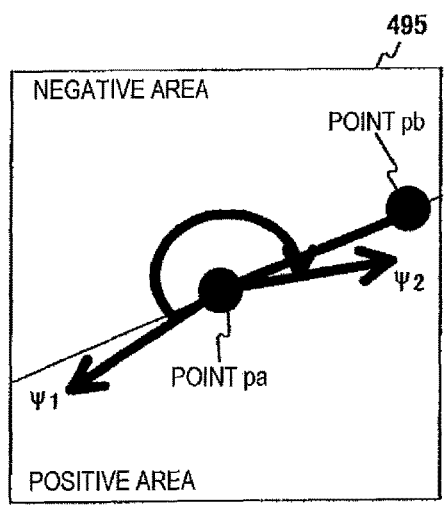
(a)
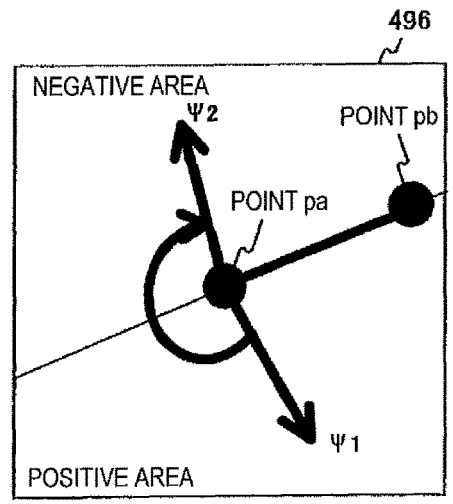
(a)
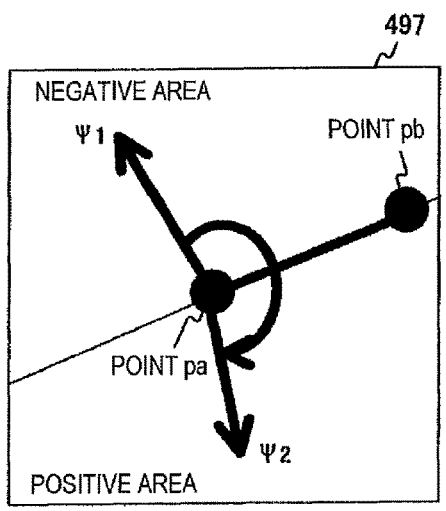
(c)
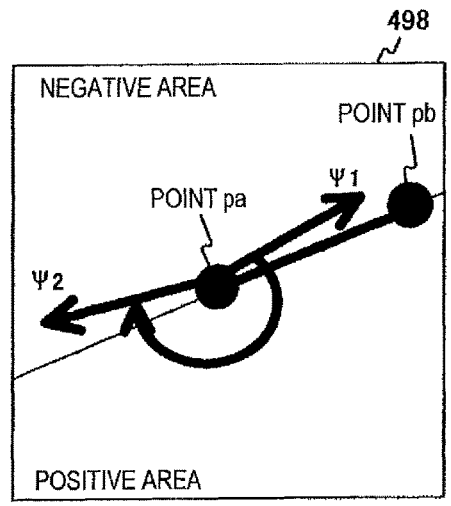
(d)

FIG.54
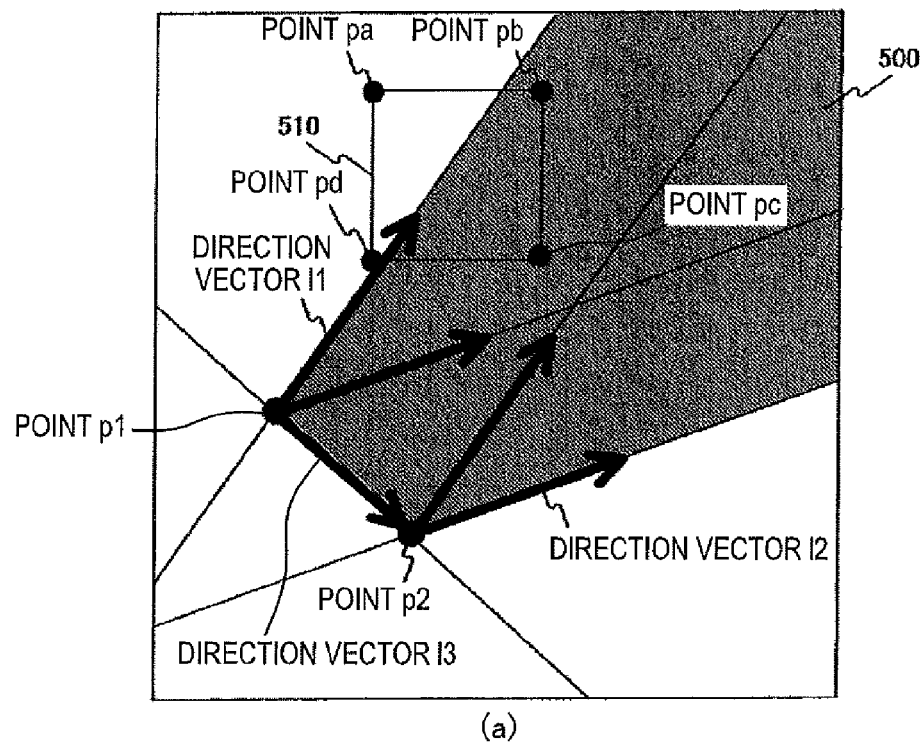
(a)
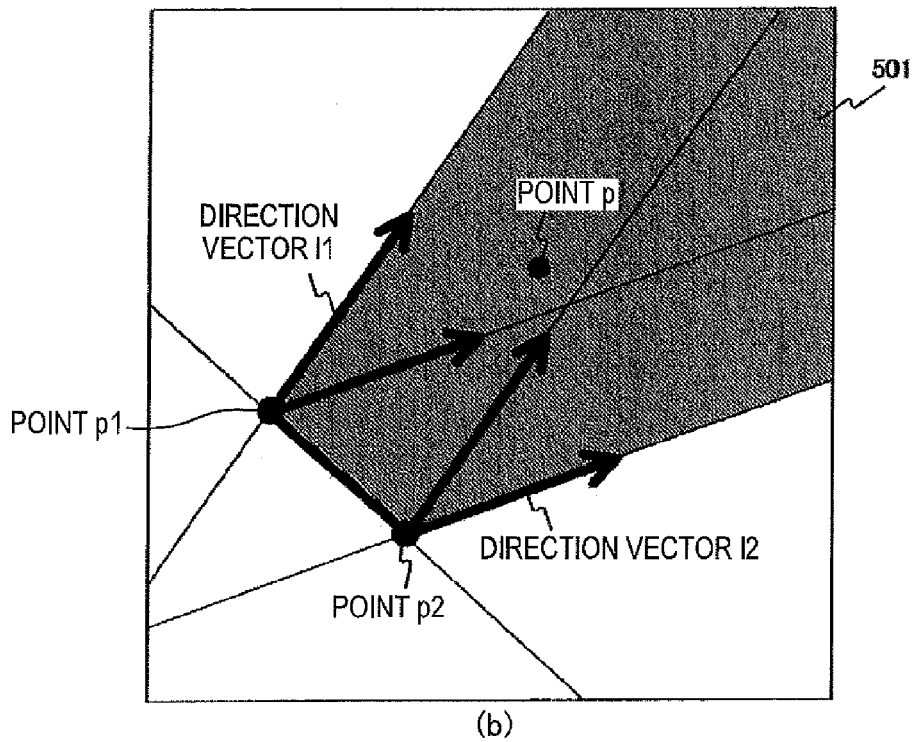
(b)

FIG.55
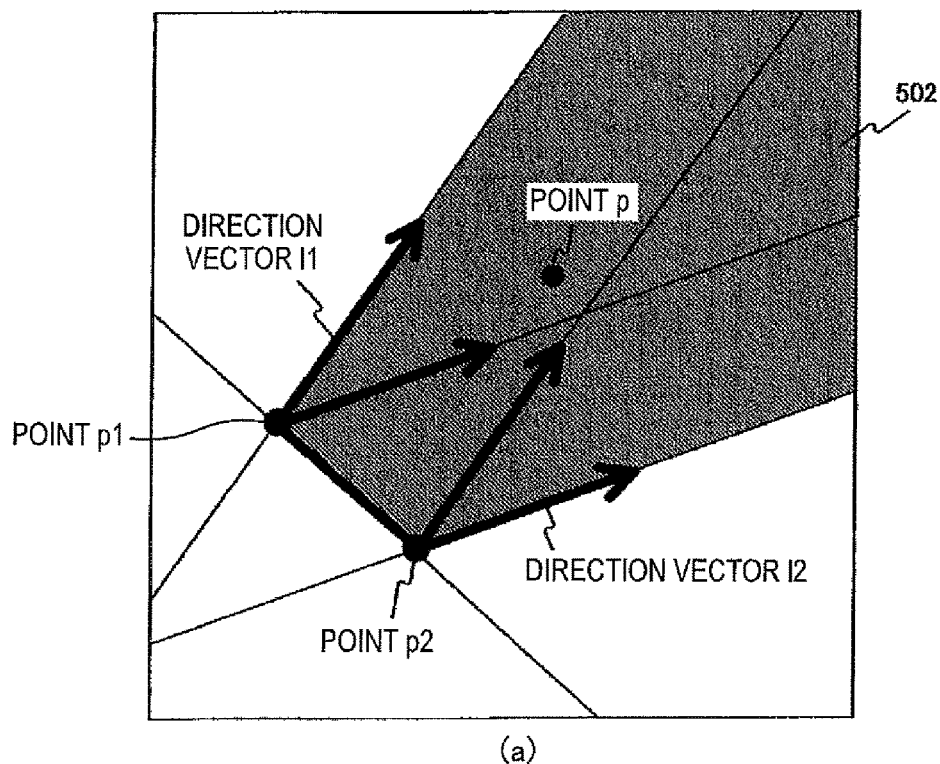
(a)
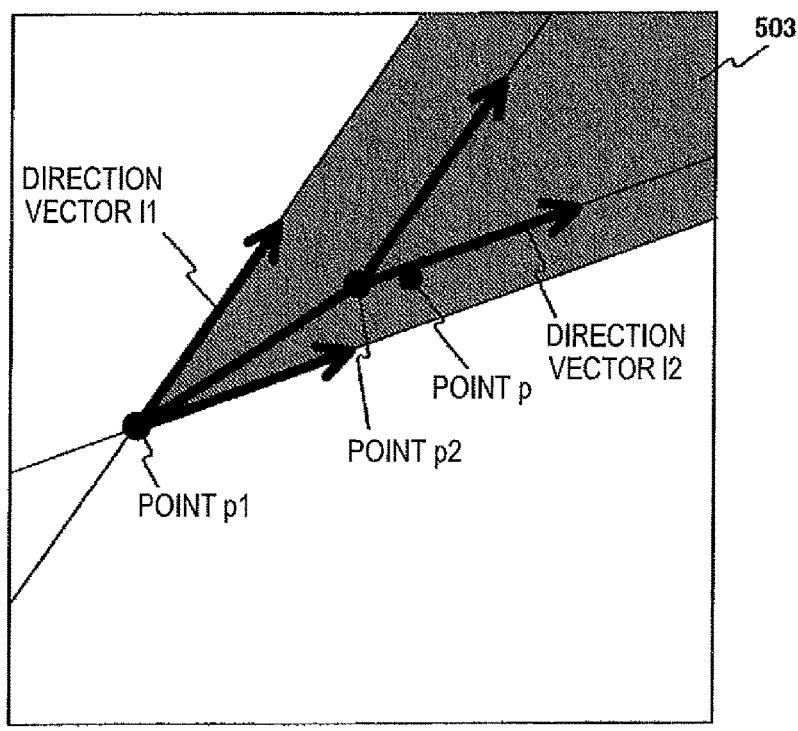
(b)

FIG.56
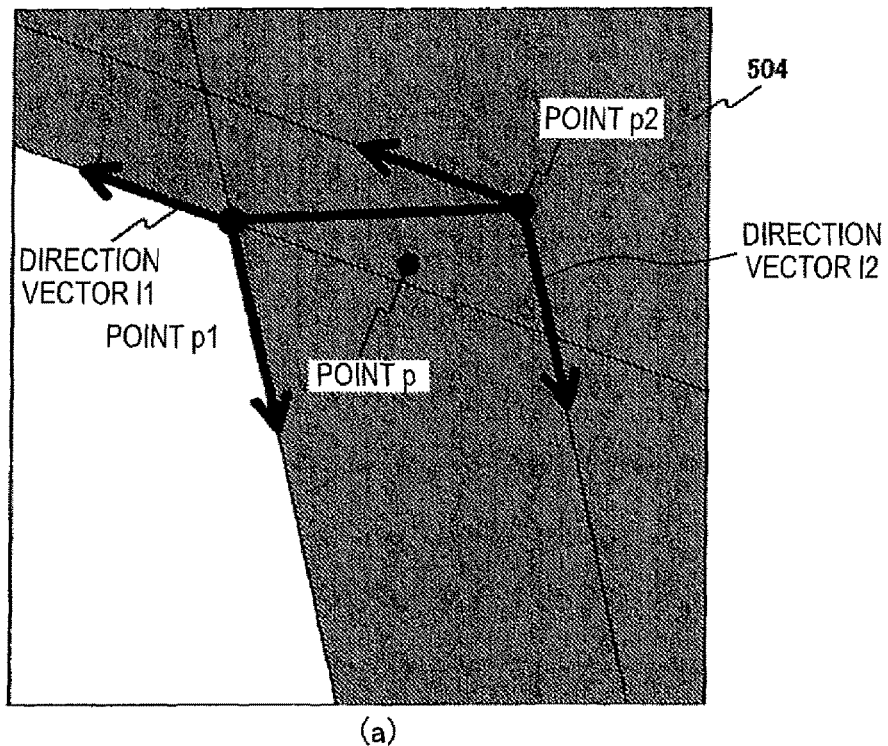
(a)
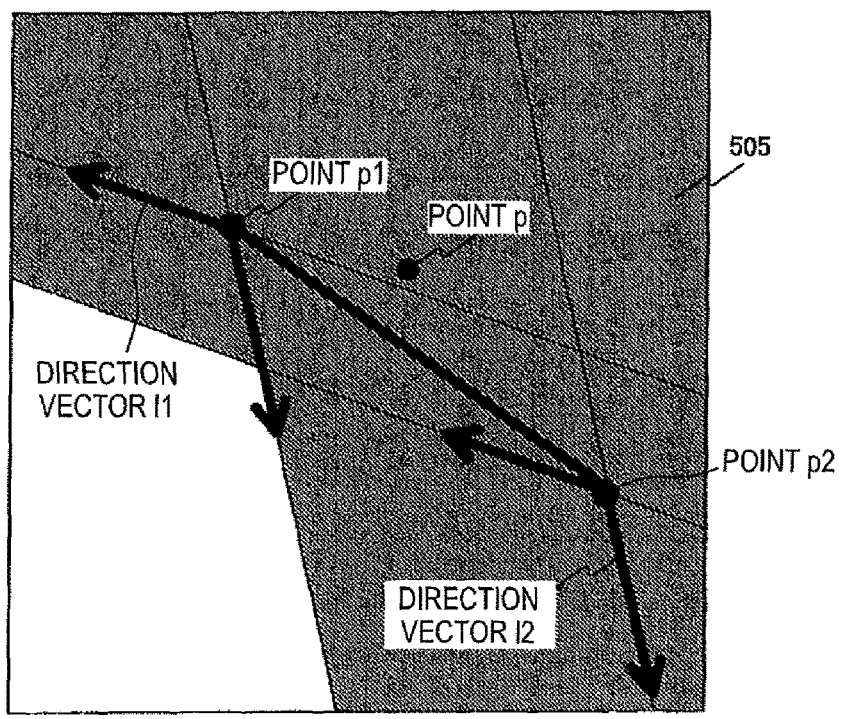
(b)

FIG.57
INPUT 1
(SHOOTING TRAJECTORY HIERARCHICAL LATTICE AREA DATA)
INPUT 2
(USER-SPECIFIED POINT)
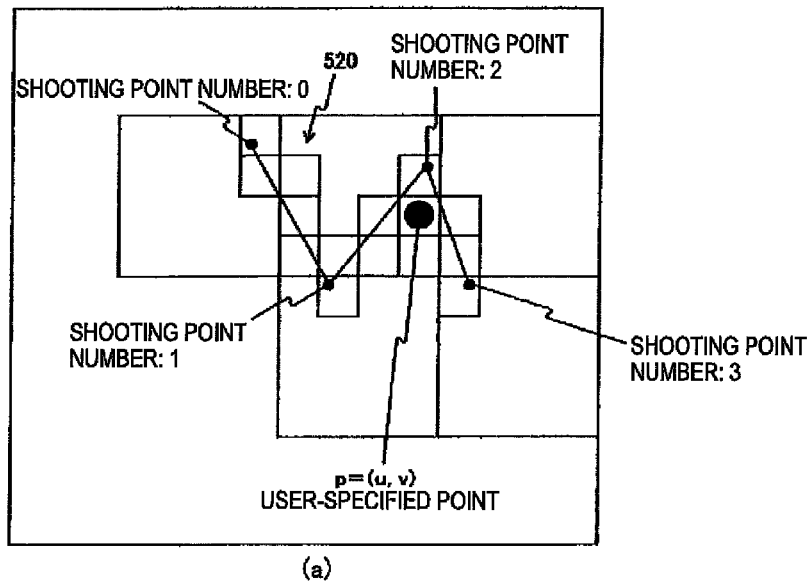
(a)
OUTPUT (SHOOTING POINT NUMBER)
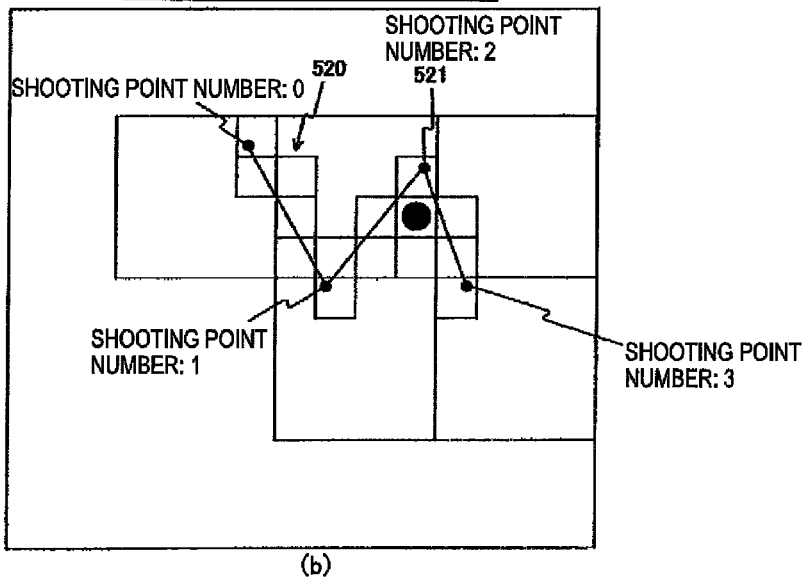
(b)

FIG.59
INPUT 1
(HIERARCHICAL LATTICE AREA DATA)
INPUT 2
(USER-SPECIFIED POINT)
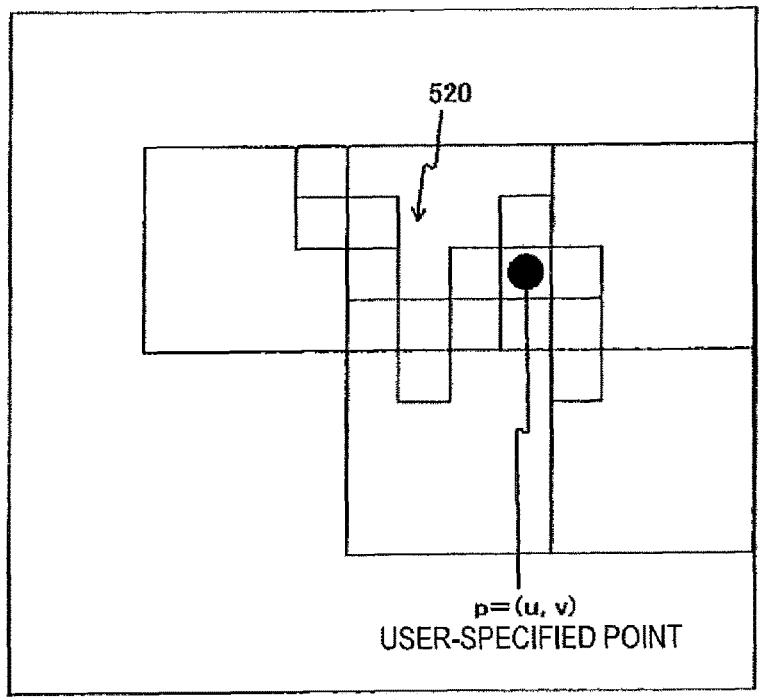
(a)
OUTPUT (USER-SPECIFIED LEVEL-0 LATTICE ELEMENT)
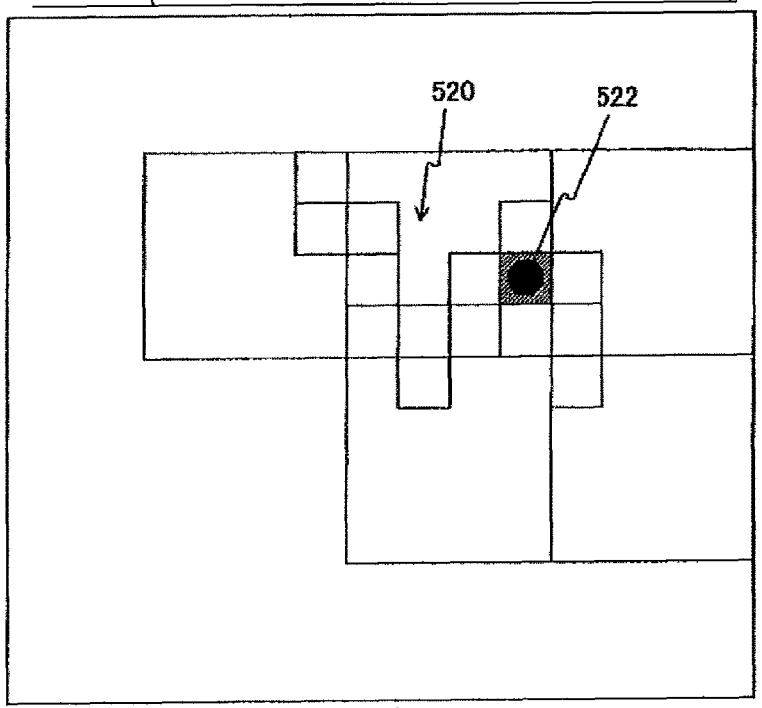
(b)

FIG.63
INPUT 1
(USER-SPECIFIED LEVEL-0 LATTICE ELEMENT E)
INPUT 2
(USER-SPECIFIED POINT)
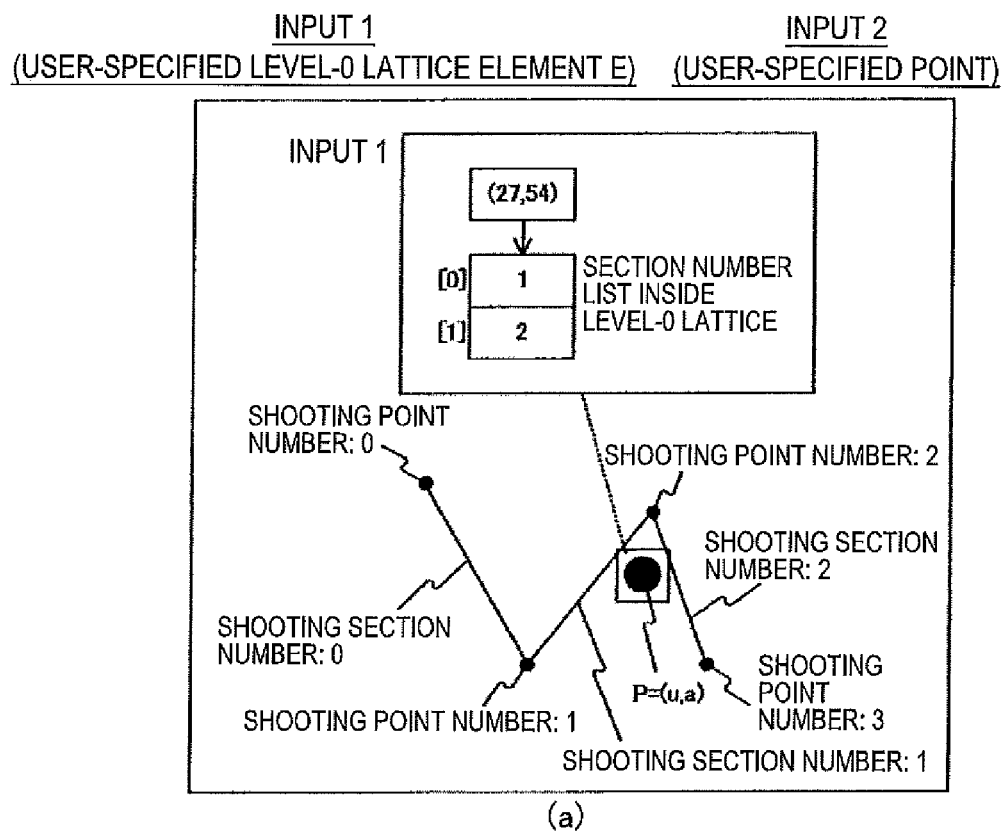
(a)
OUTPUT (SHOOTING POINT NUMBER)
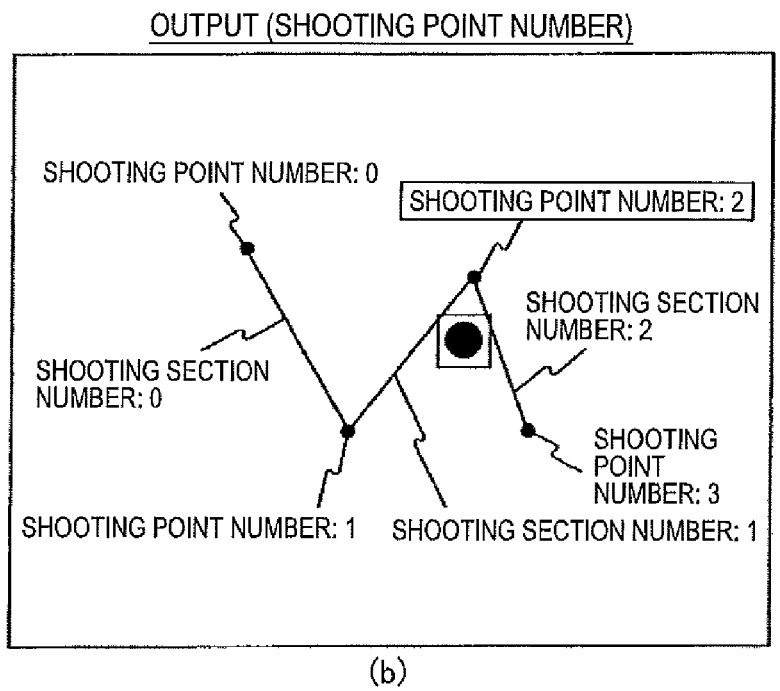
(b)

FIG.80
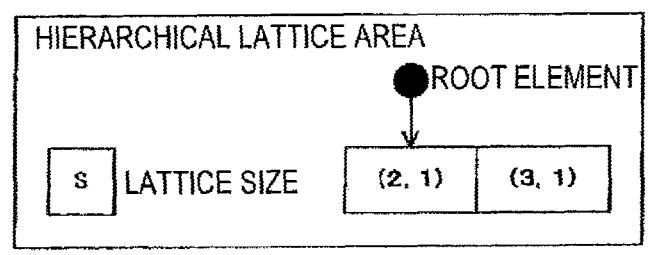
(a)
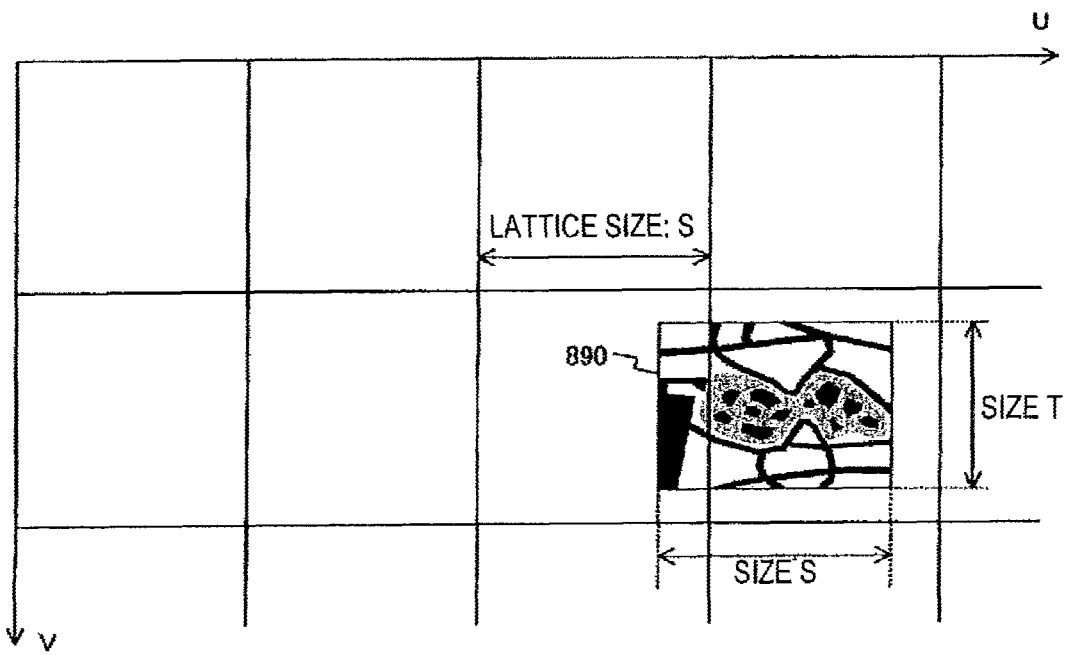
(b)

FIG.95
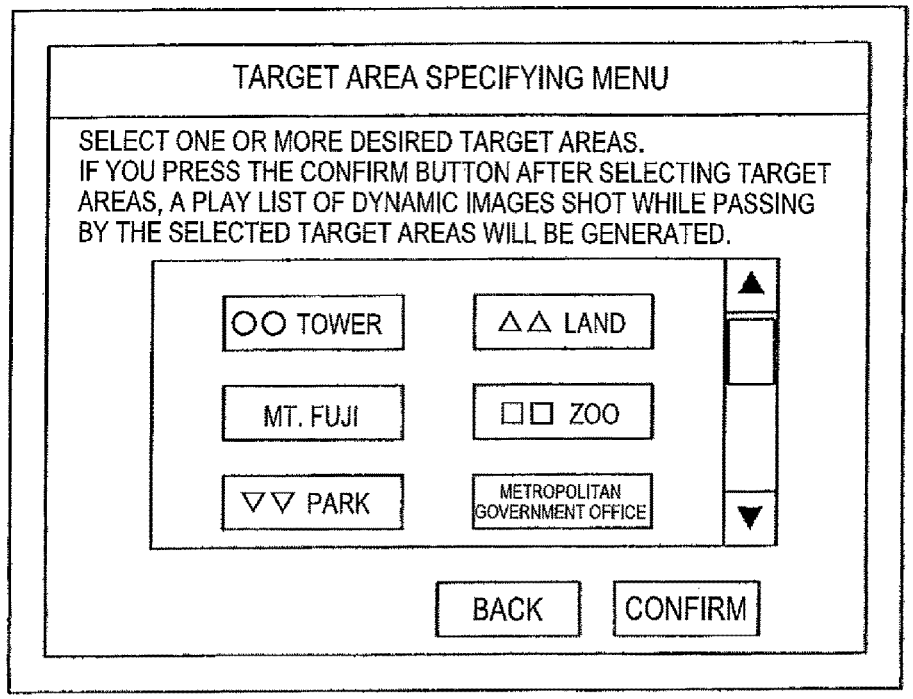
(a)
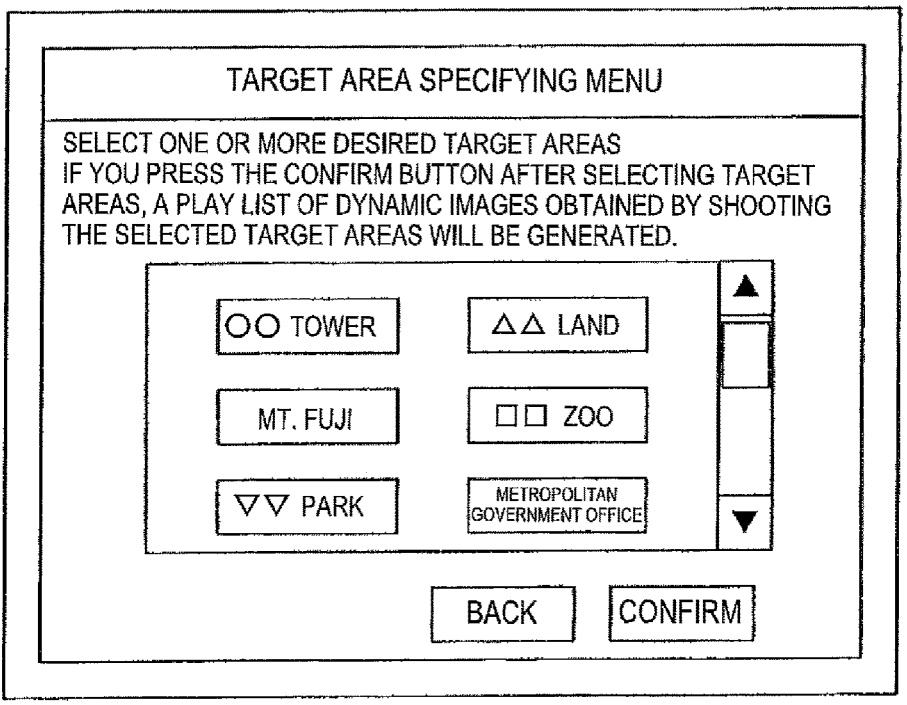
(b)

IMAGE PROCESSING APPARATUS, IMAGE PROCESSING METHOD AND PROGRAM

TECHNICAL FIELD

The present invention relates to an image processing apparatus, and in particular, relates to an image processing apparatus dealing with dynamic image content, an image processing method, and a program causing a computer to execute the method.

BACKGROUND ART

In recent years, imaging apparatuses such as digital video cameras (for example, camcorders) that image a subject such as a person and landscape to generate image data thereof and record the generated image data as content of a dynamic image file or the like are in widespread use.

Many specifying methods of specifying the start position when content recorded as described above is played back have been proposed. For example, a specifying method of specifying the playback start position of content by arranging and displaying, among images constituting content, images at regular intervals on a time axis (representative images) chronologically like a film and specifying the representative image is proposed. According to this specifying method, representative images at regular intervals on a time axis are arranged and displayed and thus, the start position of content can be specified by considering the content of the representative image and the position on the time axis.

It is assumed here, for example, that the start of playback is desired from the head of a dynamic image range generated in a predetermined area (for example, one attraction of a theme park) in a place of trip regarding content generated when the trip was made. However, according to the above editing method, it is assumed that while the content of the representative image and the position on the time axis can be considered, but it is difficult to consider the geographical position from the content. Thus, for example, a specifying method of specifying the playback start position of dynamic image content by considering the geographical position is proposed.

For example, an electronic device that displays a solid line on a map indicating a history of positions when dynamic image content is shot based on position information associated with the dynamic image content (see, for example, Patent Literature 1). If a predetermined operation (for example, a click operation) is performed on the solid line indicating the history, the electronic device starts the playback of dynamic image content from the position on the time axis corresponding to the portion (position on the map).

CITATION LIST

Patent Literature

Patent Literature 1: Japanese Patent Application Laid-Open No. 2006-254414 (FIG. 7)

SUMMARY OF INVENTION

Technical Problem

According to the above conventional technology, the playback of dynamic image content can be started from a desired portion in consideration of the geographical position by displaying a solid line on a map indicating a history of positions when dynamic image content is shot.

To view one or a plurality of pieces of dynamic image content, for example, generating play list information to play back a desired dynamic image portion by editing the dynamic image content can be considered. Thus, if dynamic image content can be edited by considering the geographical position also when the dynamic image content is edited, editing dynamic image content suiting user's preferences can be considered to be easily facilitated.

The present invention has been made in view of the above circumstances and it is desirable to facilitate easy editing of dynamic image content considering the geographical position and suiting user's preferences.

Solution to Problem

The present invention has been made to solve the above issue and a first aspect thereof are an image processing apparatus including a trajectory information generation unit that generates trajectory information about a trajectory during imaging of dynamic image content based on position information, the dynamic image content being associated with the position information about an imaging position during the imaging, a setting unit that sets a section of the dynamic image content on a time axis based on the generated trajectory information, and a play list information generation unit that generates play list information about a playback of the dynamic image content based on the set section, an image processing method, and a program to cause a computer to execute the method. Accordingly, an operation of generating trajectory information based on position information, setting a section on the time axis based on the generated trajectory information, and generating play list information based on the set section is caused.

Also according to the first aspect, the dynamic image content may be associated with azimuth information about an azimuth with respect to the imaging position during the imaging and the setting unit may set the section of the dynamic image content on the time axis based on a comparison result between an imaging range and a specific target area, the imaging range being identified by the azimuth information with respect to the imaging position, and being based on the imaging position on the trajectory identified by the generated trajectory information. Accordingly, an operation of setting the section of dynamic image content on the time axis based on a comparison result of an imaging range and a target area is caused.

Also according to the first aspect, the setting unit may set the section of the dynamic image content on the time axis based on the section of the trajectory including the imaging positions extracted as the imaging positions corresponding to the imaging range at least a portion of which overlaps with the specific target area on the trajectory identified by the generated trajectory information. Accordingly, an operation of extracting shooting positions corresponding to a shooting range at least a portion of which overlaps with a specific target area on a trajectory identified by the generated trajectory information and of setting the section of dynamic image content on the time axis based on the section of the trajectory including the extracted imaging positions is caused.

Also according to the first aspect, an operation accepting unit that accepts a specifying operation to specify a desired specific object from a plurality of specific objects on a map may further be included, wherein the setting unit may set the section of the dynamic image content on the time axis based on the comparison result between the imaging range and the specified specific target area. Accordingly, if a specifying operation to specify a desired specific object from a plurality of specific objects on a map is accepted, an operation of setting the section of dynamic image content on the time axis based on the comparison result of the shooting range and the specified specific target area is caused.

Also according to the first aspect, the play list information generation unit may generate the play list information by including, in the play list information, specific object information about the specific target area used to compare with the imaging range. Accordingly, an operation of generating the play list information by including specific object information about the specific target area used to compare with the imaging range in the play list information is caused.

Also according to the first aspect, the play list information generation unit may generate the play list information by including, in the play list information, map information about a map containing the trajectory identified by the generated trajectory information. Accordingly, an operation of generating the play list information by including map information about a map containing the trajectory identified by the generated trajectory information in the play list information is caused.

Also according to the first aspect, the setting unit may set the section of the dynamic image content on the time axis based on a comparison result between the trajectory identified by the generated trajectory information and a specific target area. Accordingly, an operation of setting the section of dynamic image content on the time axis based on a comparison result of the trajectory identified by the generated trajectory information and a specific target area is caused.

Also according to the first aspect, the setting unit may set the section of the dynamic image content on the time axis based on the trajectory obtained by extracting the trajectory contained in the specific target area of the trajectory identified by the generated trajectory information. Accordingly, an operation of setting the section of dynamic image content on the time axis based on the trajectory obtained by extracting the trajectory contained in the specific target area of the trajectory identified by the generated trajectory information is caused.

Also according to the first aspect, the setting unit may set the section of the dynamic image content on the time axis based on two editing points on the trajectory identified by the generated trajectory information, the editing point being identified based on a user's operation. Accordingly, an operation of setting the section of dynamic image content on the time axis based on editing points identified based on a user's operation (two editing points on the trajectory identified by the generated trajectory information) is caused.

Also according to the first aspect, a display control unit that displays the trajectory identified by the generated trajectory information to adopt different display modes for a trajectory portion corresponding to the set section of the trajectory and other portions may further be included. Accordingly, an operation of causing a display unit to display the trajectory identified by the generated trajectory information to adopt different display modes for a trajectory portion corresponding to the set section of the trajectory and other portions is caused.

Also according to the first aspect, the display control unit may display the trajectory identified by the generated trajectory information by superimposing the trajectory on a map containing the trajectory. Accordingly, an operation of causing the display unit to display the trajectory identified by the generated trajectory information by superimposing the trajectory on a map containing the trajectory is caused.

Advantageous Effects of Invention

According to the present invention, an advantageous effect of being able to easily edit dynamic image content considering the geographical position and suiting user's preferences can be achieved.

BRIEF DESCRIPTION OF DRAWINGS

FIG. 2 is a diagram exemplifying a file configuration of a file stored in a storage medium 160 according to the first embodiment of the present invention.

FIG. 4 is a diagram schematically showing storage content of a play list information storage unit 290 according to the first embodiment of the present invention.

FIG. 5 is a diagram showing an example of a display screen displayed in a display unit 180 according to the first embodiment of the present invention and dynamic images to be edited.

FIG. 6 is a diagram schematically showing a decision method of a range to be edited by an editing point setting unit 260 according to the first embodiment of the present invention.

FIG. 11 is a diagram defining a plane coordinate system intended for play list generation processing by the image processing apparatus 100 according to a second embodiment of the present invention.

FIG. 12 is a diagram defining a lattice area to manage each piece of data used for play list generation processing by the image processing apparatus 100 according to the second embodiment of the present invention.

FIG. 14 is a diagram defining hierarchical lattice area data used for play list generation processing by the image processing apparatus 100 according to the second embodiment of the present invention.

FIG. 15 is a diagram defining hierarchical lattice area data used for trajectory information generation processing by the image processing apparatus 100 according to the second embodiment of the present invention.

FIG. 16 is a diagram schematically showing the flow of creation of shooting trajectory data by the image processing apparatus 100 according to the second embodiment of the present invention.

FIG. 18 is a diagram showing an input/output example of creation processing of a level-0 lattice number list of a line segment by the image processing apparatus 100 according to the second embodiment of the present invention.

FIG. 21 is a diagram showing an input/output example of creation processing of the level-0 lattice number list of the line segment whose inclination is upward by the image processing apparatus 100 according to the second embodiment of the present invention.

FIG. 23 is a diagram showing an input/output example of creation processing of the level-0 lattice number list of the line segment whose inclination is vertical by the image processing apparatus 100 according to the second embodiment of the present invention.

FIG. 24 is a diagram schematically showing the flow of creation of merge processing by the image processing apparatus 100 according to the second embodiment of the present invention.

FIG. 25 is a diagram schematically showing the flow of creation of merge processing by the image processing apparatus 100 according to the second embodiment of the present invention.

FIG. 28 is a diagram schematically showing the flow of collision detection processing by the image processing apparatus 100 according to the second embodiment of the present invention.

FIG. 31 is a diagram schematically showing collision determination processing of lattice areas and element level reduction determination processing by the image processing apparatus 100 according to the second embodiment of the present invention.

FIG. 35 is a diagram showing an input/output example of shooting area data creation processing by the image processing apparatus 100 according to the second embodiment of the present invention.

FIG. 37 is a diagram showing an input/output example of level-0 lattice number list creation processing containing shooting areas inside a shooting section by the image processing apparatus 100 according to the second embodiment of the present invention.

FIG. 38 is a diagram exemplifying intra-section shooting information and intra-section area information generated by the image processing apparatus 100 according to the second embodiment of the present invention.

FIG. 39 is a diagram exemplifying the intra-section shooting information and intra-section area information generated by the image processing apparatus 100 according to the second embodiment of the present invention.

FIG. 41 is a diagram schematically showing the flow of calculation processing of a boundary line direction vector angle by the image processing apparatus 100 according to the second embodiment of the present invention.

FIG. 45 is a diagram schematically showing determination value calculation processing by the image processing apparatus 100 according to the second embodiment of the present invention.

FIG. 46 is a diagram schematically showing intra-section shooting area type determination processing by the image processing apparatus 100 according to the second embodiment of the present invention.

FIG. 48 is a diagram schematically showing intra-section shooting area type AB determination processing by the image processing apparatus 100 according to the second embodiment of the present invention.

FIG. 50 is a diagram schematically showing intra-section shooting area type CD determination processing by the image processing apparatus 100 according to the second embodiment of the present invention.

FIG. 54 is a diagram schematically showing the collision determination processing of an intra-section shooting area and a lattice area and the collision determination processing of an intra-section shooting area and a point by the image processing apparatus 100 according to the second embodiment of the present invention.

FIG. 55 is a diagram schematically showing the collision determination processing of an intra-section shooting area and a lattice area and the collision determination processing of an intra-section shooting area and a point by the image processing apparatus 100 according to the second embodiment of the present invention.

FIG. 56 is a diagram schematically showing the collision determination processing of an intra-section shooting area and a lattice area and the collision determination processing of an intra-section shooting area and a point by the image processing apparatus 100 according to the second embodiment of the present invention.

FIG. 57 is a diagram schematically showing the flow of user-specified point detection processing by the image processing apparatus 100 according to the second embodiment of the present invention.

FIG. 59 is a diagram schematically showing the flow of detection processing of a user-specified level-0 lattice area by the image processing apparatus 100 according to the second embodiment of the present invention.

FIG. 63 is a diagram schematically showing the flow of user-specified shooting point detection processing from a shooting section list by the image processing apparatus 100 according to the second embodiment of the present invention.

FIG. 80 is a diagram schematically showing a lattice size intended for dynamic image content detection processing by the image processing apparatus 100 according to the second embodiment of the present invention.

FIG. 95 is a diagram showing an example of the display screen displayed in the display unit 180 according to the second embodiment of the present invention.

DESCRIPTION OF EMBODIMENTS

Forms (hereinafter, referred to as embodiments) to embody the present invention will be described below. The description will be provided in the order below:

1. First Embodiment (Play list generation control: example of generating a play list of dynamic image content using trajectory information)

2. Second Embodiment (Play list generation control: example of generating a play list using hierarchical lattice area data)

1. First Embodiment

Configuration Example of the Image Processing Apparatus

Figure 1:
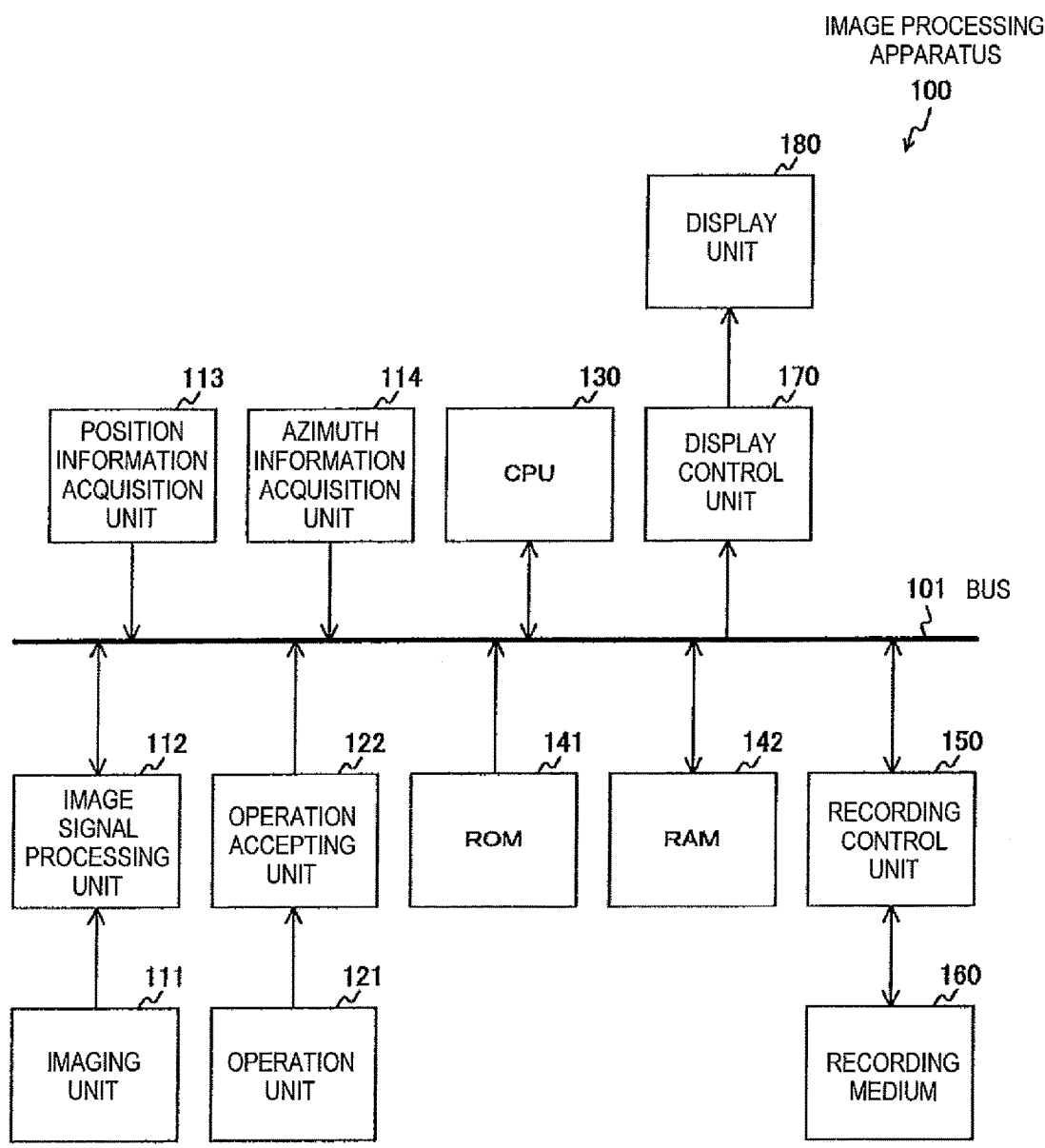
FIG. 1 is a block diagram showing an internal configuration example of an image processing apparatus 100 according to a first embodiment of the present invention.

FIG. 1 is a block diagram showing an internal configuration example of the image processing apparatus 100 according to the first embodiment of the present invention. The image processing apparatus 100 includes an imaging unit 111, an image signal processing unit 112, an azimuth information acquisition unit 114, a position information acquisition unit 113, an operation unit 121, and an operation accepting unit 122. The image processing apparatus 100 also includes a CPU (Central Processing Unit) 130, a ROM (Read Only Memory) 141, and a RAM (Random Access Memory) 142. In addition, the image processing apparatus 100 includes a recording control unit 150, the recording medium 160, a display control unit 170, the display unit 180, and a bus 101. The image processing apparatus 100 can be realized by, for example, a digital video camera (for example, a camcorder) capable of recording attribute information such as position information by associating with image data.

The imaging unit 111 includes a plurality of lenses (zoom lenses, focus lenses and the like) to condense light from a subject and an image sensor and light incident from the subject is supplied to the image sensor via these lenses and an iris. Then, the image sensor makes a photoelectric conversion of an optical signal from the subject incident via the lenses and the iris into an analog image signal and supplies the photoelectrically converted analog image signal to the image signal processing unit 112 based on the control of the CPU 130. For example, a CCD (Charge Coupled Device) or CMOS (Complementary Metal Oxide Semiconductor) can be used as the image sensor.

The image signal processing unit 112 performs various kinds of image signal processing based on the control of the CPU 130. More specifically, the image signal processing unit 112 performs analog signal processing such as noise reduction on an analog image signal supplied from the imaging unit 111 and then makes an A/D conversion of the image signal obtained by performing the analog signal processing. The image signal processing unit 112 also performs digital signal processing such as edge enhancement, gamma correction, and flicker removal on image data as a digital signal obtained by the A/D conversion. Then, the image signal processing unit 112 supplies the image data (image shot) obtained by performing the digital signal processing to each unit.

The position information acquisition unit 113 acquires position information to identify the position of the image processing apparatus 100 and outputs the acquired position information to the CPU 130. For example, a GPS (Global Positioning System) apparatus that calculates position information based on a GPS signal received by a GPS signal receiving antenna (not shown) can be used as the position information acquisition unit 113. The calculated position information contains various kinds of data on positions such as the latitude, longitude, and altitude. As the position information acquisition unit 113, for example, a position acquisition apparatus that acquires position information by using access point information by a wireless LAN (Local Area Network) present in the surroundings may also be used.

The azimuth information acquisition unit 114 is a sensor that measures the azimuth on the earth by using geomagnetism and outputs the measured azimuth to the CPU 130. The azimuth information acquisition unit 114 is, for example, a magnetic sensor including a coil of two axes (for example, the x axis and the y axis) orthogonal to each other and an MR element (magnetoresistive element) arranged in the center thereof. The MR element is an element that senses geomagnetism and whose resistance changes depending on the magnitude of the magnetism and a resistance change of the MR element is divided into components in two directions (for example, x-axis and y-axis components) by the coil with two axes and the azimuth is calculated based on the ratio of geomagnetism of components in the two directions. In the first embodiment of the present invention, the azimuth information acquisition unit 114 measures the azimuth of the imaging direction of the image processing apparatus 100. The imaging direction is a direction in which a subject contained in an image shot generated by the image signal processing unit 112 is present from the imaging position (for example, the position where the image processing apparatus 100 is present) and, for example, an optical axis direction on the side of the subject may be set as such. Also, for example, the direction of a subject present in the center position of an image shot with respect to the imaging position can be set as the imaging direction. An example in which the imaging direction is acquired by using the azimuth information acquisition unit 114 is shown in the first embodiment of the present invention, but an azimuth acquired by other azimuth acquisition methods may also be used.

The operation unit 121 is an operation unit including an operation member such as an operation button performing a user's operation and operation content by each operation member is output to the operation accepting unit 122.

The operation accepting unit 122 is an operation accepting unit that accepts operation content operated by the user and outputs a signal in accordance with the accepted operation content to the CPU 130.

The CPU 130 controls each unit of the image processing apparatus 100 based on various control programs stored in the ROM 141. The CPU 130 also controls each unit of the image processing apparatus 100 based on operation input accepted by the operation accepting unit 122. The control exercised by the CPU 130 will be described in detail with reference to FIG. 3.

The ROM 141 is a read-only memory and stores various control programs. The RAM 142 is a memory used as a main memory (main storage unit) of the CPU 130 and includes a work area of a program executed by the CPU 130.

The recording control unit 150 causes the recording medium 160 to record image data (image shot) generated by the image signal processing unit 112 as an image file (a still image file or dynamic image file) based on the control of the CPU 130. When image data is recorded, the recording control unit 150 also records the azimuth acquired by the azimuth information acquisition unit 114, position information acquired by the position information acquisition unit 113, and date/time information of the recording in an image file. That is, the azimuth indicating the imaging direction when an image shot is captured, the position when the image is captured, and the date/time when the image is captured are recorded by associating with image content. The recording control unit 150 also causes a content management file 190 (shown in FIG. 2) to record image management information about the recorded image file.

The recording medium 160 stores each piece of data such as an image file based on the control of the recording control unit 150 and supplies each piece of stored data to each unit. In the recording medium 160, for example, various kinds of data such as a dynamic image file and image management information is recorded. For example, a recording medium such as a memory card, optical disk, magnetic disk, and magnetic tape can be used as the recording medium 160. The recording medium 160 may be contained in the image processing apparatus 100 or may be removable from the image processing apparatus 100.

The display control unit 170 causes the display unit 180 to display various kinds of information based on the control of the CPU 130. For example, the display control unit 170 causes the display unit 180 to sequentially display image data (image shot) generated by the image signal processing unit 112. Also, for example, the display control unit 170 causes the display unit 180 to display dynamic image content stored in the recording medium 160. Such display examples are shown in FIGS. 5 to 9.

The display unit 180 is a display unit that displays various kinds of information based on the control of the display control unit 170. For example, an LCD (Liquid Crystal Display) or organic EL (Electro Luminescence) panel can be used as the display unit 180. Incidentally, the operation unit 121 and the display unit 180 may be integrally formed as a touch panel into which various operations can be input by contact or proximity of a finger or the like with the display screen.

[Storage Example of the Recording Medium]

FIG. 2 is a diagram exemplifying a file configuration of a file stored in the storage medium 160 according to the first embodiment of the present invention. FIG. 2(*a*) shows a directory structure of the file.

Under a root directory 161 of the recording medium 160, the content management file 190, one or a plurality of image files (dynamic image data 161, 162 and the like), and map data 163 are arranged.

The content management file 190 is a file to manage each piece of content (for example, a dynamic image file and a still image file) stored in the recording medium 160. A configuration example of the content management file 190 will be described in detail with reference to FIG. 2(*b*).

The dynamic image data 161, 162 is a dynamic image file formed of image data generated by the imaging unit 111 and the image signal processing unit 112. As the extension of each dynamic image file, ".MPG" is used.

The map data 163 is information including map data used for generating play list information, map data for displaying a map in the display unit 180, and map data used for adding the name of a place (title) to play list information. For example, the map data 163 is data identified by the latitude and longitude and is divided into a plurality of areas with a fixed latitude width and a fixed longitude width set as the unit.

FIG. 2(*b*) schematically shows a basic structure of the content management file 190. The content management file 190 is a file having the basic structure of a header 191 and an image data management section 192 and is associated with each piece of content.

Various kinds of information to manage the image data management section 192 are stored in the header 191.

Data to manage each piece of content is stored in the image data management section 192. In the image data management section 192, for example, content identification information 193, a file name 194, a thumbnail image 195, frame identification information 196, position information 197, azimuth information 198, and date/time information 199 are associated and stored.

Identification information (content ID) to identify each piece of content is stored in the content identification information 193.

A file named attached to each piece of content is stored in the file name 194. The file name can be attached by, for example, a user's manual operation. Alternatively, the file name may be automatically attached based on a description of content. For example, a file name may be decided by using position information associated with content to attach the file name to the content.

A representative image of each piece of content is stored as a thumbnail image in the thumbnail image 195. For dynamic image content, for example, an image of the first frame is stored as a thumbnail image.

Identification information to identify the frame constituting each piece of dynamic image content is stored in the frame identification information 196. For example, the identification number is attached according to the order from the first frame constituting each piece of dynamic image content. For dynamic image content, only identification information of a frame at fixed intervals (for example, at intervals of 10 frames) may be stored.

Position information acquired by the position information acquisition unit 113 is stored in the position information 197. For example, the latitude and longitude are stored as position information.

Azimuth information acquired by the azimuth information acquisition unit 114 is stored in the azimuth information 198. For example, the angle when the reference azimuth (for example, the north) is set to 0 degree is stored (90 degrees for the east, 180 degrees for the south, and 270 degrees for the west).

Date/time information when the corresponding frame is recorded is stored in the date/time information 199. For example, the year, month, day, time are stored.

Thus, position information acquired by the position information acquisition unit 113, azimuth information acquired by the azimuth information acquisition unit 114, and the date/time are stored in the content management file by associating with content. For dynamic image content, position information, azimuth information, and the date/time are stored in the content management file by associating with each frame of a frame at fixed intervals.

[Functional Configuration Example of the Image Processing Apparatus]

Figure 3:
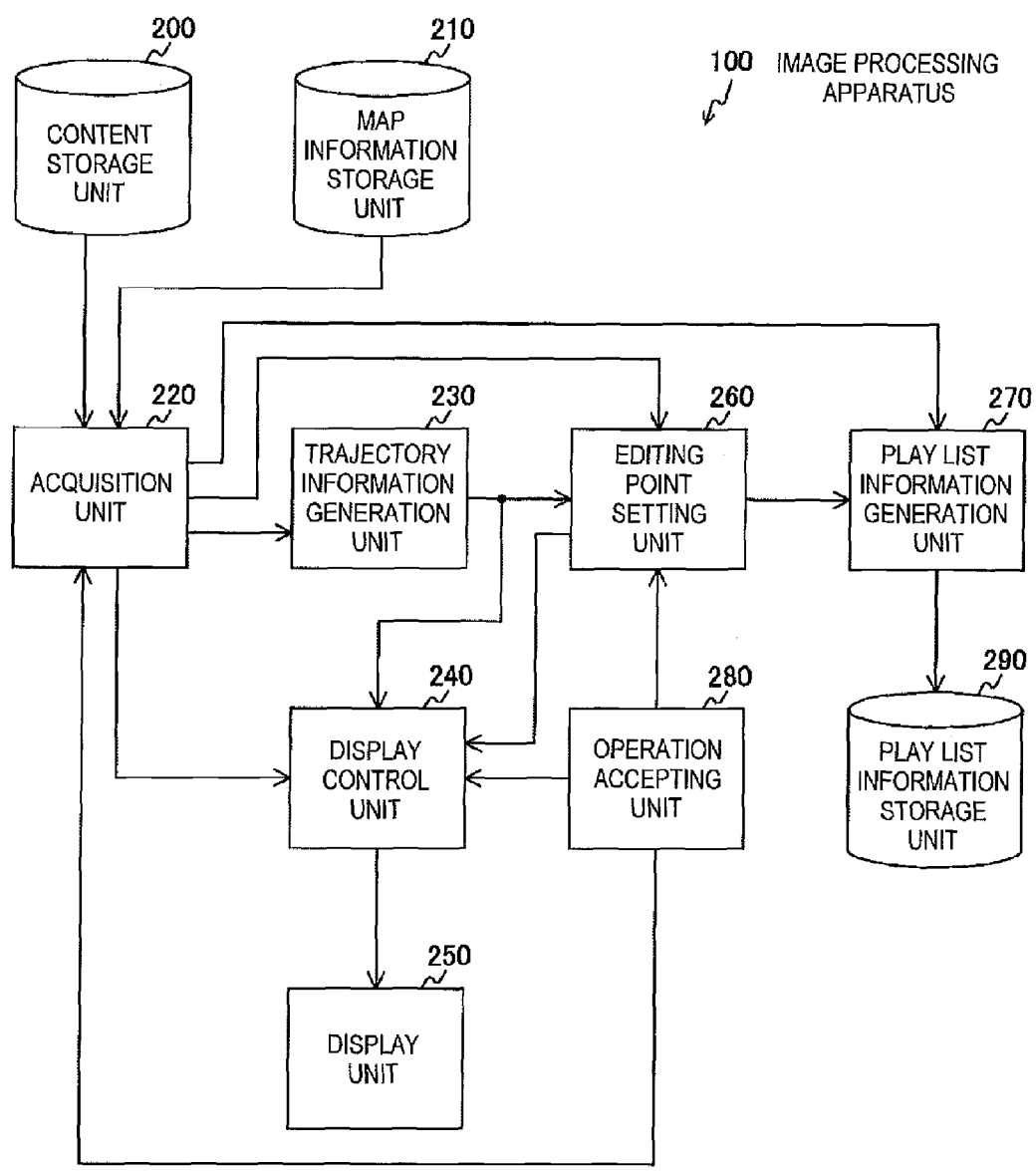
FIG. 3 is a block diagram showing a functional configuration example of the image processing apparatus 100 according to the first embodiment of the present invention.

FIG. 3 is a block diagram showing a functional configuration example of the image processing apparatus 100 according to the first embodiment of the present invention. The image processing apparatus 100 includes a content storage unit 200, a map information storage unit 210, an acquisition unit 220, a trajectory information generation unit 230, a display control unit 240, and a display unit 250. The image processing apparatus 100 also includes an editing point setting unit 260, a play list information generation unit 270, an operation accepting unit 280, and a play list information storage unit 290.

The content storage unit 200 stores dynamic image content to be edited and the content management file and supplies the stored dynamic image content to the acquisition unit 220.

The map information storage unit 210 stores map data on a map displayed in the display unit 250 and supplies the stored map data to the acquisition unit 220. For example, map data stored in the map information storage unit 210 is data identified by the latitude and longitude and is divided into a plurality of areas with a fixed latitude width and a fixed longitude width set as the unit. In each divided area, for example, the name of a place corresponding to each area or specific target area information (for example, information about a landmark) is associated and recorded. For example, the name of a place can be attached to play list information by using the name of a place. The content storage unit 200 and the map information storage unit 210 correspond to the recording medium 160 shown in FIG. 1.

The acquisition unit 220 acquires dynamic image content selected by the user to be edited and attribute information about the content from the content storage unit 200 in accordance with operation input accepted by the operation accepting unit 280. The acquisition unit 220 also acquires map information about the dynamic image content selected by the user to be edited from the map information storage unit 210. Then, the acquisition unit 220 outputs the acquired attribute information to the trajectory information generation unit 230 and outputs the acquired attribute information and map information to the editing point setting unit 260. The acquisition unit 220 also outputs the acquired dynamic image content and map information to the display control unit 240 and outputs the acquired dynamic image content, attribute information, and map information to the play list information generation unit 270. The acquisition unit 220 corresponds to the CPU 130 and the recording control unit 150 shown in FIG. 1.

The trajectory information generation unit 230 generates trajectory information of the dynamic image content selected by the user to be edited based on attribute information output from the acquisition unit 220. More specifically, the trajectory information generation unit 230 generates trajectory information about a trajectory of capturing dynamic image content based on position information (the latitude and longitude) of the selected dynamic image content. Then, the trajectory information generation unit 230 outputs the generated trajectory information to the display control unit 240 and the editing point setting unit 260. The trajectory information generation unit 230 corresponds to the CPU 130 shown in FIG. 1.

The display control unit 240 causes the display unit 250 to display dynamic image information and each piece of information used to edit the content in accordance with operation input accepted by the operation accepting unit 280. For example, the display control unit 240 causes the display unit 250 to display a trajectory identified by trajectory information output from the trajectory information generation unit 230 by superimposing the trajectory on a map containing the trajectory (map information output from the acquisition unit 220). The display control unit 240 also causes the display unit 250 to display editing points output from the editing point setting unit 260 by superimposing the editing points on trajectory information. The display control unit 240 corresponds to the display control unit 170 shown in FIG. 1.

The display unit 250 is a display unit that displays various kinds of information based on the control of the display control unit 240. The display unit 250 corresponds to the display unit 180 shown in FIG. 1.

The editing point setting unit 260 sets a section (editing points) of dynamic image content on a time axis based on trajectory information output from the trajectory information generation unit 230 in accordance with operation input accepted by the operation accepting unit 280. For example, the editing point setting unit 260 sets a section of dynamic image content on a time axis based on editing points (two editing points of a trajectory identified from trajectory information) identified based on operation input accepted by the operation accepting unit 280. The editing point setting unit 260 also sets a section of dynamic image content on a time axis based on a comparison result of the trajectory and a specific target area such as a landmark. For example, the editing point setting unit 260 extracts a trajectory contained in the specific target area of the trajectory and sets a section of dynamic image content on a time axis based on the extracted trajectory. Then, the editing point setting unit 260 outputs section information about the set section to the play list information generation unit 270. The editing point setting unit 260 also outputs each piece of content when an editing point in trajectory information is specified in accordance with operation input accepted by the operation accepting unit 280 to the display control unit 240. The editing point setting unit 260 corresponds to the CPU 130 shown in FIG. 1. The editing point setting unit 260 is also an example of the setting unit described in claims.

The play list information generation unit 270 generates play list information about playback of the dynamic image content selected by the user to be edited. More specifically, the play list information generation unit 270 generates play list information of dynamic image content based on section information output from the editing point setting unit 260. For example, the play list information generation unit 270 includes various kinds of information used for playback of dynamic image content in the play list information. For example, specific target information about a specific target area used to generate a play list can be included in the play list information. Also, map information about a map containing a trajectory identified based on trajectory information generated by the trajectory information generation unit 230 can be included in the play list information. Then, the play list information generation unit 270 causes the play list information storage unit 290 to store the generated play list information. The play list information generation unit 270 corresponds to the CPU 130 shown in FIG. 1.

The operation accepting unit 280 is an operation accepting unit that accepts operation content operated by the user and outputs the accepted operation content to the acquisition unit 220 and the editing point setting unit 260.

The play list information storage unit 290 stores play list information generated by the play list information generation unit 270. Storage content of the play list information storage unit 290 will be described in detail with reference to FIG. 4. The play list information storage unit 290 corresponds to the recording medium 160 shown in FIG. 1.

[Storage Content in the Play List Information Storage Unit]

FIG. 4 is a diagram schematically showing storage content of the play list information storage unit 290 according to the first embodiment of the present invention. In the play list information storage unit 290, play list identification information 291, content identification information 292, section information 293, a play list name 294, play list creation date/time information 295, landmark information 296, and map display area information 297 are stored.

Identification information to identify each piece of play list information is stored in the play list identification information 291.

Identification information (content ID) to identify each piece of content is stored in the content identification information 292. Dynamic image content is normally dynamic image data having a sequence of shooting trajectories recorded from the start of one shooting till a shooting stop operation. In the second embodiment of the present invention, an example in which each piece of dynamic image content includes shooting trajectory hierarchical lattice area data will be shown. The shooting trajectory hierarchical lattice area data may be created when dynamic image content is shot or when necessary.

Information about clips of dynamic image content constituting a play list is stored in the section information 293. The play list (PL) is a playback unit including a plurality of PL clips and is defined as an ordered list of PL clips. The PL clip is a clip constituting a play list. The clip is a portion (one continuous shooting section) of dynamic image content and is defined by content identification information (content ID) and shooting section information (start section number, number of sections).

The play list attached to each play list is stored in the play list name 294. The play list name can be attached by, for example, a user's manual operation. Alternatively, the play list name may be automatically attached based on a description of the play list. The play list name can be displayed when the play list is played back or a list of play lists is displayed. The play list name can also be used when play lists are sorted based on the play list name while play lists are listed. Further, the play list name can be used for play list search based on a keyword (character string). For example, the play list name can be used when a play list associated with the play list name containing a specified keyword is searched for.

Date/time information when new registration processing of a play list is started or date/time information when the creation of a play list is completed is stored in the play list creation date/time information 295. The play list creation date/time information can be displayed when, for example, a play list is played back or a list of play lists is displayed. The play list creation date/time information can also be used when play lists are sorted based on the creation date/time while play lists are listed. Further, the play list creation date/time information can be used for play list search based on the creation date/time. For example, the play list creation date/time information can be used when a play list associated with the shooting date/time of the specified date/time (or therearound) is searched for.

Information about a specific target area (for example, a landmark) specified by the user is stored in the landmark information 296. The specific target area means an area corresponding to a feature present on the ground corresponding to a map and, for example, an area serving as a guide like a landmark. The feature is a name indicating a natural product or artifact present on the ground and refers to a road, building, river, field and the like. For example, the name of a landmark can be stored in the landmark information 296 as text data. Also, link information to landmark information on a map database (for example, an ID set to each piece of landmark information on a map database) can be stored in the landmark information 296. If another play list is specified as an extraction source of a PL clip, landmark information may be stored as additional information of a new (after extraction) play list by inheriting landmark information of the play list of the extraction source. The landmark information can be displayed when, for example, a play list is played back or a list of play lists is displayed. The landmark information can also be used for play list search by specifying the landmark. For example, the landmark information can be used when a play list associated with the specified landmark information is searched for. Also, the landmark information can be used for play list search based on a keyword (character string). For example, the landmark information can be used when a play list containing the specified keyword in the name of the associated landmark information is searched for.

Information about a map display area calculated when a play list is displayed on a map or a play list is created is stored in the map display area information 297. The map display area information can be used when, for example, a play list is displayed on a map.

[Display Example of Trajectory Information]

FIG. 5 is a diagram showing an example of a display screen displayed in the display unit 180 according to the first embodiment of the present invention and dynamic images to be edited. A display screen 300 shown in FIG. 5(*a*) is provided with a content list display area 301, a trajectory information display area 302, a content preview display area 303, a film roll display area 304, a confirm button 305, and a back button 306.

The content list display area 301 is an area that lists representative images (for example, the thumbnail image 195 shown in FIG. 2(*b*)) representing dynamic image content stored in the content storage unit 200. In this example, representative images #1 to #6 representing each piece of dynamic image content are shown white rectangles in a simplified form.

The trajectory information display area 302 is an area that displays a trajectory of content corresponding to, among representative images displayed in the content list display area 301, one or a plurality of representative images selected by a user's operation. Also, as shown in FIG. 5(*a*), the trajectory information display area 302 is caused to display a solid line representing a trajectory by superimposing the solid line on a map in accordance with a user's operation. The map is a map containing a trajectory identified based on trajectory information generated by the trajectory information generation unit 230.

The content preview display area 303 is an area that displays dynamic images about a play list generated based on a specifying operation by the user as a preview.

The film roll display area 304 is an area that displays, among frames (images) constituting content corresponding to one or a plurality of representative images selected by a user's operation, a predetermined number of frames chronologically. In the film roll display area 304, among images constituting content corresponding to one or a plurality of representative images selected by a user's operation, for example, images at fixed intervals are displayed chronologically. If the number of images to be displayed is large, images displayed in the film roll display area 304 may be made scrollable by performing a pressing operation of a left arrow button 308 or a right arrow button 309 using a cursor 307.

The confirm button 305 is a button pressed when play list information is generated by deciding edit content based on a user's operation. Edit content based on the user's operation is decided by a pressing operation of the confirm button 305 and the edit content (play list information) when decided is stored in the play list information storage unit 290.

The back button 306 is a button pressed to return to the display screen displayed immediately before.

A case when the content list display area 301 is caused to display a trajectory of content to be edited and a map containing the trajectory to edit content corresponding to a representative image displayed in the content list display area 301 will be described.

For example, the user selects a desired representative image (for example, #1) from among representative images displayed in the content list display area 301 by a predetermined operation (for example, a mouse operation) via the operation accepting unit 280 using the cursor 307 displayed in the display screen 300. With this selection operation, the acquisition unit 220 acquires position information associated with dynamic image content corresponding to the representative image #1. Then, the trajectory information generation unit 230 generates trajectory information based on the acquired position information. Based on the acquired position information, the acquisition unit 220 also acquires map data containing the position identified based on the position information. Then, the display control unit 240 displays a solid line identified from the generated trajectory information by superimposing the solid line on a map corresponding to the acquired map data. For example, a trajectory 310 corresponding to content #1 shot in the city and a building 313 is displayed by being superimposed on the map. A point 311 indicates the start point of the trajectory 310 and a point 312 indicates the end point of the trajectory 310. That is, the point 311 indicates the start position on a time axis of the trajectory corresponding to the content #1 and the point 312 indicates the end position on the time axis of the trajectory corresponding to the content #1. This example shows an example in which each operation is performed by using the cursor 307, but a pressing operation using a touch panel may also be adopted.

FIG. 5(*b*) schematically shows dynamic image content 320 stored in the content storage unit 200 as a rectangle. In FIG. 5(*b*), the horizontal axis represents the time axis. The dynamic image content 320 is assumed to be dynamic images shot along the trajectory 310 shown in FIG. 5(*a*). That is, the start point 311 in the trajectory 310 shown in FIG. 5(*a*) corresponds to a start point 321 shown in FIG. 5(*b*). Also, the end point 312 in the trajectory 310 shown in FIG. 5(*a*) corresponds to an end point 322 shown in FIG. 5(*b*).

[Specification Example of the Range to be Edited]

FIGS. 6 to 9 are diagrams schematically showing a decision method of the range to be edited by the editing point setting unit 260 according to the first embodiment of the present invention.

FIG. 6 exemplifies the method of specifying an editing point by the operation accepting unit 280. FIG. 6(*a*) shows the display screen 300 to specify an editing point. The display screen 300 is the same as the display screen 300 shown in FIG. 5(*a*) except that a white circle is added to the position corresponding to the editing point specified by a user's operation in the trajectory information display area 302. Thus, the same reference numerals are attached to elements common to those in the display screen 300 shown in FIG. 5(*a*) and the description thereof is omitted.

For example, the user specifies two editing points from the trajectory 310 displayed in the trajectory information display area 302 by a predetermined operation (for example, a mouse operation) via the operation accepting unit 280 using the cursor 307. The two editing points are, for example, both ends (the start point and end point) of the range to be played back as play list information. For example, as shown on FIG. 6(*a*), points 314, 315 of the trajectory 310 are specified. The editing point setting unit 260 sets a section in which, of the two points specified by the specifying operation, the point corresponding to the prior position on the time axis of the dynamic image content is set as the start point and the point corresponding to the subsequent position as the end point. Then, the identified section (section on the time axis) is decided by a pressing operation of the confirm button 305 by the operation accepting unit 280 and play list information is generated based on the decided section. FIG. 6(b) shows an example of the section (section on the time axis) decided by the specifying operation.

FIG. 6(b) schematically shows the dynamic image content 320 stored in the content storage unit 200 as a rectangle. The dynamic image content 320, the start point 321, and the end point 322 shown in FIG. 6(b) are the same as those shown in FIG. 5(b). Thus, the same reference numerals are attached to elements common to those in FIG. 5(a) and the description thereof is omitted.

It is assumed here that the two editing points (the points 314, 315) specified by the user' operation shown in FIG. 6(a) correspond to two editing points (specifying operation positions 332, 333) shown in FIG. 6(b).

For example, the latitude and longitude (position information) corresponding to each editing point are identified by the two editing points (the points 314, 315) specified by the user' operation in the display screen 300 shown in FIG. 6(a). Times (date/time information) associated with the two latitudes and longitudes identified as described above are identified and positions on the time axis of the dynamic image content 320 corresponding to the identified times are identified as the two editing points (the points 314, 315). Then, a section 331 (length L1) is identified. Images contained in the section 331 of images displayed in the film roll display area 304 are displayed in a mode different from the mode in which other images displayed in the film roll display area 304 are displayed. For example, as shown in FIG. 6(a), images contained in the section 331 (images contained in a dotted rectangle 330) of images displayed in the film roll display area 304 are displayed in a halftone. Accordingly, the section specified by the user can be grasped geographically and can also be grasped chronologically. Moreover, a trajectory portion corresponding to the section 331 of the trajectory 310 displayed in the trajectory information display area 302 and other portions can be displayed in different modes. This example is described by taking a case when one section is specified, but a case when a plurality of sections is specified can also be specified in the same manner.

Figure 7:
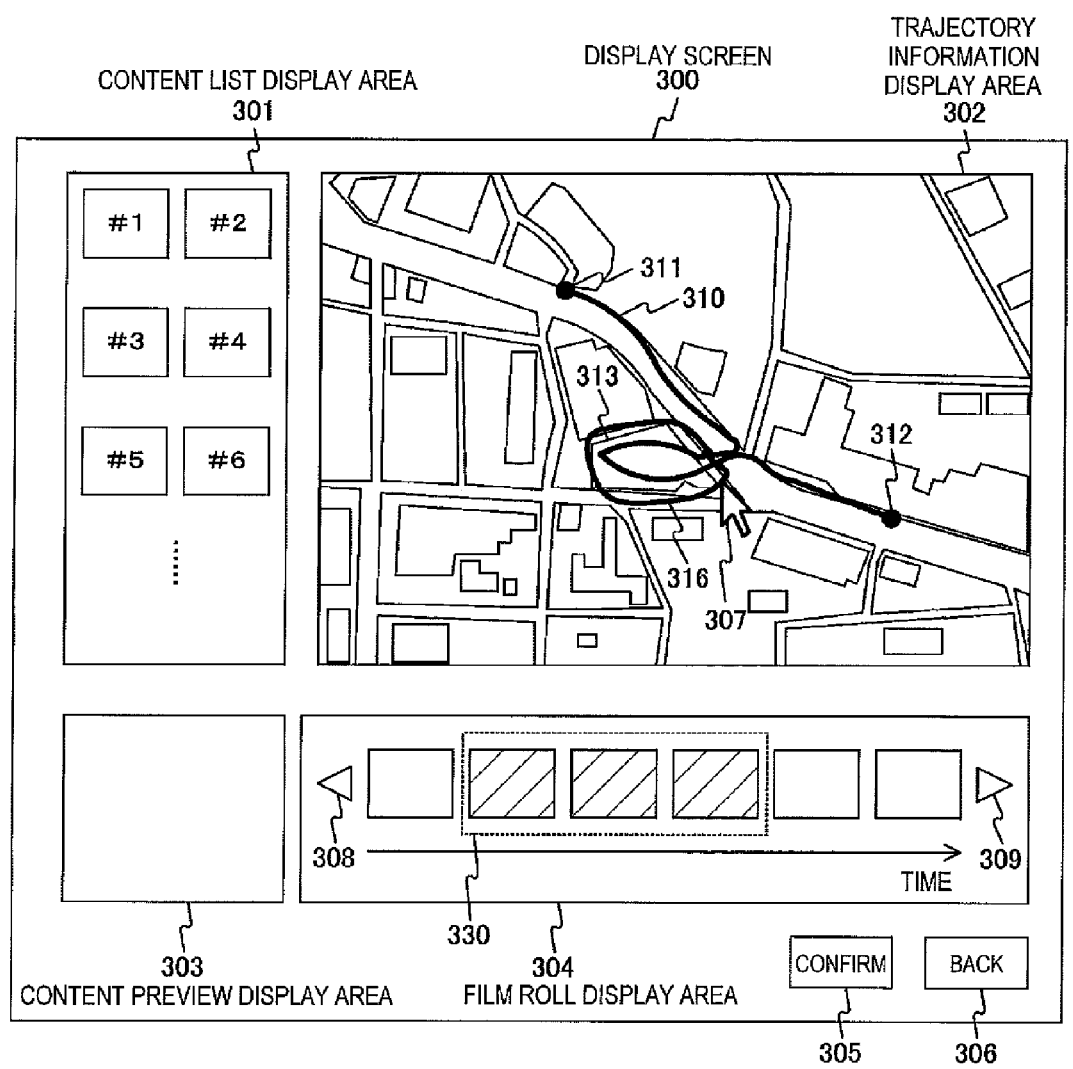
FIG. 7 is a diagram schematically showing the decision method of the range to be edited by the editing point setting unit 260 according to the first embodiment of the present invention.

FIG. 7 shows an example in which two editing points are specified by operation input of tracing a circle 316 using the cursor 307. In this case, the first point (leading point on the time axis) of the trajectory contained in the circle 316 of the trajectory 310 displayed in the trajectory information display area 302 is set as the start point and the last point (trailing point on the time axis) of the trajectory contained in the circle 316 is set as the end point.

Figure 8:
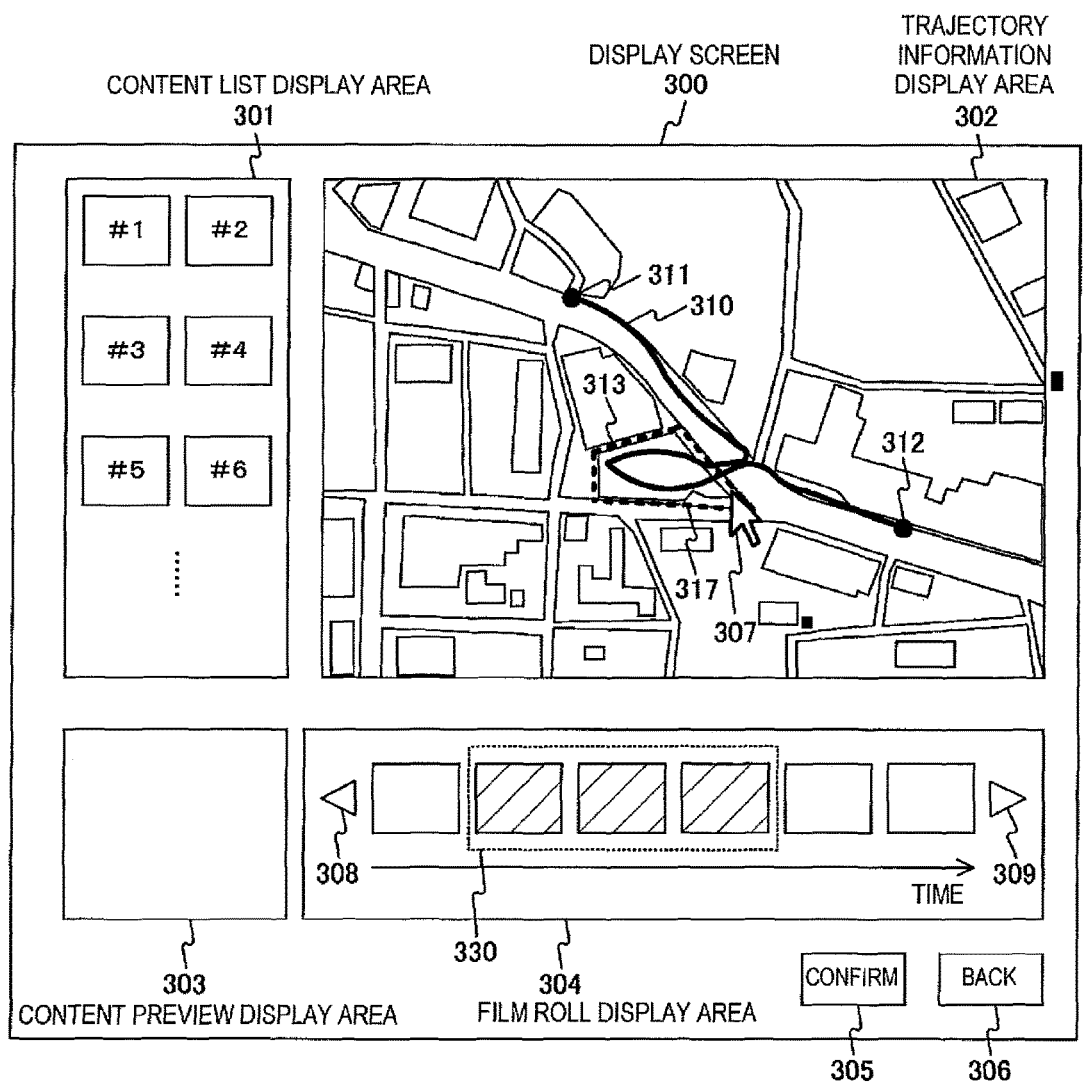
FIG. 8 is a diagram schematically showing the decision method of the range to be edited by the editing point setting unit 260 according to the first embodiment of the present invention.

FIG. 8 shows an example in which two editing points are specified by operation input of specifying a landmark 317 (corresponding to the building 313). In this case, the first point (leading point on the time axis) of the trajectory contained in the landmark 317 of the trajectory 310 displayed in the trajectory information display area 302 is set as the start point. Also, the last point (trailing point on the time axis) of the trajectory contained in the landmark 317 is set as the end point.

[Specification Example of the Range to be Edited Using Azimuth Information]

In the foregoing, examples in which play list information is generated by specifying two positions in trajectory information superimposed on a map have been described. Attribute information of dynamic image content contains azimuth information. An example in which play list information is generated by using azimuth information will be shown below.

Figure 9:
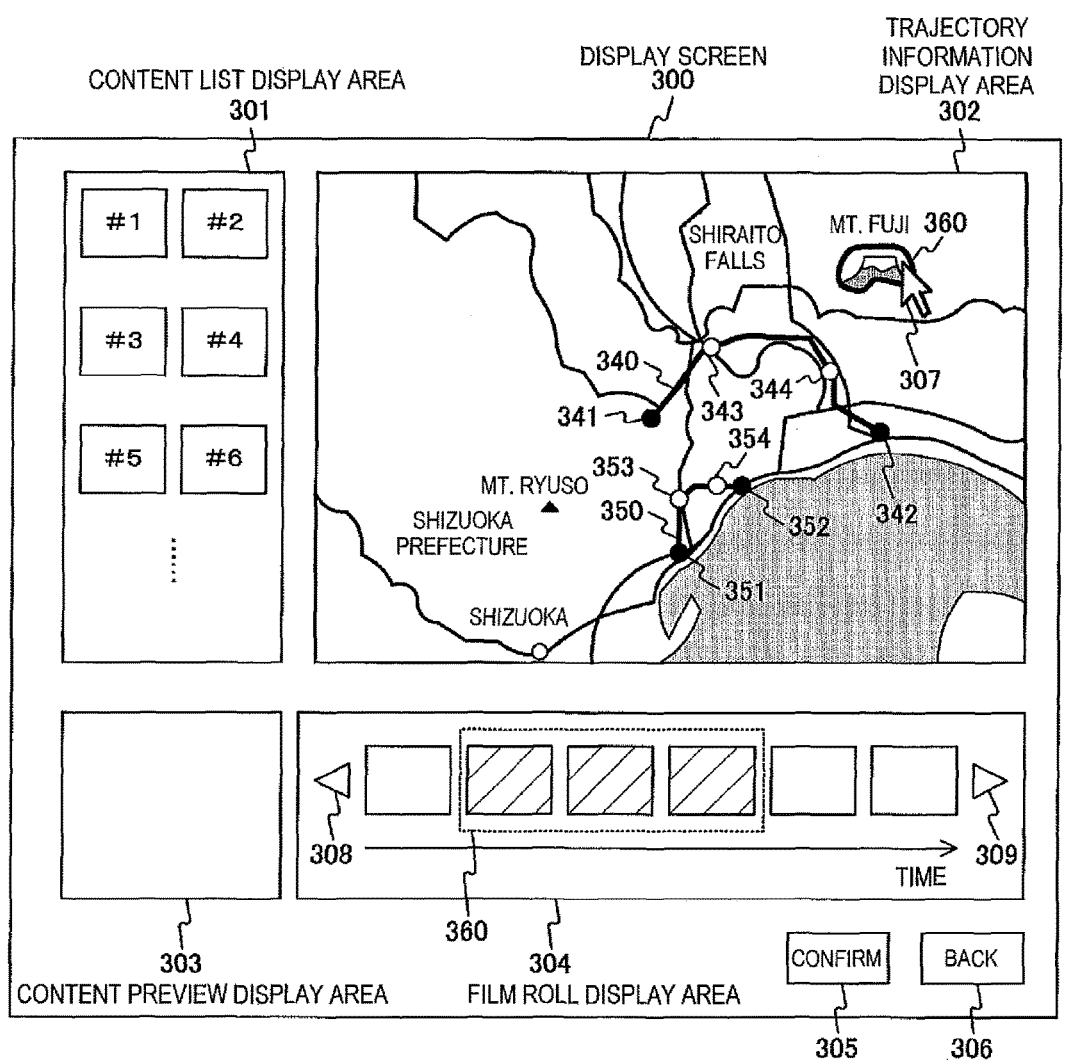
FIG. 9 is a diagram schematically showing the decision method of the range to be edited by the editing point setting unit 260 according to the first embodiment of the present invention.

FIG. 9 shows an example of the method of specifying editing points by specifying a landmark to be shot. A case when, for example, Mt. Fuji 360 is specified as a landmark is taken as an example. To specify the landmark, a method of specifying a desired landmark by a selection operation after each landmark being selectably displayed on a map or a method of specifying a landmark by specifying a desired area (for example, circling an area) on a map can be used.

For example, a collision determination with a landmark is made by using each shooting point on the trajectory and the azimuth recorded by associating with the shooting point in the range of the trajectory information display area 302. For example, the shooting point is set as a reference and a straight line identified by the azimuth associated therewith is extended in the direction of the specified landmark. Then, the collision determination can be made based on whether the straight line identified by the azimuth is contained in the area of the specified landmark. Then, shooting points the straight line from which identified by the azimuth is contained in the area of the specified landmark are extracted for each trajectory to identify the section (section on the trajectory) identified by these shooting points. Then, based on the identified section (section on the trajectory), the section of dynamic image content on the time axis can be set. For example, two editing points (points 343, 344) are identified as a section of a trajectory 340. Also, for example, two editing points (points 353, 354) are identified as a section of a trajectory 350. It is expected that dynamic images shot in these sections contain Mt. Fuji.

In this example, an example in which the shooting point is set as a reference and a straight line identified by the azimuth associated therewith is used is shown, but for example, the angle (angle of view) indicating the shooting range may be considered to make a collision determination within the range. That is, the editing point setting unit 260 can set a section on the time axis based on a comparison result of the range in which the shooting position on a shooting trajectory is set as a reference (shooting range identified by azimuth information when the shooting position is set as a reference) and a specific target area. For example, shooting positions corresponding to a shooting range at least a portion of which overlaps with a specific target area on a shooting trajectory are extracted and a section of dynamic image range on the time axis is set based on the section (section on the trajectory) including the extracted shooting positions.

Alternatively, a play list may be generated by determining whether Mt. Fuji is contained by object recognition processing on dynamic image content contained in a set section and extracting only sections containing Mt. Fuji. As the object recognition processing, for example, an object detection method (see, for example, Japanese Patent Application Laid-Open No. 2004-133637) based on matching of a template in which brightness distribution information of an object is recorded and content images. Also, for example, a detection method of detecting attributes of each object by a weak discriminator using a difference value of brightness between two points in an image can be used (see, for example, Japanese Patent Application Laid-Open No. 2009-118009).

These collision determinations will be described in detail in the second embodiment of the present invention. In the foregoing, examples in which generated trajectory information is displayed together with a map are shown, but for example, a play list may be generated by displaying only the generated trajectory information.

[Operation Example of the Image Processing Apparatus]

Figure 10:
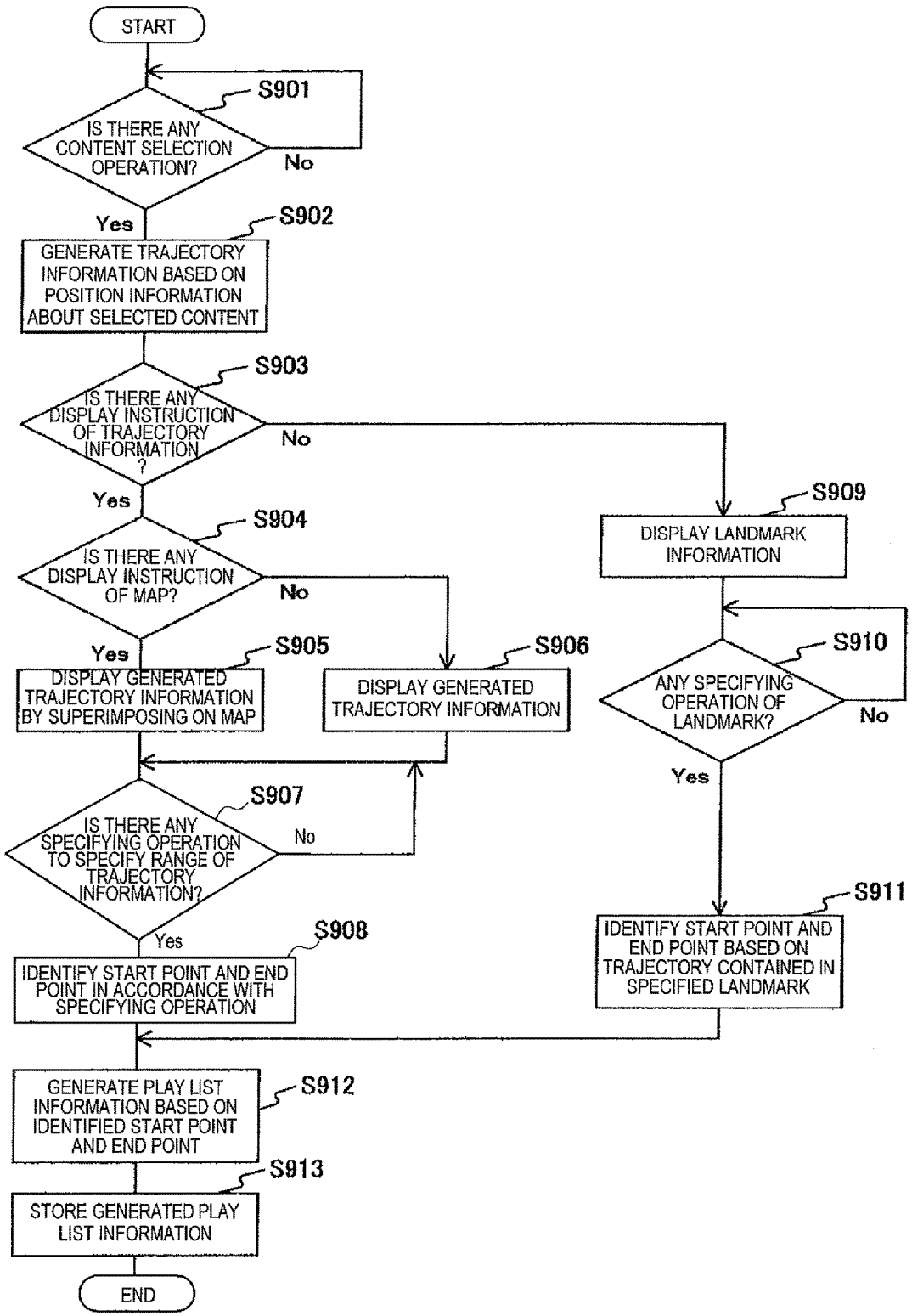
FIG. 10 is a flow chart exemplifying a processing procedure for play list generation processing by the image processing apparatus 100 according to the first embodiment of the present invention.

FIG. 10 is a flow chart exemplifying a processing procedure for play list generation processing by the image processing apparatus 100 according to the first embodiment of the present invention. In this example, an example in which if the display of trajectory information is not instructed, the display unit is caused to display landmark information and a play list is generated based on the landmark information.

First, whether a selection operation of dynamic image content is performed is determined (step S901) and if no selection operation of dynamic image content is performed, monitoring will continue. If a selection operation of dynamic image content is performed (step S901), the trajectory information generation unit 230 generates trajectory information of the selected dynamic image content based on position information (the latitude and longitude) of the selected dynamic image content (step S902). Step S902 is an example of the trajectory information generation procedure described in claims.

Subsequently, whether the display of trajectory information is instructed is determined (step S903) and if the display of trajectory information is instructed, whether the display of a map is instructed is determined (step S904). If the display of a map is instructed (step S904), the display control unit 240 causes the display unit 250 to display the generated trajectory information by superimposing the trajectory information on the map (step S905). On the other hand, if the display of a map is not instructed (step S904), the display control unit 240 causes the display unit 250 to display only the generated trajectory information (step S906).

Subsequently, whether a specifying operation to specify the range of trajectory information is performed is determined (step S907) and if no specifying operation to specify the range of trajectory information is performed, monitoring will continue. On the other hand, if the specifying operation to specify the range of trajectory information is performed (step S907), the editing point setting unit 260 identifies editing points of the trajectory information in accordance with the specifying operation to set the section of the dynamic image content on the time axis (step S908). Step S908 is an example of the setting procedure described in claims. Then, the play list information generation unit 270 generates play list information of the dynamic image content based on the set section (step S912) and causes the play list information storage unit 290 to store the generated play list information (step S913). Step S912 is an example of the play list information generation procedure described in claims.

If the display of trajectory information is not instructed (step S903), the display control unit 240 causes the display unit 250 to display landmark information based on the generated trajectory information (step S909). Subsequently, whether a specifying operation to specify the landmark is performed (step S910) and if no specifying operation to specify the landmark is performed, monitoring will continue. On the other hand, a specifying operation to specify the landmark is performed (step S910), editing points in the trajectory information is identified based on the trajectory contained in the specified landmark and the section of the dynamic image content on the time axis is set (step S911). Then, the processing proceeds to step S912. Step S911 is an example of the setting procedure described in claims.

Thus, according to the first embodiment of the present invention, a play list suiting user's preferences can easily be generated by using position information and azimuth information. That is, dynamic image content considering the geographical position and suiting user's preferences can easily be edited.

2. Second Embodiment

In the first embodiment of the present invention, examples of generating a play list of dynamic image content by using trajectory information and azimuth information have been described. If a play list of dynamic image content is generated by using trajectory information and azimuth information as described above, there is a danger that the amount of computation will be very large. Thus, when a play list of a large number of pieces of dynamic image content is generated, it is important to reduce the amount of computation related to generation of a play list. Thus, in the second embodiment of the present invention, an example in which the amount of computation is reduced by managing each piece of data when a play list is generated by a lattice area formed of a hierarchical structure will be shown.

The internal structure of an image processing apparatus according to the second embodiment of the present invention is substantially the same as in the first embodiment of the present invention and thus, the illustration and description thereof are omitted. The description below will focus on what is different from the first embodiment of the present invention and a portion of description of what is common is omitted.

First, basic concepts and terms such as a common two-dimensional coordinate system that processes spatial (plane) information such as a shooting trajectory (trajectory information) and a specific shooting target area and the data structure in the second embodiment of the present invention will be defined.

[Definition of the Coordinate System]

FIG. 11 is a diagram defining a plane coordinate system intended for play list generation processing by the image processing apparatus 100 according to the second embodiment of the present invention. Position information such as a shooting trajectory is normally recorded in the form of the latitude and longitude. Map data frequently has a different format of position information for each piece of map data. Thus, in the second embodiment of the present invention, a common two-dimensional plane coordinate system (UV coordinate system) to perform geometrical processing on such position information is defined.

FIG. 11(*a*) shows an example in which shooting points (represented as black circles) are arranged in positions where dynamic image content is recorded based on position information (the latitude and longitude) associated with the dynamic image content in the UV coordinate system. It is assumed that the image processing apparatus 100 moves along an arrow 400 when dynamic image content is shot. The shooting direction from each shooting point is schematically shown by an arrow extending from a black circle. Chronological shooting information is list information in which shooting information (shooting position information, shooting direction information) is chronologically arranged. Also, a shooting point number (starting with 0) is allocated to each point where dynamic image content is recorded and shooting information of the shooting point number i (i is an integer equal to 0 or greater) is represented as shooting information [i]. Also, a section number (starting with 0) is allocated to each section between shooting points.

FIG. 11(*b*) shows a diagram to define shooting points and shooting sections arranged in the UV coordinate system shown in FIG. 11(*a*). For example, the shooting point position of shooting information [i] is represented as a point p[i] (=(u[i], v[i])). A shooting section line segment with the shooting point p[i] and the point p[i+1] set as the start point and the end point respectively is represented as a line segment l[i].

FIG. 11(*c*) shows a diagram to define shooting definitions at shooting points arranged in the UV coordinate system shown in FIG. 11(*a*). For example, the shooting direction of shooting information [i] is represented as θ[i]. In the second embodiment of the present invention, θ is defined as a clockwise rotation angle around a U axis.

[Definition of the Lattice Area]

Figure 13:
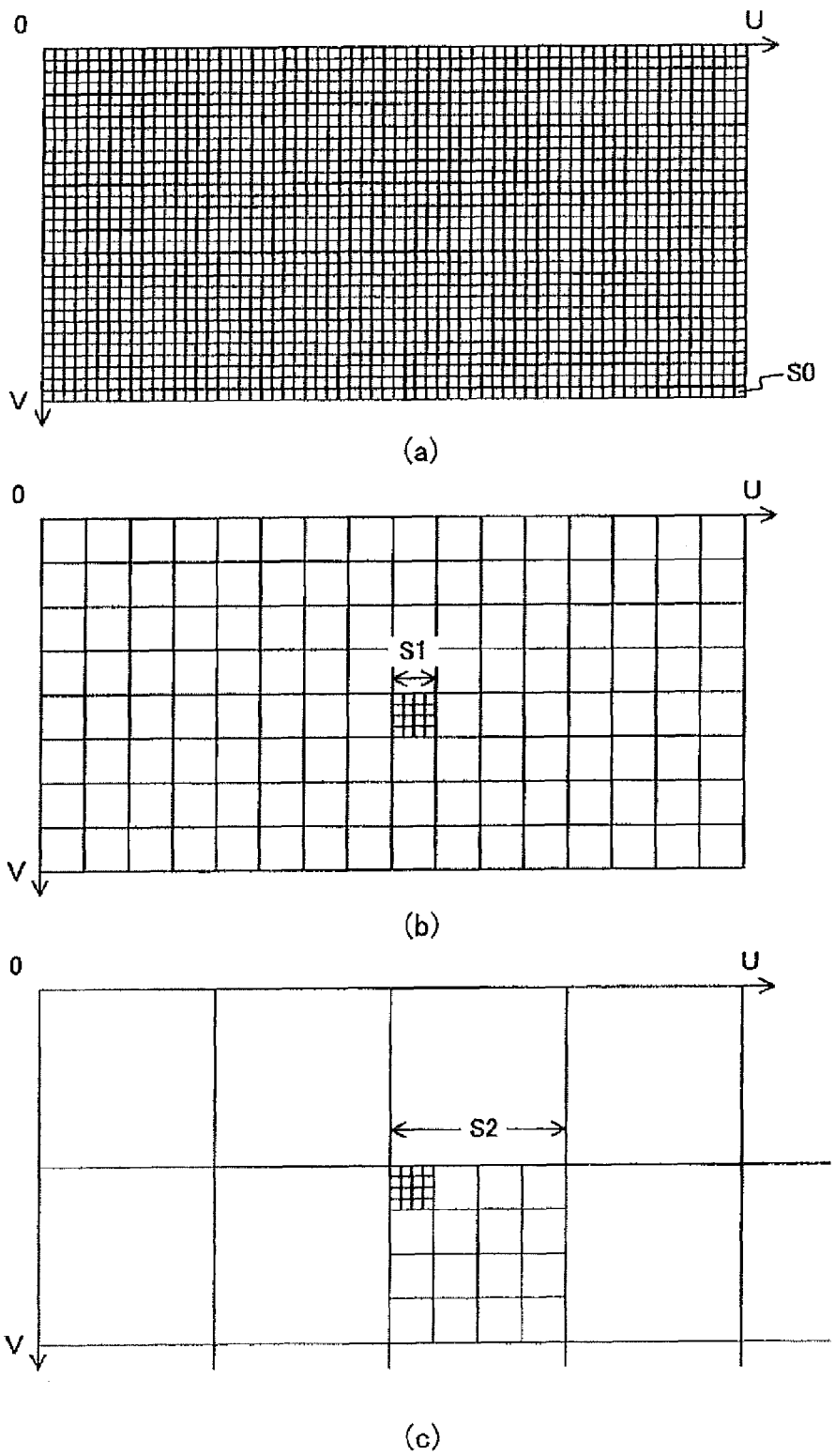
FIG. 13 is a diagram defining the lattice area to manage each piece of data used for play list generation processing by the image processing apparatus 100 according to the second embodiment of the present invention.

Next, the lattice area to manage each piece of data will be described. FIGS. 12 and 13 are diagrams defining a lattice area to manage each piece of data used for play list generation processing by the image processing apparatus 100 according to the second embodiment of the present invention. In the second embodiment of the present invention, data representing shooting trajectories and shooting target areas is managed as hierarchical data of lattice areas to efficiently detect overlapping of shooting trajectories or shooting target areas of a plurality of pieces of dynamic image content.

FIG. 12(a) shows an example of the lattice area in the UV coordinate system. As shown in FIG. 12(a), the lattice area is assumed to be a tetragonal lattice (lattice size S) and each side thereof is parallel to the U axis and V axis.

FIG. 12(b) shows an example of an order relation of lattice areas in the UV coordinate system. As shown in FIG. 12(b), a lattice number NL (M, N) (M, N are integers equal to 0 or greater) is attached to each lattice area in the UV coordinate system. Coordinates of four vertices of a lattice area of the lattice number NL (M, N) are (M×S, N×S) at the upper left, ((M+1)×S, N×S) at the upper right, ((M+1)S, (N+1)×S) at the lower right, and (M×S, (N+1)×S) at the lower left.

The order relation of lattice areas is defined by (1) and (2) shown below:

(1) The lattice area with a larger N is larger.
(2) If N is equal, the lattice area with a larger M is larger.

That is, in the example shown in FIG. 12(b), the order relation of lattice areas is defined as the order shown by arrows 401 to 404.

FIG. 13 shows an example of the hierarchical structure of a lattice area group including a plurality of lattice sizes. In the second embodiment of the present invention, as shown in FIG. 13, shooting trajectory data is managed as hierarchical data of lattice areas and thus is managed by the hierarchical structure (tree structure) of a lattice area group including a plurality of lattice sizes. In his case, the lattice size is labeled (layered) (S0 is the minimum size) in ascending order of lattice size and a higher-level lattice size is an integral multiple of a lower-level lattice size.

FIG. 13(a) shows an example the lattice area of the lattice size S0, FIG. 13(b) shows an example the lattice area of the lattice size S1, and FIG. 13(c) shows an example the lattice area of the lattice size S2. The lattice size S1 is four times the lattice size S0 and the lattice size S2 is four times the lattice size S1.

[Definition of Hierarchical Lattice Area Data]

FIG. 14 is a diagram defining hierarchical lattice area data used for play list generation processing by the image processing apparatus 100 according to the second embodiment of the present invention. The hierarchical lattice area data has, as described above, a tree structure having lattice elements (storing the lattice number) as elements thereof and satisfies (3) to (5) shown below:

(3) The hierarchical lattice area data is hierarchized for each level (lattice size) and the level of an increasing lattice size (higher level) becomes a higher layer.
(4) The lattice area of a child lattice element is contained in a lattice area of a parent lattice element.
(5) Lattice element groups having the same parent are sorted in ascending order of lattice number.

FIG. 14(a) shows an example of lattice areas of the lattice sizes S0 to S2. The lattice number NL2 (M, N) indicates the lattice number of a lattice area of the lattice size S2, the lattice number NL1 (M, N) indicates the lattice number of a lattice area of the lattice size S1, and the lattice number NL0 (M, N) indicates the lattice number of a lattice area of the lattice size S0. In the example shown in FIG. 14(a), corresponding lattice numbers are shown by attaching to inside rectangles of lattice areas of the lattice sizes S2, S1. Lattice areas of the lattice size S0 are shown as thick rectangles as a lattice area group 405.

FIG. 14(b) shows an example of the hierarchical lattice area data. The hierarchical lattice area data shown in FIG. 14(b) is hierarchical lattice area data corresponding to FIG. 14(a). In the example shown in FIG. 14(b), lattice areas in a parent-child relationship are shown by linking from a parent lattice area to a child lattice area by an arrow. The lattice number of a lattice area is shown by attaching to inside a rectangle showing the lattice area. In FIG. 14(b), NLi (i=0 to 2) of the lattice number of a lattice area may be omitted.

In the second embodiment of the present invention, an example in which a play list is generated by using the lattice area and hierarchical lattice area data defined as described above will be shown.

[Data Structure Example of Target Area Data]

The lattice area and hierarchical lattice area data defined as described above are used for generating trajectory information generated based on position information associated with dynamic image content. The generation thereof will be described in detail with reference to FIGS. 15 to 26. The lattice area and hierarchical lattice area data are also applied to target area data when a play list is generated. Regarding the target area data, the definition of the data structure representing a specific shooting target area and the method of creating the data will be described.

First, the data structure of the target area data will be described. The data structure of the target area data can also be defined in the same manner as the data structure shown in FIGS. 14(a) and 14(b). That is, shooting target areas (target areas) can be managed as hierarchical data of lattice areas. The target area data is hierarchical lattice area data containing a shooting target area in an assembled area of lattice area groups at the lowest level (level 0).

The method of creating target area data will be described. Target area data is to be created or acquired by one of the methods of (1) and (2) below:

(1) Generation by user's manual operation. When target area data should be generated in this manner, for example, the user generates hierarchical lattice area data containing a trajectory traced by the user on a map on the display screen (2) Generation acquired or converted from map data. When target area data should be generated in this manner, for example, area data of the target area stored in map data is converted into hierarchical lattice area data.

Incidentally, the lattice size S0 of the level 0 can be set by changing in accordance with an intended target area. In this case, it is preferable to set a value that is neither too large nor too small with respect to the intended target area. It is also preferable to set a value so that the target area extends over a few, few tens, or few hundred of level-0 lattice areas.

[Data Structure of Trajectory Information and a Creation Example]

Next, the definition of the data structure of trajectory information representing a shooting trajectory of dynamic image content and the creation method of the data will be described.

FIG. 15 is a diagram defining hierarchical lattice area data used for trajectory information generation processing by the image processing apparatus 100 according to the second embodiment of the present invention.

FIG. 15(*a*) shows an example of lattice areas of the lattice sizes S0 to S2. In the example shown in FIG. 15(*a*), lattice areas of the lattice sizes S0 to S2 containing shooting trajectories (points p[0] to p[3]). FIG. 15(*a*) is similar to FIG. 14(*a*) except that shooting trajectories are contained and thus, the description of what is common is omitted and the description focuses on differences.

As shown in FIG. 11(*b*), a shooting trajectory can be represented by the shooting point p[i] and the shooting section line segment l[i]. In the example shown in FIG. 15(*a*), a case of the shooting points p[0] to p[3] and the shooting section line segments l[0] to l[2] is taken as an example.

When a shooting trajectory is managed as hierarchical data of lattice areas, lattice areas at the lowest level (level 0) containing the shooting trajectory are used for management. More specifically, lattice areas (a lattice area group 410 indicated by a thick rectangle) at the lowest level (level 0) containing the shooting trajectory are identified. Subsequently, shooting section line segments passing the identified lattice areas are identified for each lattice area.

FIG. 15(*b*) shows an example of lattice areas of the lattice size S0. For example, a case of the lattice area (NL0(27, 53)) of the lattice size S0 containing the shooting point p[3] is taken as an example. As shown in FIG. 15(*b*), shooting section line segments passing the lattice area (NL0(27, 53)) are the shooting section line segments l[1] and l[2]. Thus, the section number list (l[1] and l[2]) of the shooting section line segment group passing the lattice area (NL0(27, 53)) of the lattice size S0 is linked to the lattice element of the lattice area. In this case, for example, the shooting section line segments are sorted in ascending order of section number. Thus, shooting trajectory data is hierarchical lattice area data containing a shooting trajectory in an assembled area of lattice area groups at the lowest level (level 0).

FIG. 15(*c*) shows an example of the hierarchical lattice area data. The hierarchical lattice area data shown in FIG. 15(*c*) is hierarchical lattice area data corresponding to FIG. 15(*a*). FIG. 15(*c*) is similar to FIG. 14(*b*) except that a section number list 411 inside level-0 lattices is added and thus, the description of what is common is omitted and the description focuses on differences.

In the example shown in FIG. 15(*c*), linked section numbers are shown in the section number list 411 inside level-0 lattices. Section numbers linked from a lattice area are indicated by an arrow linking the lattice area to the section numbers. Section numbers of shooting section line segments are attached and show inside the rectangle showing the section number lists inside level-0 lattices. In FIG. 15(*c*), l[ ] of the section number of the shooting section line segment is omitted.

For example, the section number list of the lattice area (NL0(27, 53)) shown in FIG. 15(*b*) is shown by drawing a rectangle 412 around the section number list.

The shooting trajectory data can be created by determining a level-0 lattice area group through which each shooting section line segment passes and merging the level-0 lattice area groups as hierarchical lattice area data. The creation method thereof will be described in detail with reference to FIGS. 16 to 26.

[Creation Example of Shooting Trajectory Data]

FIG. 16 is a diagram schematically showing the flow of creation of shooting trajectory data by the image processing apparatus 100 according to the second embodiment of the present invention.

FIG. 16(*a*) shows a shooting trajectory (list of shooting points p), which is input data when shooting trajectory data is created. The shooting trajectory shown in FIG. 16(*a*) corresponds to the shooting trajectory shown in FIG. 15(*a*).

FIG. 16(*b*) shows shooting trajectory hierarchical lattice area data, which is output data when shooting trajectory data is created. The shooting trajectory hierarchical lattice area data shown in FIG. 16(*b*) corresponds to the shooting trajectory hierarchical lattice area data shown in FIGS. 15(*a*) and 15(*c*).

Figure 17:
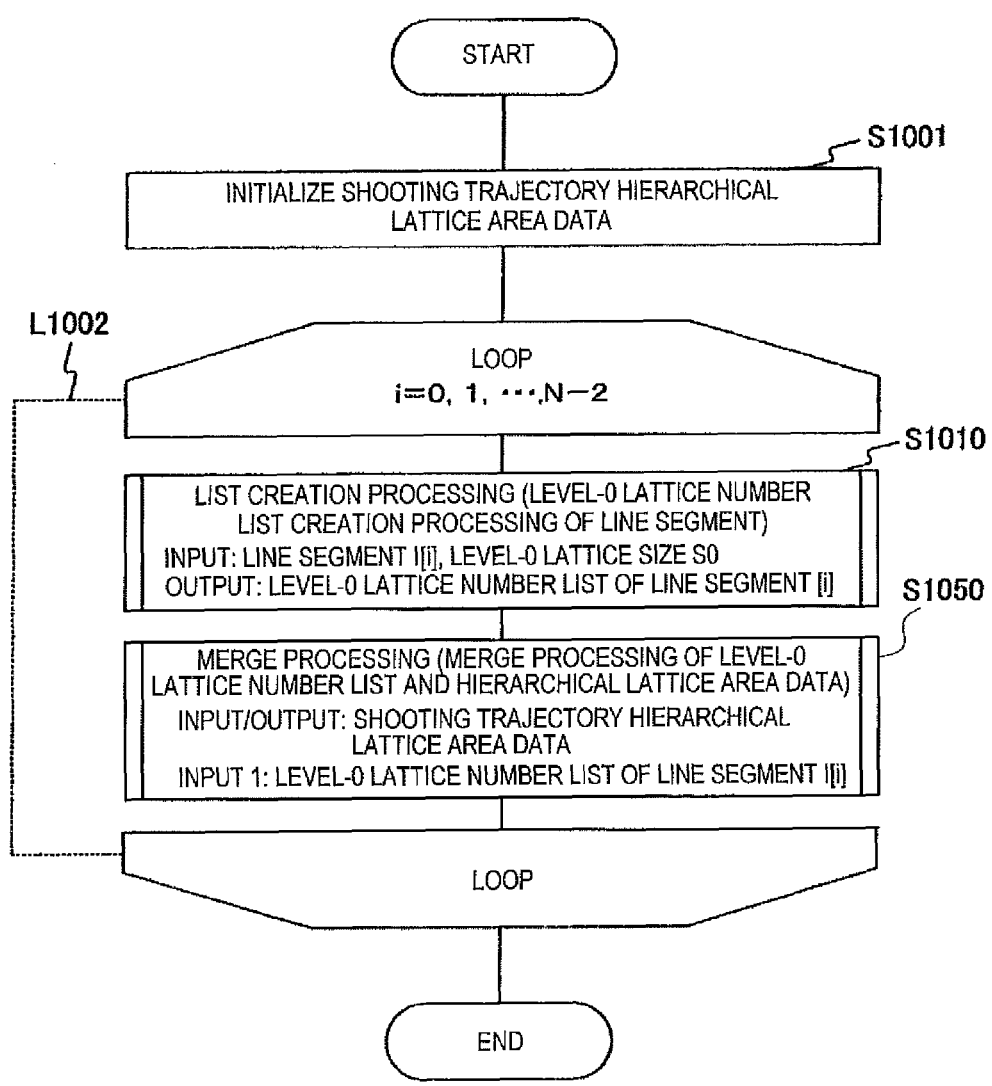
FIG. 17 is a flow chart exemplifying the processing procedure for shooting trajectory data generation processing by the image processing apparatus 100 according to the second embodiment of the present invention.

FIG. 17 is a flow chart exemplifying the processing procedure for shooting trajectory data generation processing by the image processing apparatus 100 according to the second embodiment of the present invention.

First, shooting trajectory hierarchical lattice area data is initialized (step S1001). That is, the shooting trajectory hierarchical lattice area data is initialized to data including only the root element (for example, the root element shown in FIG. 15(*c*)).

Subsequently, the following processing is repeatedly performed for each shooting section line segment (loop L1002). N is an integer equal to 0 or greater and indicates the total number of shooting points. More specifically, level-0 lattice number list creation processing of shooting section line segments is performed (step S1010). The list creation processing will be described in detail with reference to FIGS. 18 to 23.

Subsequently, merge processing of a level-0 lattice number list and the hierarchical lattice area data is performed (step S1050). The merge processing will be described in detail with reference to FIGS. 24 to 26.

FIG. 18 is a diagram showing an input/output example of creation processing of a level-0 lattice number list of a line segment by the image processing apparatus 100 according to the second embodiment of the present invention. FIG. 18(*a*) shows a line segment (line segment linking shooting points pa(ua, va) and pb(ub, vb)) as input data. FIG. 18(*b*) schematically shows a level-0 lattice number list of the line segment as output data with a lattice area group 420 at the level 0. The list is sorted, for example, in ascending order of lattice number. For example, the level-0 lattice number list of a line segment can be represented as ((m[0], n[0]), (m[1], n[1]), . . . , (m[T], n[T])).

Figure 19:
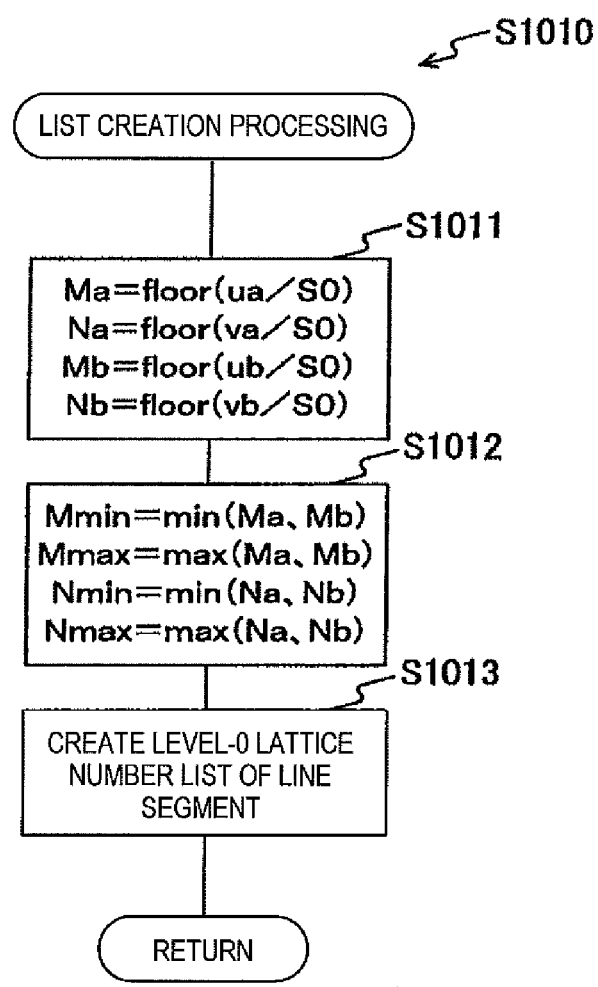
FIG. 19 is a flow chart exemplifying list generation processing of the processing procedure for shooting trajectory data generation processing by the image processing apparatus 100 according to the second embodiment of the present invention.

FIG. 19 is a flow chart exemplifying list generation processing (processing procedure of step S1010 shown in FIG. 17) of the processing procedure for shooting trajectory data generation processing by the image processing apparatus 100 according to the second embodiment of the present invention.

First, lattice numbers at the level 0 in which two shooting points constituting a line segment as input data are contained (step S1011). (Ma, Na) and (Mb, Nb) mean lattice numbers at the level 0 in which shooting points pa, pb are contained, floor(x) is a floor function and means the maximum integer within the range of a real number x.

Subsequently, the maximum value and the minimum value regarding the U axis and V axis are identified for the identified lattice numbers (Ma, Na) and (Mb, Nb) at the level 0 (step S1012). For example, the maximum value regarding the U axis is set as Mmax and the minimum value regarding the U axis is set as Mmin. Also, the maximum value regarding the V axis is set as Nmax and the minimum value regarding the V axis is set as Nmin Subsequently, a list of level-0 lattice numbers is generated in accordance with the inclination of the line segment as input data (step S1013). The generation of the list will be described in detail with reference to FIGS. 20 to 23.

First, the creation method of a list of level-0 lattice numbers of a line segment when the inclination of the line segment as input data is downward (for example, the case shown in FIG. 18) will be described.

Figure 20:
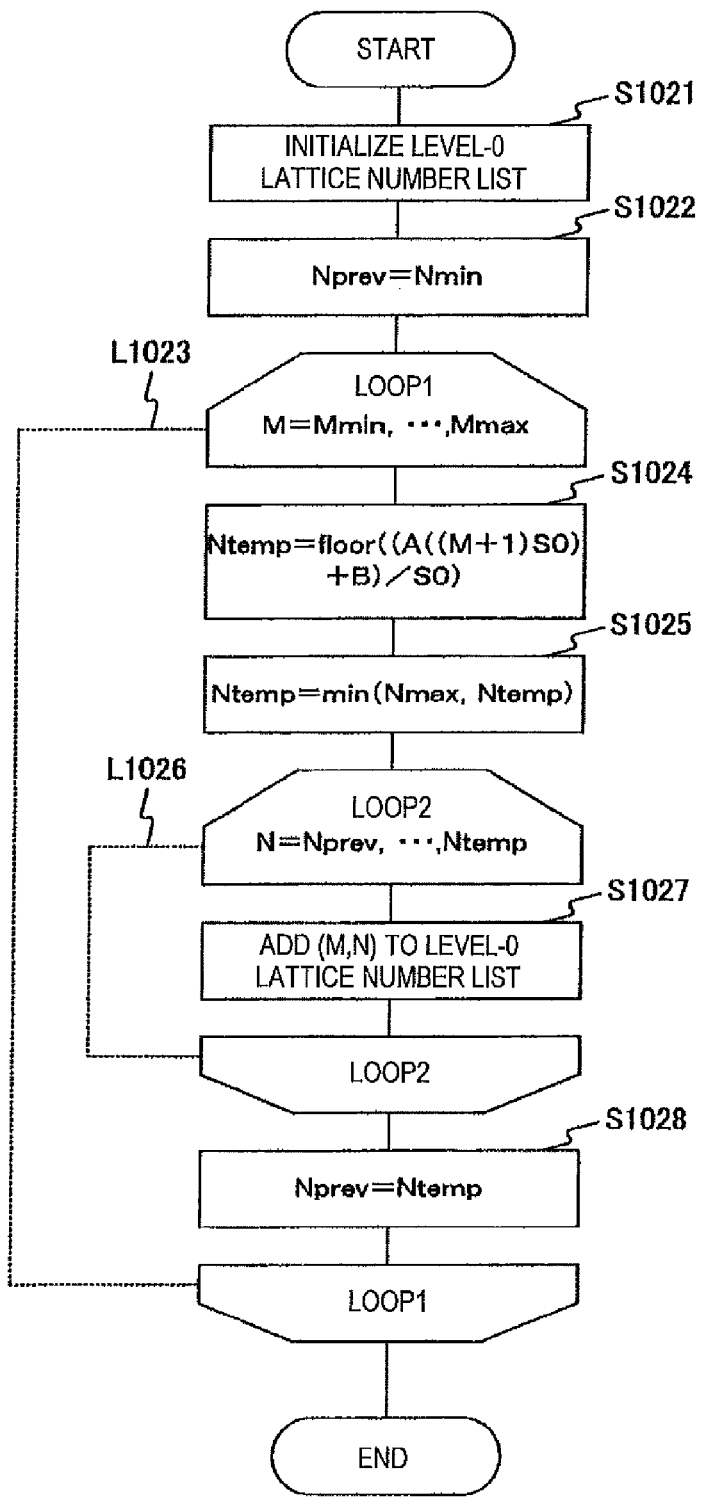
FIG. 20 is a flow chart exemplifying the processing procedure for list generation processing of level-0 lattice numbers of the segment line by the image processing apparatus 100 according to the second embodiment of the present invention.

FIG. 20 is a flow chart exemplifying the processing procedure for list generation processing of level-0 lattice numbers of the segment line (when the inclination of the line segment as input data is downward) by the image processing apparatus 100 according to the second embodiment of the present invention.

The input data here includes the above Mmin, Mmax, Nmin, Nmax, the lattice size S0 at the level 0, and straight line parameters A, B. The straight line parameters A, B are parameters of a linear formula (v=Au+B) containing the line segment as input data, where A=(va−vb)/(ua−ub) and B=va−Aua.

First, the list of level-0 lattice numbers of the line segment is initialized (step S1021) and a variable Nprev is set as Nprev=Nmin (step S1022).

Subsequently, the following processing is repeatedly performed from the minimum value (Mmin) regarding the U axis to the maximum value (Mmax) regarding the U axis for each lattice area containing the line segment as input data (loop L1023). First, a variable Ntemp is set as Ntemp=floor (((A(M+1)S0)+B)/S0) (step S1024). The variable Ntemp is a temporarily retained variable. S0 is the lattice size at the level 0. Subsequently, the variable Ntemp is set as Ntemp=min(Nmax, Ntemp) (step S1025).

Subsequently, the following processing is repeatedly performed from the value (Nprev) regarding the V axis to the value (Ntemp) regarding the V axis for each lattice area containing the line segment as input data (loop L1026). That is, (M, N) is successively added to the lattice number list at the level 0 (step S1027).

After the processing from the value (Nprev) regarding the V axis to the value (Ntemp) regarding the V axis terminates (loop L1026), the variable Nprev is set as Nprev=Ntemp (step S1028) to perform the processing of the loop L1023.

Accordingly, the level-0 lattice number list (for example, (m[0], n[0]), (m[1], n[1]), . . . , (m[T], n[T])) of the line segment whose inclination is downward is generated.

Next, the creation method of a list of level-0 lattice numbers of a line segment when the inclination of the line segment as input data is upward will be described.

FIG. 21 is a diagram showing an input/output example of creation processing of the level-0 lattice number list of the line segment whose inclination is upward by the image processing apparatus 100 according to the second embodiment of the present invention. FIG. 21(a) shows a line segment (line segment linking shooting points pa(ua, va) and pb(ub, vb)) as input data. FIG. 21(b) schematically shows a level-0 lattice number list of the line segment as output data with a lattice area group 421 at the level 0.

Figure 22:
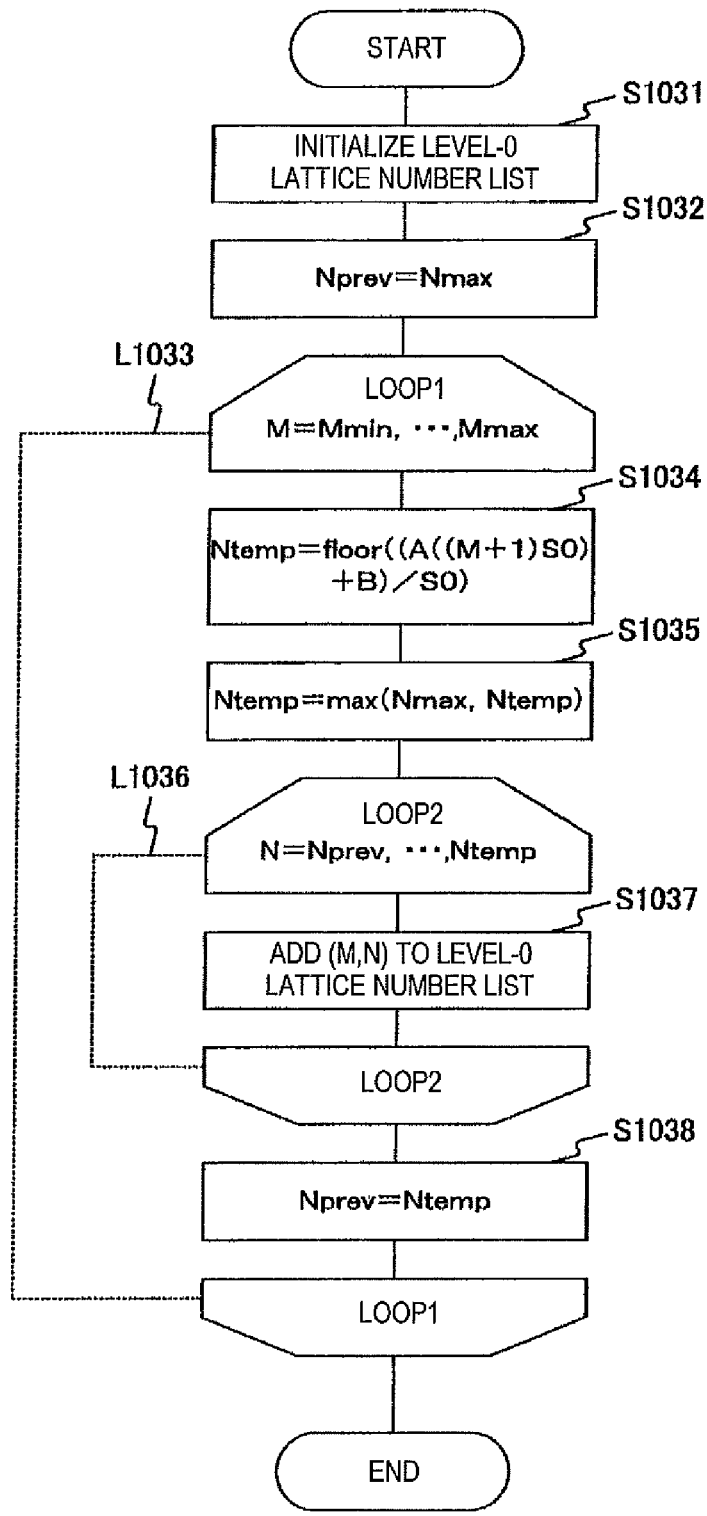
FIG. 22 is a flow chart exemplifying the processing procedure for list generation processing of level-0 lattice numbers of the segment line by the image processing apparatus 100 according to the second embodiment of the present invention.

FIG. 22 is a flow chart exemplifying the processing procedure for list generation processing of level-0 lattice numbers of the segment line (when the inclination of the line segment as input data is upward) by the image processing apparatus 100 according to the second embodiment of the present invention. The input data is the same as that in FIG. 20. The processing procedure is a partial modification of the processing procedure shown in FIG. 20. That is, the processing procedure shown in FIG. 22 is different in that variables set in steps S1032, S1035 are different and N is decremented each time the loop executes in loop L1036. Otherwise, the processing procedure shown in FIG. 22 is the same as the processing procedure shown in FIG. 20 and thus, the description thereof is omitted.

Next, the creation method of a list of level-0 lattice numbers of a line segment when the inclination of the line segment as input data is vertical will be described.

FIG. 23 is a diagram showing an input/output example of creation processing of the level-0 lattice number list of the line segment whose inclination is vertical by the image processing apparatus 100 according to the second embodiment of the present invention. FIG. 23(a) shows a line segment (line segment linking shooting points pa(ua, va) and pb(ub, vb)) as input data. FIG. 23(b) schematically shows a level-0 lattice number list of the line segment as output data with a lattice area group 422 at the level 0.

If the inclination is vertical, as shown in FIG. 23(b), the maximum value (Mmax) and the minimum value (Mmin) regarding the U axis are the same. Thus, a list of lattice areas (lattice area group parallel to the V axis) identified by the maximum value (Nmax) and the minimum value (Nmin) regarding the V axis is generated as a level-0 lattice number list of the line segment whose inclination is vertical.

Subsequently, the merge processing of a level-0 lattice number list and hierarchical lattice area data will be described.

FIGS. 24 and 25 are diagrams schematically showing the flow of creation of merge processing (merge processing of a level-0 lattice number list and hierarchical lattice area data) by the image processing apparatus 100 according to the second embodiment of the present invention.

FIG. 24(a) schematically shows hierarchical lattice area data (data identified by a lattice area group 423) generated already and newly generated level-0 lattice number list (data identified by a lattice area group 424).

FIG. 24(b) schematically shows hierarchical lattice area data (data identified by a lattice area group 425) generated by the merge processing shown in FIG. 24(a).

FIG. 25(a) schematically shows a data structure example of the hierarchical lattice area data and the level-0 lattice number list shown in FIG. 24(a). That is, FIG. 25(a) schematically shows an example in which the newly generated level-0 lattice number list (rectangle 413) is merged into the hierarchical lattice area data generated already.

FIG. 25(b) schematically shows hierarchical lattice area data generated by the merge processing shown in FIG. 25(a). The hierarchical lattice area data shown in FIG. 25(b) corresponds to hierarchical lattice area data shown in FIG. 15(c).

Figure 26:
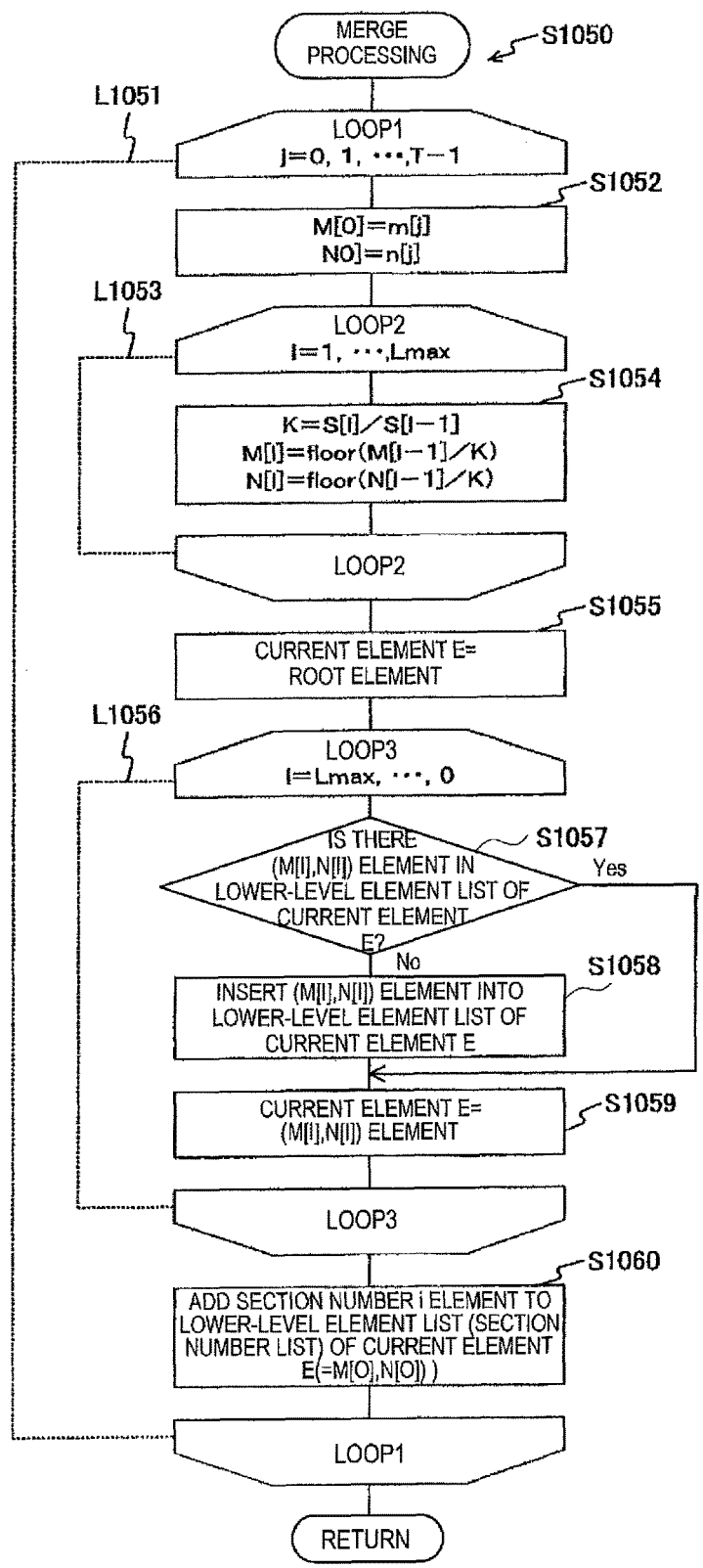
FIG. 26 is a flow chart exemplifying the merge processing of the processing procedure for shooting trajectory data generation processing by the image processing apparatus 100 according to the second embodiment of the present invention.

FIG. 26 is a flow chart exemplifying the merge processing (processing procedure in step S1050 shown in FIG. 17) of the processing procedure for shooting trajectory data generation processing by the image processing apparatus 100 according to the second embodiment of the present invention.

First, the following processing is repeated performed on the level-0 lattice number list as input data according to the order of the list (loop L1051). T is a value indicating the list length of the level-0 lattice number list as input data.

Subsequently, processing to determine a lattice area number group (M[0], N[0]), . . . , (M[Lmax], N[Lmax]) from the level 0 to the maximum level (level Lmax) containing a level-0 lattice area of a lattice number (m[j], n[j]) is performed. The lattice area number group determined by the processing (step S1052, loop L1053) becomes an addition candidate to the hierarchical lattice area data. Lmax means the maximum level number of the hierarchical lattice area data of input/output.

More specifically, set M[0]=m[j] and N[0]=n[j] (step S1052). Subsequently, the following processing is repeatedly performed from the level 1 to the maximum level (level Lmax) for lattice areas of each lattice size (loop L1053). That is, K=S[1]/S[1-1] is calculated to set M[1]=floor(M[1-1]/K) and N[1]=floor(N[1-1]/K) (step S1054)K means a value of the ratio of lattice sizes of the level 1 and level (1-1).

Subsequently, processing to merge (M[0], N[0]), . . . , (M[Lmax], N[Lmax]) as addition candidates to the hierarchical lattice area data is performed (step S1055, loop L1056). In this processing, addition candidates that are not added are successively processed to add from the highest level.

More specifically, a current element E is set as E=root element (step S1055). Subsequently, the following processing is repeatedly performed successively from the highest level (loop L1056). That is, whether any (M[1], N[1]) element is present in the low-level element list of the current element E is present is determined (step S1057). If no (M[1], N[1]) element is present in the low-level element list of the current element E is present (step S1057), the (M[1], N[1]) element is inserted into the low-level element list of the current element E (step S1058). On the other hand, if the (M[1], N[1]) element is present in the low-level element list of the current element E is present (step S1057), the processing proceeds to step S1059. Subsequently, the current element E is set as E=(M[1], N[1]) element (step S1059).

Subsequently, if the processing of loop L1056 terminates, a section number i element is added to the low-level element list (section number list) of the current element E(=(M[0], N[0]) (step S1060).

Thus, by performing the merge processing, as shown in FIGS. 15(c) and 25(b), hierarchical lattice area data is generated.

As the lattice size S0 at the level 0, it is preferable to set a value that is neither too large nor too small with respect to a shooting trajectory. For example, it is preferable to set the lattice size S0 to such a value that a shooting trajectory extends over a few to few tens level-0 lattice areas.

[Example of Shooting Trajectory Information in a Section of Dynamic Image Content]

Shooting trajectory information in a section of dynamic image content includes a shooting point as the start point of the section and a shooting point as the end point of the section. If, for example, the shooting point as the start point of a section in dynamic image content is pa1 and the shooting point as the end point of the section is pb1, shooting trajectory information is identified by the shooting point pa1 and the shooting point pb1.

[Example of Detection of a Shooting Section Passing a Target Area]

Next, an example in which a shooting section (section in the shooting trajectory) passing a target area (specific target area) is extracted based on target area data and shooting trajectory data will be shown. Accordingly, of dynamic image content shot in, for example, a theme part, a dynamic image section shot during a specific attraction can be extracted.

Figure 27:
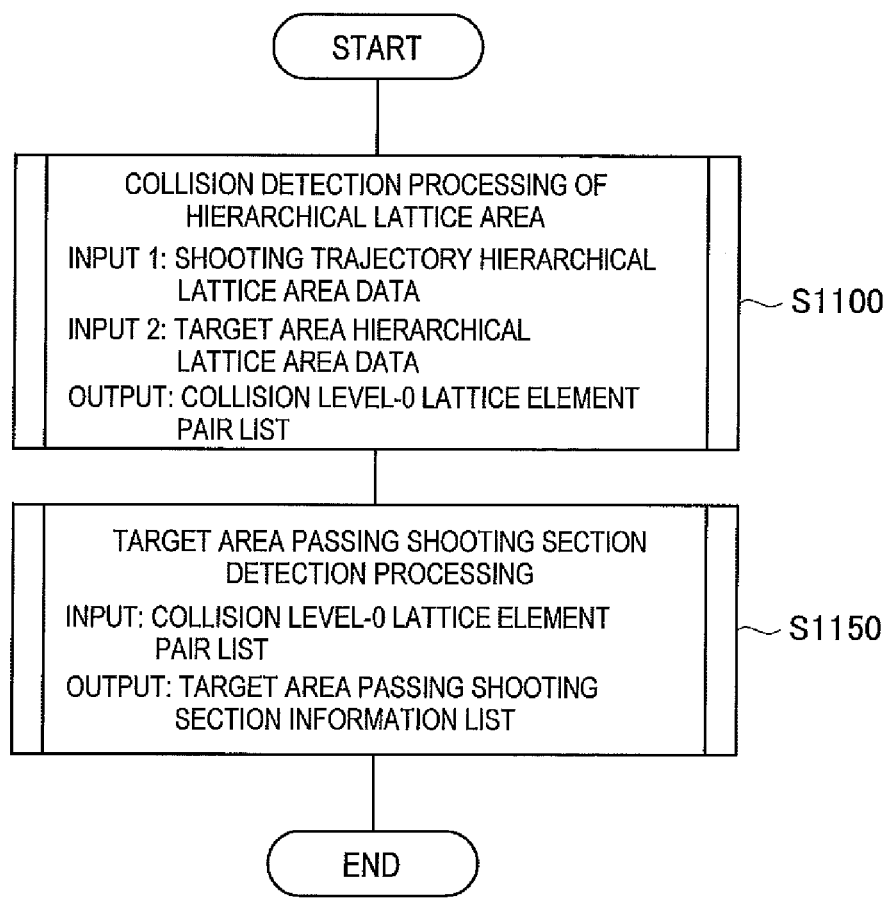
FIG. 27 is a flow chart exemplifying the processing procedure for shooting section detection processing by the image processing apparatus 100 according to the second embodiment of the present invention.

FIG. 27 is a flow chart exemplifying the processing procedure for shooting section detection processing by the image processing apparatus 100 according to the second embodiment of the present invention.

First, collision detection processing of a shooting trajectory and a hierarchical lattice area of a target area is performed (step S1100). In the collision detection processing, a collision is detected hierarchically from a large area to a small area. Accordingly, compared with a case when a large number of collision determinations between small areas are made from the start, the number of times of collision determination processing can be decreased as a whole so that processing related to play list generation reduced. The collision detection processing will be described in detail with reference to FIGS. 28 to 31.

Subsequently, target area passing shooting section detection processing is performed (step S1150). The shooting section detection processing will be described in detail with reference to FIGS. 32 to 34.

FIG. 28 is a diagram schematically showing the flow of collision detection processing (collision detection processing of a shooting trajectory and a hierarchical lattice area of a target area) by the image processing apparatus 100 according to the second embodiment of the present invention.

FIG. 28(a) schematically shows hierarchical lattice area data (data identified by a lattice area group 430) of a shooting trajectory and hierarchical lattice area data (data identified by a lattice area group 431) of a target area. In the collision detection processing, each piece of the above data is input as input data.

FIG. 28(b) schematically shows a level-0 lattice element pair list (data identified by a lattice area group 432 indicated by thick-line rectangles) detected by the collision detection processing shown in FIG. 28(a). Thus, in the collision detection processing, colliding lattice areas (level 0) of hierarchical lattice area data of a shooting trajectory and hierarchical lattice area data of a target area are identified.

Figure 29:
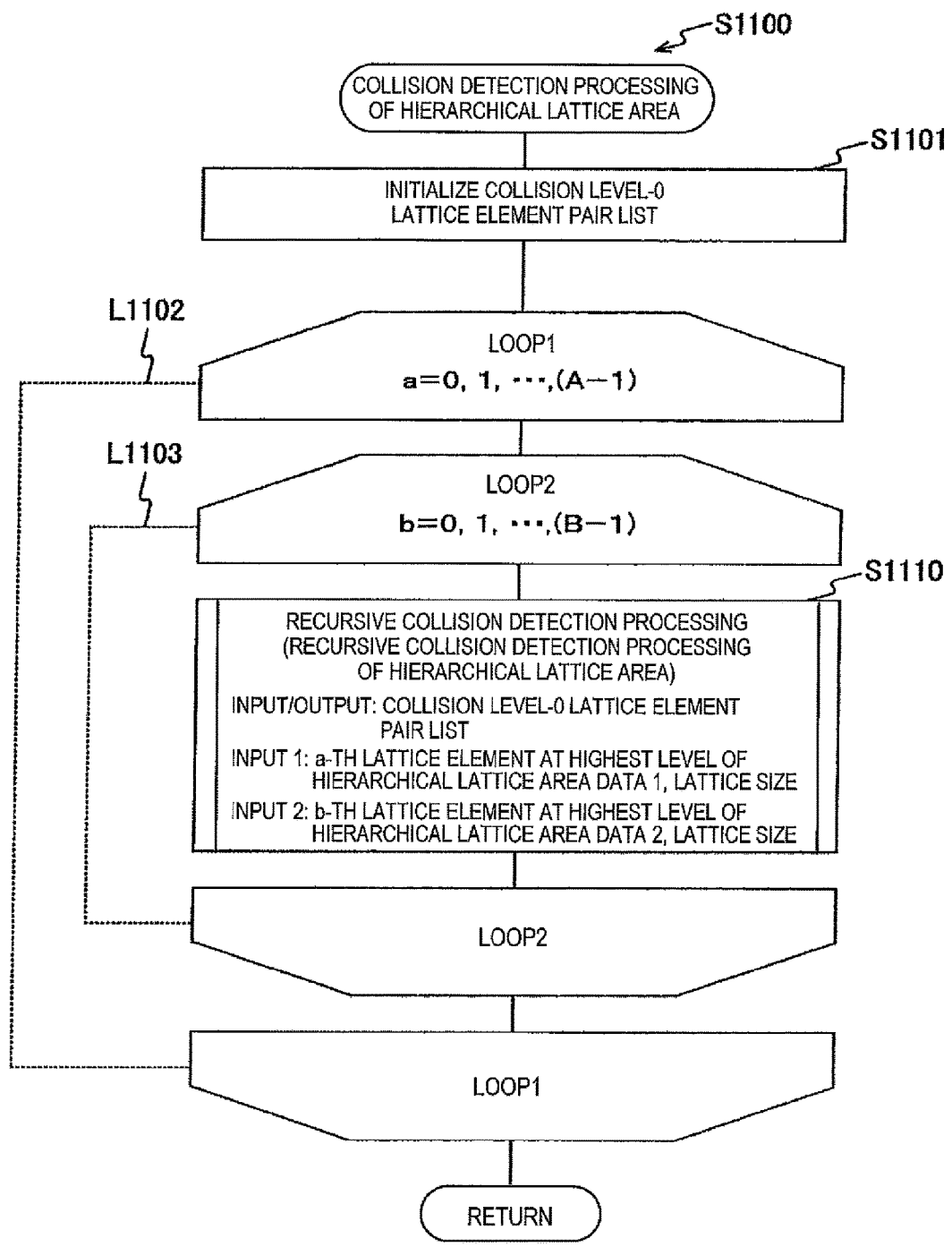
FIG. 29 is a flow chart exemplifying the collision detection processing of the processing procedure for shooting section detection processing by the image processing apparatus 100 according to the second embodiment of the present invention.

FIG. 29 is a flow chart exemplifying the collision detection processing (processing procedure in step S1100 shown in FIG. 27) of the processing procedure for shooting section detection processing by the image processing apparatus 100 according to the second embodiment of the present invention.

First, a collision level-0 lattice element pair list is initialized (step S1101). Subsequently, the following processing is repeatedly performed for lattice areas at the highest level for the hierarchical lattice area data (input 1 shown in FIG. 28(a)) of the shooting trajectory (loop L1102). A is a value indicating the number of lattice elements (number of lattice areas) at the highest level of the hierarchical lattice area data of the shooting trajectory.

Subsequently, the following processing is repeatedly performed for lattice areas at the highest level for the hierarchical lattice area data (input 2 shown in FIG. 28(a)) of the target area (loop L1103). B is a value indicating the number of lattice elements (number of lattice areas) at the highest level of the hierarchical lattice area data of the target area.

Subsequently, recursive collision detection processing of hierarchical lattice areas is performed (step S1110). The recursive collision detection processing will be described in detail with reference to FIG. 30.

Figure 30:
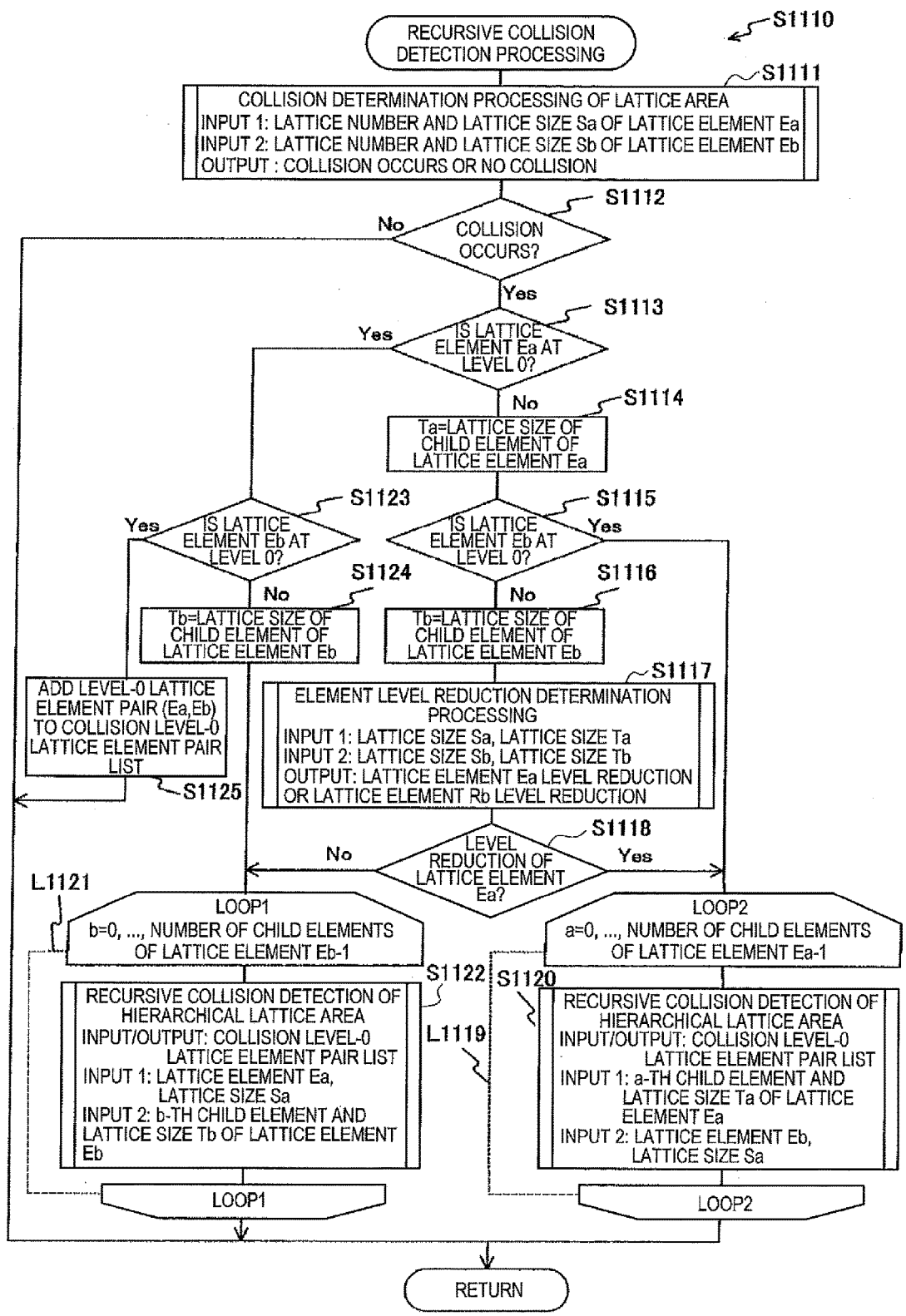
FIG. 30 is a flow chart exemplifying recursive collision detection processing of the processing procedure for shooting section detection processing by the image processing apparatus 100 according to the second embodiment of the present invention.

FIG. 30 is a flow chart exemplifying the recursive collision detection processing (processing procedure in step S1110 shown in FIG. 29) of the processing procedure for shooting section detection processing by the image processing apparatus 100 according to the second embodiment of the present invention. The input data includes a collision level-0 lattice element pair list, an a-th lattice element Ea and a lattice size Sa thereof at the highest level of hierarchical lattice area data 1, and a b-th lattice element Eb and a lattice size Sb thereof at the highest level of hierarchical lattice area data 2. The output data includes a collision level-0 lattice element pair list.

FIG. 31 is a diagram schematically showing collision determination processing of lattice areas and element level reduction determination processing by the image processing apparatus 100 according to the second embodiment of the present invention. Each piece of the above processing will be described in detail with reference to FIG. 30.

First, collision detection processing of lattice areas is performed (step S1111). For example, a lattice area A (lattice area of the lattice element Ea and the lattice size Sa) 441 and a lattice area B (lattice area of the lattice element Eb and the lattice size Sb) 442 shown in FIG. 31(a) are taken as an example. Thus, based on the lattice number of a lattice element and the lattice size, the positions and sizes of two lattice areas to be compared can be identified. Then, whether the two lattice areas to be compared overlap is determined. In the example shown in FIG. 31(a), for example, the lattice area A (441) and the lattice area B (442) overlap partially. Thus, it is determined that a collision occurs. On the other hand, the two lattice areas to be compared do not overlap, it is determined that no collision occurs.

Subsequently, whether a collision occurs is determined (step S1112). If it is determined that no collision occurs, the operation of the recursive collision detection processing is terminated. On the other hand, if it is determined that a collision occurs (step S1112), whether the lattice element Ea is at the level 0 is determined (step S1113).

If the lattice element Ea is not at the level 0 (step S1113), Ta is set as "lattice size of the child element of the lattice element Ea" (step S1114) and whether the lattice element Eb is at the level 0 is determined (step S1115).

If the lattice element Eb is not at the level 0 (step S1115), Tb is set as "lattice size of the child element of the lattice element Eb" (step S1116) and element level reduction determination processing is performed (step S1117). For example, a lattice area A (lattice area of the lattice size Sa (lattice size Ta of the child element)) 443 of the lattice element Ea and a lattice area B (lattice area of the lattice size Sb (lattice size Tb of the child element)) 444 of the lattice element Eb shown in FIG. 31(b) are taken as an example. For example, the lattice area having a larger lattice size is identified by comparing (first comparison) of lattice sizes of two (partially overlapping) lattice areas to be compared. Then, the lattice area of the smaller lattice size and the lattice size of the child area of the lattice area of the larger lattice size are compared (second comparison). If, as a result of the comparison (second comparison), the lattice area having the smaller lattice size in the initial comparison (first comparison) is smaller, the lattice area having the larger lattice size in the initial comparison is determined to reduce the level. On the other hand, if the lattice area having the smaller lattice size in the initial comparison (first comparison) is larger as the result of the comparison (second comparison), lattice sizes of child elements of the lattice areas compared initially are compared (third comparison). As a result of the comparison (third comparison), the lattice area having the child element with a larger lattice size is determined to reduce the level.

More specifically, if the lattice size Sa of the lattice area A (443) and the lattice size Sb of the lattice area B (444) are compared, the lattice size Sb is larger. Thus, the lattice size Sa of the lattice area A (443) and a lattice size Tb of the child element of the lattice area B (444) are compared. As a result of the comparison, the lattice size Sa of the lattice area A (443) is larger. Thus, a lattice size Ta of the child element of the lattice area A (443) and the lattice size Tb of the child element of the lattice area B (444) are compared. As a result of the comparison, the lattice size Tb of the child element of the lattice area B (444) is larger and the lattice area B (444) is determined to reduce the level. In this case, a level reduction of the lattice element Eb is output.

Subsequently, whether a level reduction of the lattice element Ea is output is determined (step S1118) and if a decrease in level of the lattice element Ea is output, recursive collision determination processing is performed for child elements of the lattice element Ea (loop L1119, step S1120). On the other hand, if a level reduction of the lattice element Eb is output (step S1118), recursive collision determination processing is performed for child elements of the lattice element Eb (loop L1121, step S1122). The above recursive collision determination processing is similar to the processing in step S1110 and the description thereof is omitted.

If the lattice element Ea is at the level 0 (step S1113), whether the lattice element Eb is at the level 0 is determined (step S1123). If the lattice element Eb is not at the level 0 (step S1123), Tb is set as "lattice size of the child element of the lattice element Eb" (step S1124) to proceed to loop L1121. On the other hand, if the lattice element Eb is at the level 0 (step S1123), the level-0 lattice element pair (Ea, Eb) is added to the collision level-0 lattice element pair list (step S1125) and the operation of the recursive collision detection processing is terminated.

Figure 32:
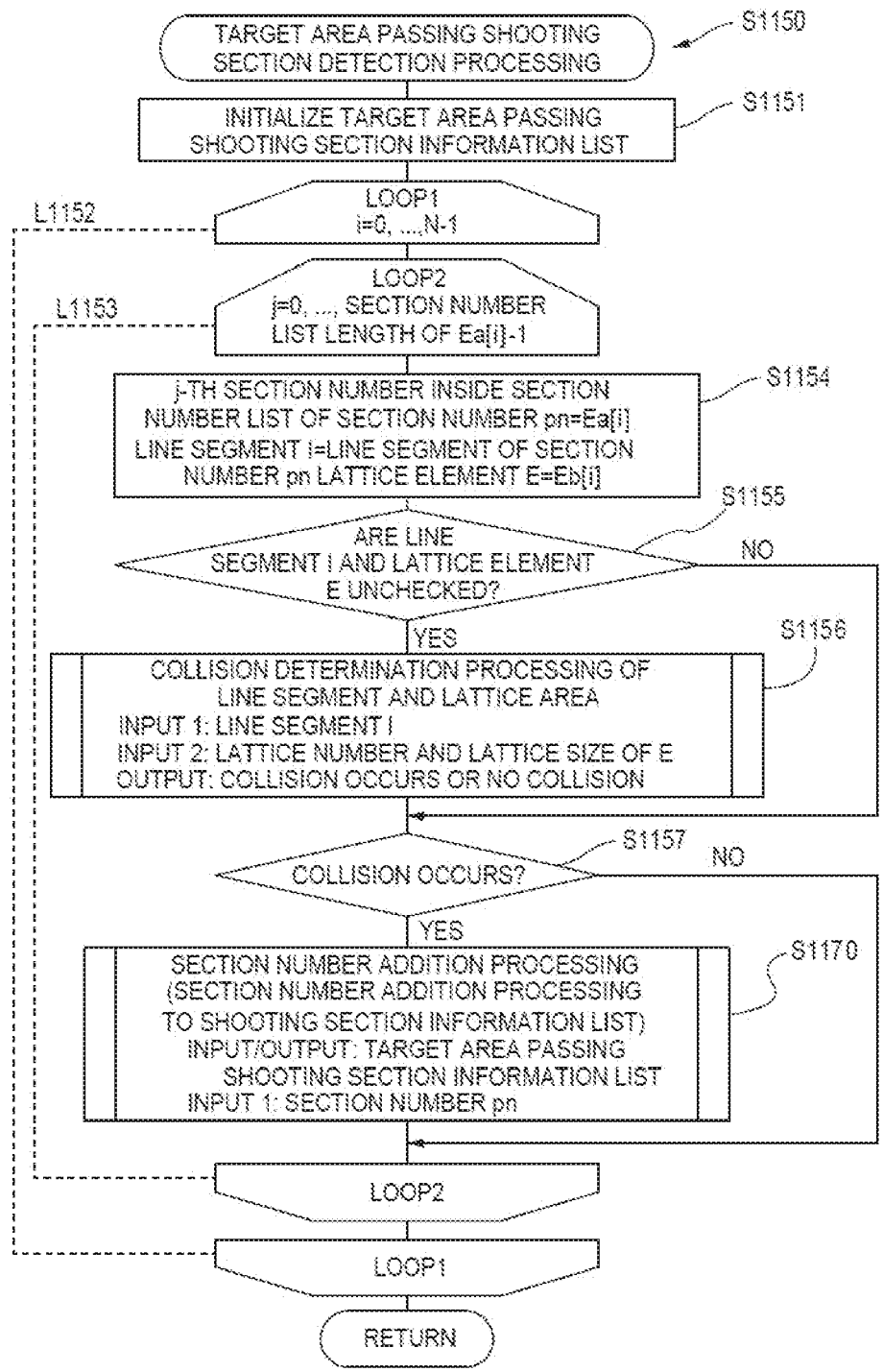
FIG. 32 is a flow chart exemplifying the shooting section detection processing of the processing procedure for shooting section detection processing by the image processing apparatus 100 according to the second embodiment of the present invention.

FIG. 32 is a flow chart exemplifying the shooting section detection processing (processing procedure in step S1150 shown in FIG. 27) of the processing procedure for shooting section detection processing by the image processing apparatus 100 according to the second embodiment of the present invention. The input data includes a collision level-0 lattice element pair list (for example, (Ea[0], Eb[0]), (Ea[1], Eb[1]), . . . , (Ea[N−1], Eb[N−1])). (Ea[i], Eb[i]) is a level-0 lattice element pair. N is the number of collision level-0 lattice element pairs. The output data includes a target area passing shooting section information list.

Figure 33:
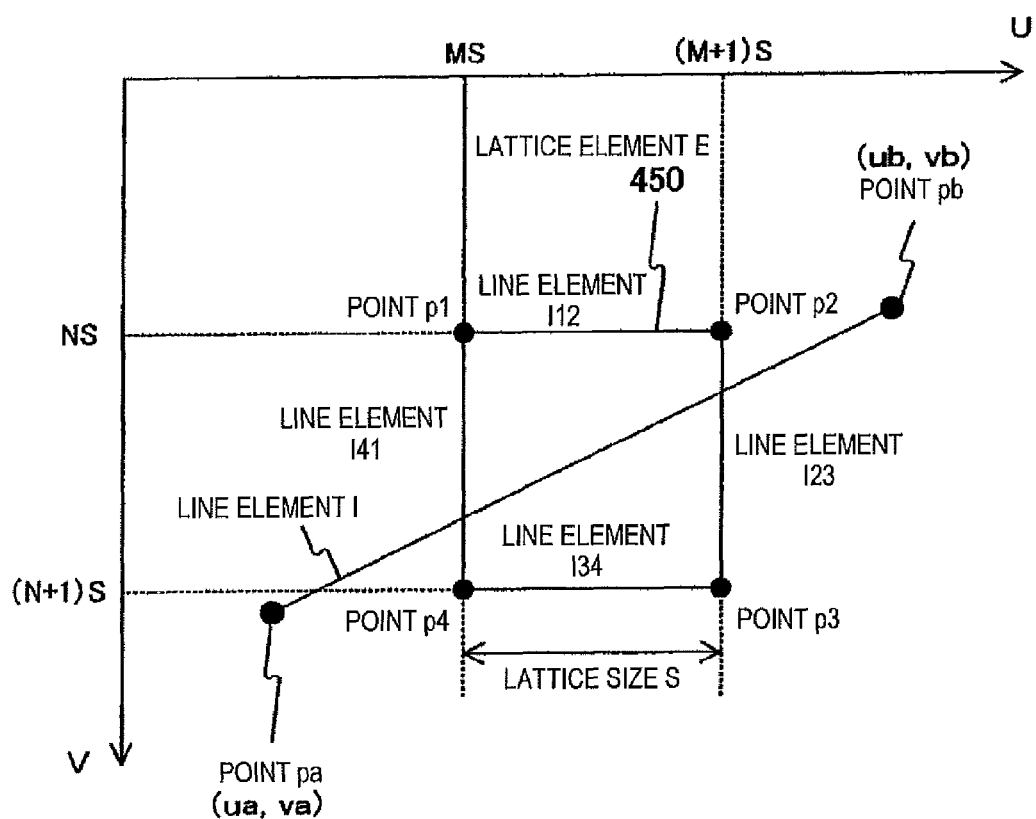
FIG. 33 is a diagram schematically showing the collision determination processing of a line segment and a lattice area by the image processing apparatus 100 according to the second embodiment of the present invention.

FIG. 33 is a diagram schematically showing the collision determination processing of a line segment and a lattice area by the image processing apparatus 100 according to the second embodiment of the present invention. Each piece of the above processing will be described in detail with reference to FIG. 32.

First, a target area passing shooting section information list is initialized (step S1151). Subsequently, the following processing is repeatedly performed for level-0 lattice number element pairs (loop L1152). Also, the following processing is repeatedly performed for line segments of the lattice element Ea[i] (loop L1153). That is, a section number pn is set as pn="j-th section number in the section number list of Ea[i]", a line segment 1 is set as 1="line segment of the section number pn", and a lattice element E is set as E=Eb[i] (step S1154).

Subsequently, whether the line segment 1 and the lattice element E are unchecked is determined (step S1155) and if the line segment 1 and the lattice element E are checked, the processing proceeds to step S1157. On the other hand, if the line segment 1 and the lattice element E are unchecked (step S1155), the collision determination processing of the line segment and the lattice area is performed (step S1156).

For example, the line segment 1 (line segment linking shooting points pa, pb) and a lattice area 450 (lattice area of the lattice number (M, N) and the lattice size S) of the lattice element E shown in FIG. 33 are taken as an example. For example, a collision determination is made based on whether the line segment 1 is contained in the lattice area of the lattice element E. In the example shown in FIG. 33, for example, the line segment 1 is contained in the lattice area 450 of the lattice element E and thus, it is determined that a collision occurs.

Subsequently, whether it is determined that a collision occurs is determined (step S1157) and if it is determined that no collision occurs, the processing returns to the start of loop L1153. On the other hand, if it is determined that a collision occurs (step S1157), section number addition processing to the shooting section information list is performed (step S1170). The section number addition processing will be described in detail with reference to FIG. 34.

Figure 34:
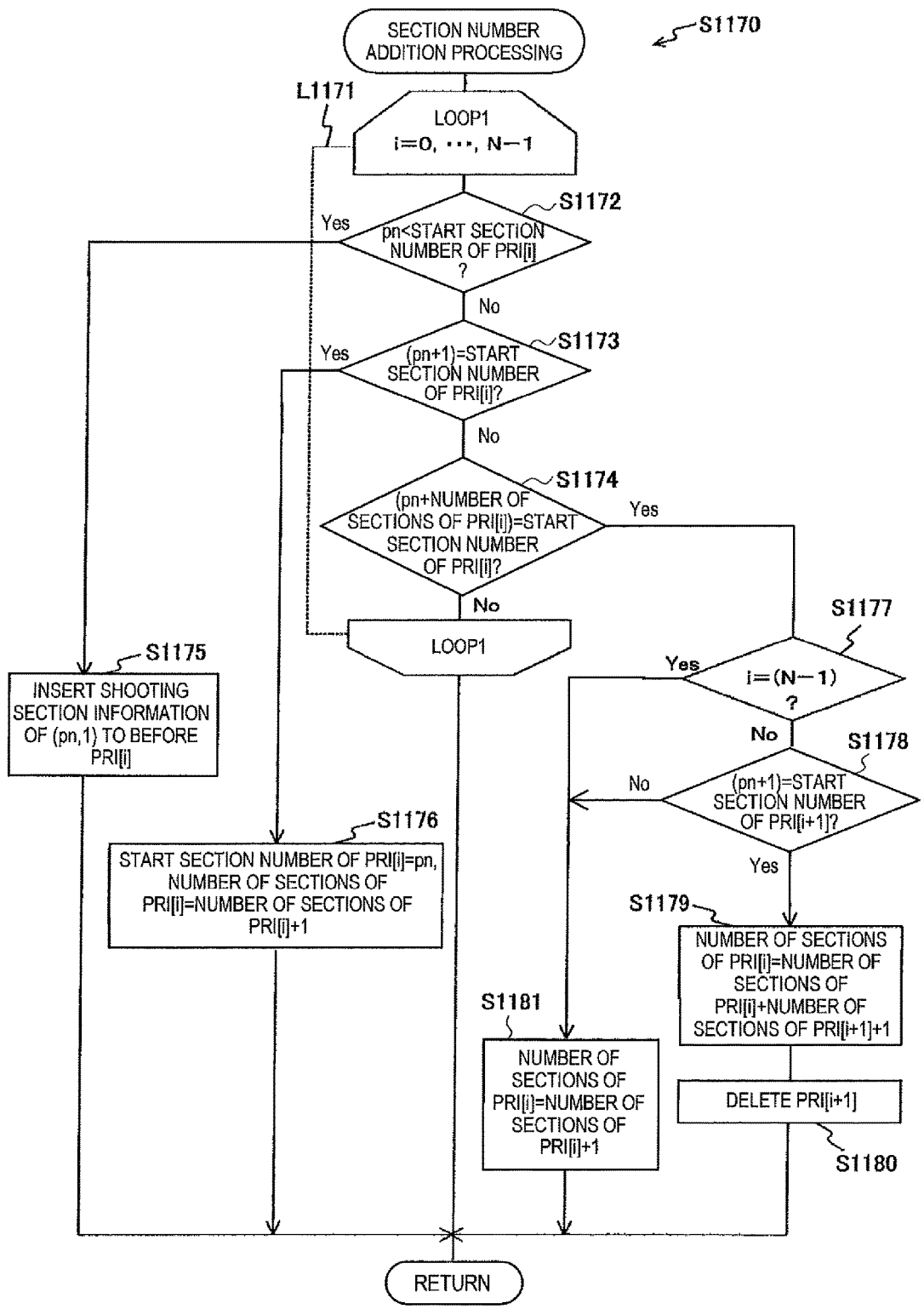
FIG. 34 is a flow chart exemplifying section number addition processing of the processing procedure for shooting section detection processing by the image processing apparatus 100 according to the second embodiment of the present invention.

FIG. 34 is a flow chart exemplifying the section number addition processing (processing procedure in step S1170 shown in FIG. 32) of the processing procedure for shooting section detection processing by the image processing apparatus 100 according to the second embodiment of the present invention. The input data includes a shooting section information list (PRI[0], . . . , PRI[N−1]) and the section number pn. The output data includes the shooting section information list. N is a value indicating the number of pieces of shooting section information and PRI is shooting section information (=(start section number, number of sections))

First, the following processing is repeatedly performed for the shooting section information list as input data (loop L1171). That is, the section number pn and the start section number of PRIM are compared to determine whether the section number pn<the start section number of PRI[i](step S1172). If the section number pn<the start section number of PRIM holds (step S1172), shooting section information of (pn, 1) is inserted to before PRI[i](step S1175) and the operation of the section number addition processing is terminated.

If the section number pn<the start section number of PRI[i] does not hold (step S1172), the section number (pn+1) and the start section number of PRI[i] are compared. Then, whether the section number (pn+1)=the start section number of PRI[i] holds is determined (step S1173). If the section number (pn+1)=the start section number of PRI[i] holds (step S1173), the start section number of PRI[i]=pn and the number of sections of PRI[i]="number of sections of PRI[i]+1" are set (step S1176).

If the section number (pn+1)=the start section number of PRI[i] does not hold (step S1173), "pn+number of sections of PRI[i]" and the start section number of PRI[i] are compared. Then, whether pn+number of sections of PRI[i]=the start section number of PRI[i] holds is determined (step S1174). If pn+number of sections of PRI[i]=the start section number of PRI[i] does not hold (step S1174), the processing returns to the start of loop L1171. On the other hand, if pn+number of sections of PRI[i]=the start section number of PRI[i] holds (step S1174), whether i=(N−1) holds is determined (step S1177).

If i=(N−1) holds (step S1177), the number of sections of PRIM="number of sections of PRI[i]+1" is set (step S1181) and the operation of the section number addition processing is terminated.

On the other hand, if i=(N−1) does not hold (step S1177), whether (pn+1)=the start section number of PRI[i+1] holds is determined (step S1178). If (pn+1)=the start section number of PRI[i+1] does not hold (step S1178), the processing proceeds to step S1181. On the other hand, if (pn+1)=the start section number of PRI[i+1] holds (step S1178), the number of sections of PRI[i]="number of sections of PRI[i]+number of sections of PRI[i+1]+1" is set (step S1179). Then, PRI[i+1] is deleted (step S1180).

[Generation Example of Shooting Area Data]

Next, an example of generating shooting area data of dynamic image content will be shown. The shooting area data is data to identify the shooting range (area corresponding to the shooting distance) during shooting. The shooting area data is also hierarchical lattice area data containing shooting areas in an assembled area of lattice area groups at the lowest level (level 0). Moreover, like the example shown in FIG. 15, a section number list (sorted in ascending order of number) of an intra-section shooting area group in contact with a lattice area is linked to the lattice element thereof at the level 0.

FIG. 35 is a diagram showing an input/output example of shooting area data creation processing by the image processing apparatus 100 according to the second embodiment of the present invention. The shooting area data can be created by determining a level-0 lattice area group in which shooting areas of each shooting section are contained and merging the level-0 lattice area groups as hierarchical lattice area data.

FIG. 35(a) shows a shooting trajectory (list of shooting points p) 451 as input data. FIG. 35(b) shows shooting area hierarchical lattice area data (lattice area group 452 at the level 0) as output data. Thick-line rectangles in the shooting area hierarchical lattice area data (lattice area group 452 at the level 0) are lattices areas corresponding to the shooting trajectory data.

Figure 36:
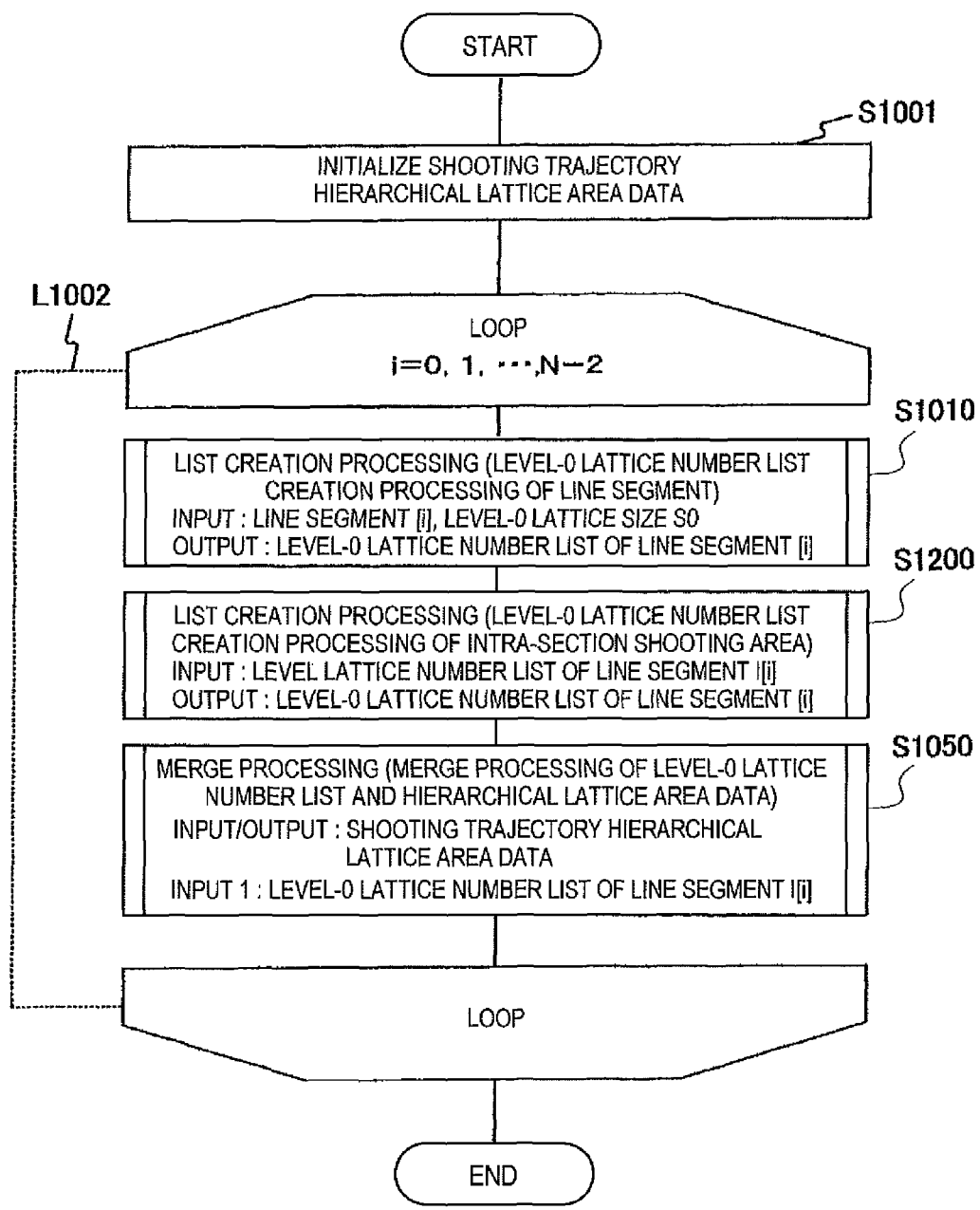
FIG. 36 is a flow chart exemplifying the processing procedure for shooting area data generation processing by the image processing apparatus 100 according to the second embodiment of the present invention.

FIG. 36 is a flow chart exemplifying the processing procedure for shooting area data generation processing by the image processing apparatus 100 according to the second embodiment of the present invention. The processing procedure is a modification of the processing procedure shown in FIG. 17 and the same reference numerals are attached common elements and the description thereof is omitted.

In loop L1002, after the level-0 lattice number list creation processing of shooting section line segments is performed (step S1010), lattice number list creation processing of a level-0 lattice area group in which shooting areas inside the shooting section are contained is performed (step S1200).

FIG. 37 is a diagram showing an input/output example of level-0 lattice number list creation processing containing shooting areas inside a shooting section by the image processing apparatus 100 according to the second embodiment of the present invention.

FIG. 37(a) schematically shows a level-0 lattice number list of a line segment as input data with a lattice area group 453 at the level 0. The list is sorted, for example, in ascending order of lattice number. For example, the level-0 lattice number list of a line segment can be represented as ((m[0], n[0]), (m[1], n[1]), . . . , (m[T], n[T])). FIG. 37(b) schematically shows a level-0 lattice number list of intra-section shooting areas as output data with a lattice area group 454 at the level 0.

By setting, for example, the upper limit of the distance from a shooting target area to a shooting point is set to the lattice size S0 at the level 0, shooting points S0 away or more from the shooting target area will not be detected as a shooting section. The user may be made to set the shooting distance set to the lattice size S0 at the level 0 or the setting may be acquired from camera information (attribute information such as the average value of the object distance) in the shooting section.

[Data Structure Examples of Intra-Section Shooting Information and Intra-Section Shooting Area Information]

Next, data structure examples of intra-section shooting information and intra-section area information to detect a shooting section of a target area and generation examples thereof will be described.

FIGS. 38 and 39 are diagrams exemplifying intra-section shooting information and intra-section area information generated by the image processing apparatus 100 according to the second embodiment of the present invention.

FIG. 38(a) shows an example of the intra-section shooting information. As information about shooting areas in a section of dynamic image content, intra-section shooting information recorded during shooting is defined. As shooting point information of the start point of a section, the shooting point pa, the shooting direction (471) θa, and the shooting angle of view φa are defined. A shooting range 472 in this case is indicated by oblique lines. Also, as shooting point information of the end point of the section, the shooting point pb, the shooting direction (473) θb, and the shooting angle of view φb are defined. A shooting range 474 in this case is indicated by oblique lines.

FIG. 38(b) shows an example of information (intra-section shooting area information) representing the shooting area in the section determined based on the intra-section shooting information. Here, the intra-section shooting area information is defined. Section endpoints are set as p1 and p2 and boundary line directions are set as l1 and l2. As intra-section shooting types, four types (types A to D) shown in FIG. 39 are exemplified.

Intra-section shooting directions θ1, θ2 correspond to shooting directions θa, θb and the intra-section shooting angle of view φmax is an angle identified by the shooting directions φa, φb. That is, the intra-section shooting angle of view φmax is set as φmax=max(φa, φb). A shooting range 480 in this case is indicated by oblique lines.

FIG. 39 shows four types (types A o D) of intra-section shooting types. Shooting areas of types A to D are shown in gray.

Figure 40:
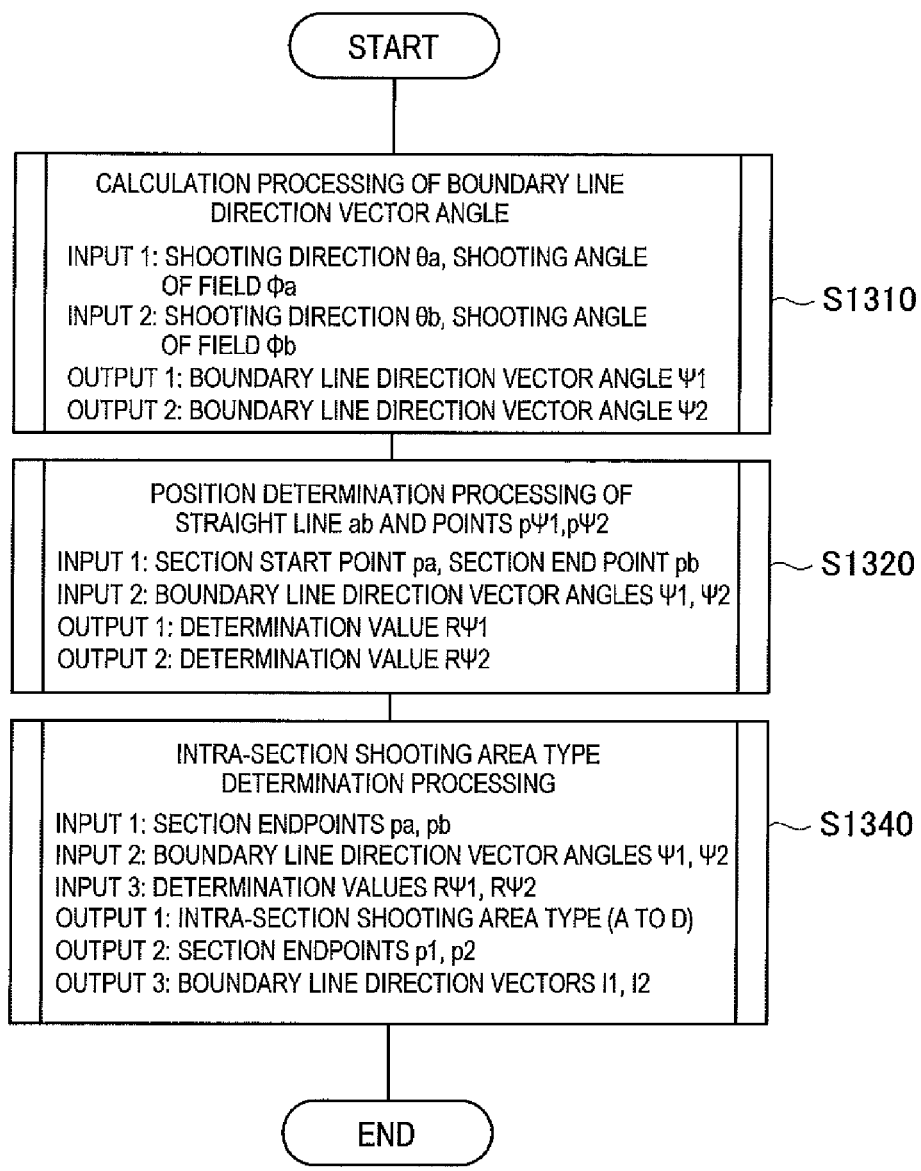
FIG. 40 is a flow chart exemplifying the processing procedure for intra-section shooting area information conversion processing by the image processing apparatus 100 according to the second embodiment of the present invention.

FIG. 40 is a flow chart exemplifying the processing procedure for intra-section shooting area information conversion processing by the image processing apparatus 100 according to the second embodiment of the present invention. In the processing procedure, the processing to convert intra-section shooting information (shown in FIG. 38(a)) into intra-section shooting area information (shown in FIG. 38(b)). The input data includes intra-section shooting information (shooting point information (the shooting point pa, the shooting direction θa, the shooting angle of view φa) of the section start point, shooting point information (the shooting point pb, the shooting direction θb, the shooting angle of view φb) of the section end point). The output data includes intra-section shooting area information (the intra-section shooting area type (A to D), the section endpoint p1, the section endpoint p2, boundary line direction vectors l1, l2).

First, calculation processing of boundary line direction vector angles is performed (step S1310). The calculation processing of a boundary line direction vector angle will be described in detail with reference to FIG. 42.

Subsequently, position determination processing of a straight line and a point is performed (step S1320). The position determination processing will be described in detail with reference to FIG. 44.

Subsequently, intra-section shooting area type determination processing is performed (step S1340). The intra-section shooting area type determination processing will be described in detail with reference to FIG. 47.

FIG. 41 is a diagram schematically showing the flow of calculation processing of a boundary line direction vector angle by the image processing apparatus 100 according to the second embodiment of the present invention.

FIGS. 41(a) and 41(b) schematically show (shooting direction θa, shooting angle of view φa) and (shooting direction θb, shooting angle of view φb). Each piece of the above data is input as input data for the calculation processing. FIG. 41(c) schematically shows boundary line direction vector angles Ψ1, Ψ2 calculated from the input data shown in FIGS. 41(a) and 41(b).

Figure 42:
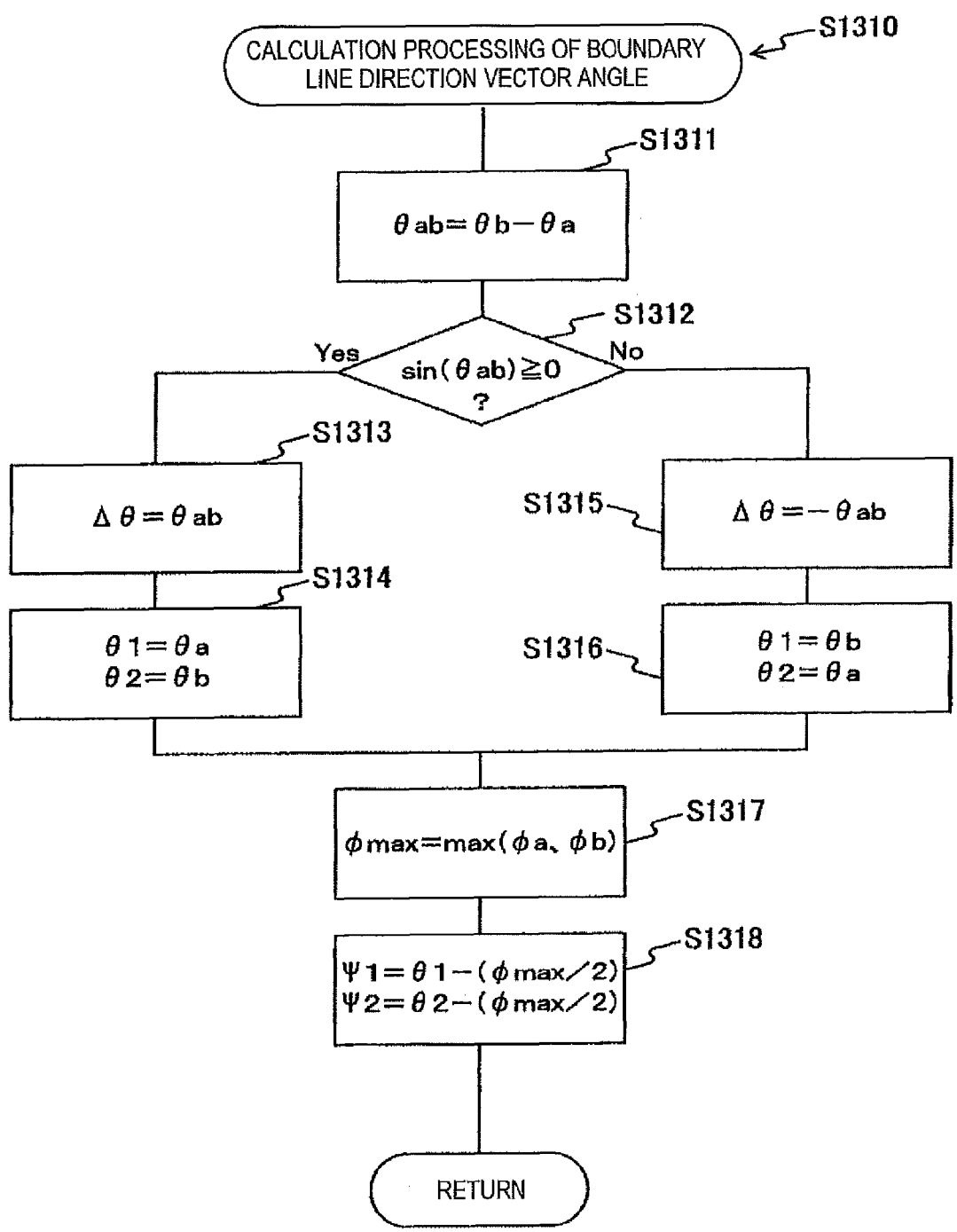
FIG. 42 is a flow chart exemplifying the calculation processing of the processing procedure for intra-section shooting area information conversion processing by the image processing apparatus 100 according to the second embodiment of the present invention.

FIG. 42 is a flow chart exemplifying the calculation processing (processing procedure in step S1310 shown in FIG. 40) of the processing procedure for intra-section shooting area information conversion processing by the image processing apparatus 100 according to the second embodiment of the present invention.

First, θab(=θb−θa) is calculated (step S1311). Subsequently, whether sin(θab)≥0 holds is determined (step S1312).

For example, if, as shown in FIG. 41(a), sin(θab)≥0 holds (step S1312), Δθ=θab is set (step S1313) and θ1=θa and θ2=θb are set (step S1314) before proceeding to step S1317.

On the other hand, if, as shown in FIG. 41(b), sin(θab)≥0 does not hand (step S1312), Δθ=−θab is set (step S1315) and θ1=θb and θ2=θa are set (step S1316) before proceeding to step S1317.

Subsequently, φmax=max(φa, φb) is set (step S1317) and ψ1=θ1−(φmax/2) and ψ2=θ2+(φmax/2) are set (step S1318) before the operation of the calculation processing of the boundary line direction vector angle is terminated.

Figure 43:
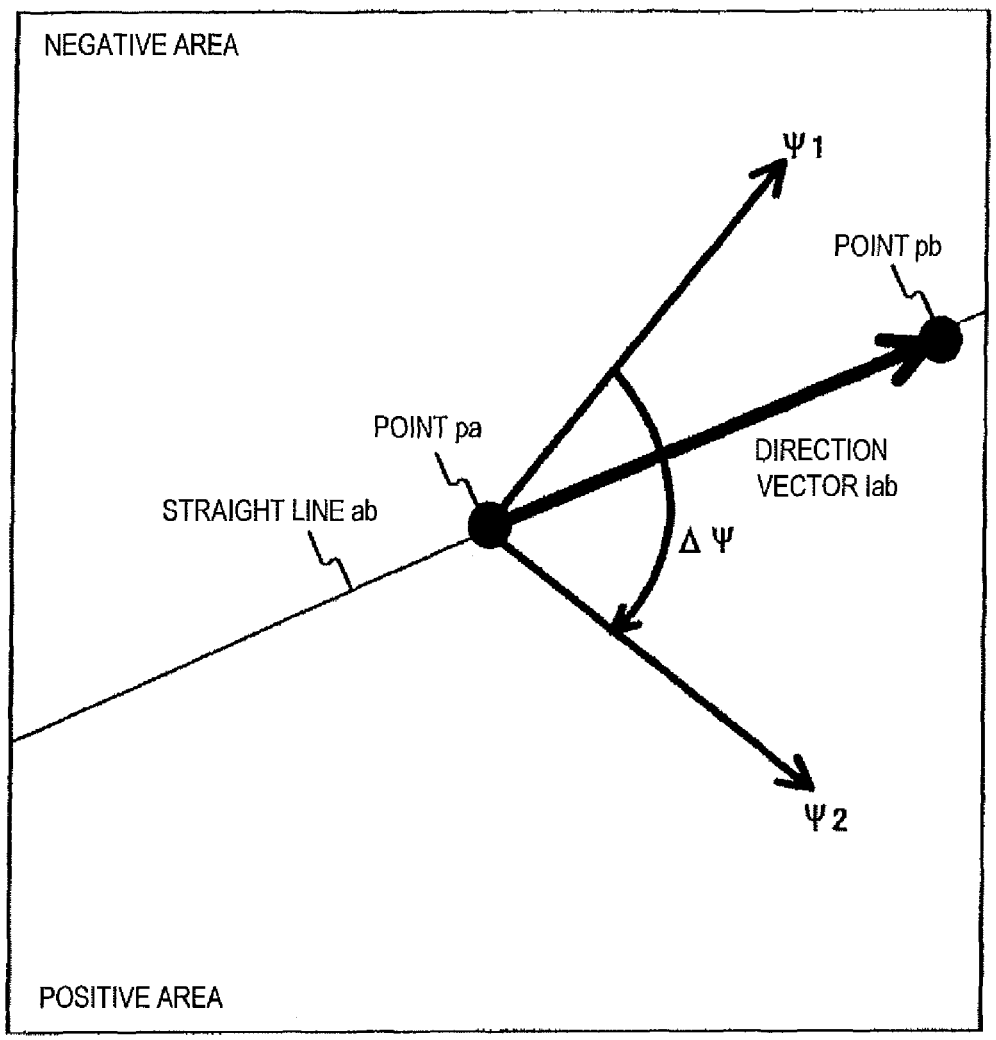
FIG. 43 is a diagram schematically showing the position determination processing of a straight line and a point by the image processing apparatus 100 according to the second embodiment of the present invention.

FIG. 43 is a diagram schematically showing the position determination processing of a straight line and a point by the image processing apparatus 100 according to the second embodiment of the present invention. FIG. 43 shows the start point pa and the end point pb of a section and the boundary line direction vector angles Ψ1, Ψ2. Each piece of the above data is input as input data for the position determination processing. In the position determination processing, determination values RΨ1, RΨ2 are output as output data.

Figure 44:
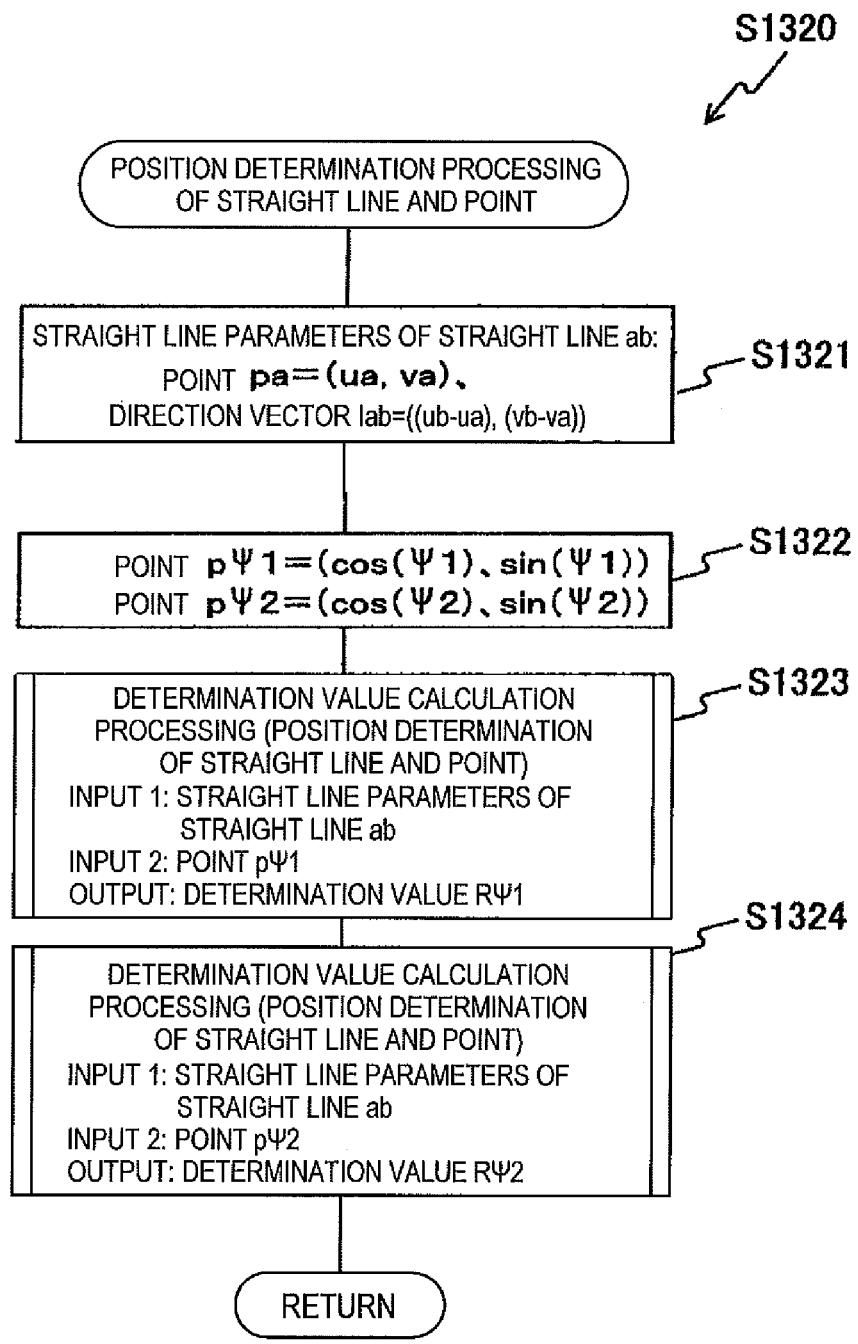
FIG. 44 is a flow chart exemplifying the position determination processing of the processing procedure for intra-section shooting area information conversion processing by the image processing apparatus 100 according to the second embodiment of the present invention.

FIG. 44 is a flow chart exemplifying the position determination processing (processing procedure in step S1320 shown in FIG. 40) of the processing procedure for intra-section shooting area information conversion processing by the image processing apparatus 100 according to the second embodiment of the present invention.

First, straight line parameters of a straight line ab are calculated (step S1321). That is, the point pa is set as pa=(ua, va) and a direction vector lab=((ub−ua), (vb−va)) is calculated.

Subsequently, a point pψ1=(cos(ψ1), sin(ψ1)) and a point pψ2=(cos(ψ2), sin(ψ2)) are calculated (step S1322).

Subsequently, determination value calculation processing to determine the positions of the straight line and point is performed (steps S1323, S1324) and the determination values RΨ1, RΨ2 are output. The determination value calculation processing will be described in detail with reference to FIG. 45.

FIG. 45 is a diagram schematically showing determination value calculation processing by the image processing apparatus 100 according to the second embodiment of the present invention. FIG. 45(a) shows a physical relationship between the straight line and the point p when straight line parameters are set as a point q=(uq, vq) and a direction vector 1=(u1, v1).

FIG. 45(b) shows an example (flow chart) of the determination value calculation processing. That is, the determination value can be determined by (up−uq)u1+(vp−vq)v1 (step S1330). The determination values RΨ1, RΨ2 in steps S1323, S1324 can also be calculated in the same manner.

FIG. 46 is a diagram schematically showing intra-section shooting area type determination processing by the image processing apparatus 100 according to the second embodiment of the present invention. FIGS. 46(a) and 46(b) show two examples of intended for intra-section shooting area type determination processing.

In FIGS. 46(a) and 46(b), the start point pa and the end point pb of a section, the boundary line direction vector angles Ψ1, Ψ2, and the determination values RΨ1, RΨ2 are shown. Each piece of the above data is input as input data. The intra-section shooting area type (type A to D), the section endpoints p1, p2, and the boundary line direction vectors l1, l2 are output as output data.

Figure 47:
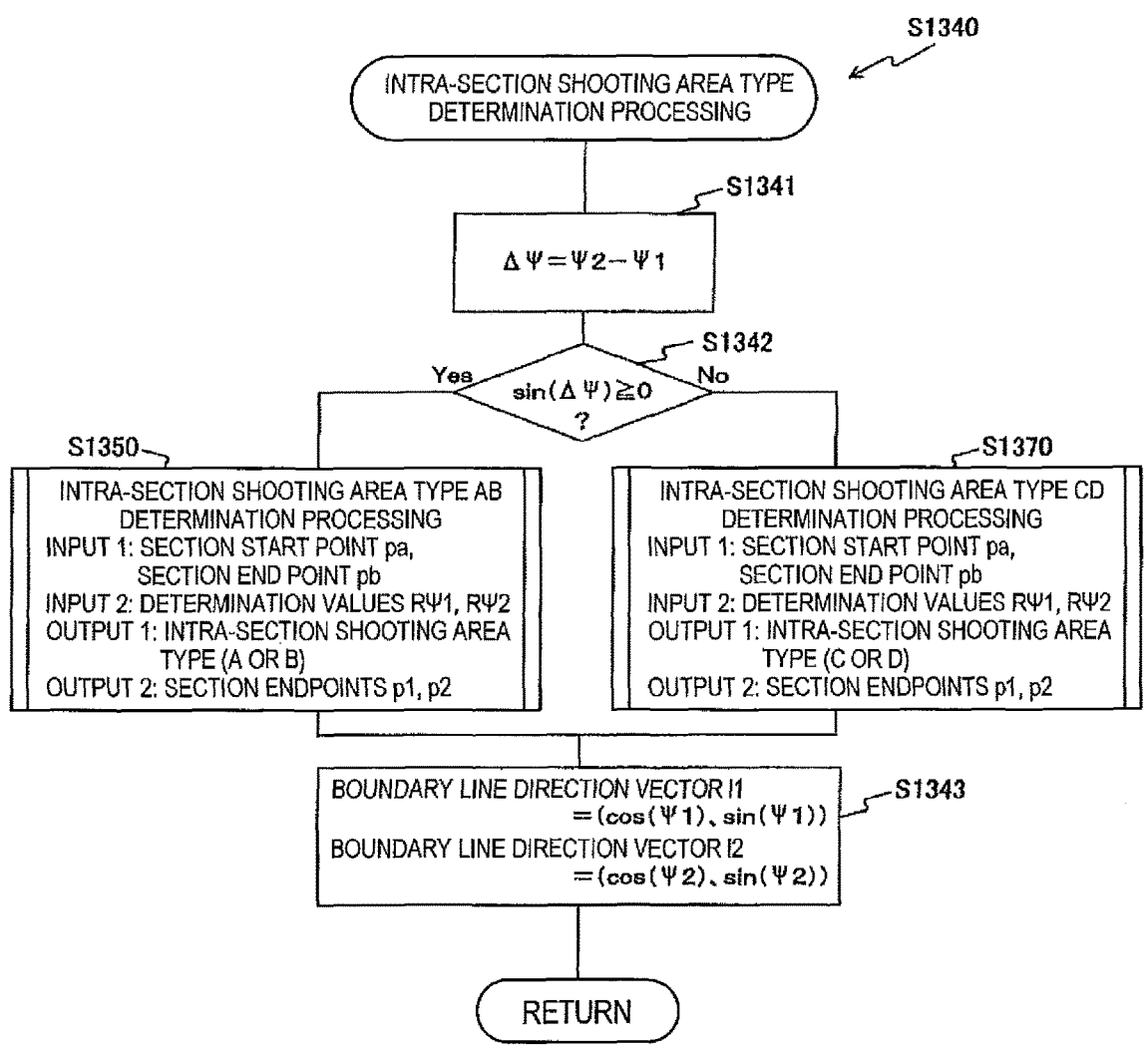
FIG. 47 is a flow chart exemplifying the intra-section shooting area type determination processing of the processing procedure for intra-section shooting area information conversion processing by the image processing apparatus 100 according to the second embodiment of the present invention.

FIG. 47 is a flow chart exemplifying the intra-section shooting area type determination processing (processing procedure in step S1340 shown in FIG. 40) of the processing procedure for intra-section shooting area information conversion processing by the image processing apparatus 100 according to the second embodiment of the present invention.

First, $\Delta\psi(=\psi2-\psi1)$ is calculated (step S1341). Subsequently, whether Subsequently, whether $\sin(\Delta\psi)\geq 0$ holds is determined (step S1342). If $\sin(\Delta\psi)\geq 0$ holds (step S1342), intra-section shooting area type AB determination processing is performed (step S1350). The intra-section shooting area type AB determination processing will be described in detail with reference to FIG. 49. On the other hand, if $\sin(\Delta\psi)\geq 0$ does not hold (step S1342), intra-section shooting area type CD determination processing is performed (step S1370). The intra-section shooting area type CD determination processing will be described in detail with reference to FIG. 51.

Subsequently, the boundary line direction vectors l1, l2 are calculated (step S1343). That is, the boundary line direction vector $l1=(\cos(\psi1), \sin(\psi1))$ and the boundary line direction vector $l2=(\cos(\psi2), \sin(\psi2))$ are calculated.

FIG. 48 is a diagram schematically showing intra-section shooting area type AB determination processing by the image processing apparatus 100 according to the second embodiment of the present invention. FIGS. 48(a) and 48(c) show an example when the shooting area type is determined to be the intra-section shooting area type A and FIGS. 48(b) and 48(d) show an example when the shooting area type is determined to be the intra-section shooting area type B.

Also in FIGS. 48(a) to 48(d), the start point pa and the end point pb of a section and the determination values RΨ1, RΨ2 are shown. Each piece of the above data is input as input data. The intra-section shooting area type (type A or B) and the section endpoints p1, p2 are output as output data.

Figure 49:
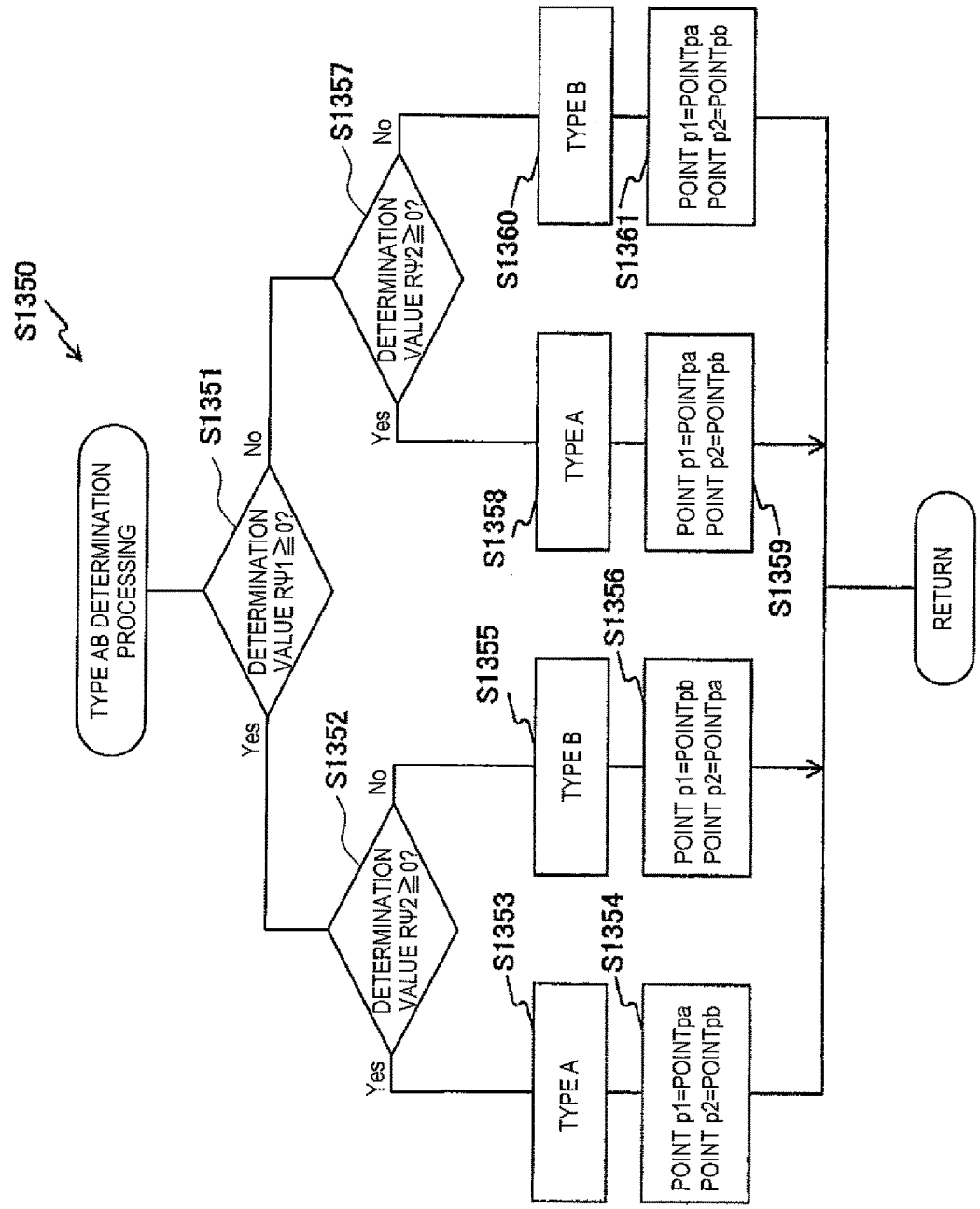
FIG. 49 is a flow chart exemplifying the intra-section shooting area type AB determination processing of the processing procedure for intra-section shooting area information conversion processing by the image processing apparatus 100 according to the second embodiment of the present invention.

FIG. 49 is a flow chart exemplifying the intra-section shooting area type AB determination processing (processing procedure in step S1350 shown in FIG. 47) of the processing procedure for intra-section shooting area information conversion processing by the image processing apparatus 100 according to the second embodiment of the present invention.

First, whether the determination value Rψ1≥0 holds is determined (step S1351). If the determination value Rψ1≥0 holds (step S1351), whether the determination value Rψ2≥0 holds is determined (step S1352). If the determination value Rψ2≥0 holds (step S1352), the shooting area type is determined to be the intra-section shooting area type A (step S1353). This case corresponds to the case shown in FIG. 48(a). Subsequently, the section endpoint p1=pa and the section endpoint p2=pb are set (step S1354) before the operation of the intra-section shooting area type AB determination processing is terminated.

If the determination value Rψ2≥0 does not hold (step S1352), the shooting area type is determined to be the intra-section shooting area type B (step S1355). This case corresponds to the case shown in FIG. 48(b). Subsequently, the section endpoint p1=pb and the section endpoint p2=pa are set (step S1356) before the operation of the intra-section shooting area type AB determination processing is terminated.

If the determination value Rψ1≥0 does not hold (step S1351), whether the determination value Rψ2≥0 holds is determined (step S1357). If the determination value Rψ2≥0 holds (step S1357), the shooting area type is determined to be the intra-section shooting area type A (step S1358). This case corresponds to the case shown in FIG. 48(c). Subsequently, the section endpoint p1=pa and the section endpoint p2=pb are set (step S1359) before the operation of the intra-section shooting area type AB determination processing is terminated.

If the determination value Rψ2≥0 does not hold (step S1357), the shooting area type is determined to be the intra-section shooting area type B (step S1360). This case corresponds to the case shown in FIG. 48(d). Subsequently, the section endpoint p1=pa and the section endpoint p2=pb are set (step S1361) before the operation of the intra-section shooting area type AB determination processing is terminated.

FIG. 50 is a diagram schematically showing intra-section shooting area type CD determination processing by the image processing apparatus 100 according to the second embodiment of the present invention. FIGS. 50(a) and 50(d) show an example when the shooting area type is determined to be the intra-section shooting area type D and FIGS. 50(b) and 50(c) show an example when the shooting area type is determined to be the intra-section shooting area type C.

Also in FIGS. 50(a) to 50(d), the start point pa and the end point pb of a section and the determination values Rψ1, Rψ2 are shown. Each piece of the above data is input as input data. Also, the intra-section shooting area type (type C or D) and the section endpoints p1, p2 are output as output data.

Figure 51:
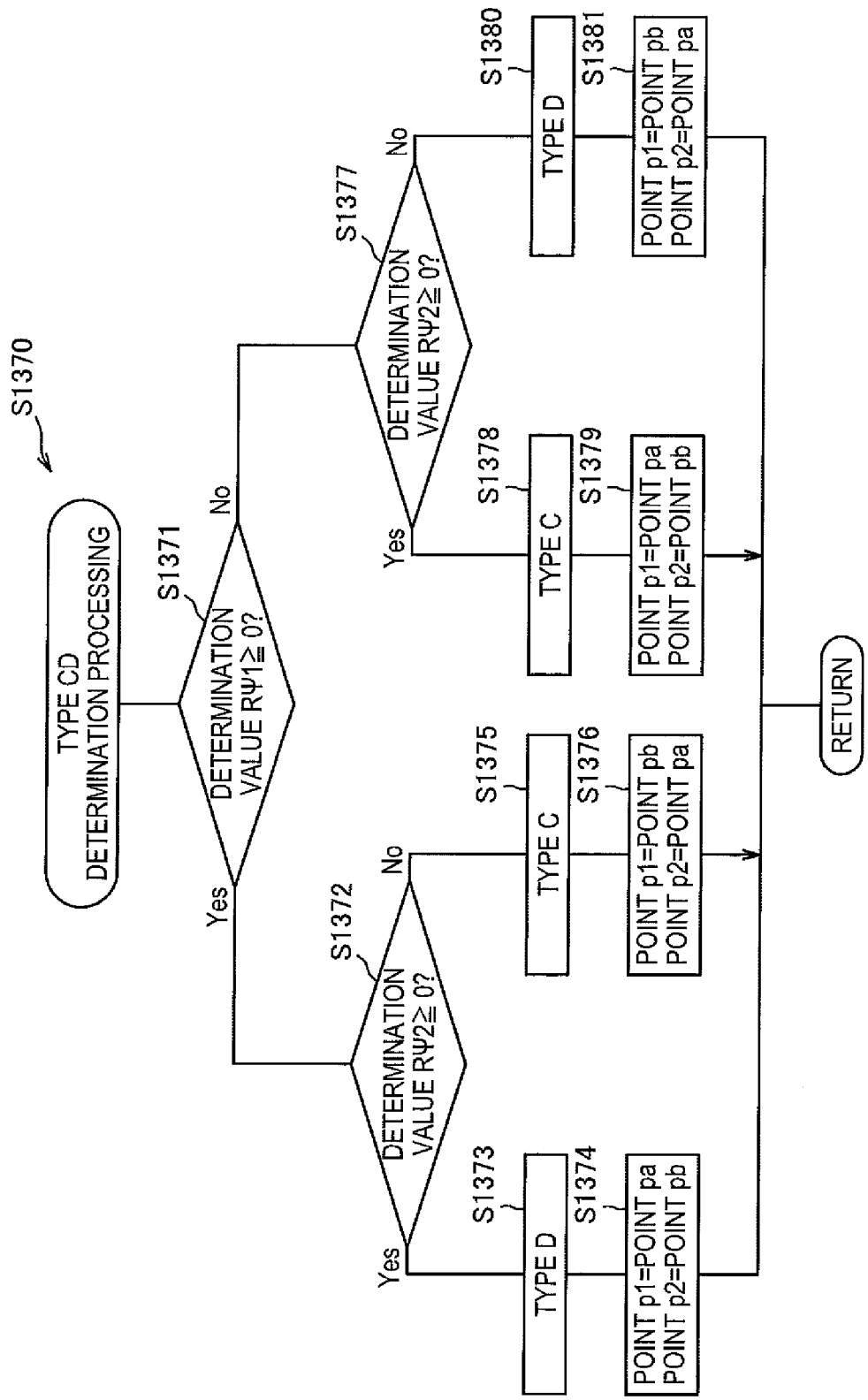
FIG. 51 is a flow chart exemplifying the intra-section shooting area type CD determination processing of the processing procedure for intra-section shooting area information conversion processing by the image processing apparatus 100 according to the second embodiment of the present invention.

FIG. 51 is a flow chart exemplifying the intra-section shooting area type CD determination processing (processing procedure in step S1370 shown in FIG. 47) of the processing procedure for intra-section shooting area information conversion processing by the image processing apparatus 100 according to the second embodiment of the present invention.

First, whether the determination value Rψ1≥0 holds is determined (step S1371). If the determination value Rψ1≥0 holds (step S1371), whether the determination value Rψ2≥0 holds is determined (step S1372). If the determination value Rψ2≥0 holds (step S1372), the shooting area type is determined to be the intra-section shooting area type D (step S1373). This case corresponds to the case shown in FIG. 50(a). Subsequently, the section endpoint p1=pa and the section endpoint p2=pb are set (step S1374) before the operation of the intra-section shooting area type CD determination processing is terminated.

If the determination value Rψ2≥0 does not hold (step S1372), the shooting area type is determined to be the intra-section shooting area type C (step S1375). This case corresponds to the case shown in FIG. 50(b). Subsequently, the section endpoint p1=pb and the section endpoint p2=pa are set (step S1376) before the operation of the intra-section shooting area type CD determination processing is terminated.

If the determination value Rψ1≥0 does not hold (step S1371), whether the determination value Rψ2≥0 holds is determined (step S1377). If the determination value Rψ2≥0 holds (step S1377), the shooting area type is determined to be the intra-section shooting area type C (step S1378). This case corresponds to the case shown in FIG. 50(c). Subsequently, the section endpoint p1=pa and the section endpoint p2=pb are set (step S1379) before the operation of the intra-section shooting area type CD determination processing is terminated.

If the determination value Rψ2≥0 does not hold (step S1377), the shooting area type is determined to be the intra-section shooting area type D (step S1380). This case corresponds to the case shown in FIG. 50(d). Subsequently, the section endpoint p1=pb and the section endpoint p2=pa are set (step S1381) before the operation of the intra-section shooting area type CD determination processing is terminated.

[Shooting Section Detection Example of the Target Area]

Next, an example in which a shooting section in which a specific shooting target area is shot is extracted based on target area data and shooting area data will be described.

Figure 52:
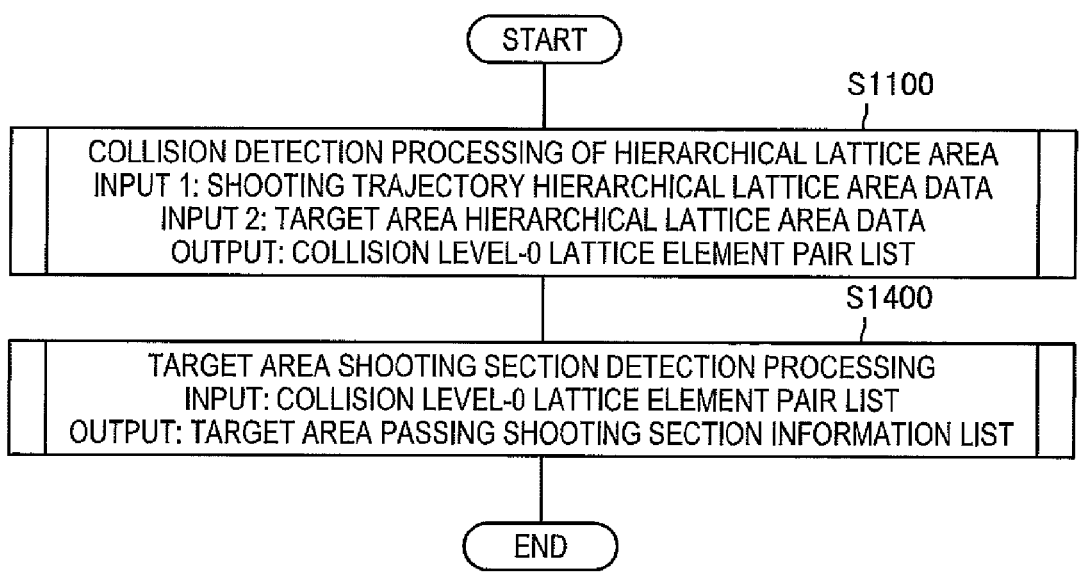
FIG. 52 is a flow chart exemplifying the processing procedure for target area shooting section detection processing by the image processing apparatus 100 according to the second embodiment of the present invention.

FIG. 52 is a flow chart exemplifying the processing procedure for target area shooting section detection processing by the image processing apparatus 100 according to the second embodiment of the present invention. In the processing procedure, the processing to detect a shooting section containing a target area as a shooting area based on shooting area hierarchical lattice area data and target area hierarchical lattice area data will be described. The input data includes shooting area hierarchical lattice area data and target area hierarchical lattice area data. The output data includes a shooting area shooting section information list.

First, collision detection processing of a shooting trajectory and a hierarchical lattice area of a target area is performed (step S1100). In the collision detection processing, a collision is detected hierarchically from a large area to a small area. Accordingly, compared with a case when a large number of collision determinations between small areas are made from the start, the number of times of collision determination processing can be decreased as a whole so that processing related to play list generation reduced. The collision detection processing is the same as in step S1100 shown in FIG. 27 and thus, the same reference numerals are attached the description thereof is omitted.

Subsequently, target area shooting section detection processing is performed (step S1400). The target area shooting section detection processing will be described in detail with reference to FIG. 53.

Figure 53:
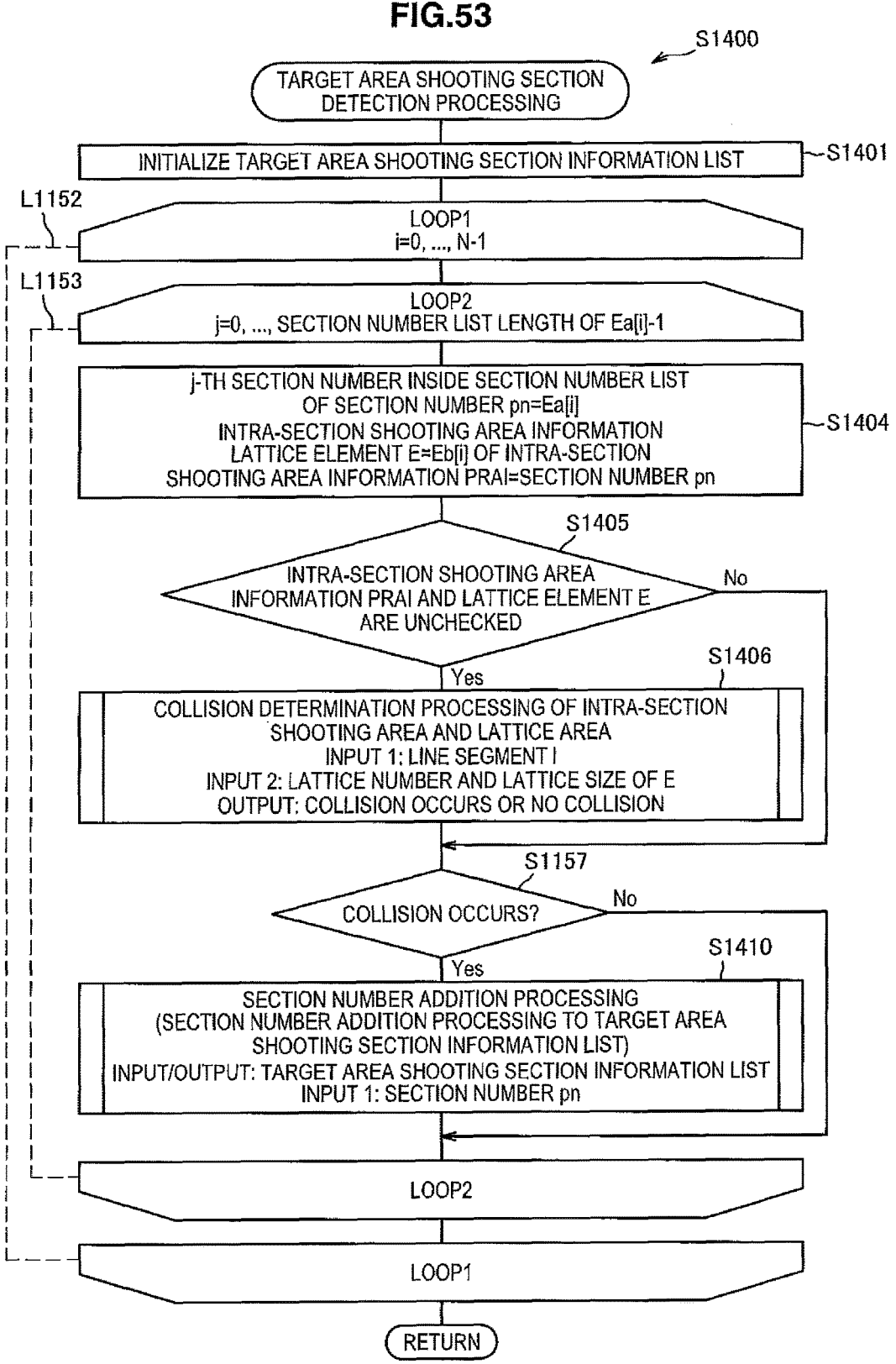
FIG. 53 is a flow chart exemplifying detection processing of the processing procedure for target area shooting section detection processing by the image processing apparatus 100 according to the second embodiment of the present invention.

FIG. 53 is a flow chart exemplifying detection processing (processing procedure in step S1400 shown in FIG. 52) of the processing procedure for target area shooting section detection processing by the image processing apparatus 100 according to the second embodiment of the present invention. The processing procedure is a modification of the processing procedure shown in FIG. 32. Thus, the same reference numerals are attached common elements and the description thereof is omitted.

Like the processing procedure shown in FIG. 32, the input data includes a collision level-0 lattice element pair list (for example, ((Ea[0], Eb[0]), (Ea[1], Eb[1]), . . . , (Ea[N−1], Eb[N−1]))). (Ea[i], Eb[i]) is a level-0 lattice element pair. N is the number of collision level-0 lattice element pairs. The output data includes a target area shooting section information list.

FIGS. 54 to 56 are diagrams schematically showing the collision determination processing of an intra-section shooting area and a lattice area and the collision determination processing of an intra-section shooting area and a point by the image processing apparatus 100 according to the second embodiment of the present invention. Each piece of the above processing will be described in detail with reference to FIG. 53.

First, a target area shooting section information list is initialized (step S1401). Subsequently, the following processing is repeatedly performed for level-0 lattice number element pairs (loop L1152). Also, the following processing is repeatedly performed for line segments of the lattice element Ea[i] (loop L1153). That is, the section number pn is set as pn="j-th section number in the section number list of Ea[i]", intra-section shooting area information PRAI is set as PRAI="intra-section shooting area information of the section number pn", and the lattice element E is set as E=Eb[i] (step S1404).

Subsequently, whether the intra-section shooting area information PRAI and the lattice element E are unchecked is determined (step S1405) and if the intra-section shooting area information PRAI and the lattice element E are checked, the processing proceeds to step S1157. On the other hand, if the intra-section shooting area information PRAI and the lattice element E are unchecked (step S1405), the collision determination processing of an intra-section shooting area and a lattice area is performed (step S1406).

For example, an shooting area 500 shown in FIG. 54(a) and a lattice area 510 (lattice area of the lattice number (M, N) and the lattice size S of the lattice element E are taken as an example. The input data in this case includes the intra-section shooting area information PRAI, the section endpoints p1, p2, the direction vectors l1, l2, and the lattice number (M, N) and the lattice size S of the lattice element E. The output data includes "collision occurs" and "no collision". For example, a collision determination is made based on whether at least a portion of the lattice area of the lattice element E is contained in the shooting area. In the example shown in FIG. 54(a), for example, a portion of the lattice area 510 of the lattice element E is contained in the shooting area 500 and thus, it is determined that a collision occurs.

FIGS. 54(b) to 56 show The input data in this case includes the intra-section shooting area information PRAI, the section endpoints p1, p2, the direction vectors l1, l2, and the point p. The output data includes "collision occurs" and "no collision". FIG. 55(a) shows the type A collision determination processing of an intra-section shooting area and a point and FIG. 55(b) shows the type B collision determination processing of an intra-section shooting area and a point. Also, FIG. 56(a) shows the type C collision determination processing of an intra-section shooting area and a point and FIG. 56(b) shows the type D collision determination processing of an intra-section shooting area and a point.

Subsequently, whether it is determined that a collision occurs is determined (step S1157) and if it is determined that no collision occurs, the processing returns to the start of loop L1153. On the other hand, if it is determined that a collision occurs (step S1157), section number addition processing to the target area shooting section information list is performed (step S1410). The section number addition processing is substantially the same as the processing procedure shown in FIG. 34 and thus, the description thereof is omitted.

[Specified Operation Example by the User]

Next, the specifying method of specifying a specific shooting section by specifying a point on a shooting trajectory displayed on a map for one or a plurality of pieces of dynamic image content through a manual operation will be described.

FIG. 57 is a diagram schematically showing the flow of user-specified point detection processing by the image processing apparatus 100 according to the second embodiment of the present invention.

FIG. 57(a) schematically shows hierarchical lattice area data (data specified by a lattice area group 520) of a shooting trajectory and a user-specified point p. In the user-specified point detection processing, each piece of the above data is input as input data. Incidentally, FIG. 57(a) shows shooting point numbers 0 to 3 corresponding to the hierarchical lattice area data of the shooting trajectory.

FIG. 57(b) schematically shows a shooting point number 521 detected in a state shown in FIG. 57(a). Thus, in the user-specified point detection processing, shooting point numbers (level 0) are detected based on hierarchical lattice area data of a shooting trajectory and a user-specified point.

Figure 58:
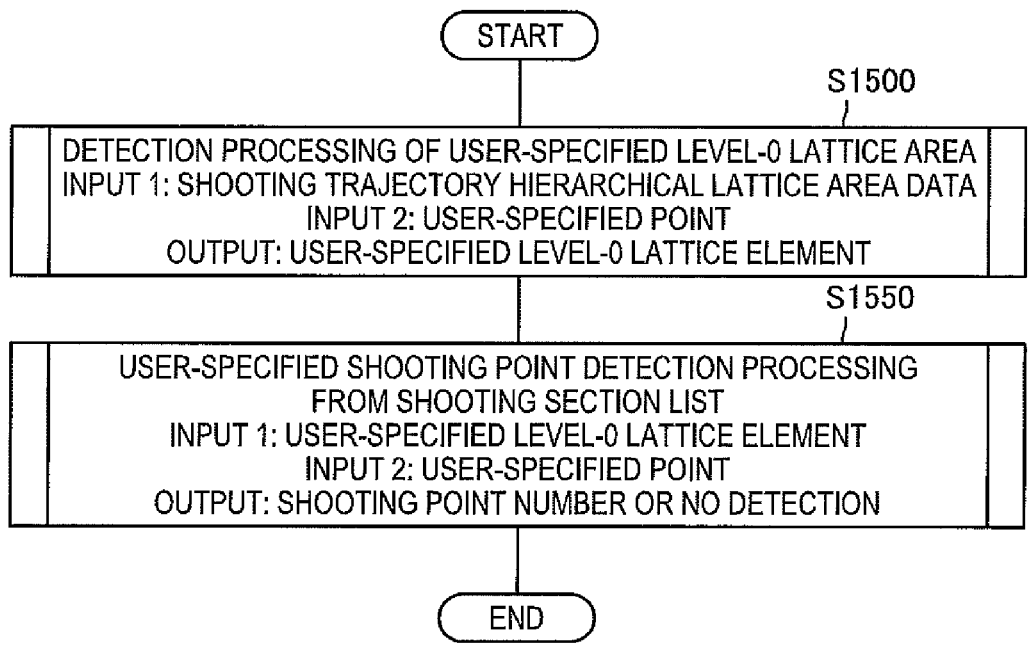
FIG. 58 is a flow chart exemplifying the processing procedure for user-specified point detection processing by the image processing apparatus 100 according to the second embodiment of the present invention.

FIG. 58 is a flow chart exemplifying the processing procedure for user-specified point detection processing by the image processing apparatus 100 according to the second embodiment of the present invention. The processing procedure is processing to detect a shooting point closest to a specified point based on shooting trajectory hierarchical lattice area data and the specified point specified by the user on a display screen.

First, detection processing of a user-specified level-0 lattice area is performed (step S1500). The detection processing is processing to detect the level-0 lattice area in which the user-specified point is contained. The detection processing will be described in detail with reference to FIG. 60.

Subsequently, user-specified shooting point detection processing from a shooting section list is performed (step S1550). The detection processing is processing to detect a shooting point closest to the user-specified point from a shooting point group of both ends of shooting sections passing the lattice area detected in step S1500. The detection processing will be described in detail with reference to FIG. 64.

FIG. 59 is a diagram schematically showing the flow of detection processing of a user-specified level-0 lattice area by the image processing apparatus 100 according to the second embodiment of the present invention.

FIG. 59(a) schematically shows hierarchical lattice area data (data specified by a lattice area group 520) of a shooting trajectory and a user-specified point p. In the detection processing, each piece of the above data is input as input data.

FIG. 59(b) schematically shows a level-0 lattice area (lattice area containing the user-specified point) 522 detected in a state shown in FIG. 59(a). Thus, in the detection processing of a user-specified level-0 lattice area, the level-0 lattice area in which the user-specified point is contained is detected based on based on hierarchical lattice area data of a shooting trajectory and a user-specified point.

Figure 60:
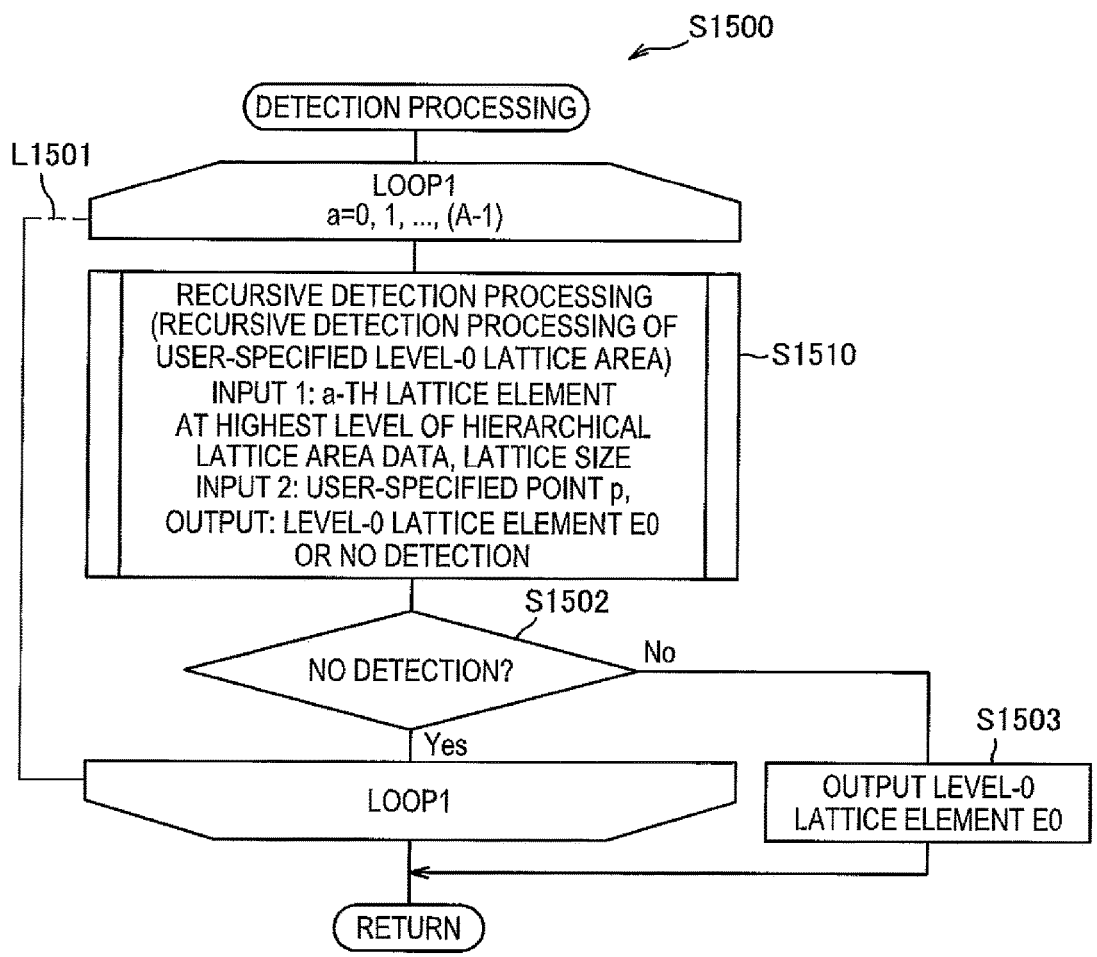
FIG. 60 is a flow chart exemplifying the detection processing of the processing procedure for user-specified point detection processing by the image processing apparatus 100 according to the second embodiment of the present invention.

FIG. 60 is a flow chart exemplifying the detection processing (processing procedure in step S1500 shown in FIG. 58) of the processing procedure for user-specified point detection processing by the image processing apparatus 100 according to the second embodiment of the present invention. The input data includes hierarchical lattice area data of a shooting trajectory and a user-specified point. The output data includes a user-specified level-0 lattice area (or no detection).

First, the following processing is repeatedly performed for lattice areas at the highest level for the hierarchical lattice area data of the shooting trajectory as input data (loop L1501). A is a value indicating the number of lattice elements (number of lattice areas) at the highest level of the hierarchical lattice area data.

Subsequently, recursive detection processing of the user-specified level-0 lattice area is performed (step S1510). The recursive detection processing will be described in detail with reference to FIG. 61.

Subsequently, whether any level-0 lattice element is detected is determined by the recursive detection processing (step S1502) and if no level-0 lattice element is detected, the processing returns to the start of loop L1501. On the other hand, if a level-0 lattice element is detected by the recursive detection processing (step S1502), the detected level-0 lattice element E0 is output (step S1503).

Figure 61:
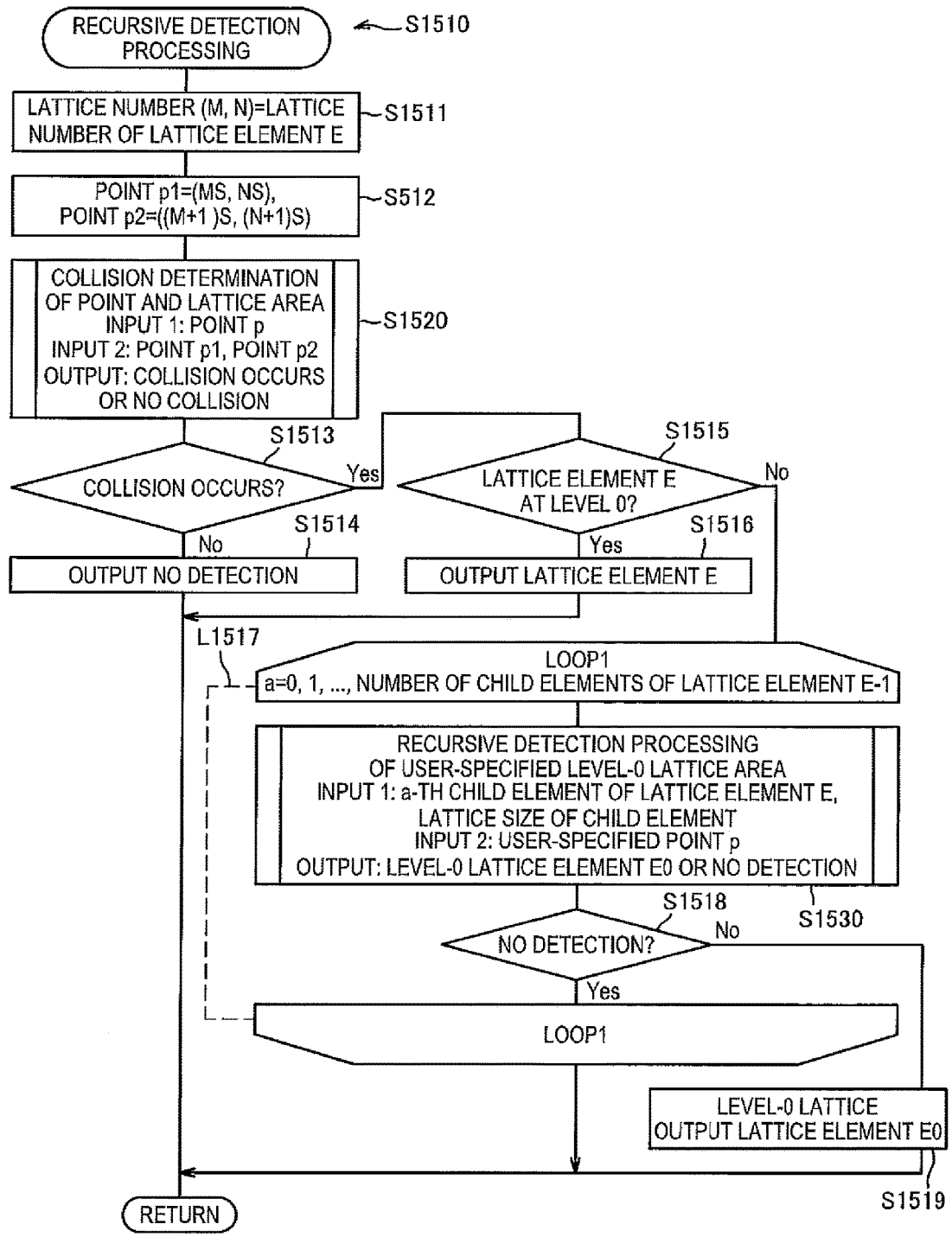
FIG. 61 is a flow chart exemplifying recursive detection processing of the detection processing of the processing procedure for user-specified point detection processing by the image processing apparatus 100 according to the second embodiment of the present invention.

FIG. 61 is a flow chart exemplifying recursive detection processing (processing procedure in step S1510 shown in FIG. 60) of the processing procedure for user-specified point detection processing by the image processing apparatus 100 according to the second embodiment of the present invention.

Figure 62:
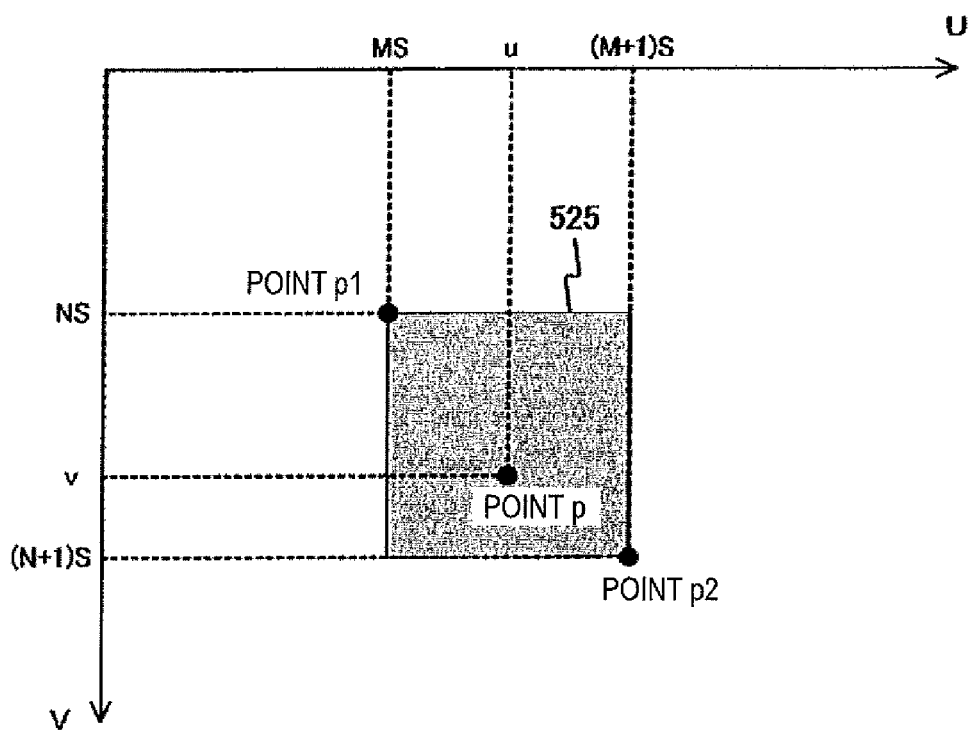
FIG. 62 is a diagram schematically showing the collision determination processing of a point and a lattice area by the image processing apparatus 100 according to the second embodiment of the present invention.

FIG. 62 is a diagram schematically showing the collision determination processing of a point and a lattice area by the image processing apparatus 100 according to the second embodiment of the present invention. The collision determination processing will be described in detail with reference to FIG. 61. The input data includes the lattice element E, the lattice size S, and the user-specified point p. The output data includes a user-specified level-0 lattice element (or no detection).

First, the lattice number (M, N)=the lattice number of the lattice element E (step S1511) and the point p1=(MS, NS) and the point p2=((M+1)S, (N+1)S) are set (step S1512).

Subsequently, collision detection processing of a point and a lattice area is preformed (step S1520). For example, as shown in FIG. 62, the point p and a lattice area (identified by the point p1=(MS, NS) and the point p2=((M+1)S, (N+1)S)) 525 are taken as an example. In this case, the point p is contained in the lattice area 525 and thus, it is determined that a collision occurs. On the other hand, if the point p is not contained in the lattice area 525, it is determined that no collision occurs.

Subsequently, whether it is determined that a collision occurs is determined (step S1513) and if it is determined that no collision occurs, no detection is output (step S1514). On the other hand, if it is determined that a collision occurs (step S1513), whether the lattice element E is at the level 0 is determined (step S1515).

If the lattice element E is at the level 0 (step S1515), the lattice element E is output (step S1516). If the lattice element E is not at the level 0 (step S1515), the recursive detection processing is repeatedly performed for child elements of the lattice element E (loop L1517, step S1530). The recursive detection processing is the same as in step S1510 and thus, the description thereof is omitted. Then, whether no detection is output is determined by the recursive detection processing (step S1518) and if no detection is output, the recursive detection processing is repeatedly performed (loop L1517, step S1530). On the other hand, if no detection is not output (step S1518), the level-0 lattice element E0 is output (step S1519).

FIG. 63 is a diagram schematically showing the flow of user-specified shooting point detection processing from a shooting section list by the image processing apparatus 100 according to the second embodiment of the present invention.

FIG. 63(a) schematically shows the user-specified level-0 lattice element E detected by the detection processing of the user-specified level-0 lattice area and the user-specified point p. In the detection processing, each piece of the above data is input as input data.

FIG. 63(b) schematically shows a shooting point number 2 (with a rectangular frame) detected in a state shown in FIG. 63(a). Thus, in the user-specified shooting point detection processing from a shooting section list, a shooting point number is detected based on a user-specified level-0 lattice element and a user-specified point.

Figure 64:
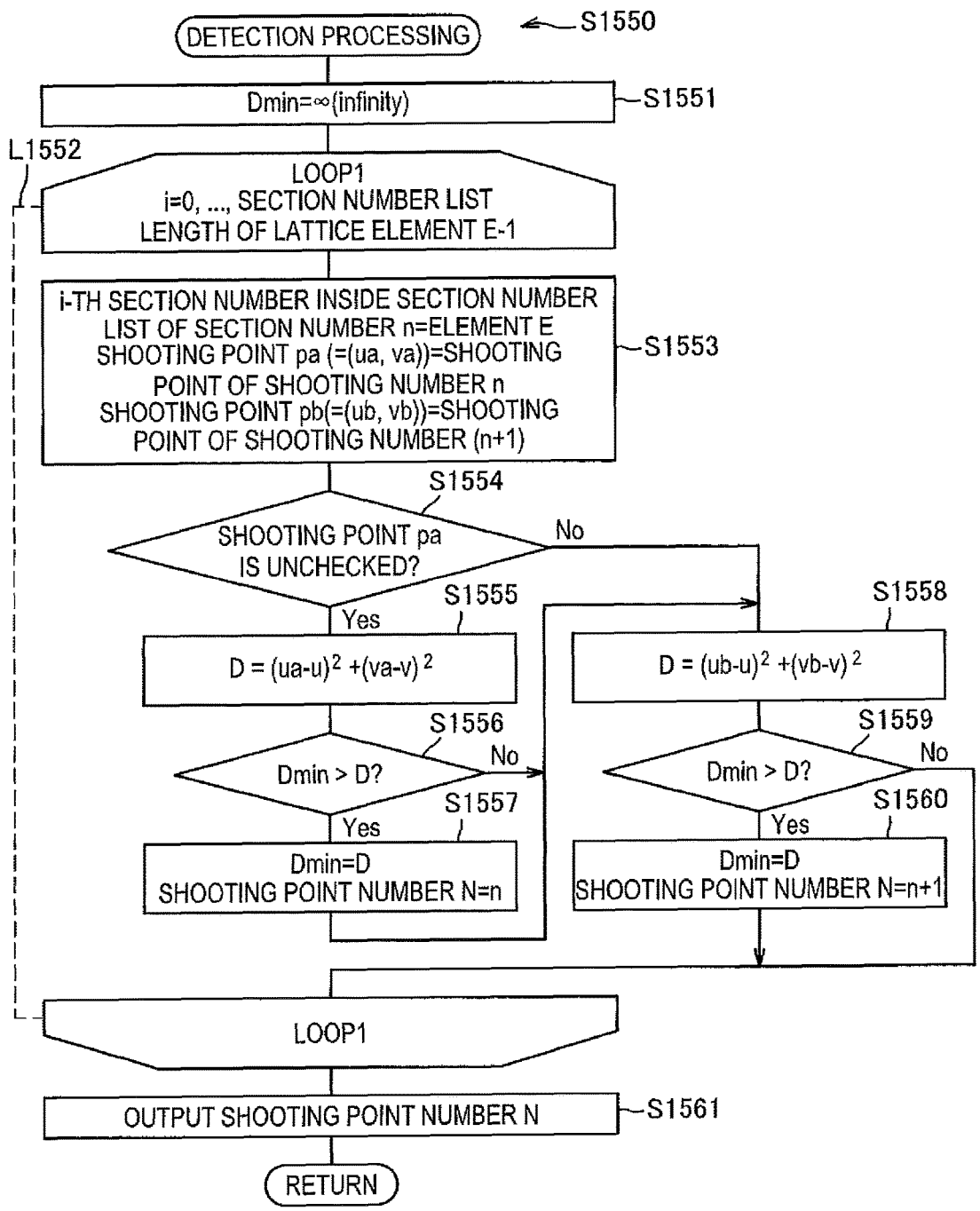
FIG. 64 is a flow chart exemplifying the user-specified shooting point detection processing of the processing procedure for user-specified point detection processing by the image processing apparatus 100 according to the second embodiment of the present invention.

FIG. 64 is a flow chart exemplifying the user-specified shooting point detection processing (processing procedure in step S1550 shown in FIG. 58) of the processing procedure for user-specified point detection processing by the image processing apparatus 100 according to the second embodiment of the present invention. The input data includes the user-specified level-0 lattice element E and the user-specified point p. The output data includes a shooting point number (or no detection).

First, Dmin=∞ (infinity) is set (step S1551) and the following processing is repeatedly performed for the lattice element E as input data (loop L1552). That is, the section number n is set as n="i-th section number in the section number list of the lattice element E", the shooting point pa is set as pa(=(ua, va))=the shooting point of the shooting point number n, and the shooting point pb is set as pb(=(ub, vb))=the shooting point of the shooting point number (n+1) (step S1553). Subsequently, whether the shooting point pa is unchecked is determined (step S1554).

If the shooting point pa is unchecked (step S1554), $D=(ua-u)^2+(va-v)^2$ is set (step S1555) and whether Dmin>D holds is determined (step S1556). If Dmin>D holds (step S1556), Dmin=D is set and the shooting point number N=n is set (step S1557) to proceed to step S1558. If Dmin>D does not hold (step S1556), the processing proceeds to step S1558.

Subsequently, $D=(ub-u)^2+(vb-v)^2$ is set (step S1558) and whether Dmin>D holds is determined (step S1559). If Dmin>D holds (step S1559), Dmin=D is set and the shooting point number N=n+1 is set (step S1560) to return to the start of loop L1552. If Dmin>D does not hold (step S1559), the processing returns to the start of loop L1552.

Then, when the processing of loop L1552 terminates, the shooting point number N is output (step S1561).

[Generation Example of Shooting Section Information from a User-Specified Point]

By using two user-specified points detected by the above user-specified point detection processing, shooting section information (clip information) between shooting points is generated. The input data in this case includes user-specified shooting point numbers N1, N2. The output data includes shooting section information (start section number N, number of sections C).

For example, the start section number N is identified by comparing the user-specified shooting point numbers N1, N2. If, for example, N1<N2 holds, the start section number N=N1 and the number of sections C=N2−N1 are obtained. On the other hand, if N1≥N2 holds, the start section number N=N2 and the number of sections C=N1−N2 are obtained. Accordingly, play list information can be generated.

By performing each piece of the above processing, a specific shooting section can be narrowed down. That is, play list information can easily be created by automatically extracting a specific shooting section group from a large amount of dynamic image content groups. An application of the image processing apparatus 100 according to the second embodiment of the present invention has, for example, the following (1) to (6) functions: (1) Manual extraction function of a shooting section by specifying points on a shooting trajectory through a user operation on a display screen. (2) Manual specifying function of a shooting target area through a user operation on the display screen. (3) Automatic specifying function of a shooting target area by specifying a place name using map data. (4) Automatic extraction function of shooting sections passing over a shooting target area. (5) Automatic extraction function of shooting sections from which to shoot a shooting target area. (6) Play list creation function from an extracted shooting section (clip). Transition examples of the display screen displayed by each of these functions are shown below.

[Generation Example of a Play List Based on Specified Editing Points]

FIGS. 65 to 69, FIGS. 72 to 79, and FIGS. 82 to 94 are diagrams showing transition examples of the display screen displayed in the display unit 180 according to the second embodiment of the present invention.

First, an example in which play list information is generated by selecting desired dynamic image content from 100 pieces of dynamic image content through a manual operation, causing the display unit 180 to display a shooting trajectory thereof, and specifying points on the shooting trajectory displayed in the display unit 180 will be shown.

Figure 65:
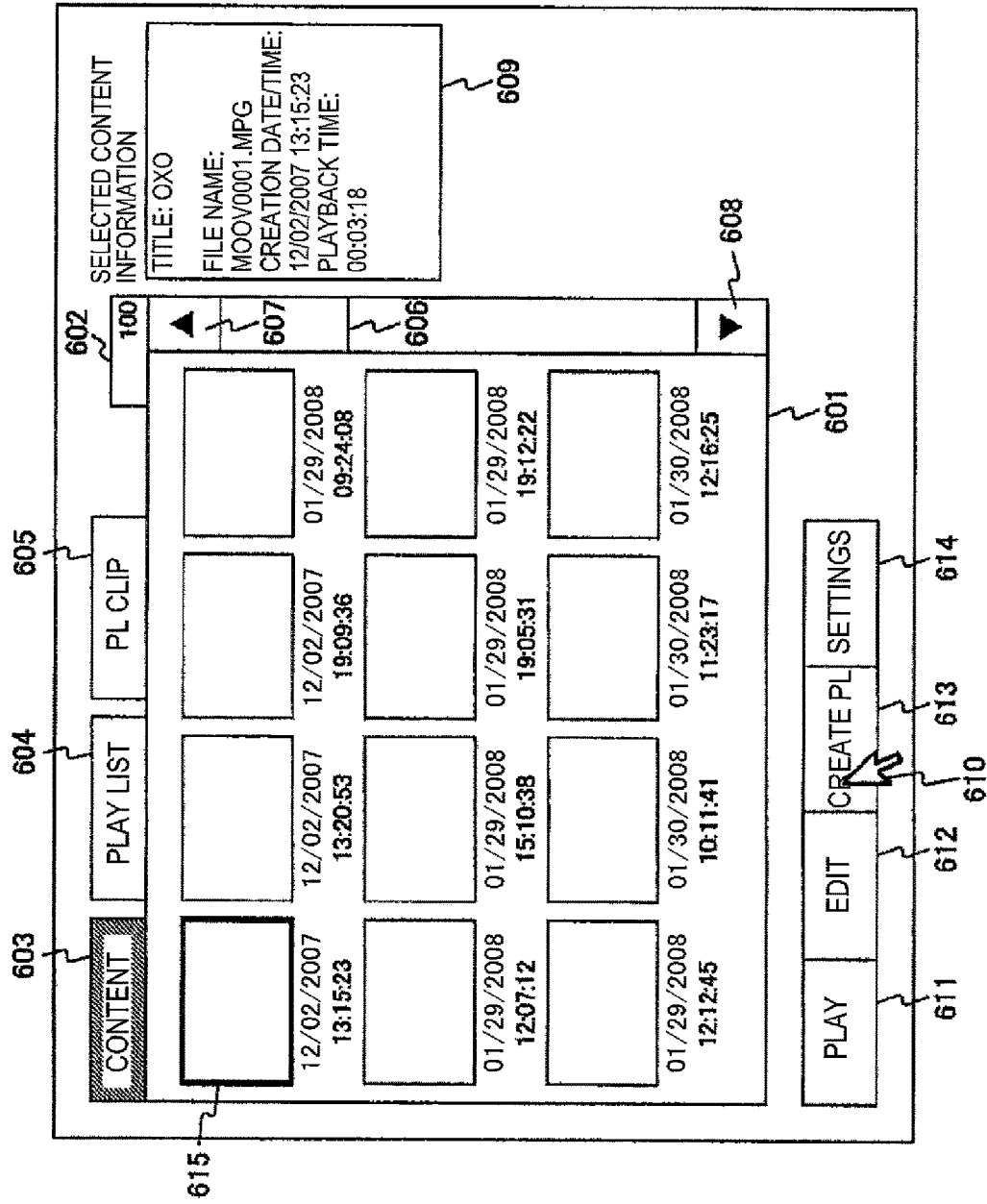
FIG. 65 is a diagram showing a transition example of the display screen displayed in the display unit 180 according to the second embodiment of the present invention.

FIG. 65 shows a content list screen listing images representing dynamic image content. The content list screen is the initial screen when a play list is reproduced or edited.

In the content list screen shown in FIG. 65, a content list display area 601, a display number display area 602, a "Content" tab 603, a "Play list" tab 604, and a "PL clip" tab 605 are provided. Also, a selected content information display area 609, a "Play" button 611, an "Edit" button 612, a "Create PL" button 613, and a "Settings" button 614 are provided in the content list screen.

In the content list display area 601, images (thumbnail images) representing content stored in the storage medium 160 are listed. In the example shown in FIG. 65, an example in which thumbnail images are displayed in a 4×3 matrix shape is shown and each image is shown as a hollow white rectangle in a simplified manner. Information (for example, generation date/time information of content) about corresponding content is displayed below each listed thumbnail image. The selected thumbnail image among listed images has a thick frame displayed therearound. In the example shown in FIG. 65, a case when a thumbnail image 615 at the upper left corner is selected is shown. If the number of pieces of content to be displayed in the content list display area 601 is large (for example, 13 or more), each image of the content list display area 601 can be scrolled and displayed by using a scroll bar 606 and up/down arrow buttons 607, 608.

In the display number display area 602, the number of pieces of content or play lists to be displayed in the content list display area 601 is displayed. In the example shown in FIG. 65, a case when 100 pieces of content are to be displayed in the content list display 601 is shown.

The "Content" tab 603, the "Play list" tab 604, and he "PL clip" tab 605 are tabs corresponding to the area displayed below.

In the selected content information display area 609, information about content corresponding to the selected thumbnail image among thumbnail images displayed in the content list display area 601 is displayed. In the selected content information display area 609, for example, the title, file name, creation date/time, and playback time about the content corresponding to the selected thumbnail.

The "Play" button 611 is a button pressed when content corresponding to each thumbnail displayed in the content list display area 601 is caused to play back.

The "Edit" button 612 is a button pressed when content corresponding to each thumbnail displayed in the content list display area 601 is edited.

The "Create PL" button 613 is a button pressed when play list information about content corresponding to each thumbnail displayed in the content list display area 601 is created.

The "Settings" button 614 is a button pressed when various setting operations are performed on content corresponding to each thumbnail displayed in the content list display area 601. In the second embodiment of the present invention, examples in which various operations are performed by using a cursor 610 are shown, but various operations may also be performed by contact or proximity operations of a user's finger or the like on a touch panel.

Figure 66:
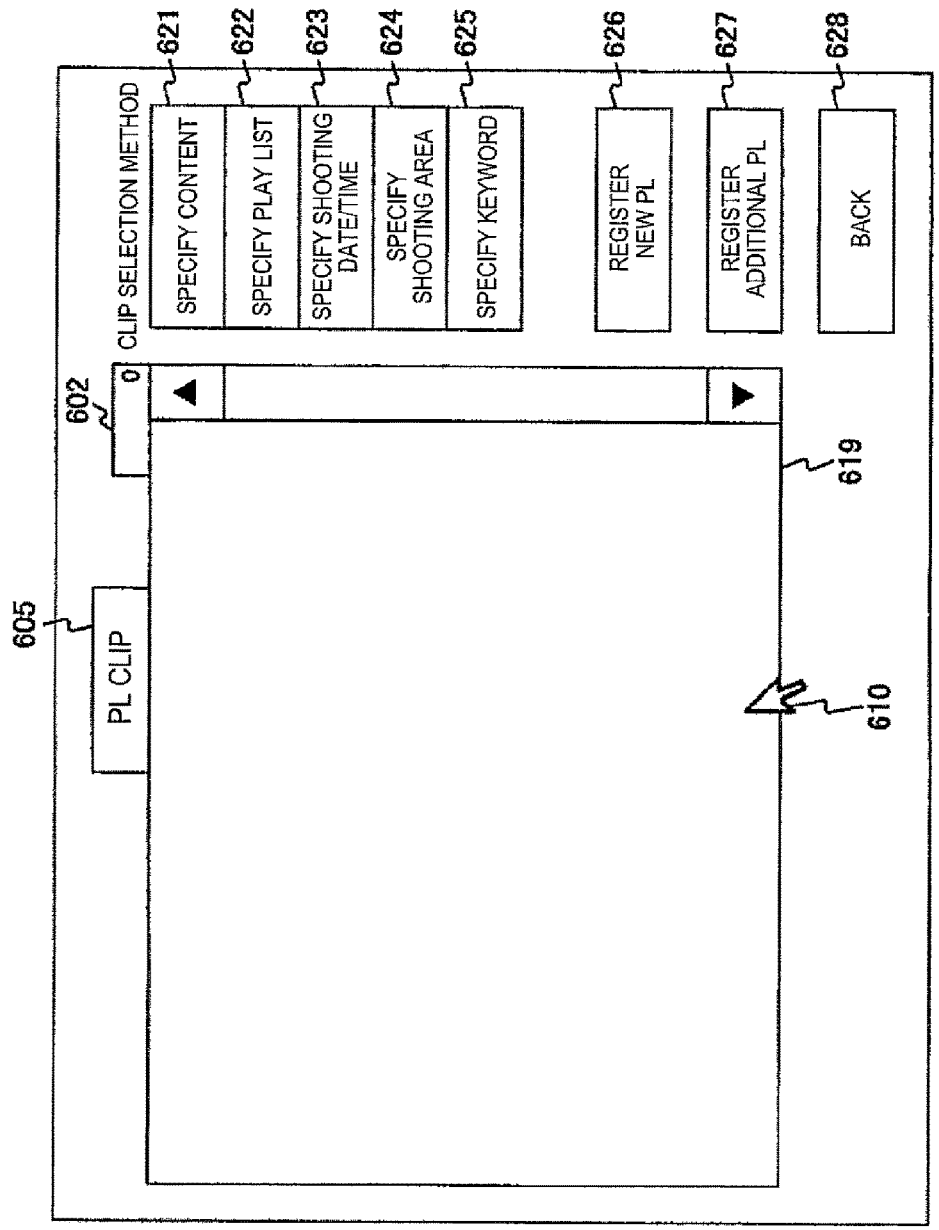
FIG. 66 is a diagram showing a transition example of the display screen displayed in the display unit 180 according to the second embodiment of the present invention.

FIG. 66 shows a PL (play list) creation screen to create play list information. The PL creation screen is a screen displayed after the "Create PL" button 613 being pressed in the content list screen shown in FIG. 65. A list of play list information is displayed in a PL clip listing area 619. In the state shown in FIG. 66, it is assumed that no PL clip constituting play list information is present.

To select desired dynamic image content by a manual operation, a "Specify content" button 621 is pressed in the PL creation screen shown in FIG. 66. With this pressing operation, a content specifying screen of PL clips shown in FIG. 67 is displayed.

Figure 67:
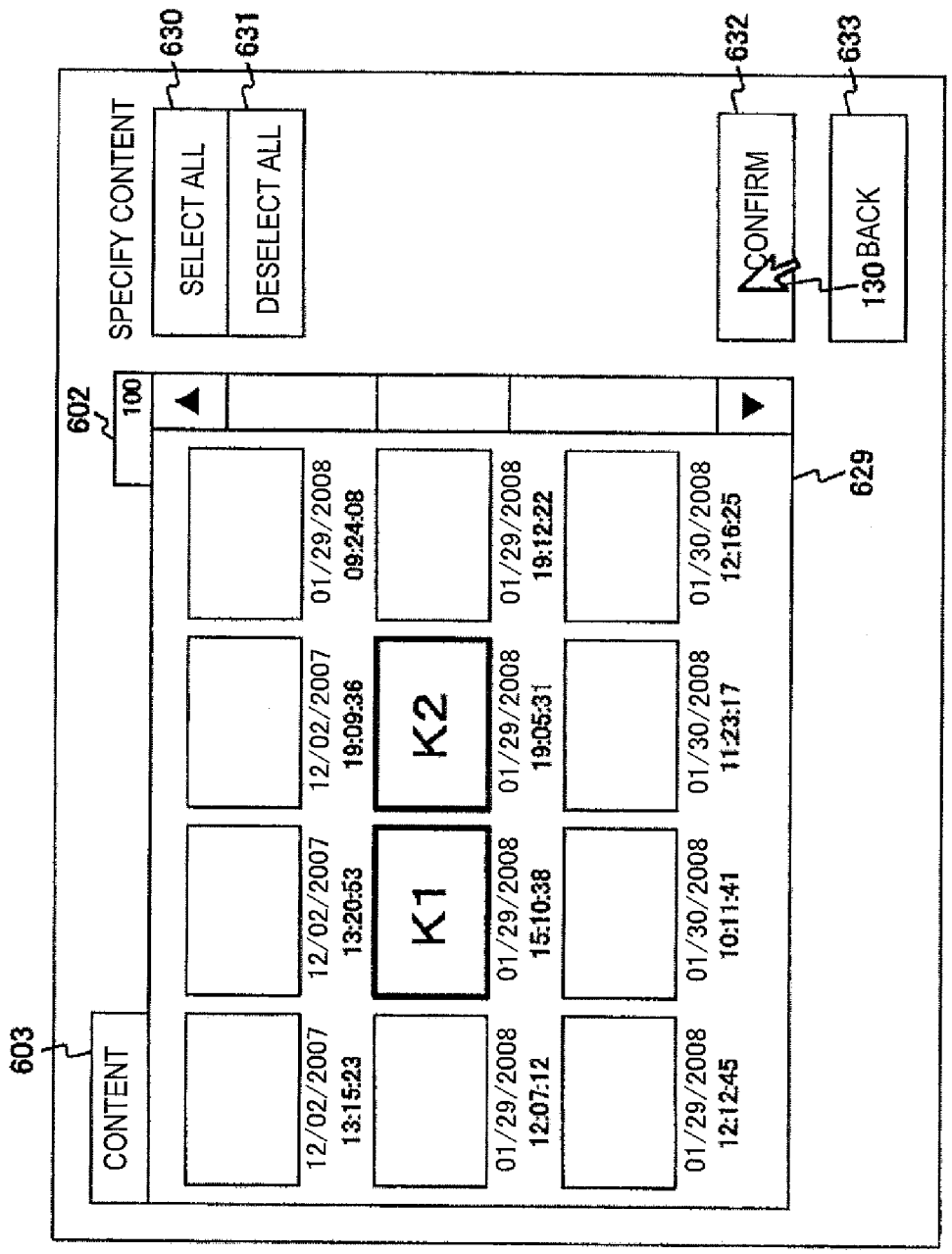
FIG. 67 is a diagram showing a transition example of the display screen displayed in the display unit 180 according to the second embodiment of the present invention.
Figure 68:
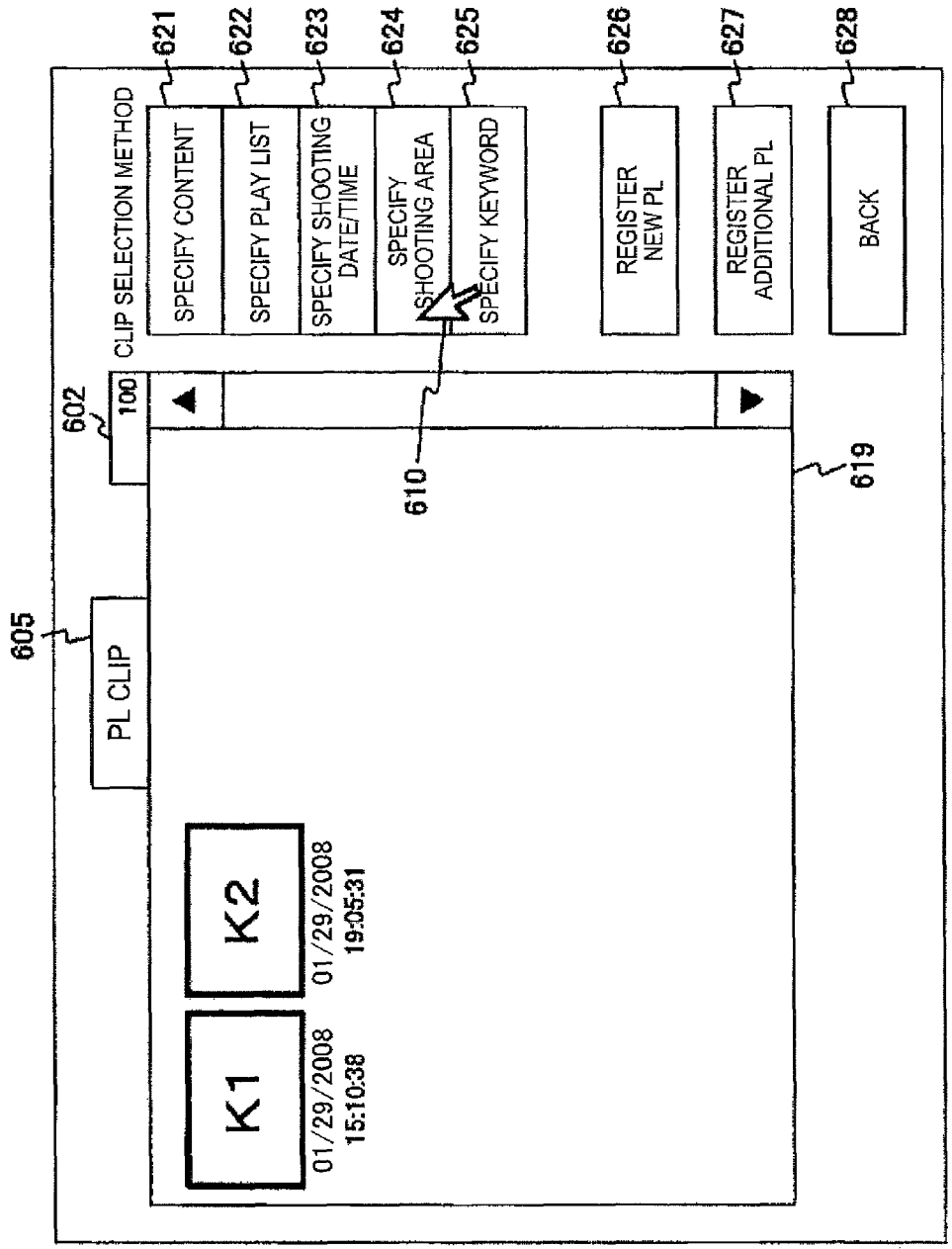
FIG. 68 is a diagram showing a transition example of the display screen displayed in the display unit 180 according to the second embodiment of the present invention.

The content specifying screen of PL clips shown in FIG. 67 is a screen to select desired dynamic image content. In this content specifying screen, the user selects (for example, a click operation) desired dynamic image content (thumbnail image) and then presses a "Confirm" button 632. In the example shown in FIG. 67, a state in which two thumbnail images in the center of a content list display area 629 are selected is shown (thumbnail images (K1, K2) with a thick frame). Then, with the pressing operation of the "Confirm" button 632, a PL creation screen of PL clips shown in FIG. 68 is displayed. The PL creation screen is similar to the PL creation screen shown in FIG. 66 and the thumbnail images (K1, K2) selected in the content specifying screen of PL clips shown in FIG. 67 are displayed in the PL clip listing area 619. That is, it is assumed in the state shown in FIG. 68 that all sections of two pieces of dynamic image content are selected as PL clips.

Figure 69:
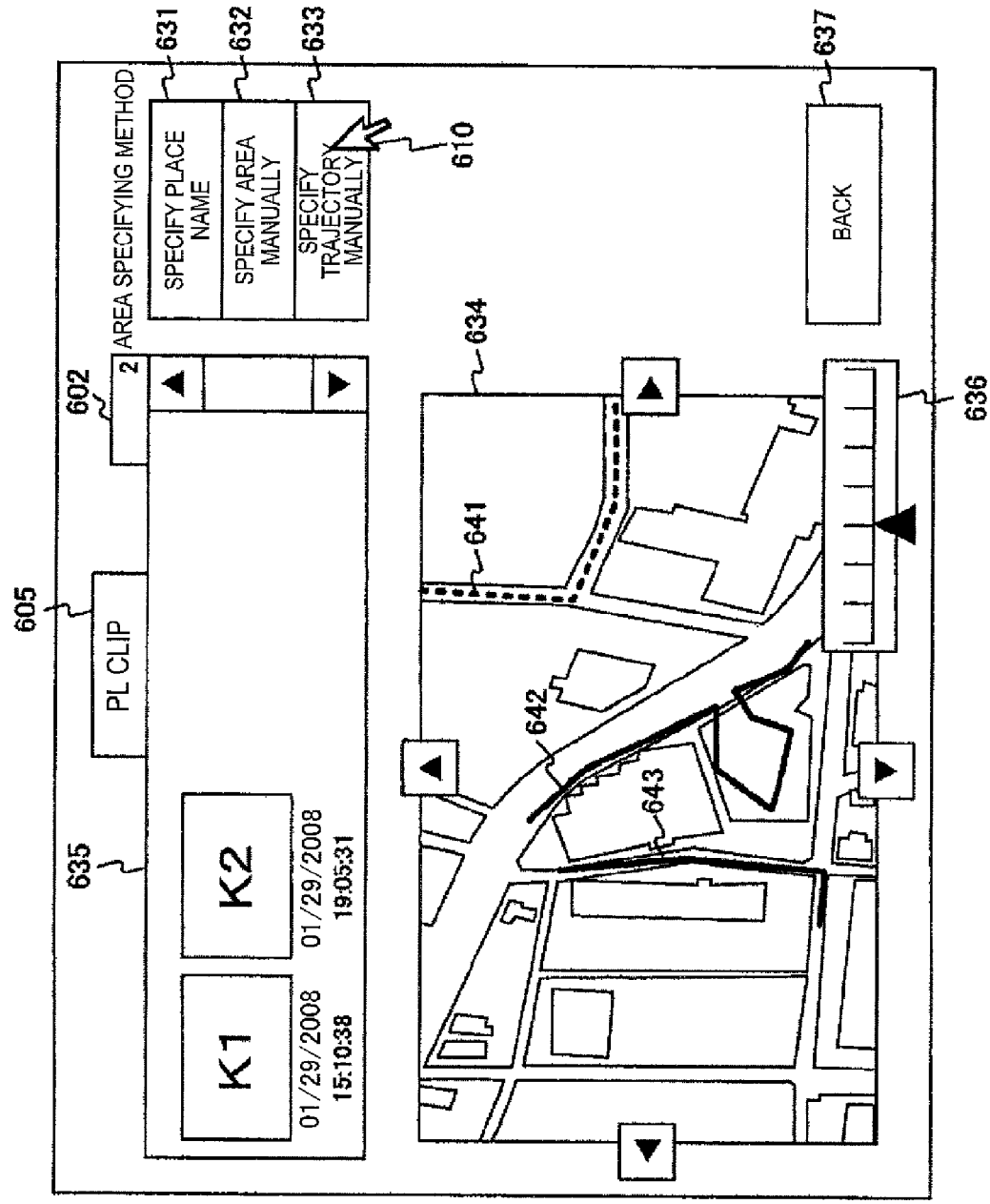
FIG. 69 is a diagram showing a transition example of the display screen displayed in the display unit 180 according to the second embodiment of the present invention.

Subsequently, if the user presses a "Specify shooting area" button 624 in the PL creation screen of PL clips shown in FIG. 68, a shooting area specifying screen of PL clips shown in FIG. 69 is displayed. In the shooting area specifying screen, the same thumbnail images (K1, K2) as those in the PL clip listing area 619 are displayed in a PL clip listing area 635. In a map display area 634, a map in which solid lines showing shooting trajectories 642, 643 of dynamic image content corresponding to the two thumbnail images displayed in the PL clip listing area 635 are arranged is displayed. A dotted line 641 in the map display area 634 indicates a shooting trajectory of dynamic image content that is not displayed in the PL clip listing area 635. By using a scale bar 636, the scale of the map displayed in the map display area 634 can be changed. Further, by pressing an arrow button of up and down, left and right provided on each side of the rectangle corresponding to the map display area 634, the map displayed in the map display area 634 can be moved in a desired direction. An area decision method of the map displayed in the map display area 634 will be described below.

[Example of Deciding the Map to be Displayed]

Figure 70:
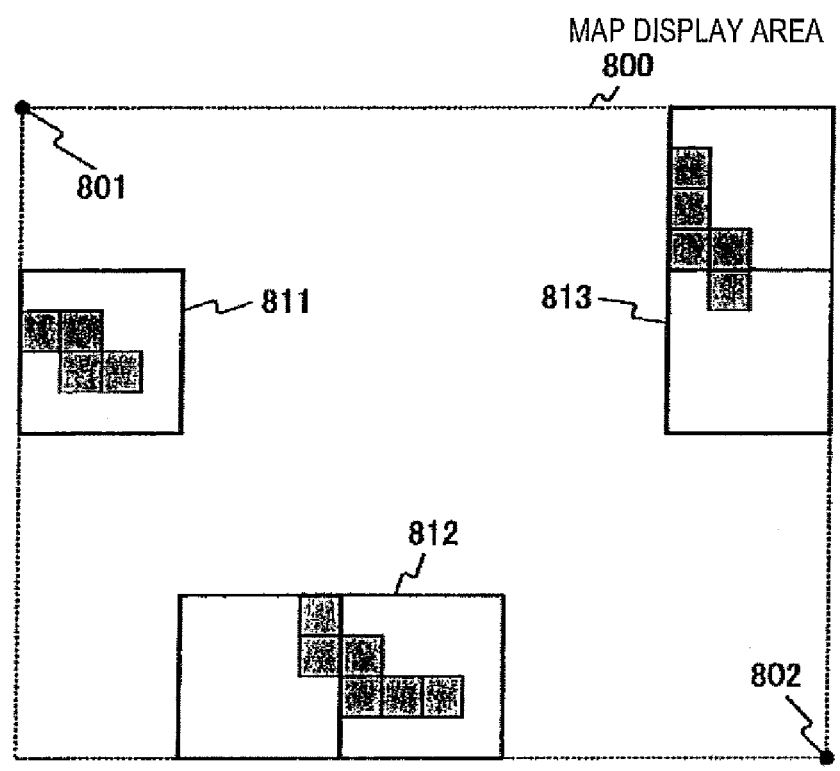
FIG. 70 is a diagram schematically showing hierarchical lattice areas corresponding to a selected clip group intended for map area decision processing by the image processing apparatus 100 according to the second embodiment of the present invention.

FIG. 70 is a diagram schematically showing hierarchical lattice areas corresponding to a selected clip group intended for map area decision processing by the image processing apparatus 100 according to the second embodiment of the present invention. A map display area 800 is an area decided by map area decision processing and is identified by upper left coordinates 801 and lower right coordinates 802.

Hierarchical lattice areas 811 to 813 are hierarchical lattice areas generated based on dynamic image content selected by a user operation or generated clip information and colored rectangles inside are assumed to be lattice areas at the level 0. Then, a map display area can be decided as an area containing the highest-level lattice area group of hierarchical lattice area data corresponding to the selected clip group.

Figure 71:
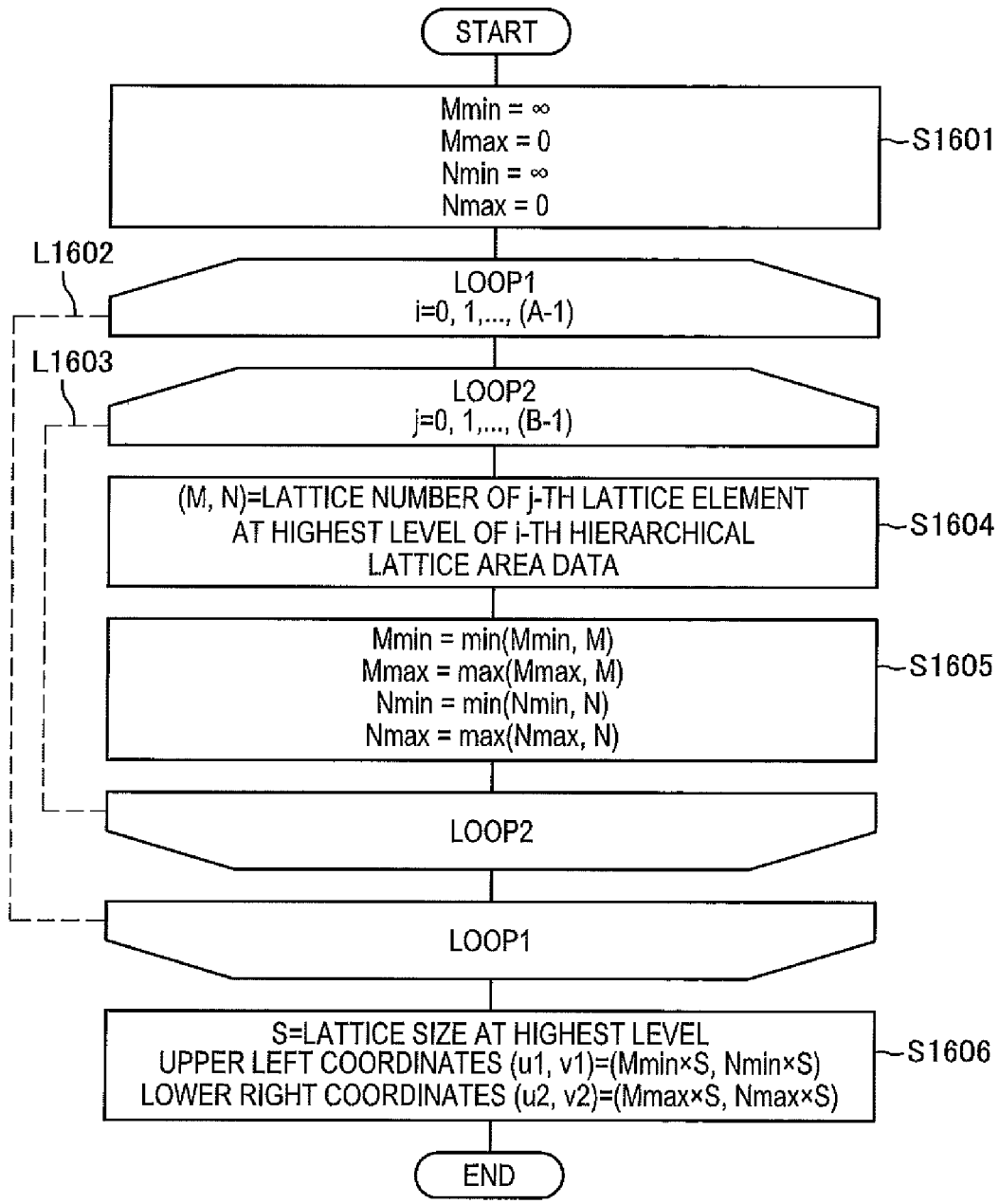
FIG. 71 is a flow chart exemplifying the processing procedure for map area decision processing by the image processing apparatus 100 according to the second embodiment of the present invention.

FIG. 71 is a flow chart exemplifying the processing procedure for map area decision processing by the image processing apparatus 100 according to the second embodiment of the present invention. The input data includes a shooting trajectory hierarchical lattice area data list corresponding to the selected clip group. The output data includes a map display area identified by upper left coordinates and lower right coordinates.

First, Mmin=∞ (infinity), Mmax=0, Nmin=∞ (infinity), and Nmax=0 are set (step S1601) and the following processing is repeatedly performed for the selected clip group as input data (loop L1602). A is a value indicating the number of selected clips. The following processing is repeatedly performed for shooting trajectory hierarchical lattice area data of the selected clip group as input data (loop L1603). B is a value indicating the number lattice elements (number of lattice areas) at the highest level of the i-th hierarchical lattice area data.

That is, in loop L1603, (M, N)="lattice number of the j-th lattice element at the highest level of the i-th hierarchical lattice area data" is set (step S1604). Subsequently, Mmin=min(Mmin, M), Mmax=max(Mmax, M), Nmin=min(Nmin, N), and Nmax=max(Nmax, N) are set (step S1605).

Then, when the processing of loops L1602 and L1603 terminates, the processing proceeds to step S1606. That is, S=the lattice size of the highest level is set, upper left coordinates (u1, v1)=(Mmin×S, Nmin×S) is set, and lower right coordinates (u2, v2)=(Mmax×S, Nmax×S) is set (step S1606). Accordingly, the map display area (upper left coordinates (u1, v1), lower right coordinates (u2, v2)) is decided. The map decided as described above is displayed in the display unit 180 as shown in FIG. 69.

[Generation Example of a Play List Based on Editing Points Specified by a Manual Operation]

Figure 72:
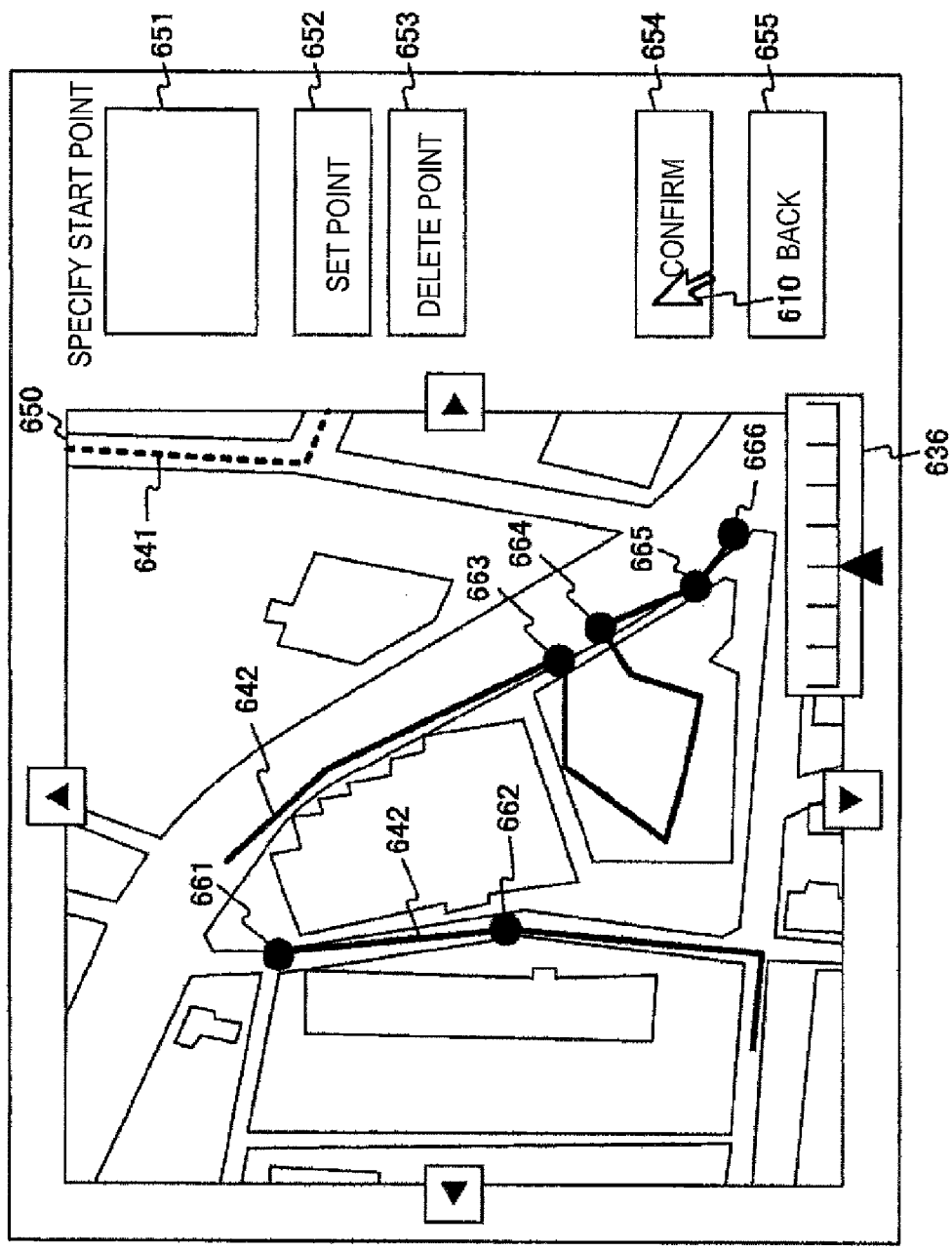
FIG. 72 is a diagram showing a transition example of the display screen displayed in the display unit 180 according to the second embodiment of the present invention.

A transition example of the above display screens will be described below. That is, if the user presses a "Specify trajectory manually" button 633 in the shooting area specifying screen of PL clips shown in FIG. 69, a manual trajectory specifying screen of PL clips shown in FIG. 72 is displayed. In the manual trajectory specifying screen of PL clips, if the user specifies any point on the shooting trajectory and presses a "Set point" button 652, the user can set the start point and the end point of a clip. FIG. 72 shows an example in which points 661 and 662, points 663 and 664, and points 665 and 666 are set as the start point and the end point of a clip respectively. The display mode of a section of a shooting trajectory set as the start point and the end point of a clip may be changed so that the section can be distinguished from other sections. For example, the color between the start point and the end point of a clip in a shooting trajectory may be changed and displayed so as to be different from the color in other portions of the shooting trajectory. Also, if the user specifies any point on the shooting trajectory, the frame corresponding to the point is displayed in an image display area 651 of the specified point.

The processing to decide the start (or end) point (shooting point) of a clip from the point clicked by the user on the display screen is shown in FIGS. 57 to 64. That is, the processing shown in FIGS. 57 to 64 is performed on "shooting trajectory hierarchical lattice area data" (two pieces of dynamic image content in the example shown in FIG. 72) of dynamic image content containing the user-specified point and each PL clip.

Also, shooting section information of a clip is generated by generation processing of shooting section information from a user-specified shooting point being performed regarding shooting point numbers of the start point and the end point.

Figure 73:
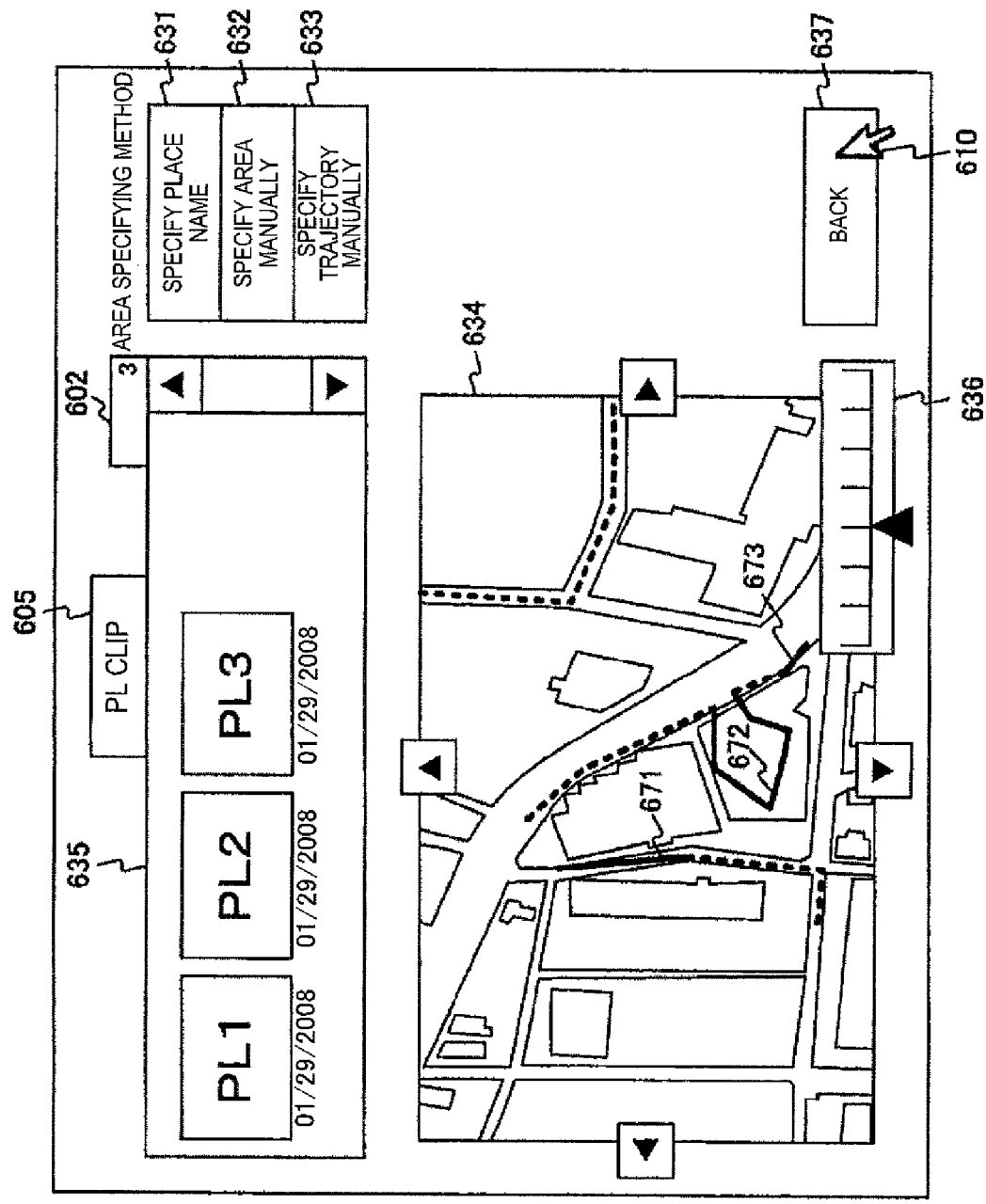
FIG. 73 is a diagram showing a transition example of the display screen displayed in the display unit 180 according to the second embodiment of the present invention.

In the state shown in FIG. 72, three shooting sections are newly narrowed down as PL clip candidates from inside (two) existing PL clips. If the user presses a "Confirm" button 654 in the manual trajectory specifying screen of PL clips shown in FIG. 72 in this state, a shooting area specifying screen of PL clips shown in FIG. 73 is displayed. The shooting area specifying screen of PL clips is substantially the same as the screen shown in FIG. 69 except that three shooting sections 671 to 673 are selected as PL clips. In addition, sections of the shooting trajectories displayed in the map display area 634 that are not selected as PL clips are shown by dotted lines.

Figure 74:
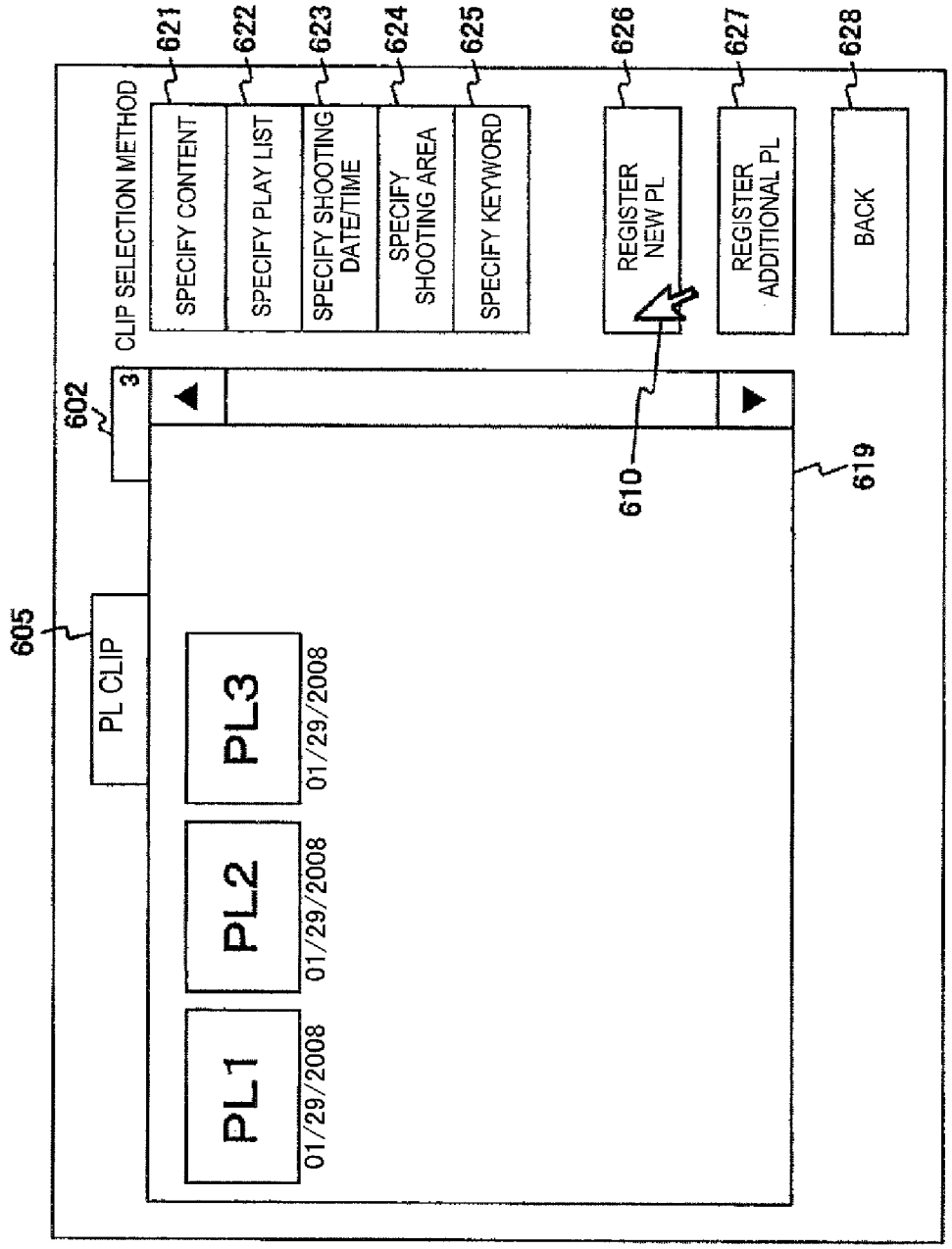
FIG. 74 is a diagram showing a transition example of the display screen displayed in the display unit 180 according to the second embodiment of the present invention.

In the shooting area specifying screen of PL clips shown in FIG. 73, if the user presses a "Back" button 637, a PL creation screen shown in FIG. 74 is displayed. The PL creation screen is substantially the same as the PL creation screen shown in FIG. 66 except that thumbnail images displayed in the PL clip listing area 619 are different. In the PL clip listing area 619 shown in FIG. 74, thumbnail images corresponding to the PL clips specified in the manual trajectory specifying screen of PL clips shown in FIG. 72 are displayed.

Figure 75:
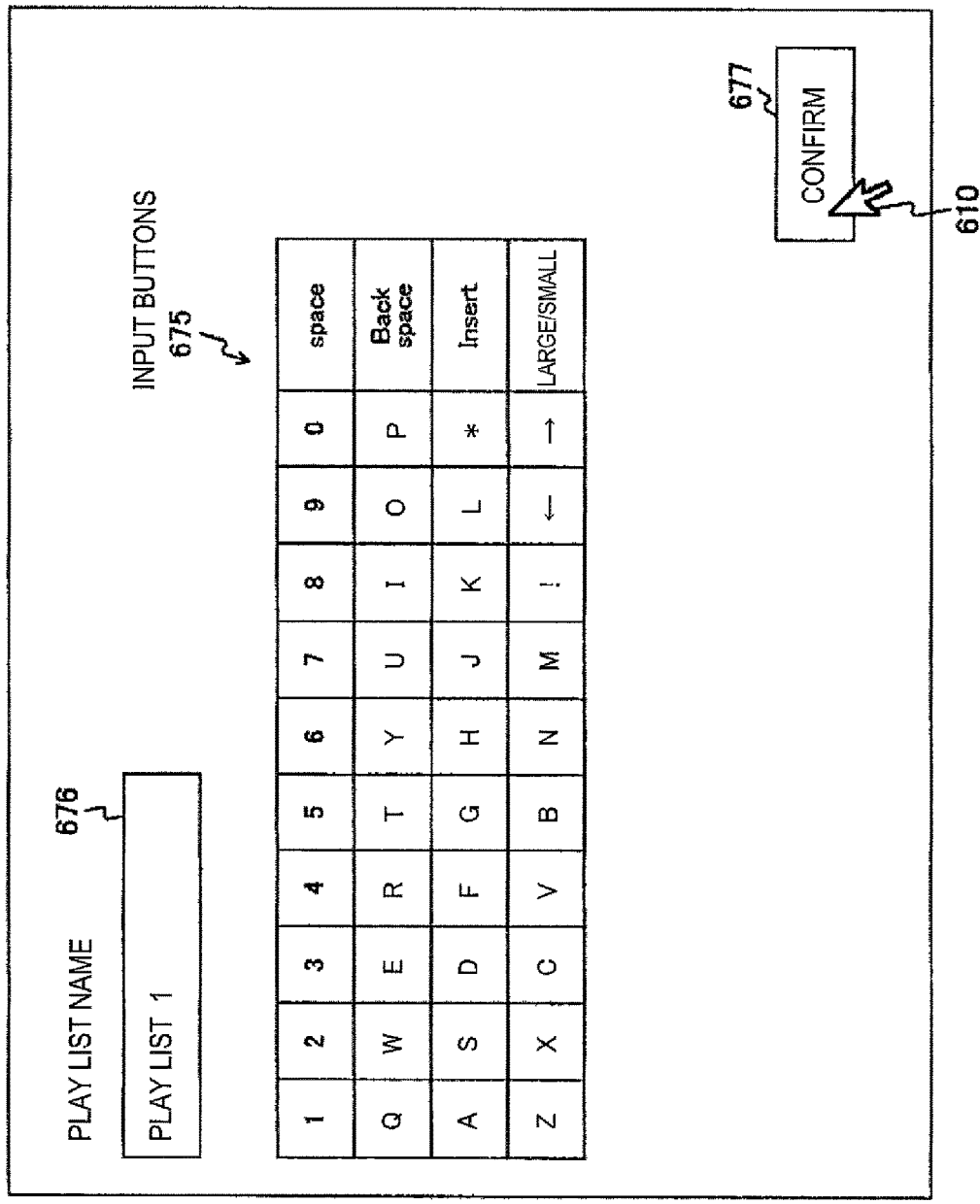
FIG. 75 is a diagram showing a transition example of the display screen displayed in the display unit 180 according to the second embodiment of the present invention.
Figure 76:
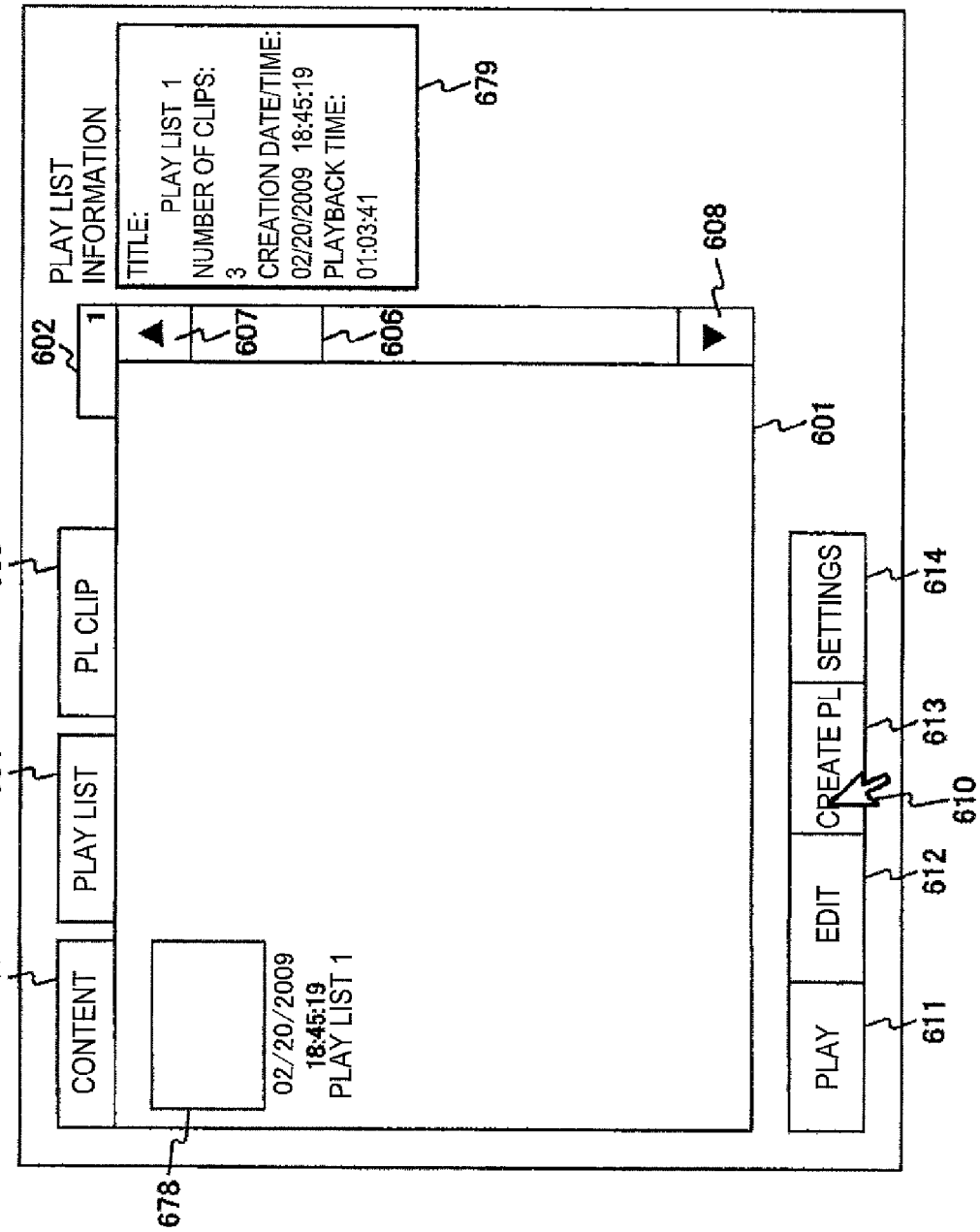
FIG. 76 is a diagram showing a transition example of the display screen displayed in the display unit 180 according to the second embodiment of the present invention.

In the PL creation screen shown in FIG. 74, if the user presses a "Register new PL" button 626, a play list name input screen shown in FIG. 75 is displayed. In the play list name input screen, a desired play list name (the default name is, for example, "Playlist*") can be input into a play list name display area 676 by using input buttons 675. Then, in the play list name input screen shown in FIG. 75, if the user presses a "Confirm" button 677 after the desired play list name being input, play list information is newly created. The play list information generated as described above is displayed in a play list listing screen shown in FIG. 76 as thumbnail images 678 thereof. In a play list information display area 679, information about the selected play list is displayed.

[Generation Example of a Play List Based on a Passing Determination of the Specified Target Area]

Next, an example in which play list information is generated by selecting a shooting object area from 100 pieces of dynamic image content based on the place name and extracting shooting sections passing over the area will be shown.

If, as described above, the user presses the "Create PL" button 613 in the content list screen shown in FIG. 65, the PL creation screen shown in FIG. 66 is displayed. It is assumed in this state that no PL clip constituting a play list is present.

Figure 77:
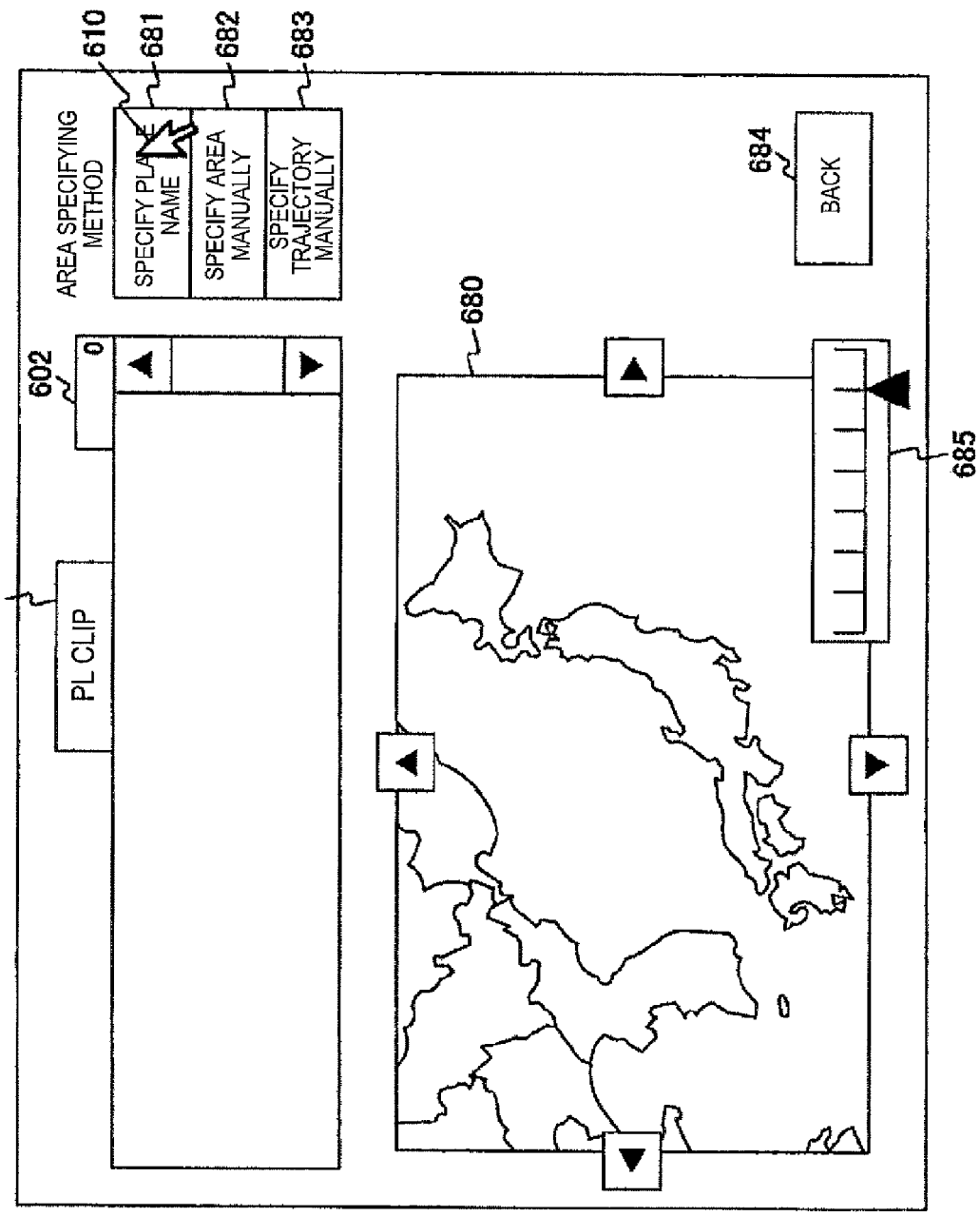
FIG. 77 is a diagram showing a transition example of the display screen displayed in the display unit 180 according to the second embodiment of the present invention.

In the PL creation screen shown in FIG. 66, if the user presses the "Specify shooting area" button 624, a shooting area specifying screen of PL clips shown in FIG. 77 is displayed. In the shooting area specifying screen of PL clips, the user can manually specify the target area using a map displayed in a map display area 680 by pressing, for example, a "Specify area manually" button 682. In this example, an example in which the target area is specified by inputting the place name of the target area is shown.

Figure 78:
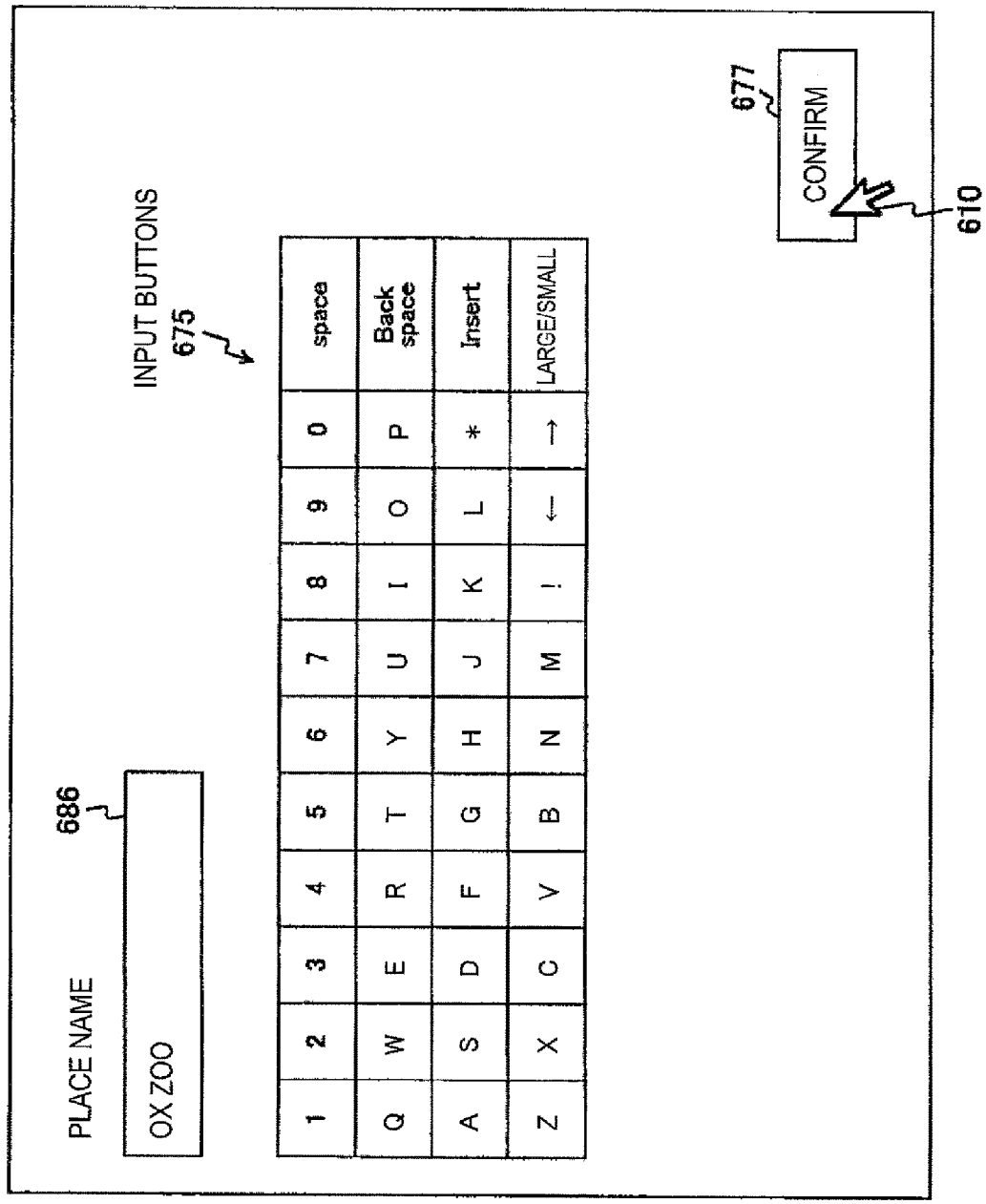
FIG. 78 is a diagram showing a transition example of the display screen displayed in the display unit 180 according to the second embodiment of the present invention.
Figure 79:
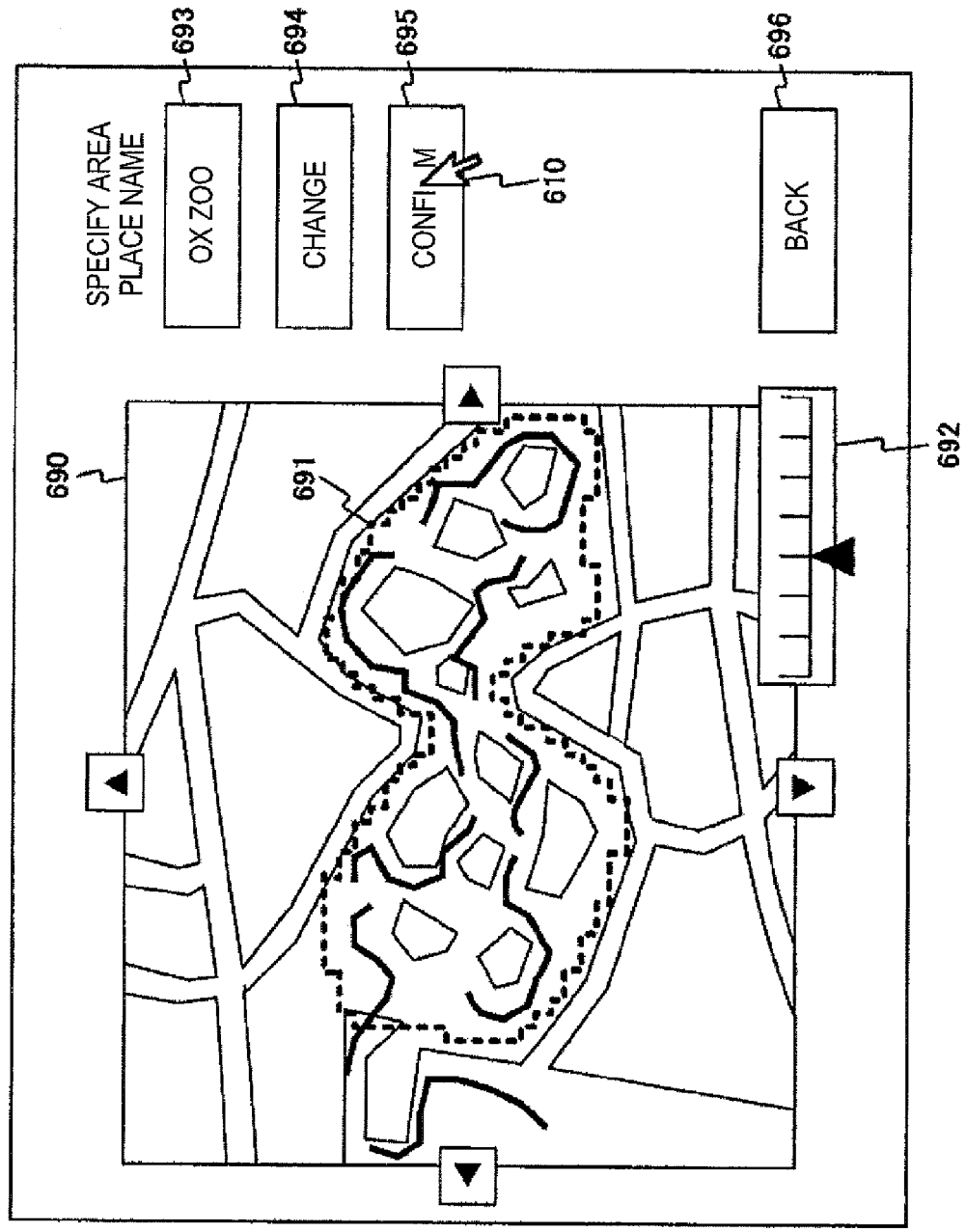
FIG. 79 is a diagram showing a transition example of the display screen displayed in the display unit 180 according to the second embodiment of the present invention.

More specifically, in the shooting area specifying screen of PL clips shown in FIG. 77, if the user presses a "Specify place name" button 681, a place name input screen of the target area shown in FIG. 78 is displayed. The place name input screen of the target area is substantially the same as the play list name input screen shown in FIG. 75 and a desired place name can be input into a place name display area 686 using the input buttons 675. Then, in the place name input screen of the target area shown in FIG. 78, if the user presses the "Confirm" button 677 after the desired place name (for example, "OX zoo") being input, a target area setting screen by specifying the place name shown in FIG. 79 is displayed. When the target area setting screen by specifying the place name is displayed, hierarchical lattice area data of the target area is generated (or acquired) from map data. In a map display area 690 of the target area setting screen by specifying the place name shown in FIG. 79, shooting trajectories (shown by thick solid lines) of dynamic image content are displayed on a map together with the specified map. Thus, dynamic image content whose shooting trajectory is displayed can be detected by dynamic image content detection processing.

[Detection Example of Dynamic Image Content Based on the Display Target Map Area]

An example in which dynamic image content whose shooting trajectory is contained in a map based on the displayed map area is shown. That is, a content group whose shooting trajectory is contained in a map display area can be detected by creating hierarchical lattice area data of the map display area and detecting a collision of the hierarchical lattice area data with a shooting trajectory hierarchical lattice area data group of the content group.

FIG. 80 is a diagram schematically showing a lattice size intended for dynamic image content detection processing by the image processing apparatus 100 according to the second embodiment of the present invention. As shown in FIG. 80(*a*), for example, the hierarchical lattice area data of the map display area is hierarchical lattice area data of one layer containing the map display area. Also, as shown in FIG. 80(*b*), the lattice size is equal to the larger of a horizontal width S and a vertical width T (the horizontal width S is larger) of the map display area 890.

Figure 81:
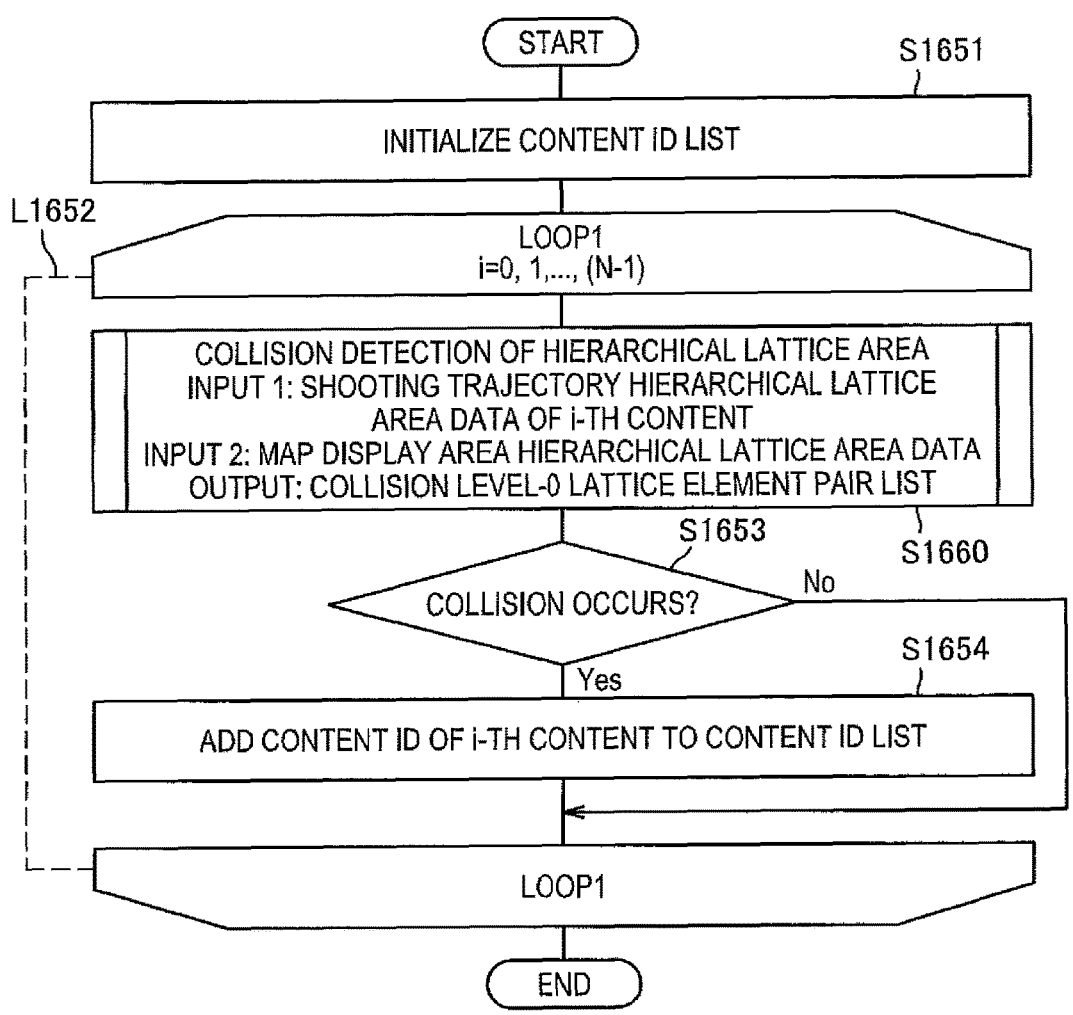
FIG. 81 is a flow chart exemplifying the processing procedure for dynamic image content detection processing by the image processing apparatus 100 according to the second embodiment of the present invention.

FIG. 81 is a flow chart exemplifying the processing procedure for dynamic image content detection processing by the image processing apparatus 100 according to the second embodiment of the present invention. The input data includes shooting trajectory hierarchical lattice area data and target area hierarchical lattice area data. The output data includes a content identification information (content ID) list.

First, a content identification information list is initialized (step S1651). Subsequently, the following processing is repeatedly performed for each piece of dynamic image content (loop L1652). N is a value indicating the number of pieces of all dynamic image content.

That is, in loop L1652, collision detection processing of hierarchical lattice areas is performed (step S1660). The collision detection processing is substantially the same as the processing procedure in step S1100 shown in FIG. 27 and thus, the description thereof is omitted.

Subsequently, whether it is determined that a collision occurs is determined (step S1653) and if it is determined that a collision occurs, content identification information of the i-th dynamic image content is added to the content identification information list (step S1654). On the other hand, if it is determined that no collision occurs (step S1653), the processing returns to the start of loop L1652. Accordingly, dynamic image content whose shooting trajectory is contained in the map display area can be detected. The display unit may be caused to display a list of thumbnail images of the detected dynamic image content to allow the user to grasp the dynamic image content shot in the area.

[Generation Example of a Play List Based on a Passing Determination of the Specified Specific Target Area]

A transition example of the above display screens will be described below. In the map display area 690 of the target area setting screen by specifying the place name shown in FIG. 79, a contour 691 (indicated by a dotted line) of the area (target area) corresponding to the place name (for example, "OX zoo") input in the place name input screen of the target area shown in FIG. 78 is displayed. Accordingly, an overview of dynamic image content shot in the target area specified by the user can easily be grasped. In a place name display area 693, the place name input in the place name input screen of the target area shown in FIG. 78 is displayed.

Figure 82:
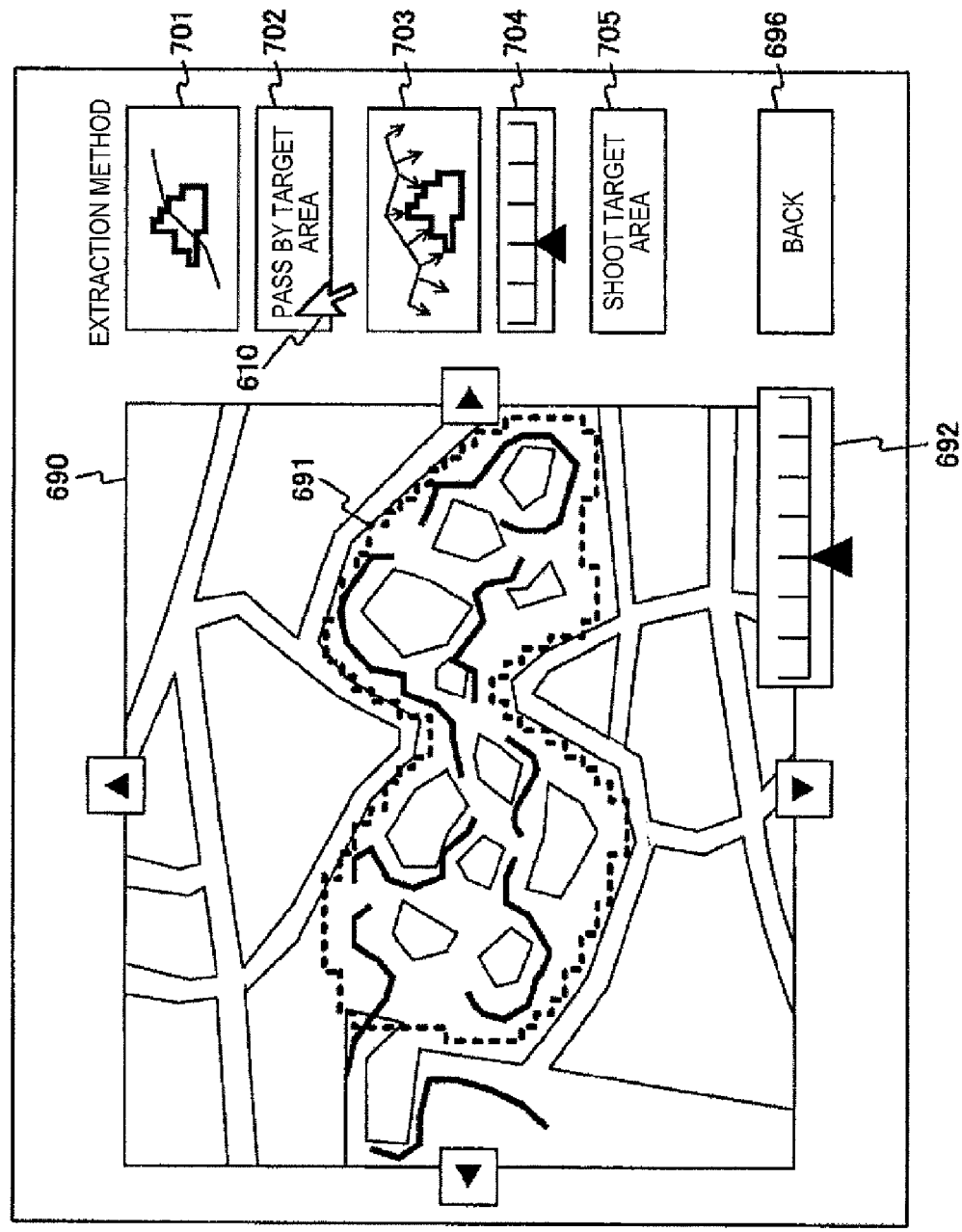
FIG. 82 is a diagram showing a transition example of the display screen displayed in the display unit 180 according to the second embodiment of the present invention.

In the target area setting screen by specifying the place name shown in FIG. 79, if the user presses a "Confirm" button 695, an extraction method selection screen of clips in the target area shown in FIG. 82 is displayed. In the map display area 690 of the extraction method selection screen, for example, the same area as the map display area 690 of the target area setting screen by specifying the place name shown in FIG. 79 is displayed.

Figure 83:
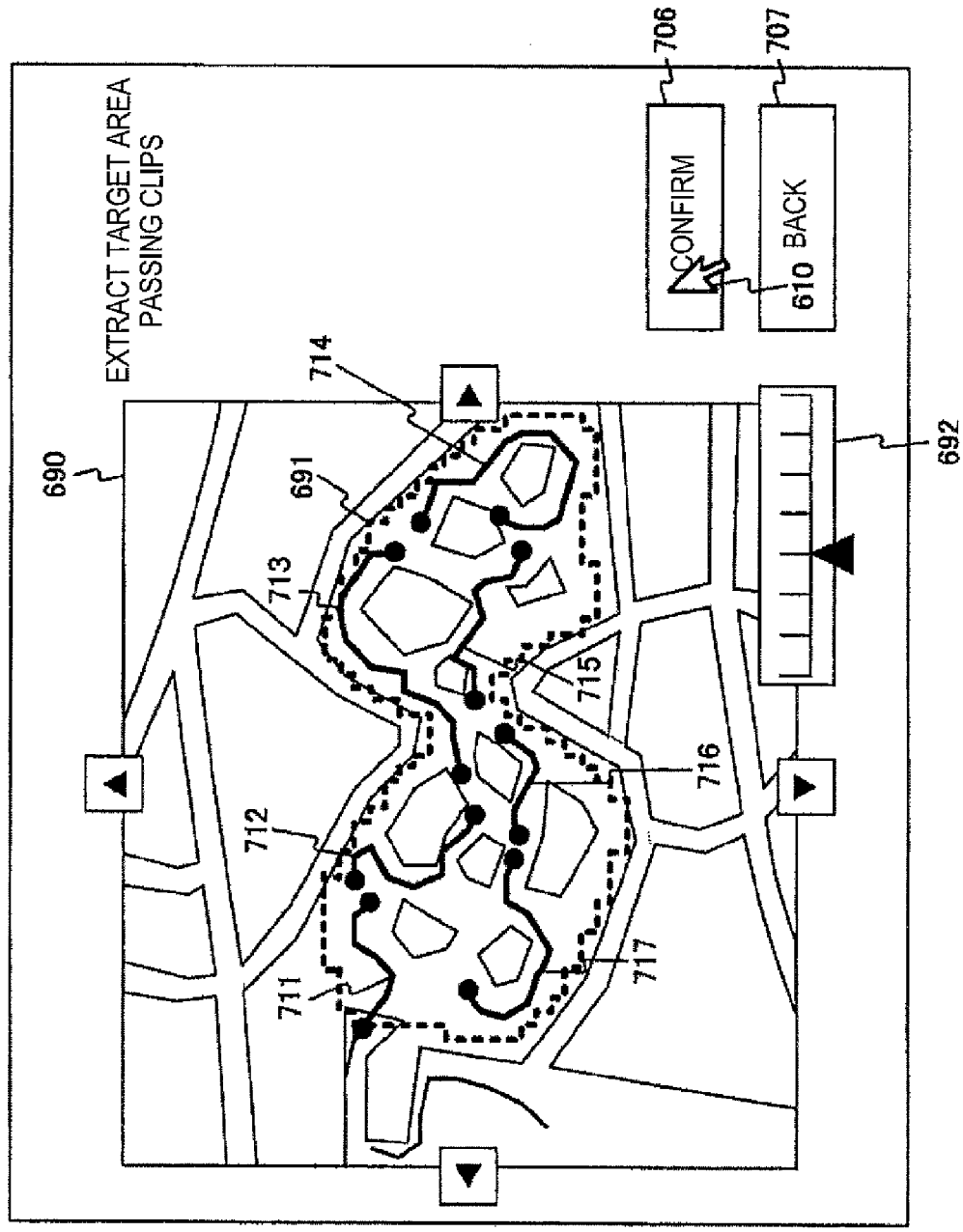
FIG. 83 is a diagram showing a transition example of the display screen displayed in the display unit 180 according to the second embodiment of the present invention.

In the extraction method selection screen of clips in the target area shown in FIG. 82, if the user presses a "Target area passing" button 702, extraction processing of shooting sections passing over the target area (area inside the contour 691) to shoot is performed. That is, the extraction processing (the processing shown in FIGS. 27 to 34) of shooting sections is performed for hierarchical lattice area data of the target area and hierarchical lattice area data (eight pieces in this case) of shooting trajectories of dynamic image content in the map display area containing the target area. A shooting section information list is generated by the extraction processing of shooting sections to generate shooting section information of a plurality of clips Then, an extraction result screen of target area passing clips shown in FIG. 83 is displayed. The extraction result screen of target area passing clips is a screen that displays a result of the extraction processing of shooting sections. In the map display area 690 of the extraction result screen of target area passing clips shown in FIG. 83, shooting sections passing over the target area (area inside the contour 691) of shooting trajectories are displayed in a mode different from the mode in which other sections are displayed. In the example shown in FIG. 83, different display modes are realized by changing the thickness of solid lines. Also, in the example shown in FIG. 83, the start point and the end point of each clip are denoted with a black dot. That is, in the state shown in FIG. 83, seven shooting sections 711 to 717 are selected as PL clip candidates.

Figure 84:
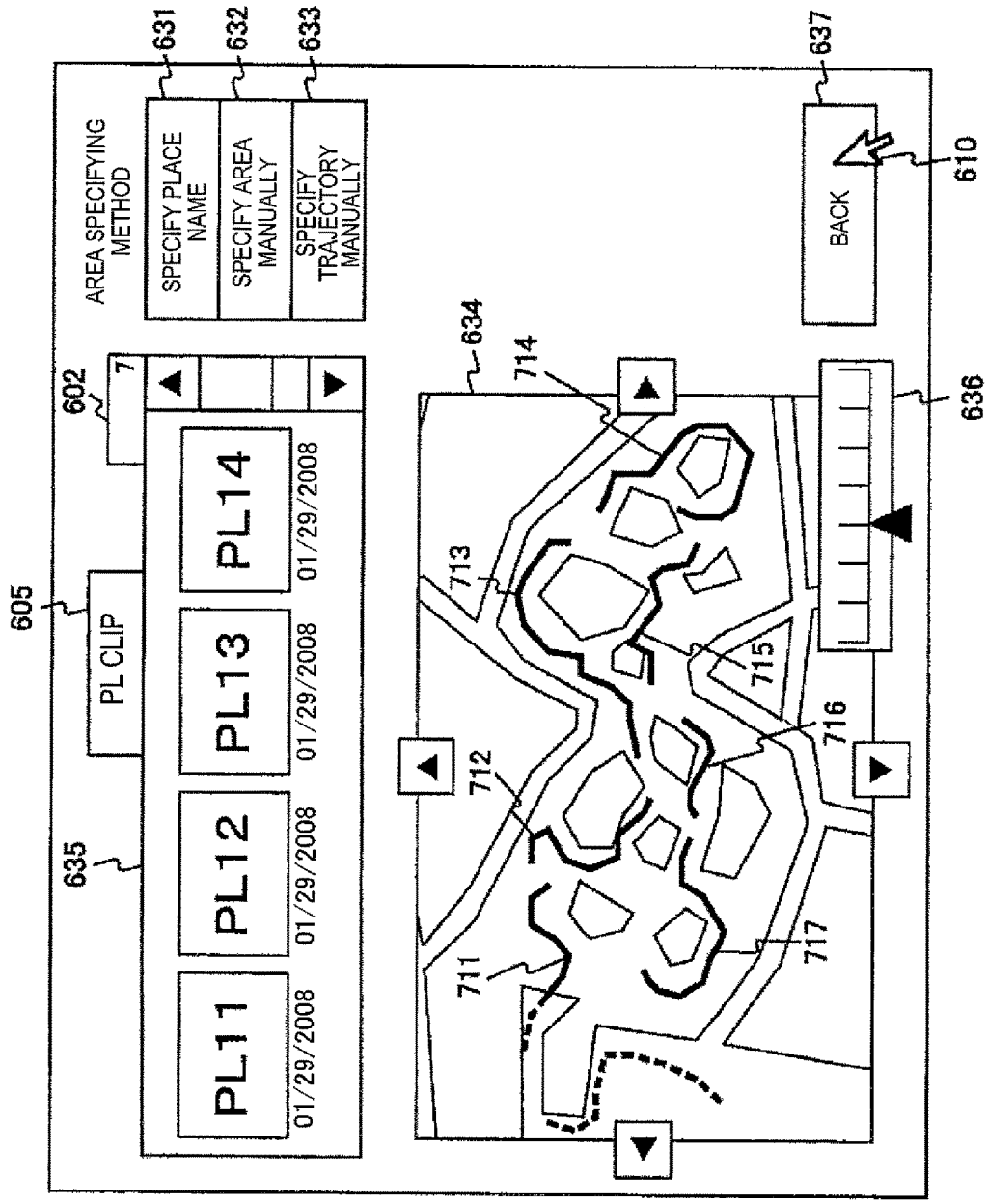
FIG. 84 is a diagram showing a transition example of the display screen displayed in the display unit 180 according to the second embodiment of the present invention.

In the extraction result screen of target area passing clips shown in FIG. 83, if the user presses a "Confirm" button 706, a shooting area specifying screen of PL clips shown in FIG. 84 is displayed. The shooting area specifying screen is substantially the same as the shooting area specifying screen of PL clips shown in FIGS. 69 and 73. In the PL clip listing area 635 shown in FIG. 84, thumbnail images PL11 to PL17 (only PL11 to PL14 are shown in FIG. 84) corresponding to the seven shooting sections 711 to 717 displayed in the map display area 634 are displayed. Incidentally, thumbnail images displayed in the PL clip listing area 635 shown in FIG. 84 and shooting sections displayed in the map display area 634 may be associated and displayed so that correspondences therebetween can easily be grasped. For example, the frame of a thumbnail image displayed in the PL clip listing area 635 and the solid line of a shooting section displayed in the map display area 634 may have the same color for each combination.

Figure 85:
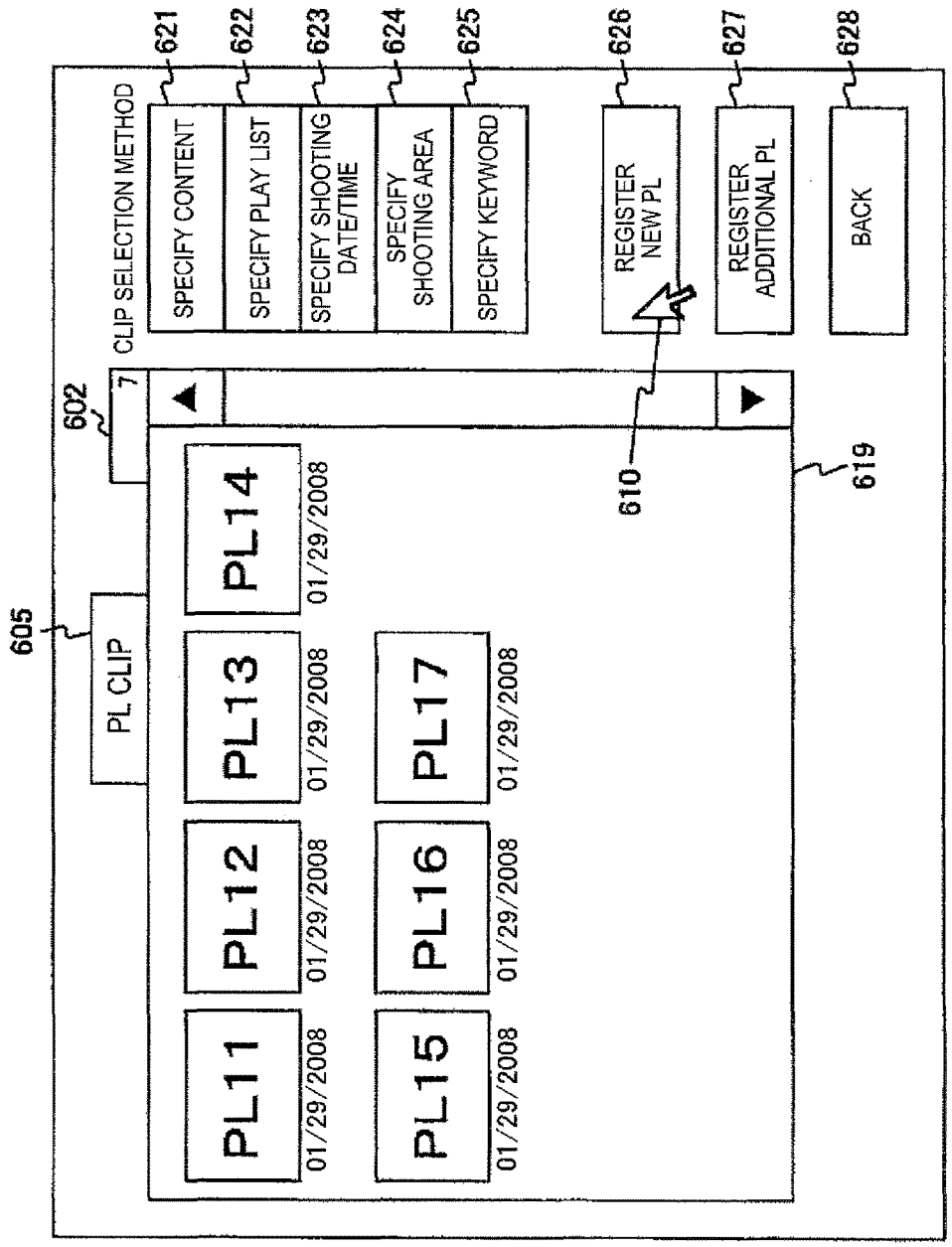
FIG. 85 is a diagram showing a transition example of the display screen displayed in the display unit 180 according to the second embodiment of the present invention.
Figure 86:
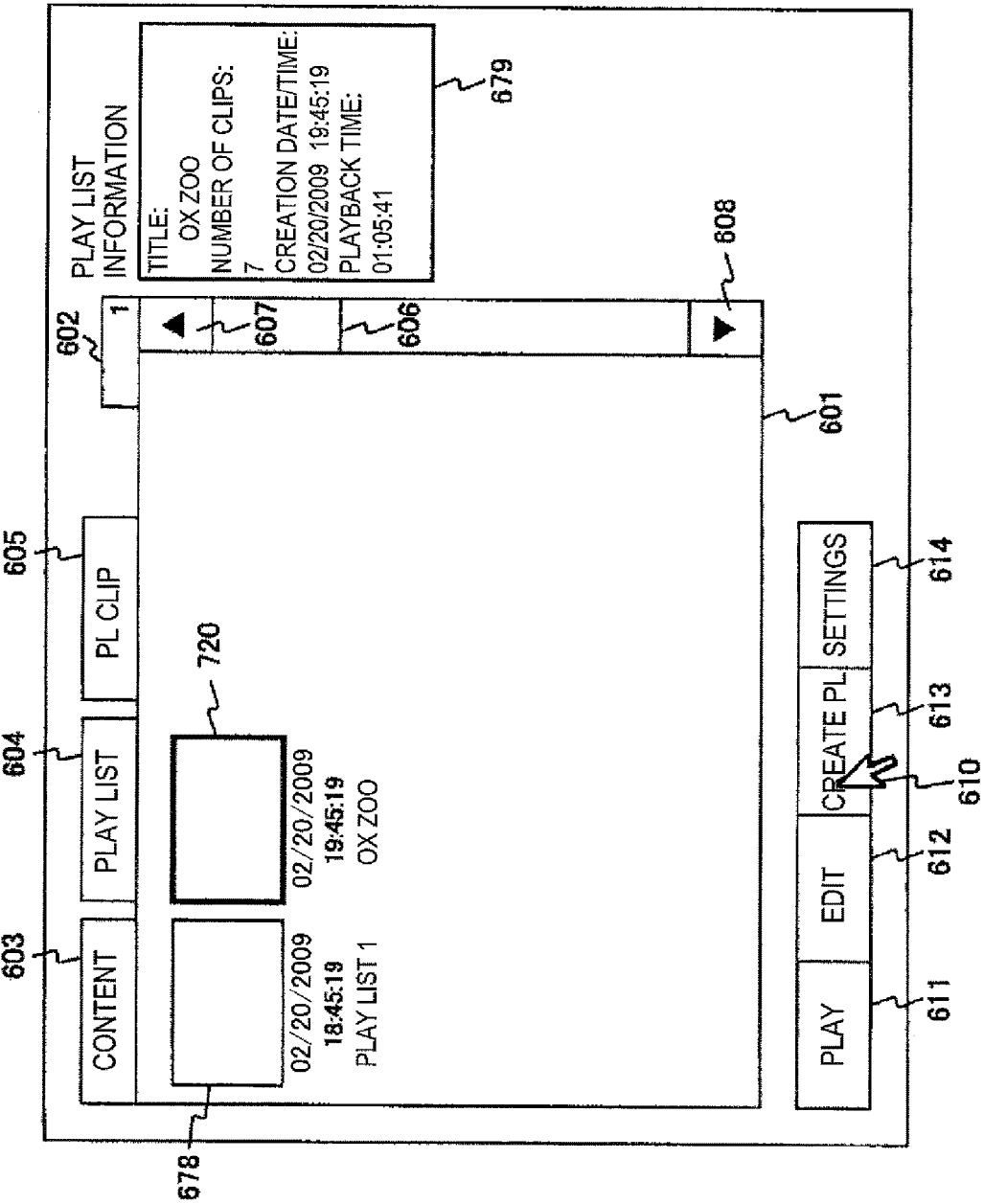
FIG. 86 is a diagram showing a transition example of the display screen displayed in the display unit 180 according to the second embodiment of the present invention.

In the shooting area specifying screen of PL clips shown in FIG. 84, if the user presses a "Back" button 637, a PL creation screen shown in FIG. 85 is displayed. The PL creation screen is substantially the same as the PL creation screen shown in FIGS. 66 and 74 except that thumbnail images displayed in the PL clip listing area 619 are different. In the PL clip listing area 619 shown in FIG. 85, thumbnail images corresponding to the seven shooting sections 711 to 717 displayed in the map display area 634 shown in FIG. 84 are displayed.

In the PL creation screen shown in FIG. 85, if the user presses the "Register new PL" button 626, the play list name input screen shown in FIG. 75 is displayed. In the play list name input screen, a desired play list name (for example, "OX zoo") can be input into the play list name display area 676 by using the input button 675. Then, in the play list name input screen shown in FIG. 75, if the user presses the "Confirm" button 677 after the desired play list name being input, play list information is newly created. The play list information generated as described above is displayed in a play list listing screen shown in FIG. 86 as thumbnail images 720 thereof.

[Generation Example of a Play List Based on a Shooting Determination of the Specified Target Area]

Next, an example in which play list information is generated by manually setting the shooting target area from shooting sections of an existing play list and extracting shooting sections shooting the area will be shown.

If, as described above, the user presses the "Create PL" button 613 in the content list screen shown in FIG. 65, the PL creation screen shown in FIG. 66 is displayed. It is assumed in this state that no PL clip constituting a play list is present.

Figure 87:
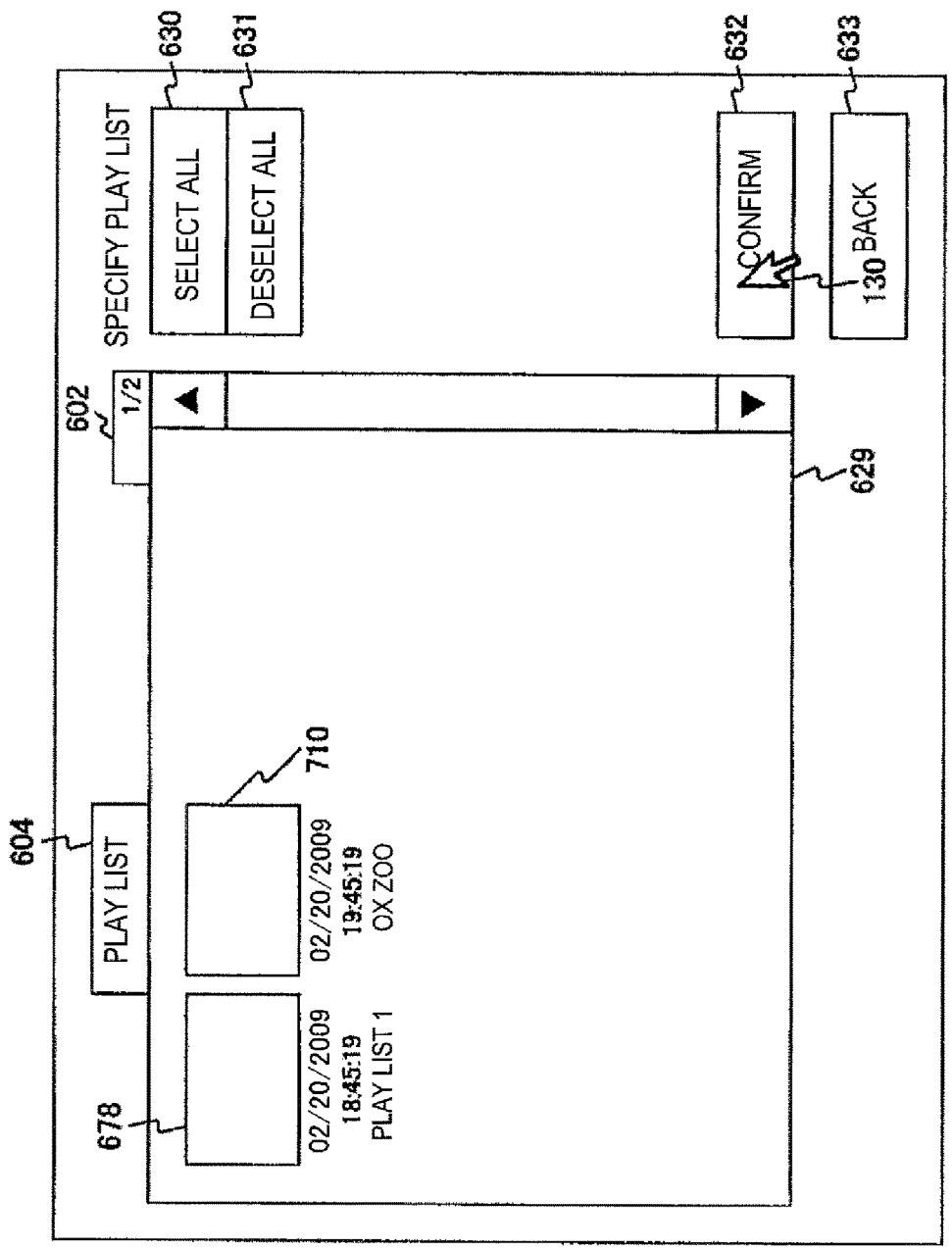
FIG. 87 is a diagram showing a transition example of the display screen displayed in the display unit 180 according to the second embodiment of the present invention.

In the PL creation screen shown in FIG. 66, if the user presses a "Specify play list" button 622, a play list specifying screen of PL clips shown in FIG. 87 is displayed. In this play list specifying screen, if the user selects a desired play list (for example, a thumbnail image 710) and then presses the "Confirm" button 632, a PL creation screen is displayed. In the PL creation screen, the same display as that of the PL creation screen shown in FIG. 85 is made. That is, seven PL clips are displayed in the state shown in FIG. 85. In the PL creation screen (the same as the screen in FIG. 85), if the user presses the "Specify shooting area" button 624, a shooting area specifying screen of PL clips is displayed. In the shooting area specifying screen of PL clips, the same display as that of the shooting area specifying screen of PL clips shown in FIG. 84 is made. In the shooting area specifying screen of PL clips (the same as the screen in FIG. 84), if the user presses a "Specify area manually" button 632, a target area setting screen by manually specifying the area shown in FIG. 88 is displayed.

Figure 88:
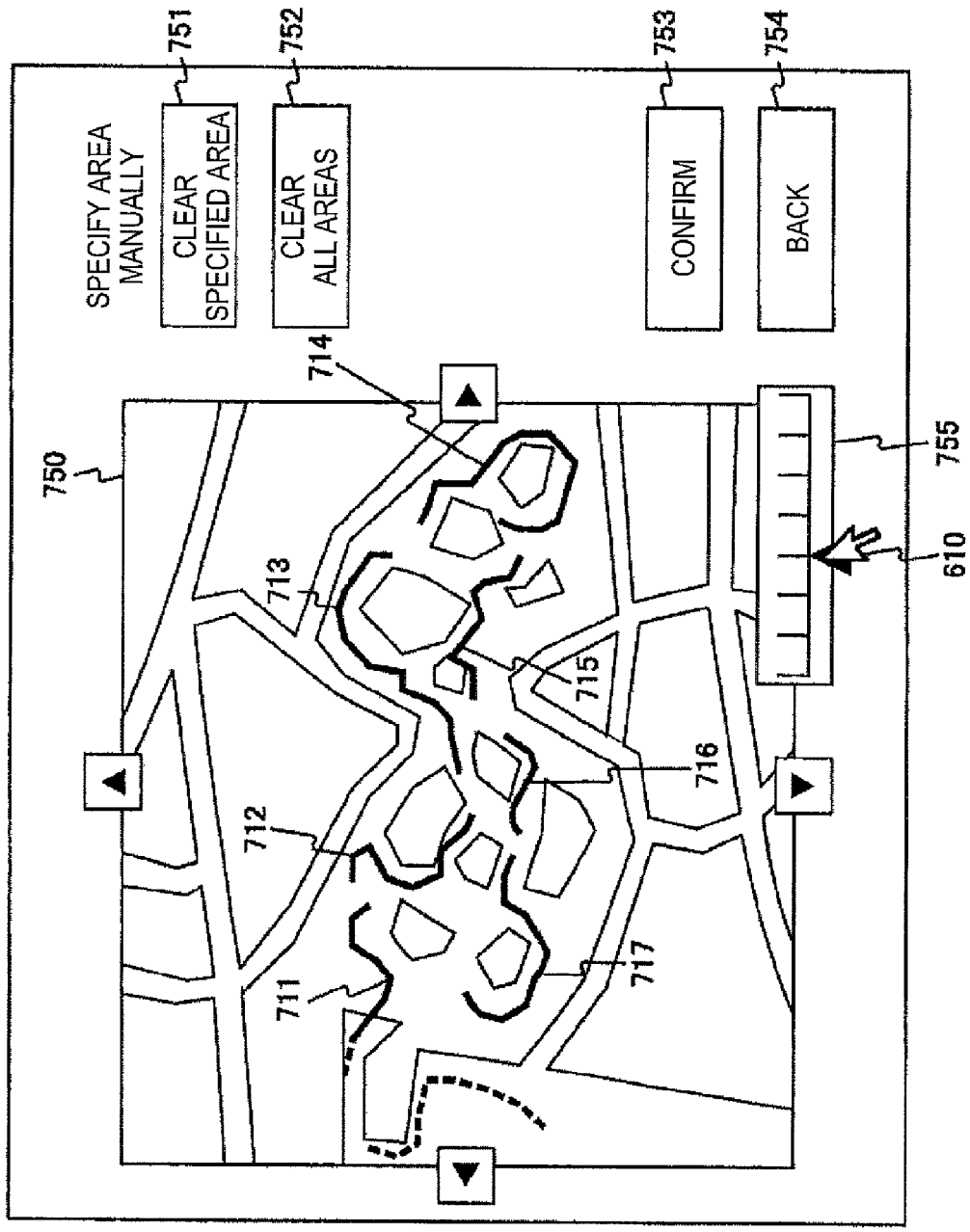
FIG. 88 is a diagram showing a transition example of the display screen displayed in the display unit 180 according to the second embodiment of the present invention.
Figure 89:
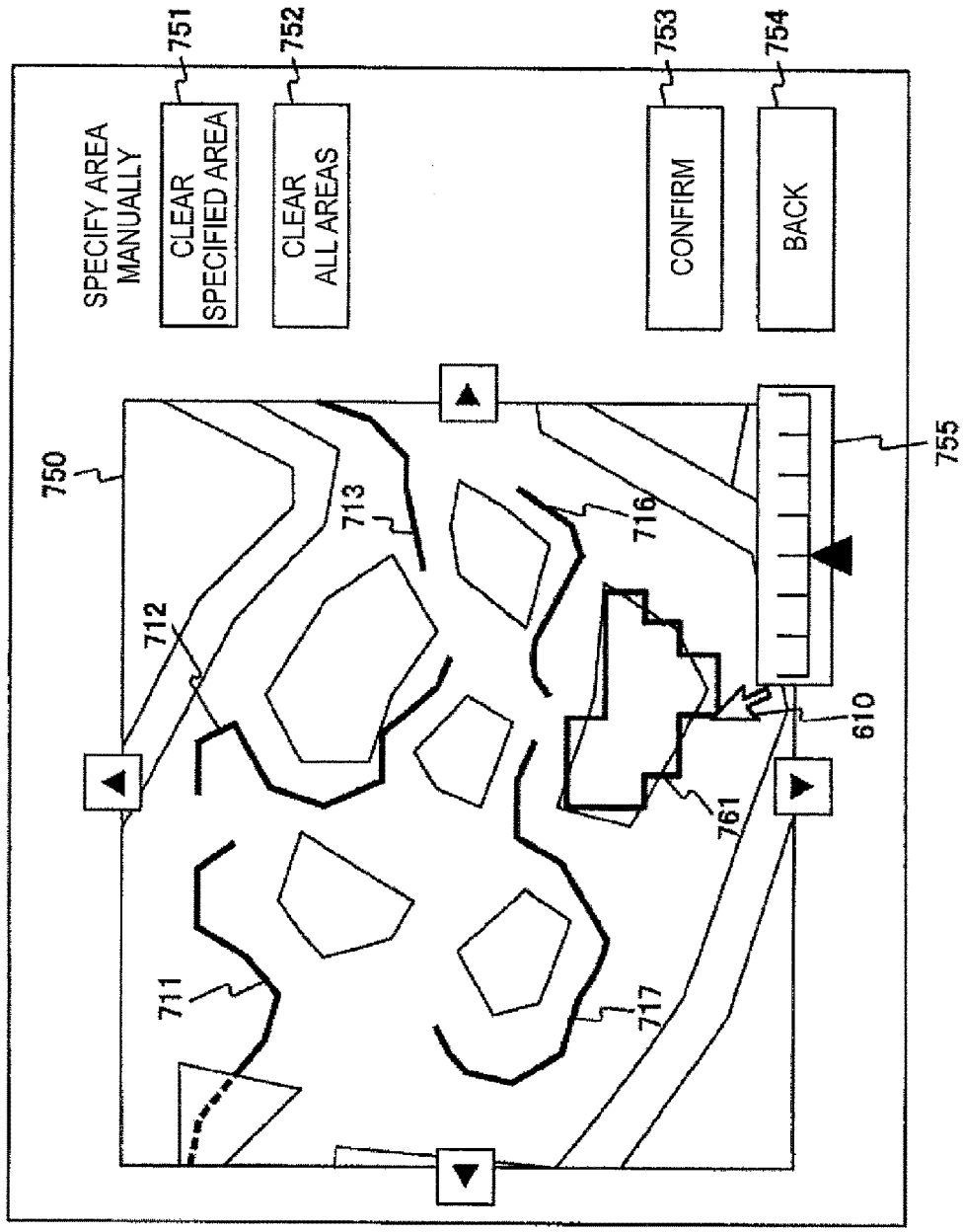
FIG. 89 is a diagram showing a transition example of the display screen displayed in the display unit 180 according to the second embodiment of the present invention.
Figure 90:
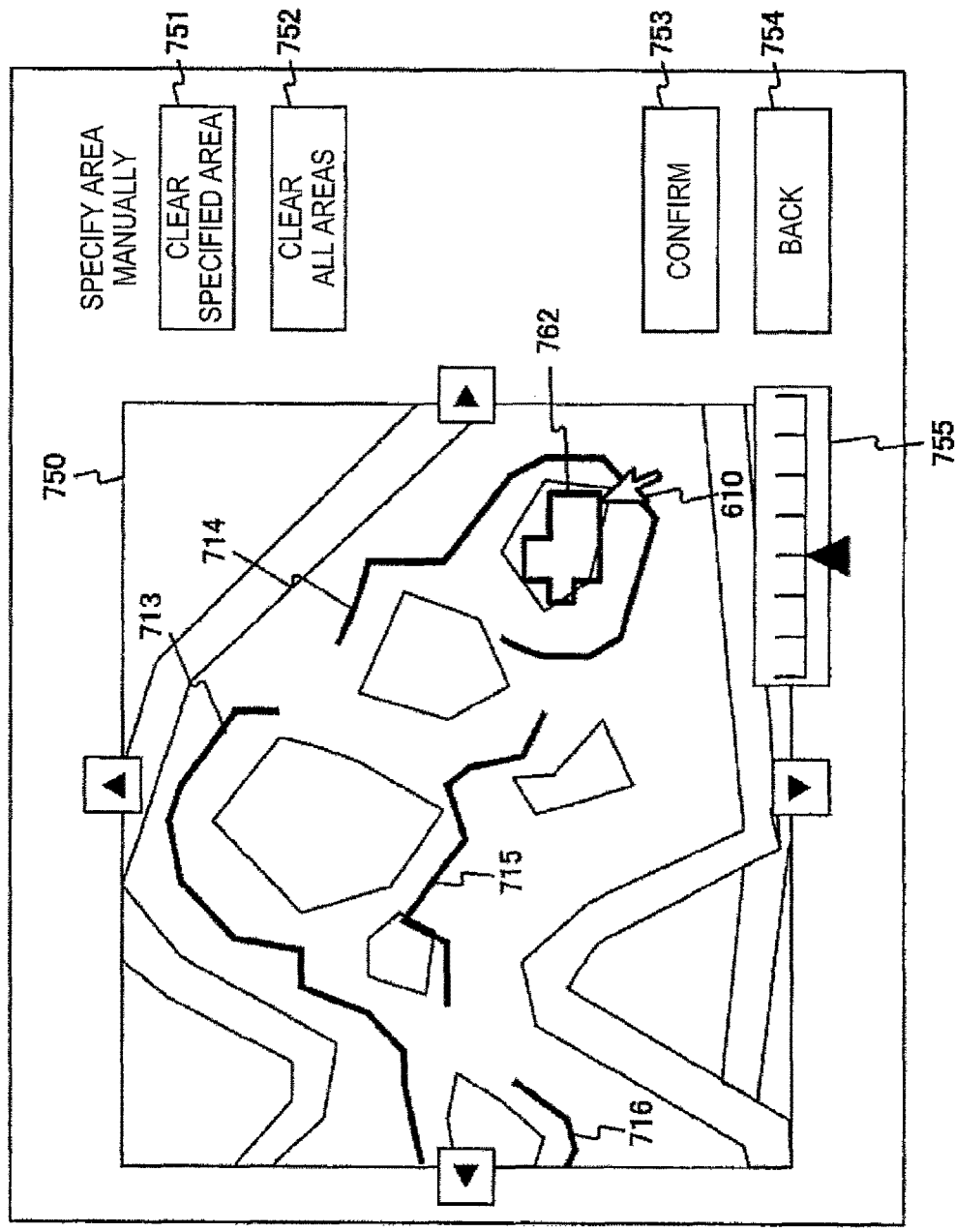
FIG. 90 is a diagram showing a transition example of the display screen displayed in the display unit 180 according to the second embodiment of the present invention.

In the target area setting screen by manually specifying the area shown in FIG. 88, the target area can be set by specifying any area on the map through a manual operation (for example, an operation to surround the target area by using the cursor 610). For example, as shown in FIGS. 89 and 90, the scale of the map shown in a map display area 750 can be changed by a scale change bar 755. Then, as shown, for example, in FIGS. 89 and 90, target areas 761, 762 can be set. The target areas 761, 762 are assumed to be, for example, areas corresponding to a space where tigers of "OX zoo" are present and a space where lions thereof are present respectively. The solid lines indicating the target areas 761, 762 may be displayed in a different mode so as to be distinguishable from the solid lines indicating the shooting trajectories 711 to 717. Thus, when target areas are set, hierarchical lattice area data of the target areas is generated.

Figure 91:
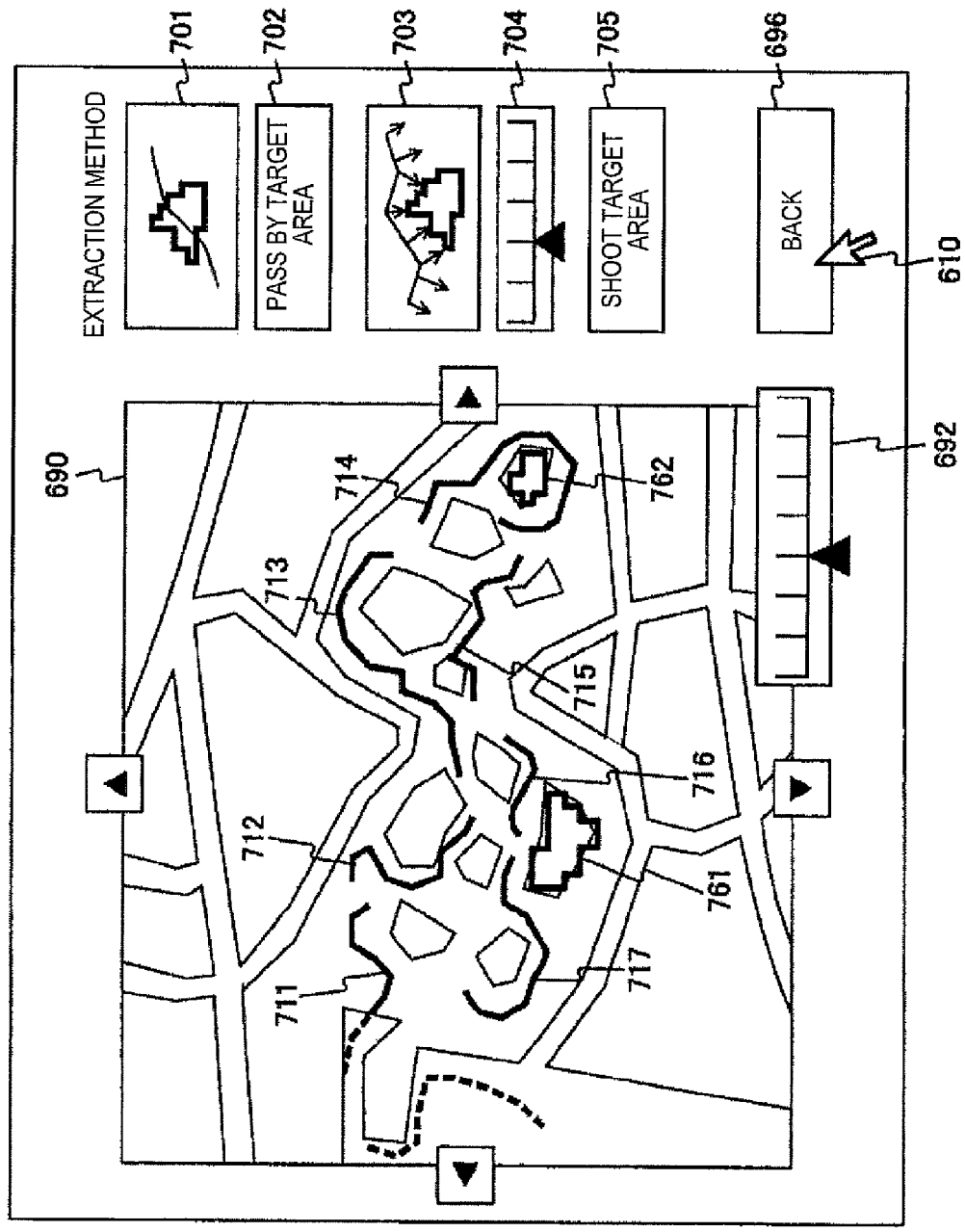
FIG. 91 is a diagram showing a transition example of the display screen displayed in the display unit 180 according to the second embodiment of the present invention.

Then, after settings of the target areas 761, 762 are completed, the user presses a "Confirm" button 753 in the target area setting screen by manually specifying the area shown in FIGS. 88 and 90. With this pressing operation, an extraction method selection screen of clips in the target area shown in FIG. 91 is displayed. The extraction method selection screen is the same as the extraction method selection screen shown in FIG. 82.

In the extraction method selection screen shown in FIG. 91, a shooting distance is set by using a shooting distance setting slider 704. The shooting distance to be set is, for example, a distance representing the distance from the imaging apparatus to a subject and is set by, for example, the generation processing of shooting area data shown in FIGS. 35 to 37. Instead of being specified by the user, the shooting distance may be acquired from camera information (attribute information such as the average value of the subject distance) attached to each clip.

Figure 92:
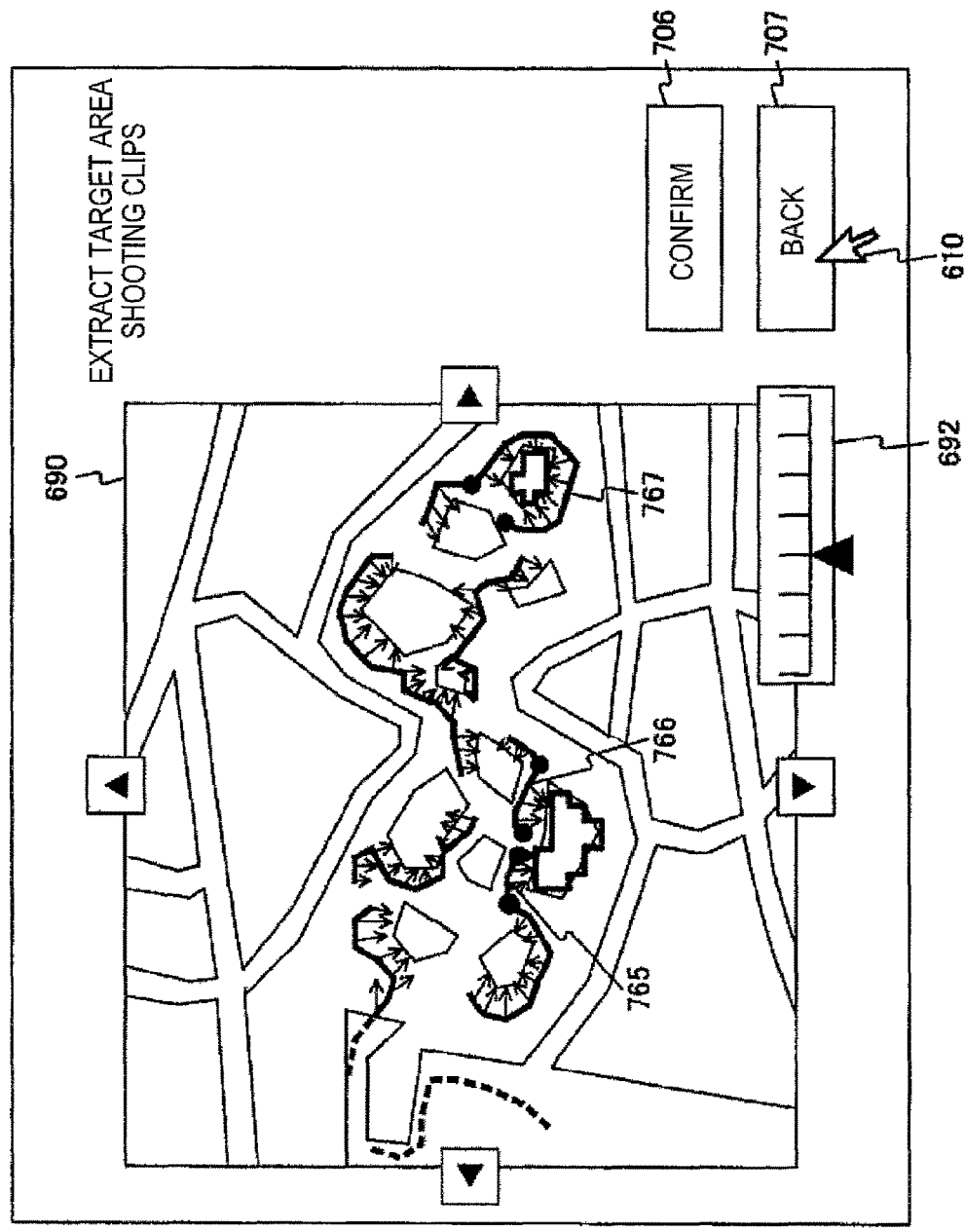
FIG. 92 is a diagram showing a transition example of the display screen displayed in the display unit 180 according to the second embodiment of the present invention.

After the shooting distance being set, if the user presses a "Shoot target area" button 705 in the extraction method selection screen shown in FIG. 91, extraction processing of shooting sections to shoot the target area is performed. That is, the extraction processing (the processing shown in FIGS. 52 to 56) of shooting sections is performed based on hierarchical lattice area data of the target area and shooting area hierarchical lattice area data (seven pieces in this case) of the shooting trajectory of each PL clip. A shooting section information list is generated by the extraction processing of shooting sections to generate shooting section information of a plurality of clips Then, an extraction result screen of target area shooting clips shown in FIG. 92 is displayed. The extraction result screen is a screen that displays a result the extraction processing. In the state shown in FIG. 92, three shooting sections 765 to 767 are selected as PL clip candidates. As shown in FIG. 92, an arrow indicating the shooting direction on the shooting trajectory may be attached to each shooting point and displayed.

Figure 93:
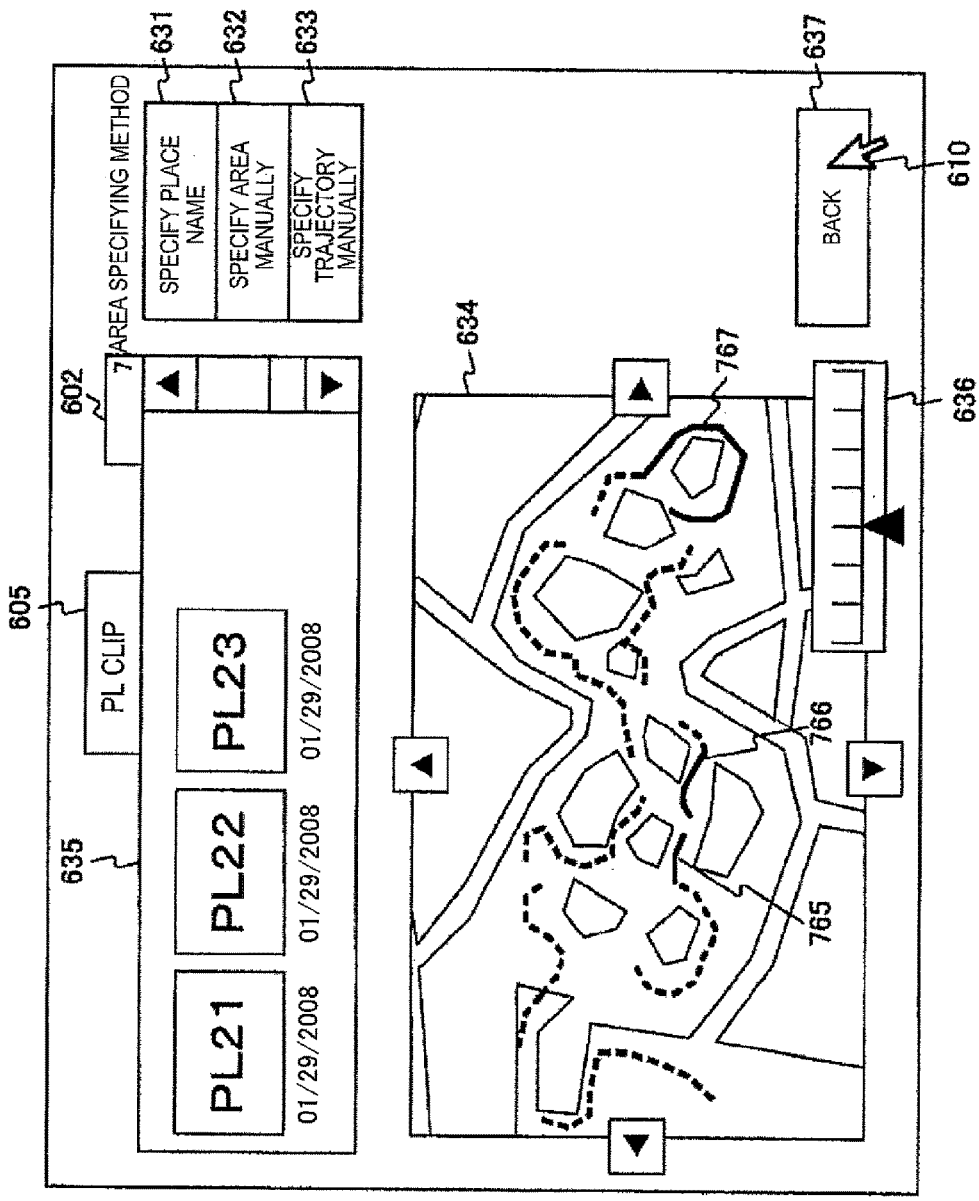
FIG. 93 is a diagram showing a transition example of the display screen displayed in the display unit 180 according to the second embodiment of the present invention.
Figure 94:
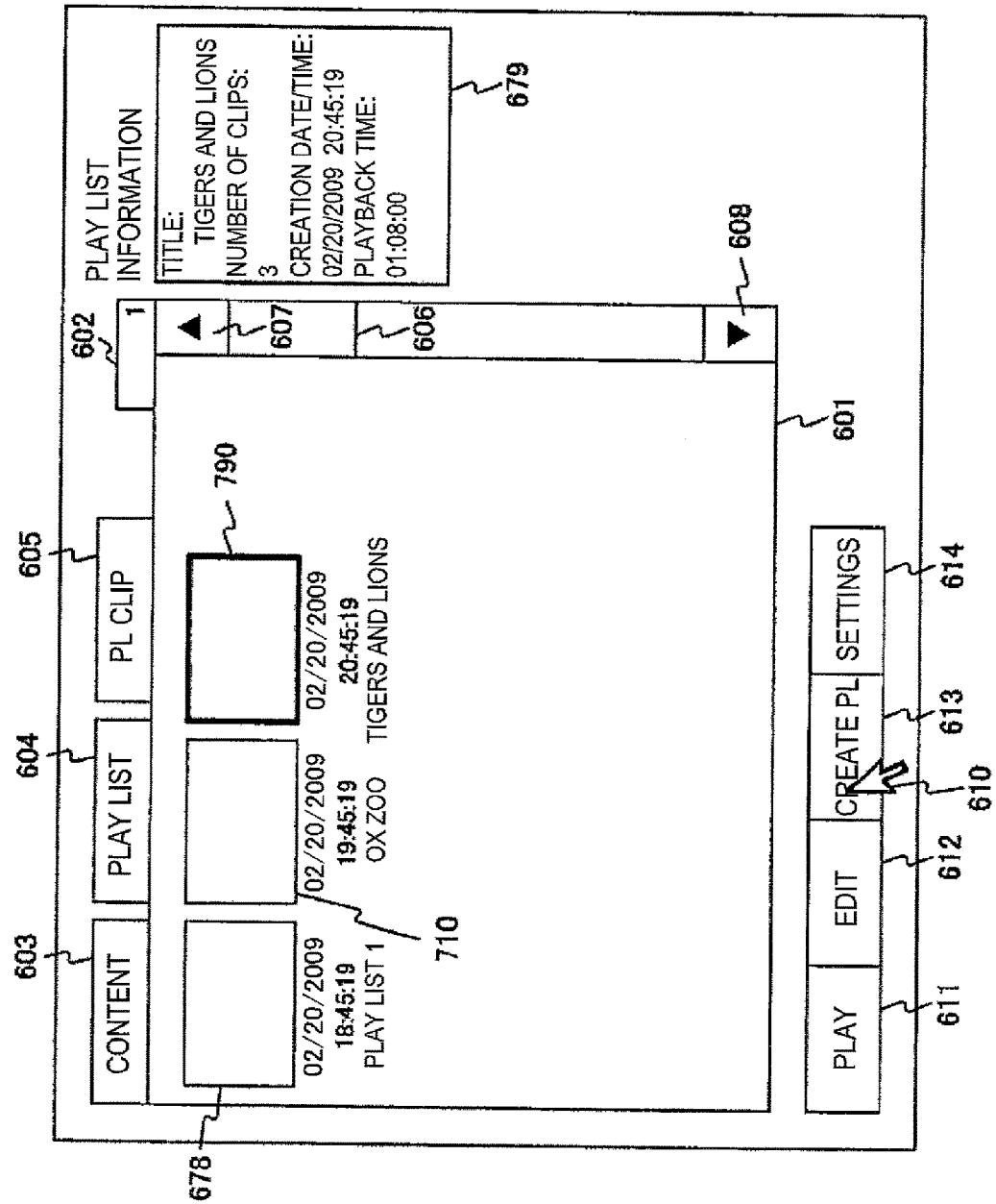
FIG. 94 is a diagram showing a transition example of the display screen displayed in the display unit 180 according to the second embodiment of the present invention.

In the extraction result screen of target area shooting clips shown in FIG. 92, if the user presses the "Confirm" button 706, a shooting area specifying screen of PL clips shown in FIG. 93 is displayed. In the state shown in FIG. 93, the three shooting sections 765 to 767 are selected as PL clip candidates. The shooting area specifying screen of PL clips is the same display as the shooting area specifying screen of PL clips shown in FIG. 84 and the like.

In the shooting area specifying screen of PL clips shown in FIG. 93, if the user presses the "Back" button 637, a PL creation screen (shown in FIG. 66 or the like) is displayed. In the PL creation screen, if the user presses the "Register new PL" button 626, the play list name input screen shown in FIG. 75 is displayed. In the play list name input screen, a desired play list name (for example, "Tigers and lions") can be input into the play list name display area 676 by using the input button 675. Then, in the play list name input screen shown in FIG. 75, if the user presses the "Confirm" button 677 after the desired play list name being input, play list information is newly created. The play list information generated as described above is displayed in a play list listing screen shown in FIG. 94 as thumbnail images 790 thereof.

In this example, an example in which a new play list (three PL clips) that further narrows down shooting sections by using a created play list (seven PL clips) is shown. However, operations of the processing in the screen shown in FIG. 88 and subsequent processing may be performed after operations in each screen shown in FIGS. 77 to 84 are performed.

[Generation Example of a Play List Based on the Specified Target Area]

A modification of the play list generation will be described. For example, dynamic image content containing shooting sections passing over the target area to shoot may be extracted from dynamic image content stored in the recording medium 160 by applying the extraction processing (the processing shown in FIGS. 27 to 34) of shooting sections passing over the target area to shoot. Also, dynamic image content containing shooting sections shooting the target area may be extracted from dynamic image content stored in the recording medium 160 by applying the extraction processing (the processing shown in FIGS. 52 to 56) of shooting sections shooting the target area. For example, the user can specify the target area, extract dynamic image content based on the specified target area, and cause the display unit to display a list of extracted dynamic image content. Accordingly, for example, dynamic image content containing dynamic images shot while passing by the desired target area (for example, a landmark) can easily be grasped. A play list may automatically be generated by further extracting only dynamic images shot while passing by the desired target area from dynamic image content extracted as described above. Similarly, for example, dynamic image content containing dynamic images shooting the desired target area (for example, a landmark) can easily be grasped. A play list may automatically be generated by further extracting only dynamic images shooting the desired target area from dynamic image content extracted as described above. FIG. 95 shows an example of the target area specifying screen when play list information is generated by specifying the target area as described above.

FIG. 95 is a diagram exemplifying the display screen displayed in the display unit 180 according to the second embodiment of the present invention. FIG. 95(*a*) shows an example of the target area specifying screen when a play list is automatically generated by extracting only dynamic images shot while passing by a desired target area. FIG. 95(*b*) shows an example of the target area specifying screen when a play list is automatically generated by extracting only dynamic images shooting a desired target area. Thus, each target area to be displayed can automatically be extracted based on, for example, dynamic image content stored in the recording medium 160.

Therefore, according to the second embodiment of the present invention, a play list suiting user's preferences can easily be generated by using position information and azimuth information. That is, edits of dynamic image content considering geographical positions and suiting user's preferences can easily be performed.

In the embodiments of the present invention, examples using angle information (azimuth information) with respect to the horizontal direction, but angle information with respect to the vertical direction may be used to set sections on a time axis of dynamic images. For example, sections on the time axis of dynamic images can be set based on sections on a trajectory extracted in such a way that the angle identified based on angle information with respect to the vertical direction detected by using a gyro sensor is within a fixed range.

The embodiments of the present invention can be applied to image processing apparatuses capable of handling dynamic image content such as mobile phones such as mobile phones with an imaging function, personal computers, navigation systems, and mobile media players.

The embodiments of the present invention show only examples to embody the present invention and as explicitly described in the embodiments of the present invention, there is a correspondence between matter in the embodiments of the present invention and invention identifying matter in claims. Similarly, there is a correspondence between invention identifying matter in claims and matter in the embodiments of the present invention to which the same name is attached. However, the present invention is not limited to the embodiments and can be embodied by making various modifications to the embodiments without deviating from the scope of the present invention.

Processing procedures described in the embodiments of the present invention may be considered as a method having a series of these procedures or as a program to cause a computer to execute a series of these procedures or as a recording medium to store the program. As the recording medium, for example, a CD (Compact Disc), MD (Mini-Disc), DVD (Digital Versatile Disk), memory card, Blu-ray Disc (registered trademark) or the like can be used.

REFERENCE SIGNS LIST

100 Image processing apparatus
101 Bus
111 Imaging unit
112 Image signal processing unit
113 Position information acquisition unit
114 Azimuth information acquisition unit
121 Operation unit
122 Operation accepting unit
130 CPU
141 ROM
142 RAM
150 Recording control unit
160 Recording medium
170 Display control unit
180 Display unit
200 Content storage unit
210 Map information storage unit
220 Acquisition unit
230 Trajectory information generation unit
240 Display control unit
250 Display unit
260 Editing point setting unit
270 Play list information generation unit
280 Operation accepting unit
290 Play list information storage unit

The invention claimed is:

1. An image processing apparatus comprising:
   a trajectory information generation unit configured to electronically convert position information into trajectory information, the position information identifies a location of a first image on a trajectory as being before a location of a second image on the trajectory and identifies the location of the second image on the trajectory as being before a location of a third image on the trajectory;
   a setting unit configured to electronically convert the trajectory information into section information, the section information defines a first section of the trajectory as being from the first image to the second image and a second section of the trajectory as being from the second image to the third image; and
   a play list information generation unit configured to electronically convert the section information into a hierarchical structure of a first group of lattice elements and a hierarchical structure of a second group of the lattice elements, the first group represents the first section and the second group represents the second section.

2. The image processing apparatus according to claim 1, wherein a lattice area of a child lattice element is contained in a lattice area of a parent lattice element, the lattice area of the parent lattice element is larger than the lattice area of the child lattice element.

3. The image processing apparatus according to claim 1, wherein at least one of the lattice elements connects the first group to the second group.

4. The image processing apparatus according to claim 1, wherein each of the lattice elements is a polygon.

5. The image processing apparatus according to claim 1, further comprising:
   a display control unit configured to display the trajectory.

6. The image processing apparatus according to claim 5, wherein the display control unit is configured to superimpose the trajectory on a map.

7. The image processing apparatus according to claim 1, wherein the position information includes a latitude and longitude of an imaging unit during a capture of the first image.

8. The image processing apparatus according to claim 7, wherein the position information includes a latitude and longitude of the imaging unit during a capture of the second image.

9. The image processing apparatus according to claim 8, wherein the position information includes a latitude and longitude of the imaging unit during a capture of the first image.

10. The image processing apparatus according to claim 1, wherein dynamic image content includes the first image, the second image, and the third image.

11. An image processing method comprising:
    electronically converting position information into trajectory information, the position information identifies a location of a first image on a trajectory as being before a location of a second image on the trajectory and identifies the location of the second image on the trajectory as being before a location of a third image on the trajectory;

electronically converting the trajectory information into section information, the section information defines a first section of the trajectory as being from the first image to the second image and a second section of the trajectory as being from the second image to the third image; and electronically converting the section information into a hierarchical structure of a first group of lattice elements and a hierarchical structure of a second group of the lattice elements, the first group represents the first section and the second group represents the second section.

12. The image processing method according to claim 11, wherein a lattice area of a child lattice element is contained in a lattice area of a parent lattice element, the lattice area of the parent lattice element is larger than the lattice area of the child lattice element.

13. The image processing method according to claim 11, wherein at least one of the lattice elements connects the first group to the second group.

14. The image processing method according to claim 11, wherein each of the lattice elements is a polygon.

15. The image processing method according to claim 11, further comprising:

displaying the trajectory on a display.

16. The image processing method according to claim 11, further comprising:

superimposing the trajectory on a map.

17. The image processing method according to claim 11, wherein the position information includes a latitude and longitude of an imaging unit during a capture of the first image.

18. The image processing method according to claim 17, wherein the position information includes a latitude and longitude of the imaging unit during a capture of the second image.

19. The image processing method according to claim 18, wherein the position information includes a latitude and longitude of the imaging unit during a capture of the first image.

20. The image processing method according to claim 11, wherein dynamic image content includes the first image, the second image, and the third image.

* * * * *